(12) United States Patent
Wahlbin et al.

(10) Patent No.: US 7,805,321 B2
(45) Date of Patent: *Sep. 28, 2010

(54) COMPUTERIZED METHOD AND SYSTEM FOR ESTIMATING LIABILITY FOR AN ACCIDENT FROM AN INVESTIGATION OF THE ACCIDENT

(75) Inventors: Stephan Wahlbin, Austin, TX (US); Kathleen E. Rourke, Farmington, CT (US); Kimberly Wiesman, Austin, TX (US)

(73) Assignee: Computer Sciences Corporation, El Segundo, CA (US)

( * ) Notice: Subject to any disclaimer, the term of this patent is extended or adjusted under 35 U.S.C. 154(b) by 1481 days.

This patent is subject to a terminal disclaimer.

(21) Appl. No.: 10/306,864

(22) Filed: Nov. 27, 2002

(65) Prior Publication Data

US 2004/0103008 A1    May 27, 2004

(51) Int. Cl.
    *G06Q 10/00*  (2006.01)
(52) U.S. Cl. .................... 705/4; 705/2; 705/3
(58) Field of Classification Search .............. 705/2–4
    See application file for complete search history.

(56) References Cited

U.S. PATENT DOCUMENTS

| | | |
|---|---|---|
| 4,166,599 A | 9/1979 | Auer et al. |
| 4,638,289 A | 1/1987 | Zottnik |
| 4,656,585 A | 4/1987 | Stephenson |
| 4,839,822 A | 6/1989 | Dormond et al. |
| 4,878,167 A | 10/1989 | Kapulka et al. |
| 4,931,793 A | 6/1990 | Fuhrmann et al. |
| 5,099,422 A | 3/1992 | Foresman et al. |
| 5,172,281 A | 12/1992 | Ardis et al. |
| 5,180,309 A | 1/1993 | Egnor |
| 5,191,522 A | 3/1993 | Bosco et al. |
| 5,201,044 A | 4/1993 | Frey, Jr. et al. |
| 5,233,513 A | 8/1993 | Doyle |
| 5,243,524 A * | 9/1993 | Ishida et al. ................. 701/28 |

(Continued)

FOREIGN PATENT DOCUMENTS

EP    0 280 773    9/1988

(Continued)

OTHER PUBLICATIONS

"Reel to Real: Should You Believe What You See?" by Dean Harts; Defense Counsel Journal, Oct. 1999, vol. 66(4); p. 514 from the Dialog File ABI/Inform Global.*

(Continued)

*Primary Examiner*—Vivek D Koppikar
(74) *Attorney, Agent, or Firm*—Meyertons, Hood, Kivlin, Kowert & Goetzel, P.C.; Eric B. Meyertons

(57) ABSTRACT

Computer-implemented methods and systems for estimating liability for a vehicle accident are provided. In one embodiment, a question may be generated on one or more topics relating to the accident. A set of answers corresponding to the question may be provided to the computer system. In an embodiment, the set of answers may include one or more answers obtained from one or more sources. An answer from the set of answers may be selected for use in estimating liability in the accident. The effect of the selected answer on liability may be estimated.

20 Claims, 126 Drawing Sheets

U.S. PATENT DOCUMENTS

| | | |
|---|---|---|
| 5,317,503 A | 5/1994 | Inoue |
| 5,386,566 A | 1/1995 | Hamanaka et al. |
| 5,394,555 A | 2/1995 | Hunter et al. |
| 5,434,994 A | 7/1995 | Shaheen et al. |
| 5,446,659 A | 8/1995 | Yamawaki |
| 5,455,947 A | 10/1995 | Suzuki et al. |
| 5,483,442 A | 1/1996 | Black et al. |
| 5,483,632 A | 1/1996 | Kuwamoto et al. |
| 5,499,330 A | 3/1996 | Lucas et al. |
| 5,504,674 A | 4/1996 | Chen et al. |
| 5,523,942 A | 6/1996 | Tyler et al. |
| 5,524,489 A | 6/1996 | Twigg |
| 5,550,976 A | 8/1996 | Henderson et al. |
| 5,557,515 A | 9/1996 | Abbruzzese et al. |
| 5,585,798 A * | 12/1996 | Yoshioka et al. .............. 342/70 |
| 5,586,310 A | 12/1996 | Sharman |
| 5,638,508 A | 6/1997 | Kanai et al. |
| 5,652,705 A | 7/1997 | Spiess |
| 5,689,706 A | 11/1997 | Rao et al. |
| 5,696,705 A | 12/1997 | Zykan |
| 5,710,578 A | 1/1998 | Beauregard et al. |
| 5,717,391 A | 2/1998 | Rodriguez |
| 5,745,901 A | 4/1998 | Entner et al. |
| 5,768,505 A | 6/1998 | Gilchrist et al. |
| 5,768,506 A | 6/1998 | Randell |
| 5,787,269 A | 7/1998 | Hyodo |
| 5,787,429 A | 7/1998 | Nikolin |
| 5,797,134 A | 8/1998 | McMillan et al. |
| 5,798,949 A | 8/1998 | Kaub |
| 5,815,093 A | 9/1998 | Kikinis |
| 5,832,481 A | 11/1998 | Sheffield |
| 5,862,500 A | 1/1999 | Goodwin |
| 5,870,711 A | 2/1999 | Huffman |
| 5,873,066 A | 2/1999 | Underwood et al. |
| 5,877,707 A | 3/1999 | Kowalick |
| 5,907,848 A | 5/1999 | Zaiken et al. |
| 5,909,683 A | 6/1999 | Miginiac et al. |
| 5,930,759 A | 7/1999 | Moore et al. |
| 5,933,816 A | 8/1999 | Zeanah et al. |
| 5,937,189 A | 8/1999 | Branson et al. |
| 5,948,035 A | 9/1999 | Tomita |
| 5,950,169 A | 9/1999 | Borghesi et al. |
| 5,956,687 A | 9/1999 | Wamsley |
| 5,987,434 A | 11/1999 | Libman |
| 5,991,733 A | 11/1999 | Aleia et al. |
| 6,009,402 A | 12/1999 | Whitworth |
| 6,037,860 A | 3/2000 | Zander et al. |
| 6,038,393 A | 3/2000 | Iyengar et al. |
| 6,043,813 A | 3/2000 | Stickney et al. |
| 6,049,665 A | 4/2000 | Branson et al. |
| 6,064,983 A | 5/2000 | Koehler |
| 6,076,026 A | 6/2000 | Jambhekar et al. |
| 6,081,832 A | 6/2000 | Gilchrist et al. |
| 6,092,049 A | 7/2000 | Chislenko et al. |
| 6,098,070 A | 8/2000 | Maxwell |
| 6,105,007 A | 8/2000 | Norris |
| 6,115,690 A | 9/2000 | Wong |
| 6,134,582 A | 10/2000 | Kennedy |
| 6,141,015 A * | 10/2000 | Tanaka ....................... 345/427 |
| 6,141,611 A | 10/2000 | Mackey et al. |
| 6,161,071 A * | 12/2000 | Shuman et al. .............. 701/48 |
| 6,163,770 A | 12/2000 | Gamble et al. |
| 6,173,284 B1 | 1/2001 | Brown |
| 6,184,782 B1 | 2/2001 | Oda et al. |
| 6,185,490 B1 | 2/2001 | Ferguson |
| 6,185,540 B1 | 2/2001 | Schreitmueller et al. |
| 6,223,125 B1 | 4/2001 | Hall |
| 6,226,623 B1 | 5/2001 | Schein et al. |
| 6,236,975 B1 | 5/2001 | Boe et al. |
| 6,246,933 B1 | 6/2001 | Bague |
| 6,254,127 B1 | 7/2001 | Breed et al. |
| 6,268,804 B1 | 7/2001 | Janky et al. |
| 6,308,187 B1 | 10/2001 | DeStefano |
| 6,336,096 B1 | 1/2002 | Jernberg |
| 6,351,893 B1 | 3/2002 | St. Pierre |
| 6,363,360 B1 | 3/2002 | Madden |
| 6,381,561 B1 * | 4/2002 | Bomar et al. .................. 703/8 |
| 6,397,334 B1 | 5/2002 | Chainer et al. |
| 6,405,132 B1 | 6/2002 | Breed et al. |
| 6,408,304 B1 | 6/2002 | Kumhyr |
| 6,446,086 B1 | 9/2002 | Bartlett et al. |
| 6,473,084 B1 | 10/2002 | Phillips et al. |
| 6,493,650 B1 | 12/2002 | Rodgers et al. |
| 6,525,672 B2 | 2/2003 | Chainer et al. |
| 6,532,459 B1 | 3/2003 | Berson |
| 6,570,609 B1 * | 5/2003 | Heien ......................... 348/148 |
| 6,604,080 B1 | 8/2003 | Kern |
| 6,675,074 B2 | 1/2004 | Hathout et al. |
| 6,696,929 B2 | 2/2004 | Igaki et al. |
| 6,832,205 B1 | 12/2004 | Aragones et al. |
| 6,850,843 B2 | 2/2005 | Smith et al. |
| 6,925,468 B1 | 8/2005 | Bobbitt et al. |
| 6,938,029 B1 | 8/2005 | Tien |
| 6,952,741 B1 | 10/2005 | Bartlett et al. |
| 6,961,708 B1 | 11/2005 | Bierenbaum |
| 6,970,844 B1 | 11/2005 | Bierenbaum |
| 7,013,284 B2 | 3/2006 | Guyan |
| 7,024,418 B1 | 4/2006 | Childress et al. |
| 7,051,046 B2 | 5/2006 | Virag et al. |
| 7,095,426 B1 | 8/2006 | Childress |
| 7,197,444 B2 | 3/2007 | Bomar, Jr. et al. |
| 7,337,121 B1 | 2/2008 | Beinat et al. |
| 7,343,307 B1 | 3/2008 | Childress |
| 7,353,196 B1 | 4/2008 | Doughty et al. |
| 7,356,541 B1 | 4/2008 | Doughty |
| 7,359,863 B1 | 4/2008 | Evenshaug et al. |
| 7,363,264 B1 | 4/2008 | Doughty et al. |
| 7,398,219 B1 | 7/2008 | Wolfe |
| 7,418,400 B1 | 8/2008 | Lorenz |
| 7,430,514 B1 | 9/2008 | Childress et al. |
| 7,430,515 B1 | 9/2008 | Wolfe et al. |
| 2001/0037223 A1 | 11/2001 | Beery et al. |
| 2001/0041993 A1 | 11/2001 | Campbell |
| 2001/0044735 A1 | 11/2001 | Colburn et al. |
| 2002/0004729 A1 | 1/2002 | Zak et al. |
| 2002/0007289 A1 | 1/2002 | Malin et al. |
| 2002/0030587 A1 | 3/2002 | Jackson |
| 2002/0035488 A1 | 3/2002 | Aquila et al. |
| 2002/0049619 A1 | 4/2002 | Wahlbin et al. |
| 2002/0055860 A1 | 5/2002 | Wahlbin et al. |
| 2002/0055861 A1 | 5/2002 | King et al. |
| 2002/0059083 A1 | 5/2002 | Wahlbin et al. |
| 2002/0059084 A1 | 5/2002 | Wahlbin et al. |
| 2002/0059085 A1 | 5/2002 | Wahlbin et al. |
| 2002/0059086 A1 | 5/2002 | Wahlbin et al. |
| 2002/0059087 A1 | 5/2002 | Wahlbin et al. |
| 2002/0059097 A1 | 5/2002 | Wahlbin et al. |
| 2002/0062232 A1 | 5/2002 | Wahlbin et al. |
| 2002/0062233 A1 | 5/2002 | Wahlbin et al. |
| 2002/0062234 A1 | 5/2002 | Wahlbin et al. |
| 2002/0062235 A1 | 5/2002 | Wahlbin et al. |
| 2002/0069091 A1 | 6/2002 | Wahlbin et al. |
| 2002/0069092 A1 | 6/2002 | Wahlbin et al. |
| 2002/0082873 A1 | 6/2002 | Wahlbin et al. |
| 2002/0087363 A1 | 7/2002 | Wahlbin et al. |
| 2002/0091504 A1 | 7/2002 | Wahlbin et al. |
| 2002/0128881 A1 | 9/2002 | Wahlbin et al. |
| 2002/0133362 A1 | 9/2002 | Karathanasis et al. |
| 2002/0145666 A1 | 10/2002 | Scaman et al. |
| 2002/0161597 A1 | 10/2002 | Klibaner |
| 2003/0114972 A1 | 6/2003 | Takafuji et al. |
| 2003/0125991 A1 | 7/2003 | Logan |
| 2003/0200123 A1 | 10/2003 | Burge et al. |
| 2004/0030587 A1 | 2/2004 | Danico et al. |

| | | | |
|---|---|---|---|
| 2004/0049409 | A1 | 3/2004 | Wahlbin et al. |
| 2004/0054556 | A1 | 3/2004 | Wahlbin et al. |
| 2004/0054557 | A1 | 3/2004 | Wahlbin et al. |
| 2004/0054558 | A1 | 3/2004 | Wahlbin et al. |
| 2004/0054559 | A1 | 3/2004 | Wahlbin et al. |
| 2004/0088198 | A1 | 5/2004 | Childress et al. |
| 2004/0102984 | A1 | 5/2004 | Wahlbin et al. |
| 2004/0102985 | A1 | 5/2004 | Wahlbin et al. |
| 2004/0103004 | A1 | 5/2004 | Wahlbin et al. |
| 2004/0103005 | A1 | 5/2004 | Wahlbin et al. |
| 2004/0103006 | A1 | 5/2004 | Wahlbin et al. |
| 2004/0103007 | A1 | 5/2004 | Wahlbin et al. |
| 2004/0103009 | A1 | 5/2004 | Wahlbin et al. |
| 2004/0103010 | A1 | 5/2004 | Wahlbin et al. |
| 2004/0111301 | A1 | 6/2004 | Wahlbin et al. |
| 2004/0205562 | A1 | 10/2004 | Rozek et al. |
| 2005/0060205 | A1 | 3/2005 | Woods et al. |
| 2005/0192850 | A1 | 9/2005 | Lorenz |
| 2005/0198154 | A1 | 9/2005 | Xie et al. |
| 2006/0031103 | A1 | 2/2006 | Henry |
| 2007/0214020 | A1 | 9/2007 | Srinivasan et al. |

FOREIGN PATENT DOCUMENTS

| | | |
|---|---|---|
| EP | 0 465 018 | 1/1992 |
| EP | 0 926 608 | 6/1999 |
| GB | 2054229 | 2/1981 |
| JP | 10197285 | 7/1998 |
| JP | 10214283 | 8/1998 |
| JP | 111611711 | 6/1999 |
| WO | 9506884 | 3/1995 |

OTHER PUBLICATIONS

"Big Time" Match Frame May Be Small,but It has No Problems Working With the Big Boys, by Chuck Malloy; San Antonio Business Journal, vol. 5, No. 11 , s 1, p. 11; Mar. 15, 1991. Dialog ID No. 0205483. From Dialog File 635 (Business Dateline®).*

"@ Fault A Commitment to Consistency," Computer Sciences Corporation, Copyright 2000, pp. 1-2.

"Accident Reconstruction Software Maine Computer Group," Maine Computer Group, Copyright 2001, pp. 1-2.

"ADP CSG: Integrated Medical Solutions," ADP Claims Solutions Group, Copyright 2001, p. 1.

"CSC Expands Cost Containment Solutions for Claims and Legal Expenses," Computer Sciences Corporation, Jun. 27, 2001, El Segundo, CA, pp. 1-2.

"CSC Introduces Liability Assessment Tool to Improve Claims Consistency," Computer Sciences Corporation, Oct. 31, 2001, pp. 1-2.

"CSC: Solutions Search," Computer Sciences Corporation, Copyright 2001, p. 1.

"IMS ICE," ADP Integrated Medical Solutions, Copyright 2001, Rockville, MD, pp. 1-6.

"Insurance Services Office Strengthens Claims Handling Team," ISO Properties, Inc., Copyright 1996, 2001, Jersey City, NJ, pp. 1-2.

"ISO Claims Outcome Advisor," ISO Properties Inc., Copyright 1996, 2001, Jersey City, NJ, pp. 1-2.

"REC-TEC Accident Reconstruction and Analysis Computer Software," George M. Bonnett, Nov. 2001, Rockledge, FL, pp. 1-5.

"REC-TEC Accident Reconstruction Software," George M. Bonnett, Sep. 2001, Rockledge, FL, pp. 1-10.

Borland, Russel, "Running Microsoft Outlook 97," Microsoft Press, 1997.

Frey, Joe, "p. 2: Putting a price on auto injuries: How software called Colossus evaluates your pain—Allstate under. colossal pressure," Insure.com, Oct. 26, 2000, pp. 1-3.

Frey, Joe, "Putting a price on auto injuries: How software called Colossus evaluates your pain," Insure.com, Oct. 26, 2000, pp. 1-5.

Continuum Connections, vol. I, No. 1, The Continuum Company, Inc., Nov. 1991, 16 pages.

Continuum Connections, vol. I, No. 2, The Continuum Company, Inc., Jan./Feb. 1992, 17 pages.

Continuum Connections, vol. I, No. 3, The Continuum Company, Inc., Mar./Apr. 1992, 16 pages.

Continuum Connections, vol. I, No. 4, The Continuum Company, Inc., Jul./Aug. 1992, 15 pages.

Continuum Connections, vol. II, No. 1, The Continuum Company, Inc., Oct./Nov. 1992, 16 pages.

Continuum Connections, vol. II, No. 2, The Continuum Company, Inc., Dec./Jan. 1993, 24 pages.

Continuum Connections, vol. II, No. 3, The Continuum Company, Inc., Mar./Apr. 1993, 16 pages.

Continuum Connections, vol. II, No. 4, The Continuum Company, Inc., Jul./Aug. 1993, 16 pages.

Continuum Connections, vol. II, No. 5, The Continuum Company, Inc., Nov./Dec. 1993, 20 pages.

Continuum Connections, vol. II, No. 6, The Continuum Company, Inc., Jan./Feb. 1994, 19 pages.

Continuum Connections, vol. III, No. 1, The Continuum Company, Inc., Mar./Apr. 1994, 24 pages.

Continuum Connections, vol. III, No. 2, The Continuum Company, Inc., Nov./Dec. 1994, 20 pages.

Continuum Connections, vol. III, No. 3, The Continuum Company, Inc., Mar./Apr. 1995, 16 pages.

Continuum Connections to the Americas, vol. 1, No. 1, The Continuum Company, Inc., Sep. 1995, 49 pages.

Continuum Connections, Vol. III, No. 4, The Continuum Company, Inc., Oct./Nov. 1995, 24 pages.

Continuum Connections to the Americas, vol. 2, No. 1, The Continuum Company, Inc., Jan. 1996, 59 pages.

Continuum Connections to the Americas, vol. 2, No. 2, The Continuum Company, Inc., Mar. 1996, 59 pages.

Continuum Connections to the Americas, vol. 2, No. 3, The Continuum Company, Inc., May 1996, 51 pages.

Continuum Connections to the Americas, vol. 2, No. 4, The Continuum Company, Inc., Jul. 1996, 55 pages.

Continuum Connections to the Americas, vol. 2, No. 5, The Continuum Company, Inc., Sep. 1996, 59 pages.

Connections to the Americas, vol. 3, No. 1, CSC Continuum, Jan. 1997, 55 pages.

Connections to the Americas, vol. 3, No. 2, CSC Continuum, Feb. 1997, 55 pages.

Connections to the Americas, vol. 3, No. 3, CSC Continuum, Mar. 1997, 48 pages.

Connections to the Americas, vol. 3, No. 4, CSC Continuum, Apr. 1997, 40 pages.

Connections to the Americas, vol. 3, No. 5, Computer Sciences Corporation, May/Jun. 1997, 66 pages.

Connections to the Americas, vol. 3, No. 6, Computer Sciences Corporation, Jul./Aug. 1997, 56 pages.

Connections to the Americas, vol. 3, No. 7, Computer Sciences Corporation, Sep./Oct. 1997, 76 pages.

Connections to the Americas, vol. 4, No. 1, Computer Sciences Corporation, Jan. 1998, 64 pages.

Connections to the Americas, vol. 4, No. 2, Computer Sciences Corporation, Feb./Mar. 1998, 50 pages.

Connections to the Americas, vol. 4, No. 3, Computer Sciences Corporation, May/Jun. 1998, 48 pages.

Connections to the Americas, vol. 4, No. 4, Computer Sciences Corporation, Sep./Oct. 1998, 62 pages.

Insurance Connections, Computer Sciences Corporation, Feb./Mar. 1999, 52 pages.

Banking Connections, Computer Sciences Corporation, Apr./May 1999, 44 pages.

Insurance Connections, Computer Sciences Corporation, Jun./Jul. 1999, 56 pages.

Banking Connections, Computer Sciences Corporation, Aug./Sep. 1999, 52 pages.

Insurance Connections, Computer Sciences Corporation, Oct./Nov. 1999, 56 pages.

Cost Containment: Products and Solutions for the Property and Casualty Insurance Industry, Computer Sciences Corporation, Oct. 1999, 40 pages.

Banking Connections, Computer Sciences Corporation, Dec. 1999, 48 pages.

Insurance Connections, Computer Sciences Corporation, Feb./Mar. 2000, 60 pages.

Banking Connections, Computer Sciences Corporation, Apr./May 2000, 48 pages.
Insurance Connections, Computer Sciences Corporation, Jun./Jul. 2000, 43 pages.
Insurance Connections, Computer Sciences Corporation, Sep./Oct. 2000, 43 pages.
Banking Connections, Computer Sciences Corporation, Nov./Dec. 2000, 48 pages.
Connections, Computer Sciences Corporation, Mar./Apr. 2001, 58 pages.
Connections, Computer Sciences Corporation, Jun. 2001, 44 pages.
Connections, Computer Sciences Corporation, Oct. 2001, 39 pages.
Connections, Computer Sciences Corporation, Dec. 2001, 39 pages.
Connections, Computer Sciences Corporation, Apr. 2002, 35 pages.
CSC's Property and Casualty Claims Solutions, Computer Sciences Corporation, Nov. 2002, 2 pages.
International search report application No. PCT/US 01/30822, mailed Jan. 22, 2002, 5 pages.
Baker, "Don't Throw Your Adjusters to the Lions" Apr. 1995, Best's Review, vol. 95 No. 12, pp. 66-69.
CSC website, "Fault Evaluator,"www.csc.com, accesCSC website, "Fault Evaluator,"www.csc.com, accessed on Feb. 8, 2006.
"CSC Files Suit to protect Intellectual Property", PR Newswire, New York: Jan. 12, 2000, p. 1.
David, "Knowledge on the Beat," Jul. 1999, Knowledge Management Magazine, www.destinationkm..com.
Ditek@http://www.archive.org/web/20000301124742/www.ditec.com, last viewed on Nov. 28, 2005.
Esters, "Computers Can Help Settle Auto Claims" Apr. 28, 1997, National Underwriter. vol. 101, Iss. 17, p. 10.
ISO Liability Advisor, www.iso.com, accessed on Feb. 8, 2006.
"ISO to Acquire Claims Outcome Advisor from Computer Sciences and MYND," Dec. 21, 2000, accessed at www.swampfox.ws.
Laser Technology, Inc. "Crash/Crime Scene Mapping" @ http://www.lasertech.com/accidentcsinv.html. Copyright 1999.
Laser Technology, Inc. "QuickMap 3D" http://web.archive.org/web/200003011511/222.lasertech.com/laserproducts/qm3d.html, last view on Nov. 28, 2005.
Nairn, "IT and Crime Resolution, It's elementary, Holmes helps UK police solve crimes,"Jan. 3, 1997, Financial Times (London, UK), p. 17.
Nicolle, "Elementary, dear Holmes," Jan. 22, 1997, The Times (London, UK, p. Interfa).
"Policy Management Systems Corporation Announces Pilot Licensing of Claims Outcome Advisor ™ to Blue Ridge Insurance Co.," PR Newswire. New York; Aug. 24, 1999, p. 1.
Ross, "Settled Out of Court" Copyright 1980. Aldine Degruyter.
Meckbach, "U.S. universities pic up Ditek's CAD application" Feb. 26, 1999. Computing Canada. vol. 25, Iss. 8 p. 14.
Spice, "Police use lasers, computers to map scenes Town of Pewaukee's new system boost accuracy of reconstructions, users say" Sep. 29, 1998. Milwaukee Journal Sentinel. p. 2.
Trademark for @Fault, accessed from uspto.gov on Feb. 8, 2006.
Traynor, "The Effects of Varying Safety Conditions on the External Costs of Driving," Winter, 1994 Eastern Economic journal, vol. 20 No. 1 pp. 45-60.
Lindberg, Gunnar, "Calculating Transport Accident Costs: Final report of the Expert Advisors to the high Level group on Infrastructure charging (Working Group 3)." Borlaenge, Sweden. Apr. 27, 1999, 53 pages.
U.S. Patent and Trademark Office, "Communication" for U.S. Appl. No. 09/969,017 mailed Oct. 11, 2006, available in PAIR.
U.S. Patent and Trademark Office, "Communication" for U.S. Appl. No. 09/969,017 mailed Mar. 1, 2006, available in PAIR.
U.S. Patent and Trademark Office, "Communication" for U.S. Appl. No. 09/969,020 mailed Dec. 21, 2006 available in PAIR.
U.S. Patent and Trademark Office, "Communication" for U.S. Appl. No. 09/969,020 mailed Jan. 26, 2006, available in PAIR.
U.S. Patent and Trademark Office, "Communication" for U.S. Appl. No. 09/969,020 mailed Jul. 5, 2006, available in PAIR.
U.S. Patent and Trademark Office, "Communication" for U.S. Appl. No. 09/969,019 mailed Jun. 1, 2006, available in PAIR.
U.S. Patent and Trademark Office, "Communication" for U.S. Appl. No. 09/969,536 mailed Mar. 24, 2006, available in PAIR.
U.S. Patent and Trademark Office, "Communication" for U.S. Appl. No. 09/969,534 mailed Feb. 17, 2006, available in PAIR.
U.S. Patent and Trademark Office, "Communication" for U.S. Appl. No. 09/969,021 mailed Feb. 27, 2006, available in PAIR.
U.S. Patent and Trademark Office, "Communication" for U.S. Appl. No. 09/969,021 mailed Feb. 27, 2006, available in PAIR.
U.S. Patent and Trademark Office, "Communication" for U.S. Appl. No. 09/969,027 mailed Mar. 3, 2006, available in PAIR.
U.S. Patent and Trademark Office, "Communication" for U.S. Appl. No. 09/969,022 mailed Apr. 6, 2006, available in PAIR.
U.S. Patent and Trademark Office, "Communication" for U.S. Appl. No. 09/969,015 mailed Jun. 1, 2006, available in PAIR.
U.S. Patent and Trademark Office, "Communication" for U.S. Appl. No. 09/970,161 mailed Mar. 23, 2006 available in PAIR.
U.S. Patent and Trademark Office, "Communication" for U.S. Appl. No. 09/969,146 mailed Feb. 28, 2006, available in PAIR.
U.S. Patent and Trademark Office, "Communication" for U.S. Appl. No. 09/969,546 mailed Mar. 21, 2006, available in PAIR.
U.S. Patent and Trademark Office, "Communication" for U.S. Appl. No. 09/969,016 mailed Mar. 21, 2006, available in PAIR.
U.S. Patent and Trademark Office, "Communication" for U.S. Appl. No. 09/969,516 mailed Aug. 10, 2006, available in PAIR.
U.S. Patent and Trademark Office, "Communication" for U.S. Appl. No. 09/969,545 mailed Mar. 23, 2006, available in PAIR.
Blodgett, "Corporate Ethics Codes: A Practical Application of Liability Prevention", Journal of Business Ethics, vol. 16, Nos. 12-23, pp. 1363-1369, 1997.
Falkinham, Sara, "The 'Open and Obvious Defense ' is No Longer a Complete Bar to Plaintiff Recovery", Mississippi Law Journal (Fall 1994), p. 241 (64 Miss. L.J. 241).
U.S. Patent and Trademark Office, "Communication" for U.S. Appl. No. 09/969,018 mailed Jun. 21, 2007 available in PAIR.
U.S. Patent and Trademark Office, "Communication" for U.S. Appl. No. 09/969,017 mailed Apr. 16, 2008, available in PAIR.
U.S. Patent and Trademark Office, "Communication" for U.S. Appl. No. 09/969,016 mailed Mar. 17, 2008, available in PAIR.
U.S. Patent and Trademark Office, "Communication" for U.S. Appl. No. 09/969,534 mailed Apr. 15, 2008, available in PAIR.
U.S. Patent and Trademark Office, "Communication" for U.S. Appl. No. 09/969,019 mailed Feb. 27, 2008, available in PAIR.
U.S. Patent and Trademark Office, "Communication" for U.S. Appl. No. 09/969,019 mailed Apr. 28, 2008, available in PAIR.
U.S. Patent and Trademark Office, "Communication" for U.S. Appl. No. 09/969,146 mailed Sep. 22, 2006, available in PAIR.
U.S. Patent and Trademark Office, "Communication" for U.S. Appl. No. 09/969,146 mailed Oct. 5, 2007, available in PAIR.
U.S. Patent and Trademark Office, "Communication" for U.S. Appl. No. 10/238,025 mailed Jan. 9, 2008, available in PAIR.
U.S. Patent and Trademark Office, "Communication" for U.S. Appl. No. 10/238,029 mailed Dec. 13, 2007, available in PAIR.
U.S. Patent and Trademark Office, "Communication" for U.S. Appl. No. 10/238,029 mailed May 12, 2005, available in PAIR.
U.S. Patent and Trademark Office, "Communication" for U.S. Appl. No. 10/306,908 mailed Mar. 21, 2008, available in PAIR.
U.S. Patent and Trademark Office, "Communication" for U.S. Appl. No. 10/306,804 mailed Mar. 21, 2008, available in PAIR.
U.S. Patent and Trademark Office, "Communication" for U.S. Appl. No. 10/306,866 mailed May 5, 2008, available in PAIR.
U.S. Patent and Trademark Office, "Communication" for U.S. Appl. No. 10/306,628 mailed Mar. 27, 2008, available in PAIR.
U.S. Patent and Trademark Office, "Communication" for U.S. Appl. No. 10/306,873 mailed May 21, 2008, available in PAIR.
U.S. Patent and Trademark Office, "Communication" for U.S. Appl. No. 10/306,909 mailed May 14, 2008 available in PAIR.
U.S. Patent and Trademark Office, "Communication" for U.S. Appl. No. 10/306,803 mailed May 29, 2008, available in PAIR.
U.S. Patent and Trademark Office, "Communication" for U.S. Appl. No. 09/969,018 mailed Jul. 21, 2008, available in PAIR.
U.S. Patent and Trademark Office, "Communication" for U.S. Appl. No. 09/969,027 mailed Jul. 10, 2008 available in PAIR.

U.S. Patent and Trademark Office, "Communication" for U.S. Appl. No. 09/9969,020 mailed Jul. 7, 2008, available in PAIR.
U.S. Patent and Trademark Office, "Communication" for U.S. Appl. No. 10/238,025 mailed Jun. 27, 2008, available in PAIR.
U.S. Patent and Trademark Office, "Communication" for U.S. Appl. No. 10/237,547 mailed Jun. 30, 2008, available in PAIR.
U.S. Patent and Trademark Office, "Communication" for U.S. Appl. No. 10/238,981 mailed Aug. 1, 2008, available in PAIR.
U.S. Patent and Trademark Office, "Communication" for U.S. Appl. No. 10/306,858 mailed Jul. 18, 2008, available in PAIR.
U.S. Patent and Trademark Office, "Communication" for U.S. Appl. No. 10/790,632 mailed Jul. 2, 2008, available in PAIR.
U.S. Patent and Trademark Office, "Notice of Allowance" for U.S. Appl. No. 09/969,546 mailed Jun. 22, 2009, available in PAIR.
U.S. Patent and Trademark Office, "Office Action" for U.S. Appl. No. 09/969,015 mailed Apr. 28, 2009, available in PAIR.
U.S. Patent and Trademark Office, "Office Action" for U.S. Appl. No. 09/969,022 mailed Apr. 28, 2009, available in PAIR.
U.S. Patent and Trademark Office, "Advisory Action" for U.S. Appl. No. 09/969,534 mailed Apr. 29, 2009, available in PAIR.
U.S. Patent and Trademark Office, "Notice of Allowance" for U.S. Appl. No. 09/969,018 mailed Jun. 29, 2009, available in PAIR.
U.S. Patent and Trademark Office, "Office Action" for U.S. Appl. No. 09/969,019 mailed Apr. 28, 2009, available in PAIR.
U.S. Patent and Trademark Office, "Office Action" for U.S. Appl. No. 09/970,161 mailed Apr. 28, 2009, available in PAIR.
U.S. Patent and Trademark Office, "Examiner's Answer" for U.S. Appl. No. 09/969,027 mailed Jun. 8, 2009 available in PAIR.
U.S. Patent and Trademark Office, "Office Action" for U.S. Appl. No. 10/238,029 mailed Apr. 10, 2009 available in PAIR.
U.S. Patent and Trademark Office, "Office Action" for U.S. Appl. No. 10/238,019 mailed Jun. 26, 2009, available in PAIR.
U.S. Patent and Trademark Office, "Final Office Action" for U.S. Appl. No. 10/238,981 mailed Apr. 13, 2009, available in PAIR.
U.S. Patent and Trademark Office, "Final Office Action" for U.S. Appl. No. 10/306,909 mailed Apr. 29, 2009, available in PAIR.
U.S. Patent and Trademark Office, "Final Office Action" for U.S. Appl. No. 10/306,803 mailed Apr. 29, 2009, available in PAIR.
U.S. Patent and Trademark Office, "Office Action" for U.S. Appl. No. 10/306,804 mailed May 26, 2009, available in PAIR.
U.S. Patent and Trademark Office, "Final Office Action" for U.S. Appl. No. 10/306,866 mailed Apr. 16, 2009, available in PAIR.
U.S. Patent and Trademark Office, "Final Office Action" for U.S. Appl. No. 10/306,858 mailed Apr. 2, 2009, available in PAIR.
U.S. Patent and Trademark Office, "Final Office Action" for U.S. Appl. No. 10/306,628 mailed May 7, 2009, available in PAIR.
U.S. Patent and Trademark Office, "Office Action" for U.S. Appl. No. 10/790,632 mailed May 22, 2009, available in PAIR.
U.S. Patent and Trademark Office, "Office Action" for U.S. Appl. No. 10/970,626 mailed Jun. 24, 2009, available in PAIR.
U.S. Patent and Trademark Office, "Office Action" for U.S. Appl. No. 10/912,883 mailed Jun. 25, 2009, available in PAIR.
North Carolina Cooperative Extension Service, "Liability and the North Carolina Landowner." Oct. 9, 1995.
Clark, Walter, "The Investigation and Adjustment of Liability" 1914.
Taanaim, "Babylonian Talmud: Tractate Baba Kamma-47a and 47b" 500CE.
Sayed, "Assault on the Common Law of Premise Liability: What duty of care does and owner or occupier of land owe to a police officer who enters the premises of another by authority of law." Spring 1997, 19 Campbell Law Review 579.
Wiedmann, "Technical parameters influencing the severity of injury front-seat, beltprotected car passengers on the impact side in car-to-car side collisions with the main impact between the front and rear seats (B-pillars)", International Journal of Legal Medicine (Germany); 1992; p. 105(1) p. 11-5, ISSN 0937-9827.
NexGen Ergonomics, Mannequin Pro, Jun. 20, 2002.
U.S. Patent and Trademark Office, "Final Office Action" for U.S. Appl. No. 09/969,536 mailed Oct. 16, 2009, available in PAIR.
U.S. Patent and Trademark Office, "Advisory Action" for U.S. Appl. No. 09/969,020 mailed Oct. 21, 2009, available in PAIR.
U.S. Patent and Trademark Office, "Office Action" (Restriction Requirement) for U.S. Appl. No. 10/238,025 mailed Oct. 16, 2009, available in PAIR.
U.S. Patent and Trademark Office, "Notice of Allowance" for U.S. Appl. No. 10/238,981 mailed Oct. 7, 2009, available in PAIR.
U.S. Patent and Trademark Office, "Office Action" for U.S. Appl. No. 10/306,909 mailed Oct. 5, 2009, available in PAIR.
U.S. Patent and Trademark Office, "Office Action" for U.S. Appl. No. 10/306,623 mailed Oct. 22, 2009, available in PAIR.
U.S. Patent and Trademark Office, "Office Action" for U.S. Appl. No. 10/306,803 mailed Oct. 5, 2009, available in PAIR.
U.S. Patent and Trademark Office, "Office Action" for U.S. Appl. No. 10/306,098 mailed Sep. 21, 2009, available in PAIR.
U.S. Patent and Trademark Office, "Office Action" for U.S. Appl. No. 10/306,628 mailed Oct. 1, 2009, available in PAIR.
U.S. Patent and Trademark Office, "Final Office Action" for U.S. Appl. No. 10/970,632 mailed Oct. 20, 2009, available in PAIR.
U.S. Patent and Trademark Office, "Notice of Allowance" for U.S. Appl. No. 09/969,039 dated Oct. 9, 2009, available in PAIR.
U.S. Patent and Trademark Office, "Office Action" for U.S. Appl. No. 09/969,015 dated Oct. 27, 2009, available in PAIR.
U.S. Patent and Trademark Office, "Office Action" for U.S. Appl. No. 09/969,022 dated Oct. 27, 2009, available in PAIR.
U.S. Patent and Trademark Office, "Office Action" for U.S. Appl. No. 09/969,019 dated Oct. 27, 2009, available in PAIR.
U.S. Patent and Trademark Office, "Final Office Action" for U.S. Appl. No. 10/790,632 mailed Dec. 23, 2008, available in PAIR.
U.S. Patent and Trademark Office, "Office Action" for U.S. Appl. No. 10/790,626 mailed Jan. 22, 2009, available in PAIR.
Ivanovich, Michael G., "How the Web Works—Part 1." Heating, Piping, and Air Conditioning. Feb. 1997, vol. 69 p. 82.
U.S. Patent and Trademark Office, "Board Decision" for U.S. Appl. No. 09/969,546 mailed Feb. 20, 2009, available in PAIR.
U.S. Patent and Trademark Office, "Examiner's Answer" for U.S. Appl. No. 09/969,018 mailed Mar. 19, 2009, available in PAIR.
U.S. Patent and Trademark Office, "Final Office Action" for U.S. Appl. No. 09/969,021 mailed Mar. 17, 2009, available in PAIR.
U.S. Patent and Trademark Office, "Examiner's Answer" for U.S. Appl. No. 09/969,024 dated Jan. 9, 2008, available in PAIR.
U.S. Patent and Trademark Office, "Final Office Action" for U.S. Appl. No. 10/238,029 mailed Dec. 8, 2008, available in PAIR.
U.S. Patent and Trademark Office, "Examiner's Answer" for U.S. Appl. No. 10/306,623 mailed Jan. 7, 2009, available in PAIR.
U.S. Patent and Trademark Office, "Final Office Action" for U.S. Appl. No. 10/306,908 mailed Mar. 19, 2009, available in PAIR.
U.S. Patent and Trademark Office, "Final Office Action" for U.S. Appl. No. 10/306,873 mailed Jul. 21, 2009, available in PAIR.
U.S. Patent and Trademark Office, "Supplemental Notice of Allowance" for U.S. Appl. No. 09/969,018 mailed Jul. 30, 2009, available in PAIR.
U.S. Patent and Trademark Office, "Decision on Appeal" for U.S. Appl. No. 09/969,039 dated Jun. 10, 2009, available in PAIR.
U.S. Patent and Trademark Office, "Notice of Allowability" for U.S. Appl. No. 10/306,908 mailed Jul. 27, 2009, available in PAIR.
U.S. Patent and Trademark Office, "Office Action" for U.S. Appl. No. 10/306,866 mailed Aug. 14, 2009, available in PAIR.
Juhl, Randy P., "The OTC Revolution;" Drugtopics.com; Mar. 3, 1997, pp. 1-9.
McHenry, Brian G., "The Algorithms of Crash," Southeast Coast Collision Conference, Aug. 2001, pp. 1-34.
Mead, Jay, "Technical Communication," Aug. 1998, v. 45, N. 3, pp. 353-380.
Merlin, Jr., William F., "Collision Course With the Colossus Program: How to Deal With It," The Merlin Law Group May 2000, Tampa, FL, pp. 1-17.
Merlin, Jr., William F., "Colossus: What We Know Today," The Merlin Law Group, Aug. 2000, Tampa, FL, pp. 1-8.
Merlin, Jr., William F., "Overcoming Allstate's Trade Secrets and Work-Product Objections," The Merlin Law Group Mar. 2000, Tampa, FL, pp. 1-31.
Scopus and Entrust Technologies to Deliver World's First Secure Customer Care Solution for the Financial Services Market; PR Newswire dated Nov. 5, 1997.

Scopus and Entrust: Call Center Sales Center is Unveiled; American Banker, Nov. 10, 1997, vol. 162, Issue 217.

U.S. Patent and Trademark Office, "Communication" for U.S. Appl. No. 09/969,017 mailed May 9, 2007 available in PAIR.

U.S. Patent and Trademark Office, "Communication" for U.S. Appl. No. 09/969,016 mailed Mar. 3, 2007 available in PAIR.

U.S. Patent and Trademark Office, "Communication" for U.S. Appl. No. 09/969,534 mailed May 30, 2007 available in PAIR.

U.S. Patent and Trademark Office, "Communication" for U.S. Appl. No. 09/969,027 mailed Jun. 20, 2007 available in PAIR.

U.S. Patent and Trademark Office, "Communication" for U.S. Appl. No. 10/306,866 mailed Jun. 21, 2007 available in PAIR.

U.S. Patent and Trademark Office, "Communication" for U.S. Appl. No. 10/306,858 mailed Jun. 29, 2007 available in PAIR.

U.S. Patent and Trademark Office, "Communication" for U.S. Appl. No. 09/969,021 mailed Mar. 8, 2007, available in PAIR.

U.S. Patent and Trademark Office, "Communication" for U.S. Appl. No. 09/969,020 mailed Jul. 5, 2007, available in PAIR.

Walrand, J., et al., High-Performance Communication Networks, "Economics," Chapter 8 through 8.2.1, p. 361-369, 1996. (f8).

Microsoft Component Services: Server Operating System A Technology Overview, Microsoft Corp., p. 1-7, Aug. 15, 1998. (f38).

Holding State in Objects with Microsoft Transaction Server, Microsoft Corp., pp. 2, Jun. 1997. (f37).

Straight Through Processing: Migration Assessment for Series II Clients Computer Sciences Corporation, pp. 6, 2003. (g50).

Property and Casualty Solutions: CSC's Property & Casualty Claims Solutions, Computer Sciences Corporation, pp. 2, 2003. (g51).

@Fault: Improve Claims Practices Through Greater consistency in Fault Assessment, Computer Sciences corporation, pp. 2, 2004. (g53).

Utzaeider, James, "Microsoft Transaction Server and Internet Information Server: Technology for the Web," Microsoft Corp., p. 1-5, Feb. 6, 1998. (f44).

Howarth, Brad, "Outsourcing: Technology on tap," Information Economy, BRW, vol. 21, No. 47, p. 1-5, Dec. 3, 1999. (f28).

U.S. Patent and Trademark Office, "Communication" for U.S. Appl. No. 09/969,021 mailed Mar. 8, 2007, available in PAIR.

U.S. Patent and Trademark Office, "Communication" for U.S. Appl. No. 09/969,020 mailed Jul. 5, 2007, available in PAIR.

U.S. Patent and Trademark Office, "Communication" for U.S. Appl. No. 09/969,021 mailed Sep. 4, 2008, available in PAIR.

U.S. Patent and Trademark Office, "Communication" for U.S. Appl. No. 10/238,019 mailed Sep. 23, 2008, available in PAIR.

U.S. Patent and Trademark Office, "Communication" for U.S. Appl. No. 10/306,628 mailed Aug. 22, 2008, available in PAIR.

U.S. Patent and Trademark Office, "Communication" for U.S. Appl. No. 10/306,873 mailed Sep. 23, 2008, available in PAIR.

U.S. Patent and Trademark Office, "Communication" for U.S. Appl. No. 10/306,804 mailed Sep. 2, 2008, available in PAIR.

U.S. Patent and Trademark Office, "Communication" for U.S. Appl. No. 09/969,516 mailed Oct. 14, 2008, available in PAIR.

U.S. Patent and Trademark Office, "Communication" for U.S. Appl. No. 09/969,016 mailed Oct. 28, 2008, available in PAIR.

U.S. Patent and Trademark Office, "Communication" for U.S. Appl. No. 09/969,017 mailed Dec. 11, 2008, available in PAIR.

U.S. Patent and Trademark Office, "Communication" for U.S. Appl. No. 09/969,545 mailed Dec. 9, 2008, available in PAIR.

U.S. Patent and Trademark Office, "Communication" for U.S. Appl. No. 09/969,015 mailed Dec. 9, 2008, available in PAIR.

U.S. Patent and Trademark Office, "Communication" for U.S. Appl. No. 09/969,022 mailed Dec. 9, 2008, available in PAIR.

U.S. Patent and Trademark Office, "Communication" for U.S. Appl. No. 09/969,536 mailed Dec. 4, 2008, available in PAIR.

U.S. Patent and Trademark Office, "Communication" for U.S. Appl. No. 09/969,534 mailed Dec. 9, 2008, available in PAIR.

U.S. Patent and Trademark Office, "Communication" for U.S. Appl. No. 09/969,019 mailed Dec. 9, 2008, available in PAIR.

U.S. Patent and Trademark Office, "Communication" for U.S. Appl. No. 09/970,161 mailed Dec. 9, 2008, available in PAIR.

U.S. Patent and Trademark Office, "Communication" for U.S. Appl. No. 09/969,039 mailed Dec. 9, 2008, available in PAIR.

U.S. Patent and Trademark Office, "Communication" for U.S. Appl. No. 10/238,029 mailed Dec. 5, 2008, available in PAIR.

U.S. Patent and Trademark Office, "Communication" for U.S. Appl. No. 10/306,909 mailed Dec. 15, 2008, available in PAIR.

U.S. Patent and Trademark Office, "Communication" for U.S. Appl. No. 10/306,803 mailed Dec. 12, 2008, available in PAIR.

U.S. Patent and Trademark Office, "Communication" for U.S. Appl. No. 10/306,908 mailed Dec. 9, 2008, available in PAIR.

U.S. Patent and Trademark Office, "Communication" for U.S. Appl. No. 10/306,866 mailed Dec. 9, 2008, available in PAIR.

U.S. Patent and Trademark Office, "Communication" for U.S. Appl. No. 10/306,858 mailed Dec. 13, 2007, available in PAIR.

U.S. Patent and Trademark Office, "Communication" for U.S. Appl. No. 10/306,623 mailed Jan. 25, 2008, available in PAIR.

U.S. Patent and Trademark Office, "Communication" for U.S. Appl. No. 10/238,029 mailed Dec. 13, 2007, available in PAIR.

U.S. Patent and Trademark Office, "Communication" for U.S. Appl. No. 09/969,020 mailed Jan. 24, 2008, available in PAIR.

U.S. Patent and Trademark Office, "Communication" for U.S. Appl. No. 09/969,021 mailed Jan. 8, 2008, available in PAIR.

U.S. Patent and Trademark Office, "Communication" for U.S. Appl. No. 09/969,027 mailed Jan. 11, 2008, available in PAIR.

U.S. Patent and Trademark Office, "Communication" for U.S. Appl. No. 10/238,019 mailed Jan. 11, 2008, available in PAIR.

U.S. Patent and Trademark Office, "Communication" for U.S. Appl. No. 10/238,981 mailed Jan. 25, 2008, available in PAIR.

U.S. Patent and Trademark Office, "Communication" for U.S. Appl. No. 10/306,804 mailed Oct. 3, 2007 available in PAIR.

U.S. Patent and Trademark Office, "Communication" for U.S. Appl. No. 10/306,909 mailed Oct. 5, 2007, available in PAIR.

U.S. Patent and Trademark Office, "Communication" for U.S. Appl. No. 10/306,873 mailed Sep. 20, 2007, available in PAIR.

U.S. Patent and Trademark Office, "Communication" for U.S. Appl. No. 10/306,803 mailed Oct. 5, 2007, available in PAIR.

U.S. Patent and Trademark Office, "Communication" for U.S. Appl. No. 10/306,908 mailed Oct. 5, 2007 available in PAIR.

U.S. Patent and Trademark Office, "Communication" for U.S. Appl. No. 09/969,545 mailed Oct. 18, 2007 available in PAIR.

U.S. Patent and Trademark Office, "Communication" for U.S. Appl. No. 10/306,628 mailed Oct. 10, 2007 available in PAIR.

U.S. Patent and Trademark Office, "Communication" for U.S. Appl. No. 10/239,029 mailed Jun. 29, 2007 available in PAIR.

U.S. Patent and Trademark Office, "Communication" for U.S. Appl. No. 09/969,516 mailed Nov. 14, 2007, available in PAIR.

Kahn, "The Premise Behind Premises Liability" Feb. 1994, Secruity Management, vol. 38, Iss. 2 pp. 61-63.

CIGNA P&C Opens National Premises Liability Center, Mar. 1999, PR Newswire, p. 1.

U.S. Patent and Trademark Office, "Communication" for U.S. Appl. No. 09/969,024 mailed May 23, 2007 available in PAIR.

U.S. Patent and Trademark Office, "Communication" for U.S. Appl. No. 10/306,623 mailed Mar. 7, 2007 available in PAIR.

U.S. Patent and Trademark Office, "Office Action" for U.S. Appl. No. 09/970,161, mailed Oct. 28, 2009, available in PAIR.

U.S. Patent and Trademark Office, "Notice of Allowance" for U.S. Appl. No. 10/238, 019 mailed Nov. 13, 2009, available in PAIR.

U.S. Patent and Trademark Office, "Notice of Allowance" for U.S. Appl. No. 10/306,804 mailed Nov. 9, 2009, available in PAIR.

U.S. Patent and Trademark Office, "Office Action" for U.S. Appl. No. 10/790,626 mailed Nov. 25, 2009, available in PAIR.

U.S. Patent and Trademark Office, "Notice of Allowance" for U.S. Appl. No. 10/306,873 mailed Dec. 14, 2009, available in PAIR.

U.S. Patent and Trademark Office, "Notice of Allowance" for U.S. Appl. No. 09/969,015 mailed Dec. 31, 2009, available in PAIR.

U.S. Patent and Trademark Office, "Notice of Allowance" for U.S. Appl. No. 09/969,019 mailed Dec. 31, 2009, available in PAIR.

U.S. Patent and Trademark Office, "Final Office Action" for U.S. Appl. No. 10/238,025 mailed Dec. 31, 2009, available in PAIR.

U.S. Patent and Trademark Office, "Decision of Appeal" for U.S. Appl. No. 09/969,146 mailed Jan. 15, 2010, available in PAIR.

U.S. Patent and Trademark Office, "Final Office Action" for U.S. Appl. No. 10/912,883 mailed Jan. 25, 2010, available in PAIR.

U.S. Patent and Trademark Office, "Notice of Allowance" for U.S. Appl. No. 09/969,022 mailed Jan. 29, 2010, available in PAIR.
U.S. Patent and Trademark Office, "Notice of Allowance" for U.S. Appl. No. 09/970,161 mailed Jan. 29, 2010, available in PAIR.
U.S. Patent and Trademark Office, "Notice of Allowance" for U.S. Appl. No. 09/969,021 mailed Feb. 4, 2010, available in PAIR.

* cited by examiner

Roadway Configuration

| | A | B | C | D | E | F | G | H | I | FG |
|---|---|---|---|---|---|---|---|---|---|---|
| 1 | Y | Y | Y | Y | Y | Y | Y | Y | Y | Y |
| 2 | N | Y | Y | N | N | N | N | Y | N | N |
| 3 | N | Y | Y | N | N | N | N | N | Y | N |
| 4 | N | Y | Y | Y | N | N | N | Y | N | N |
| 5 | N | Y | Y | N | N | N | N | N | N | N |
| 6 | N | Y | Y | N | N | Y | N | Y | N | Y |
| 7 | N | Y | N | N | N | Y | N | Y | N | Y |
| 8 | Y | Y | Y | N | Y | N | N | Y | N | N |
| 9 | Y | Y | Y | Y | Y | N | N | N | Y | N |
| 10 | Y | Y | Y | Y | Y | N | N | N | Y | N |
| 11 | Y | Y | Y | N | Y | N | N | Y | Y | N |
| 12 | Y | Y | Y | Y | Y | N | N | Y | Y | N |
| 13 | Y | Y | Y | Y | Y | N | N | Y | Y | N |
| 14 | Y | Y | Y | Y | Y | Y | Y | Y | Y | Y |
| 15 | Y | Y | Y | Y | Y | Y | Y | Y | Y | Y |
| 16 | Y | Y | Y | N | Y | Y | N | Y | N | Y |
| 17 | N | Y | N | N | N | Y | Y | N | N | Y |

Accident Type

*FIG. 6*

| Accident Type - Roadway Configuration | Impact Groups | | | |
|---|---|---|---|---|
| 1H-A behind B | A811B805, A811B806, A811B807, A812B805, A812B806, A812B807, A801B805, A801B806, A801B807, A802B807, A803B807, A804 B807, A808B805, A809B805, A810B805 | | | |
| 1I-A behind B | A811B805, A811B806, A811B807, A812B805, A812B806, A812B807, A801B805, A801B806, A801B807, A802B807, A803B807, A804 B807, A808B805, A809B805, A810B805 | | | |
| 2B-4 way intersect w/A from top turning left and B from bottom going straight | A811B809, A811B810, A810B808 | A811B811, A812B811, A801B811, A801B812, A801B812, | A802B801, A803B812, A803B801 | A804B812, A804B801 |
| 2C-T intersect to right w/A turning left from top and B from bottom going straight | A811B809, A811B810, A810B808 | A811B811, A812B811, A801B811, A801B812, A802B812 | A802B801, A803B812, A803B801 | A804B812, A804B801 |
| 2H- center turn lane w/A turning left and B going straight | A811B809, A811B810, A810B808 | A811B811, A812B811, A801B811, A801B812, A802B812 | A802B801, A803B812, A803B801 | A804B812, A804B801 |
| 3B-4- way intersect w/A going straight from left and B going straight from bottom | A811B808, A812B808, A801B808, A811B809, A812B809 | A811B810, A812B810, A801B809, A801B810 | A802B811, A802B812, A802B801, A803B811 | A803B812, A803B801, A804B811, A804B812, A804B801 |

*FIG. 8b*

Insured

| Factor | Penalty (%) | Situational Weight | % weight | applies | adjusted penalty (%) |
|---|---|---|---|---|---|
| 1. Alcohol/Drugs | 15 | High | 150 | YES | 22.5 |
| 2. Headlights Off | 5 | *Normal* | 100 | YES | 5 |
| 3. Inattention | 10 | Low | 50 | NO | 0 |
| ... | | | | | |
| 19. Faulty equipment | 10 | N/A | 0 | YES | 0 |

Claimant

| Factor | Penalty (%) | Situational Weight | % weight | applies | adjusted penalty (%) |
|---|---|---|---|---|---|
| 1. Alcohol/Drugs | 15 | High | 150 | NO | 0 |
| 2. Headlights Off | 5 | *High* | 150 | YES | 7.5 |
| 3. Inattention | 10 | Low | 50 | NO | 0 |
| ... | | | | | |
| 10. Speed | 15 | Low | 50 | YES | 7.5 |

*FIG. 9a*

|                | First Party | Second Party |
|----------------|-------------|--------------|
| Base Liability | 50%         | 50%          |
| Factor 1       | +10%        | -10%         |
| Factor 2       | +15%        | -15%         |
| Factor 3       | -5%         | +5%          |
| Total Liability| 70%         | 30%          |

*Fig. 9b*

|                | First Party | Second Party |
|----------------|-------------|--------------|
| Base Liability | 50%         | 50%          |
| Factor 1       | +10%        | -10%         |
| Factor 2       | +15%        | -15%         |
| Factor 3       | -5%         | +5%          |
| Sum of Effects | +20%        | -20%         |
| Total Liability| 60%         | 40%          |

*Fig. 9c*

| Speed | Surface | Condition | Number of car lengths |
|---|---|---|---|
| <= 45 | Not gravel | Dry | < 10% speed |
| | | Wet | < 20% speed |
| | | Muddy | < 20% speed |
| | | Plowed snow | < 30% speed |
| | | Snow Ice Patch | < 30% speed |
| | | Snow Ice | < 60% speed |
| | Gravel | Any | < 20% speed |
| > 45 | Not gravel | Dry | < 15% speed |
| | | Wet | < 30% speed |
| | | Muddy | < 30% speed |
| | | Plowed snow | < 45% speed |
| | | Snow Ice Patch | < 45% speed |
| | | Snow Ice | < 90% speed |
| | Gravel | Any | < 30% speed |

2050, 2052, 2054, 2056, 2058

Max. Safe Speed = Speed Limit (SL) - Road Condition reduction - Weather reduction

| Safe Speed (mph) | Actual Speed (mph) | Threshold distance for close or far (ft) | Close % (<=threshold) (ft) | Far % (>=threshold) (ft) |
|---|---|---|---|---|
| 50 | 50-60<br>61-70<br>71-80<br>81-90<br>91-100+ | 100<br>150<br>200<br>300<br>N/A | 0<br>30<br>40<br>70 ALV<br>100 ALV | 0<br>10<br>20<br>50 ALV<br>100 ALV |
| 25 | 25-27<br>28-30<br>31-35<br>36-40<br>41-45<br>46-50<br>51-60 | 50<br><br><br>80<br><br><br>130 | 0<br>10<br>30<br>70 ALV<br>70 ALV<br>70 ALV<br>100 ALV | 0<br>0<br>20<br>50<br>50 ALV<br>50 ALV<br>100 ALV |

FIG. 31c

| Road Condition | Category | Safe speed as percent of speed limit |
|---|---|---|
| Dry | A | 100% |
| Wet | B | 90% |
| Accumulated water | C | 55% |
| Muddy | C | 55% |
| Blowing snow- no accumulation | A | 100% |
| Accumulated snow | C | 55% |
| Hardpacked snow | D | 45% |
| Ice patches | D | 45% |
| Ice | E | 15% |
| Black ice | F | 45% |

FIG. 32a

| Safe Speed (pick a row based on this) | Actual Speed (pick smaller row) | Threshold distance for close or far | Close % (distance in ft. <=threshold) | Far % (> threshold) |
|---|---|---|---|---|
| Over 35 | <61<br>61-70<br>71-80<br>81-90<br>91+ | 100<br>150<br>200<br>300<br>N/A | N/A<br>30<br>40<br>70 ALV<br>100 ALV | N/A<br>10<br>20<br>50 ALV<br>100 ALV |
| 20 to 35 | <28<br>28-30<br>31-35<br>36-40<br>41-45<br>46-50<br>51+ | 50<br>50<br>50<br>80<br>80<br>80<br>130 | N/A<br>10<br>30<br>70 ALV<br>70 ALV<br>70 ALV<br>100 ALV | N/A<br>N/A<br>20<br>50<br>50 ALV<br>50 ALV<br>100 ALV |

FIG. 32c

| Question | Conclusion based on these answers | |
|---|---|---|
| | Violation | Violation and citation |
| Cones / barricade | 2100 | 2101 |
| Do not enter | 2102 | 2103 |
| Left turn only | 2104 | 2105 |
| Solid yellow / white line marking | 2106 | 2107 |
| No right turn on red | 2108 | 2109 |
| No stopping | 2110 | 2111 |
| No U-turn | 2112 | 2113 |
| Right turn only | 2114 | 2115 |
| Straight only | 2116 | 2117 |
| One way only | 2118 | 2119 |
| No parking zone | 2120 | 2121 |
| No passing zone | 2122 | 2123 |

| A | Factors | B |
|---|---|---|
| N/A | Following too closely | N/A |
| Low | Alcohol / Drugs / Rx | Low |
| High | Headlights off (night) | High |
| Low | Driver inattention | Low |
| Low | Speed | High |
| Low | Animal / pedestrian / other vehicle action | Low |
| N/A | Sudden stop | N/A |
| N/A | Brakelights not on | N/A |
| N/A | Backing unsafely | N/A |
| Low | Failure to take evasive action | Low |
| N/A | Opened door into traffic lane | N/A |
| High | Driver illness / physical disability | High |
| N/A | Improper lane change | N/A |
| N/A | Improper turn | Low |
| Low | Weather (visibility and traction) | N/A |
| Low | Debris | N/A |
| Low | Road defect | Low |
| High | Defective traffic control | High |
| High | Faulty equipment (may shift to 3d party) | High |

Acts 1985, 69th Leg., ch. 959, § 1, eff. Sept. 1, 1985. Amended by Acts 1987, 70th Leg., 1st C.S., ch. 2, § 2.04, eff. Sept. 2, 1987; Acts 1995, 74th Leg., ch. 136, § 1, eff. Sept. 1, 1995.

<General Materials (GM) - References, Annotations, or Tables>

HISTORICAL NOTES -- REVISOR'S NOTE

REVISOR'S NOTE

1997 Main Volume

The words "party" and "legal representative of any person or party" are omitted because they are included in the Code Construction Act (V.A.C.S. Article 5429b-2) definition of "person."

HISTORICAL NOTES -- HISTORICAL AND STATUTORY NOTES

HISTORICAL AND STATUTORY NOTES

1997 Main Volume

The 1987 amendment, in the Chapter 33 heading, the subchapter A heading and the section heading, substituted "responsibility" for "negligence"; and rewrote the section, which previously read:

"(a) In an action to recover damages for negligence resulting in death or injury to a person or property, contributory negligence does not bar recovery if the contributory negligence is not greater than the negligence of the person or persons against whom recovery is sought.

"(b) Damages allowed are diminished in proportion to the amount of negligence attributed to the person recovering."

Manual Assessment

For the reasons stated below, @Fault did not compute a fault assessment. Therefore, you will need to do so. Please answer the question below.

What is the percentage of fault for both parties?

Insured ▬ 5403
Claimant ▭ 5405

Manual Assessment reason(s):

This combination of impact points requires a manual assessment. When possible, using impact points 812 and 806 for front and rear impacts, 803 and 809 for side impacts and 801, 811, 805, and 807 for angled impacts.

5407

<< Previous    Next >>

Conflicts

| | Resolved | Unresolved |
|---|---|---|
| INSD's governing traffic control? | ■ | |
| CLMT's governing traffic control? | ■ | |
| Lighting? | ■ | |
| Weather? | ■ | |
| INSD speed prior to reacting? | ■ | |
| INSD consumed alcohol? | ■ | |
| CLMT cited for impairment? | ■ | |
| CLMT vehicle equipment defective? | ■ | |

FIG. 65b

Unanswered and Unknown

| | Final | Insured Driver [Steve] | Claimant Driver [Keri] | Witness [Wit 1] |
|---|---|---|---|---|
| INSD's secondary traffic control? | | | | ■ |
| INSD's control partially obscured? | | | ■ | ■ |
| INSD's control completely obscured or missing? | | | ■ | ■ |
| CLMTs governing traffic control? | | | | ■ |
| CLMT cited for violating governing traffic control? | ■ | | | |
| CLMTs secondary traffic control? | | | ■ | ■ |
| CLMTs control partially obscured? | ? | ? | ■ | ■ |
| CLMTs control completely obscured or missing? | ? | ? | ■ | ■ |
| Roadway Character? | | | ■ | ■ |
| Roadway Surface? | | | ■ | ■ |
| Roadway Condition? | | | ■ | ■ |

FIG. 65c

```
┌─────────────────────────────┐
│ Select one or more vehicle  │
│ points, such that the start │
│ and end coordinates of at   │
│ least one vehicle point are │
│          known              │
│           8401              │
└─────────────────────────────┘
              │
              ▼
┌─────────────────────────────┐
│ Determine start and end     │
│ coordinates of vehicle      │
│ points that are unknown     │
│ from the known coordinates  │
│ of a vehicle point          │
│           8403              │
└─────────────────────────────┘
              │
              ▼
┌─────────────────────────────┐
│ Determine mathematical      │
│ relationships between the   │
│ start and end coordinates   │
│ of at least one vehicle     │
│ point                       │
│           8405              │
└─────────────────────────────┘
```

*FIG. 84*

Claim Report:
Discrepancy between Assigned Liability and Settlement Liability Greater than 20%

| Claim Number | Jurisdiction | Adjuster Id | Assessment Date | Name of Insured | Assigned Liability Range | Settlement Liability | Discrepancy |
|---|---|---|---|---|---|---|---|
| 1442080 | New York | X4134 | 1/12/20 02 | John Smith | 85% - 95% | 50% | 35% Below |

FIG. 105

Claims Settled on 1/28/02

| Claim number | Jurisdiction | Adjuster Id | Name of Insured | Assigned Liability Range | Settlement Liability | Discrepancy |
|---|---|---|---|---|---|---|
| 1942080 | New York | X9879 | Tom Rand | 85% - 95% | 50% | 35% Below |
| 1348902 | New Jersey | X5657 | Ed Walsh | 100% - 100% | 100% | |
| 1450808 | Texas | X7634 | Anne Simpson | 45% - 55% | 80% | 25% Above |
| 1670393 | Texas | X3746 | Kim Sanders | 70% - 80% | 85% | 5% Above |
| 1983034 | Arizona | X8374 | Sam Levine | 0% - 0% | 0% | |

FIG. 106

| Seconds before AE | Vehicle Speed | Engine Speed (RPM) | Throttle Position (percent) | Brake Switch Circuit Status |
|---|---|---|---|---|
| -5 | 57 | 4032 | 100 | OFF |
| -4 | 65 | 4160 | 70 | OFF |
| -3 | 62 | 2304 | 2 | ON |
| -2 | 55 | 1088 | 2 | ON |
| -1 | 47 | 896 | 2 | ON |

COMPUTERIZED METHOD AND SYSTEM FOR ESTIMATING LIABILITY FOR AN ACCIDENT FROM AN INVESTIGATION OF THE ACCIDENT

BACKGROUND OF THE INVENTION

1. Field of the Invention

The present invention generally relates to estimation of liability in an accident. Certain embodiments relate to computer-implemented systems and methods for estimating liability in a motor vehicle accident.

2. Description of the Related Art

A typical motor vehicle accident claims organization may face a number of challenges in processing claims. Some of these challenges may include assessment of liability, threat of litigation, and experience level of claims adjusters. A motor vehicle accident claims organization may add value to the liability assessment process by producing a solution that enhances the liability assessment process and increases the effectiveness of the claims adjuster.

Assessment of liability is one important challenge facing a claims organization. It is believed that a large percentage of motor vehicle accident claims may be assessed at 100% liability against the insured when the claimant may actually share in the fault. While it may be difficult to pinpoint exact reasons for this practice among claims adjusters, several factors influencing the tendency to assess 100% liability against the insured may include, but are not limited to, ineffective negotiation, large case loads, inadequate time to effectively assess liability, and a desire to settle claims quickly to avoid litigation.

Considering the litigious nature of claimants, and the presence of claimant counsel during negotiations, claims adjusters may need to rigorously investigate characteristics of a motor vehicle accident scene, duties of the insured, and contributing actions of the claimant before assessing liability.

The experience level of claims adjusters may typically be low due to a lack of longevity in such a position. Over the years, a dramatic shortening of the training regimen for most new claims adjusters may reduce the effectiveness of claims adjusters. In addition, the lack of experienced claims adjusters available to advise and teach new claims adjusters worsens the situation. Furthermore, new claims adjusters may not be as knowledgeable in claims adjusting practices and the laws of their jurisdiction, as are senior claims adjusters, and consequently they may make "best guess" assessments. Therefore, a lack of trained and experienced claims adjusters may tend to produce an inadequate and/or inequitable assessment process.

Accordingly, it may be advantageous to provide a system and method to assess fault or liability in motor vehicle accidents by relying on expert knowledge collected from experienced claims adjusters regarding the influence of multiple characteristics of a motor vehicle accident proportional to the liability of the claimant and the insured.

SUMMARY OF THE INVENTION

An embodiment of the present invention relates to a computer-implemented method for estimating liability in an accident.

In one embodiment, liability estimation in a vehicle accident may be based on multiple characteristics that describe the accident. Characteristics that describe either a real, a past, or a theoretical accident may include but are not limited to, roadway configuration, accident type, traffic controls at the vehicle accident scene, right of way, and impact points of each motor vehicle. The right of way may be established from real characteristics of a vehicle accident and questions about the real characteristics. At least one of the real characteristics may include: roadway configuration, accident type, right of way, or traffic control. Alternatively, a claims adjuster may specify the right of way.

The real set of characteristics may be compared to past or theoretical characteristics to determine a set of matching characteristics. The liability for the real accident may be based on an estimate of liability associated with the matching set of past or theoretical characteristics. The estimated liability for the real accident determined in this way may be a base liability.

The liabilities associated with the characteristics of the past or theoretical accident may be associated with an impact group in addition to other characteristics of a real accident. An impact group may include a pair of impact points for a past or theoretical accident. A pair of impact points may include an impact point for each of two vehicles involved in an accident. Each pair of impact points may be associated with two values of base liability: a lower bound of liability and an upper bound of liability. One set of values may correspond to one vehicle with the right of way, and the other set of values may correspond to the other vehicle having the right of way. Each of the pairs of impact points in a given impact group may have the same base liability and lower and upper bound of liability.

Effects on the liability due to factors specific to the vehicle, driver, and environment may be taken into account by identifying specific factors that may be relevant to the real accident. Factors for past or theoretical accidents may be associated with estimates of a contribution to liability. An estimate of the contribution of the factors to liability in the real accident may be determined by associating the factors relevant to the real accident with the estimates of the contribution of the factors for the past or theoretical accidents.

The contribution of the factors to the liability may also be adjusted. The adjustments may take into account sets of characteristics corresponding to the real accident and/or the preference of a claims organization. A situational weight (i.e., an adjustment related to the characteristics of a specific accident) may be based on knowledge obtained from experienced claims adjusters. Alternatively, the situational weight may be inferred from answers to a series of questions relating to the factor and accident.

The individual factors may be adjusted by a ranking factor that accounts for the preference of the claims organization. Furthermore, the sum of the contribution of the factors to liability may be adjusted by a factor influence that may also account for the preference of a claims organization.

The contribution of a factor may be so significant that it may be necessary to perform a further adjustment. Such a factor may adjust the liability beyond the lower and upper bounds defined for the liability. The contribution of the factor may be ignored and an absolute liability value may be assigned to be the liability estimate.

The liability might be expressed as a range rather than a single value. The range may be created using a range radius. The range radius may be a percentage value that may be added to and subtracted from the final liability to create the range.

A knowledge acquisition utility may be used to determine impact groups for a given set of characteristics of a past or theoretical accident. An impact group may be a collection of pairs of impact points. Each of the pairs of impact points in the impact group may have the same liability and lower and upper bounds of liability. Experienced claims adjusters may use the knowledge acquisition utility to determine the number of impact groups for each set of characteristics and the impact point pairs in each impact group.

A claims organization may employ experienced claims adjusters to use a tuning utility to estimate characteristics and properties of past or theoretical accidents such as base liabilities and lower and upper bounds of liabilities. Characteristics and properties may be entered into a knowledge acquisition utility associated with the tuning utility. The user may then run pre-configured test scenarios, analyze the results, and refine the characteristics and properties as necessary. The procedure may be repeated until the user is satisfied.

A computer-implemented method for estimating liability in a vehicle accident may include several steps. The user may provide to a computer system claim data regarding the vehicle accident in a graphical user interface. The user may provide to a computer system data for each vehicle involved in a vehicle accident. The user may provide data regarding characteristics of the vehicle accident. To assist the user in providing data regarding characteristics of the vehicle accident, the computer system may display graphical representations of the characteristics such as the roadway configurations, accident types, and impact points. The user may identify discords within the entered data. The user may determine a most likely set of characteristics associated with the real accident. As needed, the user may consult a legal reference system to determine legal information specific to the jurisdiction in which the accident occurred. The user may be provided with an assessment report that summarizes the estimate of liability, data used to determine the estimate, and negotiating points regarding the estimate.

The assessment of liability in a vehicle accident may involve analysis of multiple statements of the description of an accident. In one embodiment, the consistency between different witness statements may be assessed. A graphical user interface used for estimating liability may be used to collect information from witness statements. The computer system may compare details given in each witness description. The system may present the results of the comparison in tabular form, listing for each party, its version of the detail described. Details with inconsistent versions may be noted in the tabulation of results.

In one embodiment for analysis of witness statements, a graphical user interface for estimating liability may be combined with accident reconstruction methodology to assess the credibility of details in witness accident descriptions. Accident reconstruction software may be applied to determine details relating to speed, time, and distance of the vehicles involved in the accident. The credibility of a witness statement may be evaluated according to its consistency with the results of the accident reconstruction software.

In one embodiment, a graphical user interface for estimating liability may be combined with a credibility assessment method to create a reliable accident description. The details relevant to the accident may be tested by a credibility assessment method such as accident reconstruction software. The most credible version of the details may then be combined into a single, reliable version of an accident description.

In one embodiment, a method may include accessing claim data for one or more claims relating to a vehicle accident from a first database on a computer system. The claim data may be stored on a second database on the computer system. In an embodiment, the second database may be associated with a method and system for estimating liability in the vehicle accident. The method may further include accessing the claim data for one or more of the claims on the second database for use by the method and system for estimating liability in a vehicle accident.

Some embodiments may include accessing claim data for one or more claims relating to a vehicle accident from a first database on a computer system following a user-defined time period. Other embodiments may include accessing claim data in response to a request from a user.

In an embodiment, a method may include accessing claim information on a computer system required by a pre-configured claim report for an accident from a database if a user-specified condition is met. The pre-configured claim report may be created from the accessed claim information. In some embodiments, the pre-configured claim report may be sent to a user-specified location. Alternatively, claim information on a computer system required by a pre-configured claim report for an accident may be accessed from a database periodically following a user-specified time period. In other embodiments, a method may include requesting a pre-configured claim report on a computer system relating to an accident.

One embodiment of a method of estimating liability for an accident may include recording vehicle data of a vehicle relating to the accident in memory on a computer system. In an embodiment, the recorded vehicle data may be stored on the computer system. Some embodiments may include decoding the vehicle data. An effect of the vehicle data on the liability of a party in the accident may be estimated.

Other embodiments may include recording vehicle data in memory on a first computer system. The recorded vehicle data may be stored on the first computer system. The method may further include retrieving the stored vehicle data from the first computer system with a second computer system. An effect of the vehicle data on liability of a party in the accident may be estimated.

An embodiment of a method for assessing a claim in a vehicle accident on a computer system may include estimating injuries to one or more vehicle occupants in the vehicle accident. The injuries to the one or more vehicle occupants may be estimated from one or more variables. The method may further include estimating damages due to injuries of the one or more vehicle occupants. Some embodiments may include estimating the liability of parties in the accident. Adjusted damages may be determined from the estimated damages and the liability of the parties.

In one embodiment, a method of estimating liability for an accident on a computer system may include estimating pre-impact speeds of one or more vehicles in the accident from the crush damage of the one or more vehicles. The method may further include estimating an effect of the pre-impact speeds of the one or more vehicles on the liability of parties in the accident.

In one embodiment, a method of estimating liability for a vehicle accident using a computer system may include estimating a theoretical path of a reference vehicle and estimating a theoretical path of a reacting vehicle. The reacting vehicle may react to a danger of an accident with the reference vehicle. The method may further include assessing the opportunity of the reacting vehicle to avoid the accident. Some embodiments may also include estimating a contribution to liability to the reacting vehicle based on the opportunity of the reacting vehicle to avoid the accident.

In certain embodiments, a method of estimating liability for a vehicle accident using a computer system may include estimating a theoretical path of a straight traveling vehicle. The theoretical path of a turning vehicle that is in the same lane at the completion of a turn as the straight traveling vehicle may then be estimated. The opportunity of at least one vehicle traveling at a specified speed to avoid the accident may be assessed. A contribution to liability to at least one vehicle based on the opportunity of the vehicle to avoid the accident may be estimated.

Another embodiment of a method of estimating liability for a vehicle accident may include estimating an actual speed of a vehicle involved in an accident. At least one specified speed of a vehicle involved in the accident may be provided to the computer system. The actual speed may then be compared to the at least one specified speed. The method may then include estimating an effect on liability based on the comparison.

In some embodiments, a method of estimating liability for a vehicle accident using a computer system may include selecting a specified speed of a vehicle involved in an accident. The method may then include assessing whether the vehicle had an opportunity to avoid the accident at the specified speed. An effect on liability based on the opportunity to avoid the accident may then be estimated.

Other embodiments of a method of estimating liability for a vehicle accident using a computer system may include estimating a speed for avoiding of a vehicle, which may be an approximate speed that allows the vehicle an opportunity to avoid the accident. A specified speed of the vehicle involved in an accident may then be provided. The speed for avoiding may be compared to the specified speed. The method may further include assessing an opportunity to avoid the accident based on the comparison. In an embodiment, an effect on liability based on the opportunity to avoid the accident may be estimated.

Another embodiment of a method of estimating liability for a vehicle accident using a computer system may include estimating at least one stopping distance of a vehicle. A stopping distance may be an approximate distance for the vehicle traveling at a specified speed to stop to avoid the accident. The method may also include estimating a perception distance, which may be an approximate distance from the accident at which the vehicle sensed danger of an accident. An opportunity of the vehicle to avoid the accident may be assessed using the perception distance. In one embodiment, an effect on liability based on the opportunity to avoid the accident may be estimated.

Certain embodiments of a method of estimating liability for a vehicle accident using a computer system may include estimating a theoretical path of at least one point on a reference vehicle and at least one point on a reacting vehicle. The opportunity of the reacting vehicle to avoid the accident using the theoretical path of at least one point may be assessed. The method may further include estimating an effect on liability for the reacting vehicle based on the opportunity of the reacting vehicle to avoid the accident.

Some embodiments of a method of estimating liability for a vehicle accident may include estimating coordinates of a collision area that includes a collision point. The collision area may include a location where a reference vehicle and a reacting vehicle are likely to occupy at impact. A time for the reference vehicle to clear the collision area may be estimated. A time for the reacting vehicle to reach the collision area may also be estimated, such that the reacting vehicle avoids the accident. The method may further include assessing an opportunity of the reacting vehicle to avoid the accident using the estimated time for the reacting vehicle to reach the collision area. In an embodiment a contribution to liability to the reacting vehicle based on the opportunity of the reacting vehicle to avoid the accident may be assessed.

In one embodiment, a method may include providing a computer system configured to access a memory such that the memory may include a theoretical path of at least one vehicle in an accident. The memory may include a collision area. The collision area may be displayed as a graphical image in a graphical user interface. The method may further include displaying at least one vehicle as a graphical image in a graphical user interface. In one embodiment, the theoretical path may be displayed as a graphical image in a graphical user interface.

Some embodiments of a method of estimating liability for an accident using a computer system may include generating one or more questions relating to an accident. One or more sets of answers corresponding to the one or more questions may be provided to the computer system. A set of answers may include answers to a question obtained from one or more sources. The method may further include estimating the effect of at least one factor on liability using at least one answer.

In certain embodiments, a method of estimating liability for an accident using a computer system may include generating a question on one or more topics relating to the accident. The method may further include providing a set of answers corresponding to the question to the computer system. The set of answers may include one or more answers obtained from one or more sources. An answer may be selected from the set of answers for use in estimating liability in the accident. In an embodiment, the effect of a factor on liability using the selected answer may be estimated.

In some embodiments, a question may be associated with one or more answers. At least one answer may be associated with a set of additional questions. An answer associated with a set of additional questions may be then be selected. The method may further include generating a set of additional questions associated with the selected answer.

In another embodiment, a method may include displaying a first screen on a computer system for entering answers to a question relating to an accident from two or more sources. Two or more answers from the two or more sources may be entered on the first screen. The method may further include displaying a second screen for selecting an answer from the two or more answers for use in estimating liability. The user may be allowed to select an answer for use in estimating the effect of a factor on liability on the second screen.

BRIEF DESCRIPTION OF THE DRAWINGS

A better understanding of the present invention may be obtained when the following detailed description of preferred embodiments is considered in conjunction with the following drawings, in which:

FIG. 6 is a roadway configuration/accident type matrix of applicability according to one embodiment.

FIG. 8b is a table of impact groups for roadway configuration/accident type combinations according to one embodiment.

FIG. 9a includes tables illustrating a first method of assessing the contribution of factors to the liability according to one embodiment.

FIG. 9b includes a table illustrating a second method of assessing the contribution of factors to the liability according to one embodiment.

FIG. 9c includes a table illustrating a third method of assessing the contribution of factors to the liability according to one embodiment.

FIG. 31c is a table illustrating the contribution of speed to a motor vehicle accident according to the first embodiment.

FIG. 32a is a flow chart for estimating the contribution of speed to liability in a motor vehicle accident according to a second embodiment.

FIG. 32c is a table illustrating the contribution of speed to a motor vehicle accident according to the second embodiment.

FIG. 38 is a screen shot of a window from a Knowledge Acquisition utility or tuning utility for selecting a roadway configuration/accident type combination according to one embodiment.

FIG. 39 is a screen shot of an editing combination window from a Knowledge Acquisition utility or tuning utility according to one embodiment.

FIG. 40 is a screen shot of a window for editing the estimate effect of a factor according to one embodiment.

FIG. 43 is a screen shot of a Vehicle Information frame according to one embodiment.

FIG. 44 is a screen shot of an Additional Information frame according to one embodiment.

FIG. 45 is a screen shot of a Parties Information frame according to one embodiment.

FIG. 46 is a screen shot of a Legal Reference window according to one embodiment.

FIG. 47 is a screen shot of a Right of Way data frame according to one embodiment.

FIG. 48 is a screen shot of a Traffic Controls data frame according to one embodiment.

FIG. 49 is a screen shot of a Impact Points data frame according to one embodiment.

FIG. 50 is a screen shot of a Discords Report frame according to one embodiment.

FIG. 51 is a screen shot of a Factors Input frame according to one embodiment.

FIG. 52 is a screen shot of a Conflict Identification frame according to one embodiment.

FIG. 53 is a screen shot of a Review frame according to one embodiment.

FIG. 54 is a screen shot of a Manual Assessment window according to one embodiment.

FIG. 55 is a screen shot of the Consultation Report window according to one embodiment.

FIG. 58 depicts a screen shot of an embodiment of a claim data frame of a graphical user interface.

FIG. 63$f$ depicts an embodiment of a flow chart of questions generated in a graphical user interface.

FIG. 64 depicts an embodiment of a Resolution window of a graphical user interface.

FIG. 65$b$ depicts an embodiment of an accident report of a graphical user interface.

FIG. 65$c$ depicts an embodiment of an accident report of a graphical user interface.

FIG. 76$b$ depicts an illustration of vehicle orientation.

FIG. 84 depicts a flow chart of an embodiment of a method of estimating a mathematical relationship for a trajectory.

FIG. 103 depicts a flow chart illustrating accessing of claim information.

FIG. 104 depicts a schematic illustration of a system for creating a pre-configured claim report.

FIG. 105 is a schematic illustration of a claim report.

FIG. 106 is a schematic illustration of a claim report.

FIG. 107 depicts a flow chart illustrating an embodiment of a method of estimating liability.

FIG. 108 illustrates a system for obtaining vehicle data.

FIG. 109 illustrates vehicle data from a CDR.

FIG. 110 depicts graphical output of a CDR.

FIG. 111 depicts graphical output from a CDR.

FIG. 112 depicts an illustration of an embodiment of assessing a claim.

Figure 1:
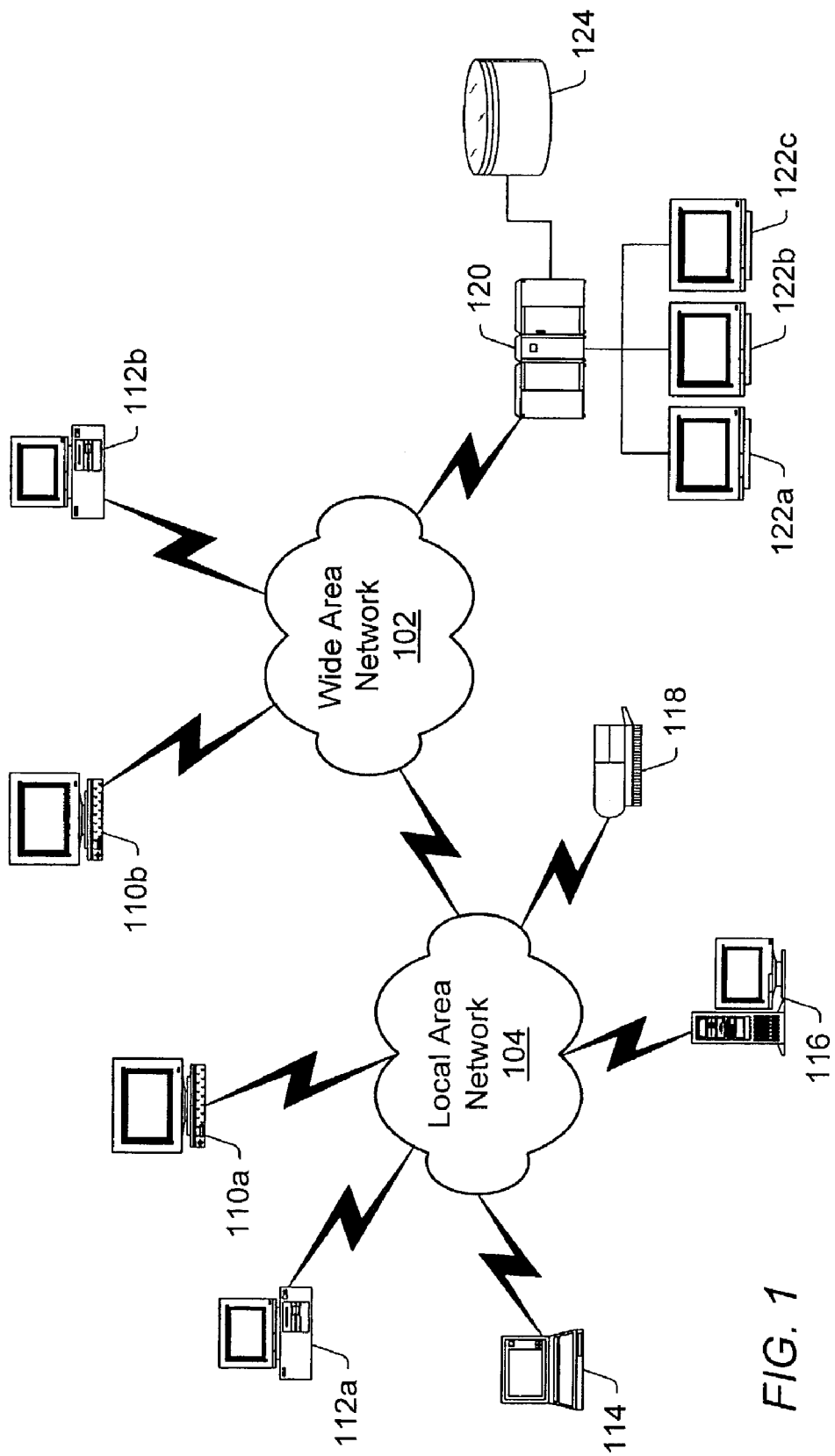
FIG. 1 depicts an embodiment of a network diagram of a wide area network suitable for implementing various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

FIG. 1 illustrates a wide area network ("WAN") according to one embodiment. WAN 102 may be a network that spans a relatively large geographical area. The Internet is an example of WAN 102. WAN 102 typically includes a plurality of computer systems that may be interconnected through one or more networks. Although one particular configuration is shown in FIG. 1, WAN 102 may include a variety of heterogeneous computer systems and networks that may be interconnected in a variety of ways and that may run a variety of software applications.

One or more local area networks ("LANs") 104 may be coupled to WAN 102. LAN 104 may be a network that spans a relatively small area. Typically, LAN 104 may be confined to a single building or group of buildings. Each node (i.e., individual computer system or device) on LAN 104 may have its own CPU with which it may execute programs, and each node may also be able to access data and devices anywhere on LAN 104. LAN 104, thus, may allow many users to share devices (e.g., printers) and data stored on file servers. LAN 104 may be characterized by a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, and/or radio waves).

Each LAN 104 may include a plurality of interconnected computer systems and optionally one or more other devices such as one or more workstations 110a, one or more personal computers 112a, one or more laptop or notebook computer systems 114, one or more server computer systems 116, and one or more network printers 118. As illustrated in FIG. 1, an example LAN 104 may include one of each computer systems 110a, 112a, 114, and 116, and one printer 118. LAN 104 may be coupled to other computer systems and/or other devices and/or other LANs 104 through WAN 102.

One or more mainframe computer systems 120 may be coupled to WAN 102. As shown, mainframe 120 may be coupled to a storage device or file server 124 and mainframe terminals 122a, 122b, and 122c. Mainframe terminals 122a, 122b, and 122c may access data stored in the storage device or file server 124 coupled to or included in mainframe computer system 120.

WAN 102 may also include computer systems connected to WAN 102 individually and not through LAN 104 for purposes of example, workstation 110b and personal computer 112b. For example, WAN 102 may include computer systems that may be geographically remote and connected to each other through the Internet.

Figure 2:
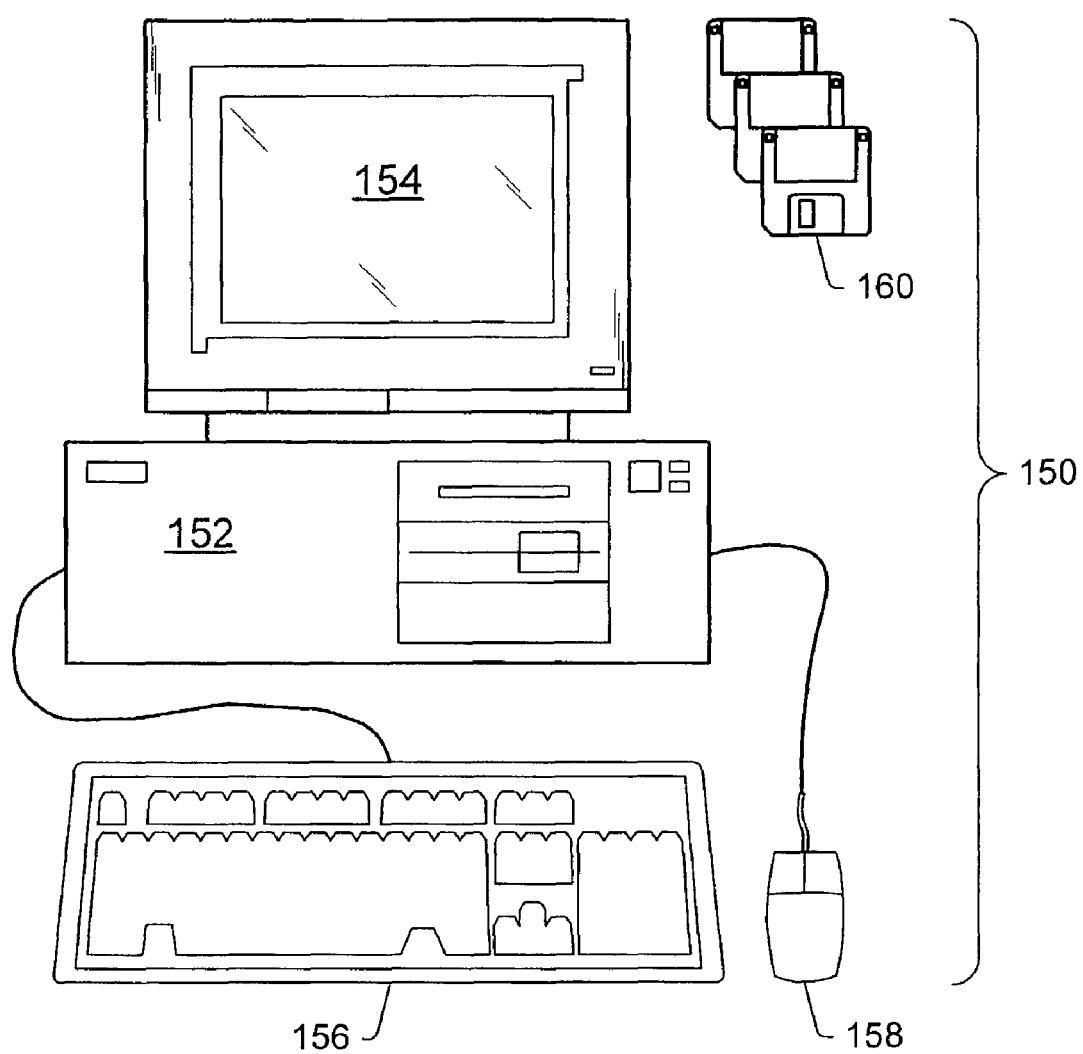
FIG. 2 depicts an embodiment of a computer system suitable for implementing various embodiments.

FIG. 2 illustrates an embodiment of computer system 150 that may be suitable for implementing various embodiments of a system and method for assessment of liability in a motor vehicle accident by considering characteristics that describe such an accident combined with expert knowledge collected from experienced claims adjusters. Each computer system 150 typically includes components such as CPU 152 with an associated memory medium such as floppy disks 160. The memory medium may store program instructions for computer programs. The program instructions may be executable by CPU 152. Computer system 150 may further include a display device such as monitor 154, an alphanumeric input device such as keyboard 156, and a directional input device such as mouse 158. Computer system 150 may be operable to execute the computer programs to implement assessment of liability in a motor vehicle accident by considering characteristics that describe such an accident combined with expert knowledge collected from experienced claims adjusters.

Computer system 150 may include a memory medium on which computer programs according to various embodiments may be stored. The term "memory medium" is intended to include an installation medium, e.g., a CD-ROM or floppy disks 160, a computer system memory such as DRAM, SRAM, EDO RAM, Rambus RAM, etc., or a non-volatile memory such as a magnetic media, e.g., a hard drive or optical storage. The memory medium may also include other types of memory or combinations thereof. In addition, the memory medium may be located in a first computer which executes the programs or may be located in a second different computer which connects to the first computer over a network. In the latter instance, the second computer may provide the program instructions to the first computer for execution. Also, computer system 150 may take various forms such as a personal computer system, mainframe computer system, workstation, network appliance, Internet appliance, personal digital assistant ("PDA"), television system or other device. In general, the term "computer system" may refer to any device having a processor that executes instructions from a memory medium.

The memory medium may store a software program or programs operable to implement a method for assessment of liability in a motor vehicle accident by considering characteristics that describe such an accident combined with expert knowledge collected from experienced claims adjusters. The software program(s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes ("MFC"), browser-based applications (e.g., Java applets), traditional programs, or other technologies or methodologies, as desired. A CPU such as host CPU 152 executing code and data from the memory medium may include a means for creating and executing the software program or programs according to the embodiments described herein.

Various embodiments may also include receiving or storing instructions and/or data implemented in accordance with the foregoing description upon a carrier medium. Suitable carrier media may include storage media or memory media such as magnetic or optical media, e.g., disk or CD-ROM, as well as signals such as electrical, electromagnetic, or digital signals, may be conveyed via a communication medium such as networks 102 and/or 104 and/or a wireless link.

Figure 3:
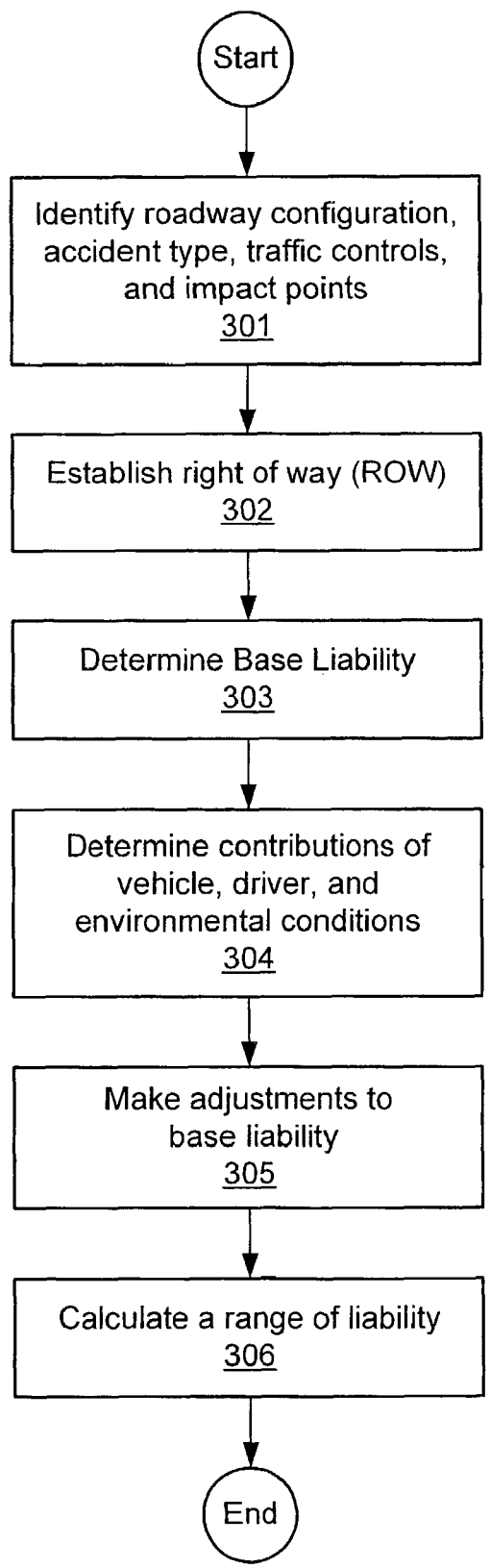
FIG. 3 depicts a flow chart of an embodiment of a liability estimation process.

FIG. 3 is a flow chart of an embodiment of a liability estimation process for vehicle accidents according to one embodiment. As used herein, the term "liability" generally refers to an amount for which a person or party is responsible or obligated. In an embodiment, liability in an accident may be expressed in a ratio or percentage (e.g., there is a total of 100% liability that can be attributed to persons, parties, or other factors such as weather, etc.). In another embodiment, liability may be expressed as a dollar amount.

An embodiment may apply to accidents involving many different types of vehicles (e.g., automobiles, light trucks, heavy trucks, motor cycles, school buses, vans, commercial trucks, tractor-trailers, motor homes, recreational vehicles, commercial buses, farming related vehicles, tractors). It is anticipated that an embodiment may apply to accidents involving other types of transportation craft such as boats and airplanes. It is also anticipated that an embodiment may apply to other types of accidents such as premises liability, which may include slip, trip and fall, dog bite, food poisoning, etc.

When two or more vehicles are involved in a motor vehicle accident, typically an estimation of liability is needed in order to settle a claim that a claimant may make against an insured. As used herein, the term "claimant" generally refers to a party involved in an accident that seeks compensation for bodily injury and/or property damage from the claims organization of an insurance carrier of another party, the insured, involved in the accident. As used herein, the term "insured" generally refers to a party involved in an accident who holds an insurance policy with a claims organization of an insurance carrier that obligates the claims organization of an insurance carrier to compensate a third party for the portion of the damages suffered by the third party that was the fault of the insured party in the accident.

The estimation of liability may be a complicated process involving multiple characteristics. Gathering the characteristics may typically be a task completed by a claims adjuster. As used herein, the term "claims adjuster" generally refers to an individual employed by a claims organization of an insurance carrier who assesses the liability of each party involved in an accident. When the claims adjuster has collected some or all of the information available, the claims adjuster may enter the information into a computer system. Examples of data input screens that may be suitable for entering accident information into a computer are shown in FIGS. 42-55.

The claims adjuster may provide to a computer system a real set of characteristics relating to a real accident. As used herein the term "real characteristics" generally refers to characteristics that describe an accident being considered for liability assessment. The computer system may have access to a memory that contains sets of characteristics that correspond to past or theoretical accidents. As used herein, the term "past accident" generally refers to an accident that occurred in the past of which certain characteristics may be stored in a memory of a computer system. As used herein, the term "theoretical accident" generally refers to an accident that might occur. The computer system may be configured to provide an estimate of liability for each set of characteristics in the memory.

The computer system may correlate the real set of characteristics from the real accident to the sets of characteristics in the memory to determine a set of characteristics that most closely approximates or matches the real set of characteristics. The computer system may then use the estimates of liability for the sets of characteristics in the memory to estimate liability for the real accident. It is anticipated that one or more of the sets of characteristics may be used to estimate liability.

FIG. 3 provides an overview of an embodiment of a liability estimation process based on multiple characteristics that may describe a vehicle accident. In step 301, a claims adjuster may identify a set of real characteristics relating to a real accident. A set of real characteristics may include, but are not limited to, roadway configuration, accident type, and impact points of each motor vehicle. Additionally, the real set of characteristics may include identification of traffic controls at the scene of the accident. Screen shots illustrating examples of providing each of these characteristics to a computer system may be found as follows: roadway configurations in FIG. 47, accident types in FIG. 47, traffic controls in FIG. 48, and impact points in FIG. 49.

Figure 7A:
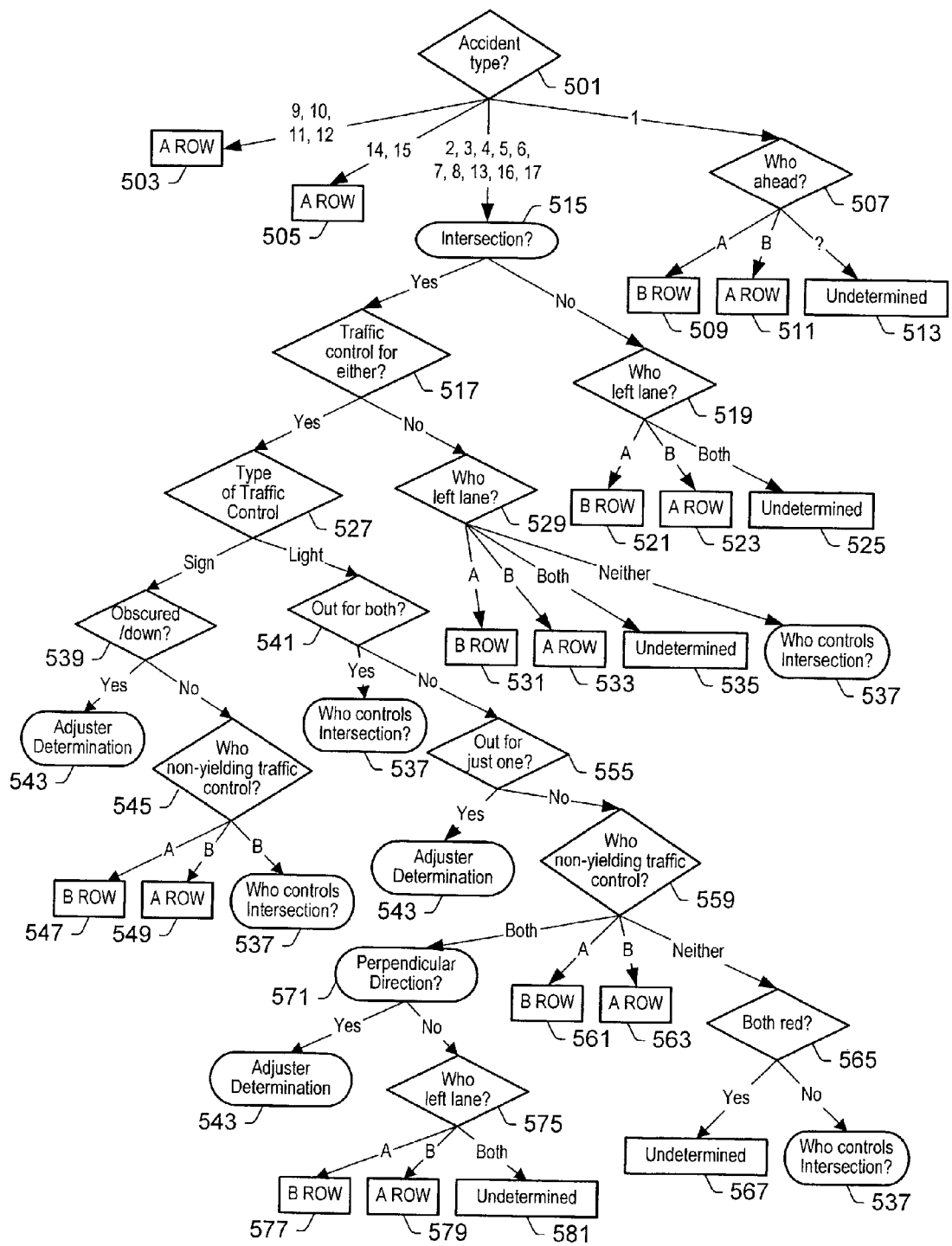
FIG. 7a is a flow chart for determining the right of way according to one embodiment.
Figure 7B:
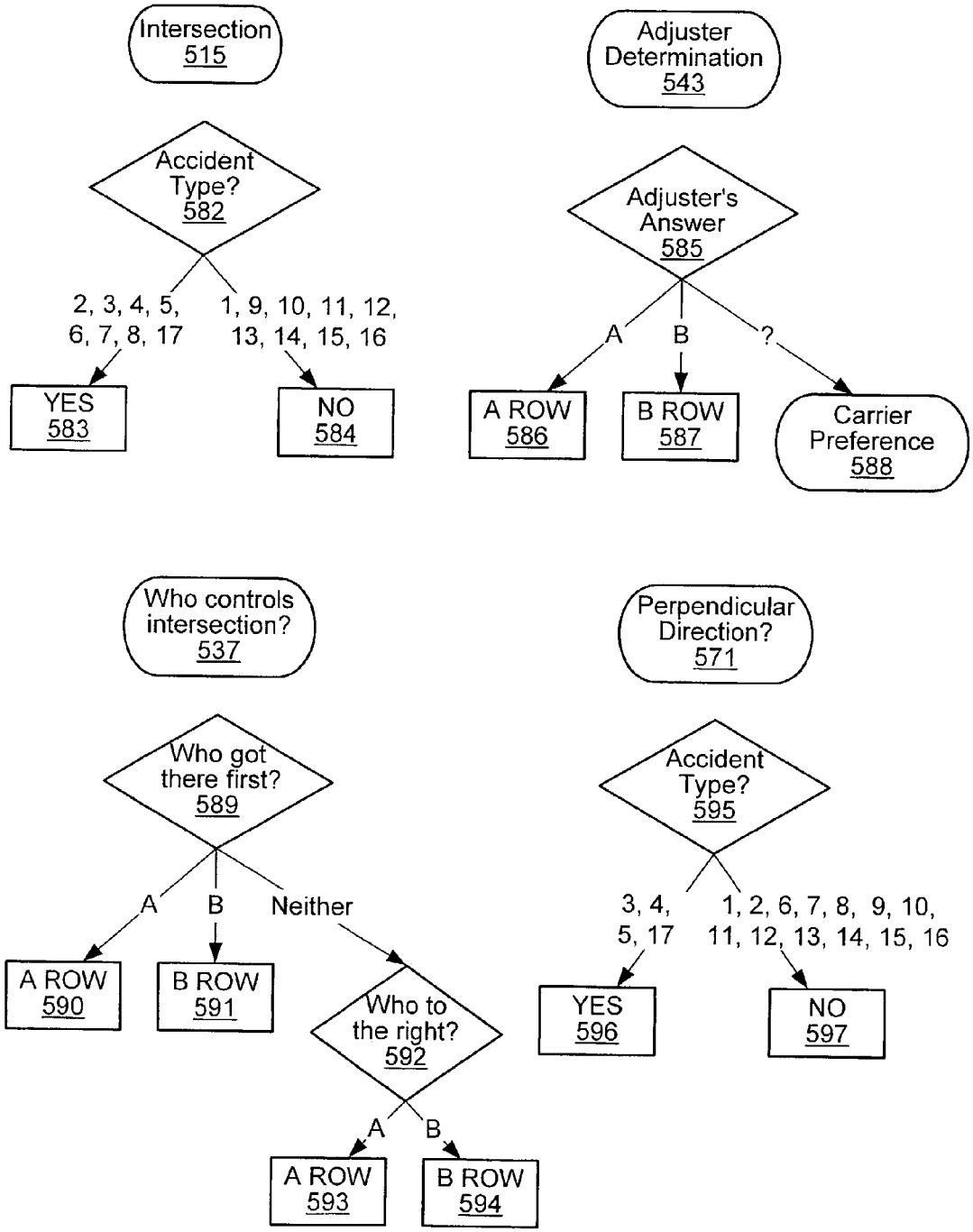
FIG. 7b is a group of flow charts corresponding to the flow chart in FIG. 5a according to one embodiment.

In step 302, the right of way ("ROW") may be established by a computer system from one or more of the real characteristics. Additionally, the computer system may ask one or more questions about the real accident to establish the ROW. At least one of the real characteristics may include a roadway configuration, an accident type, or a traffic control. FIGS. 7a and 7b show flow charts that illustrate an embodiment of right of way determination. Alternatively, the claims adjuster may specify the ROW.

In step 303, a base liability may be estimated from a table or database of characteristics that contain sets of characteristics that correspond to past or theoretical accidents. As used herein, the term "base liability" generally refers to the portion of the liability that is independent of factors specific to condition of vehicles in the accident, condition of drivers in the accident, actions of drivers in the accident, and environmental conditions common to vehicles in the accident. A computer system may have access to a memory that contains sets of characteristics such as roadway configuration, accident type, traffic control, right of way, and impact points of the vehicles involved in the vehicle accidents that correspond to past or theoretical accidents. Each of the sets of characteristics for past or theoretical accidents may be associated with an estimate of base liability. FIGS. 37 to 41 are screen shots of a knowledge acquisition utility and a tuning utility that may be utilized to input base liability information into a computer system. The utilities may be used to create a database of sets of characteristics that correspond to past or theoretical accidents.

The computer system may compare the real set of characteristics established or identified in the earlier steps (e.g., roadway configuration, accident type, traffic control, right of way, impact points) to the sets of characteristics relating to past or theoretical accidents to determine a nearest matching set of characteristics among the sets of characteristics relating to past or theoretical accidents. The computer may then determine an estimate of liability for the real accident based on the estimate of liability associated with the nearest matching set of characteristics among the sets of characteristics relating to past or theoretical accidents. It is anticipated that a computer system may be configured to provide an estimate of liability using at least one of the sets of characteristics that correspond to past or theoretical accidents.

Figure 51:
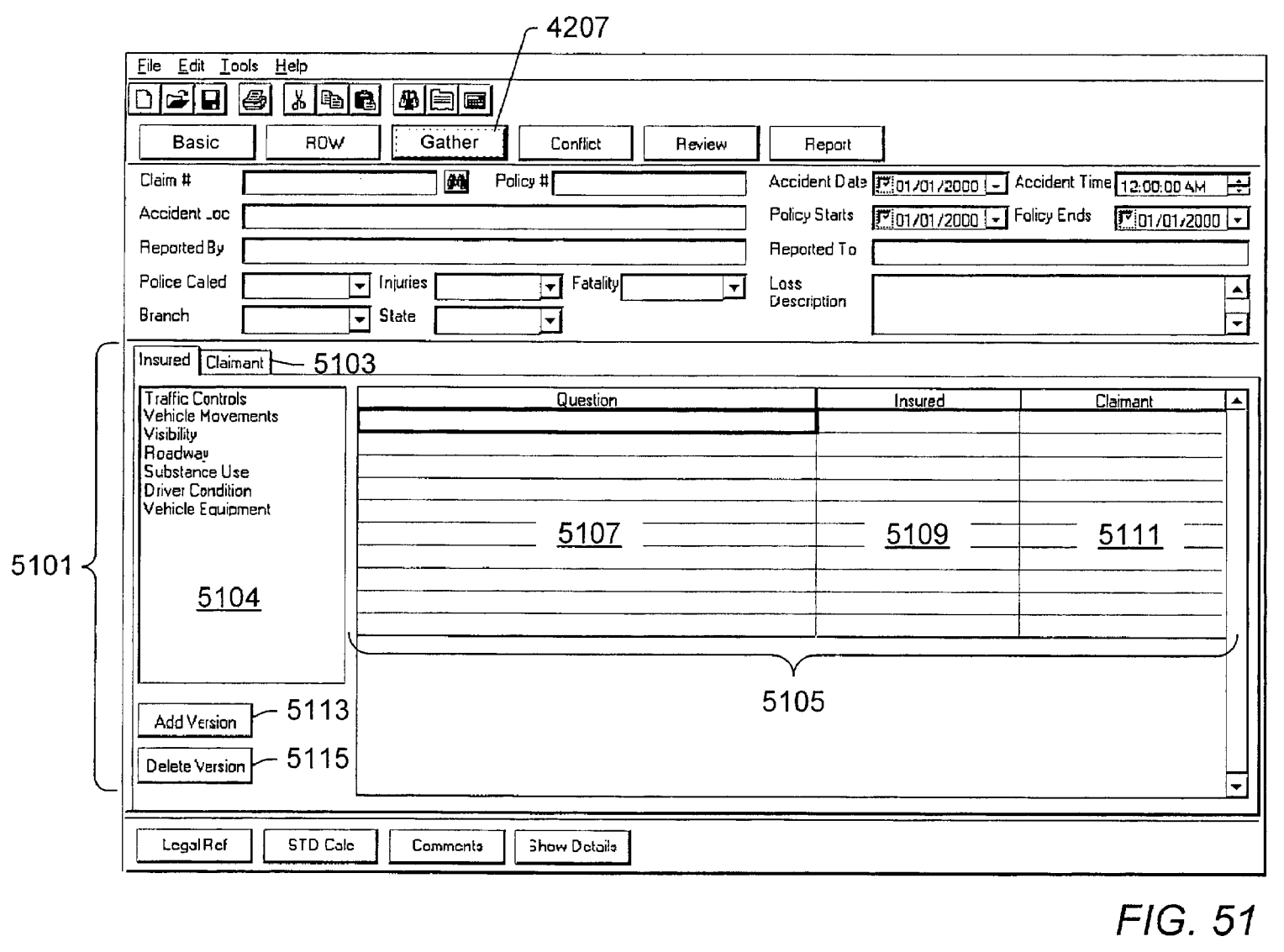

In step 304, the claims adjuster may identify to the computer system one or more factors corresponding to a real accident. The factors may include characteristics specific to condition of vehicles in the accident, condition of drivers in the accident, actions of drivers in the accident, or environmental conditions common to vehicles in the accident. The computer system may have access to a memory that contains corresponding factors associated with one or more past or theoretical accidents. One or more of the factors associated with past or theoretical accidents may be associated with an estimate of the effect on liability of the factor. The computer system may compare the factors associated with the real accident to factors associated with past or theoretical accidents to determine one or more nearest matching factors. Estimates of the effect on liability of the determined nearest matching factors may be used to estimate the effect on liability of the factors associated with the real accident. FIG. 51 is a screen shot showing a graphical user interface for entering conditional factors into a computer system.

In some embodiments, the estimate of the effect on liability of each factor may be adjustable. For example, the adjustments may be due to sets of characteristics corresponding to the real accident, the preference of a claims organization, knowledge of an experienced claims adjuster, or requirements of a jurisdiction in which the accident took place. FIGS. 10a through 36 illustrate several embodiments of estimates of the effect on liability of several factors which may be associated with theoretical accidents. It is anticipated that there are other methods than those shown in and described in reference to FIGS. 10a to 36 to estimate effects on liability due to the contribution of various factors.

In step 305, any necessary adjustments to the base liability estimated in step 303 due to contributions from factors estimated in 304 may be made. One example of a necessary adjustment may be an Absolute Liability Value. As used herein, the term "Absolute Liability Value" ("ALV") is generally defined as a factor that makes a significant contribution to liability such as negating the effect of other factors or characteristics associated with the accident. An ALV may also be defined as a factor that may adjust the liability beyond the lower and upper bounds defined for the liability. However, an ALV may not always shift liability to the other party. For example, an ALV might simply absolve one party of liability and explain the accident as being unavoidable. In such a situation, the contribution of various factors and characteristics may be ignored and an ALV may be assigned. For example, if a person had a sudden, unforeseen heart attack that caused an accident, the base liability might be determined to be 75 percent, but the final liability may be set via an ALV at 0 percent because the accident was probably unavoidable.

In step 306, all of the previously entered information may be taken into account and processed. Reference to expert knowledge databases, and other static information (such as jurisdictional information) may be made in calculating a range of liability. A range of liability may be more suitable than a single value in negotiations between parties regarding fault.

Figure 4:
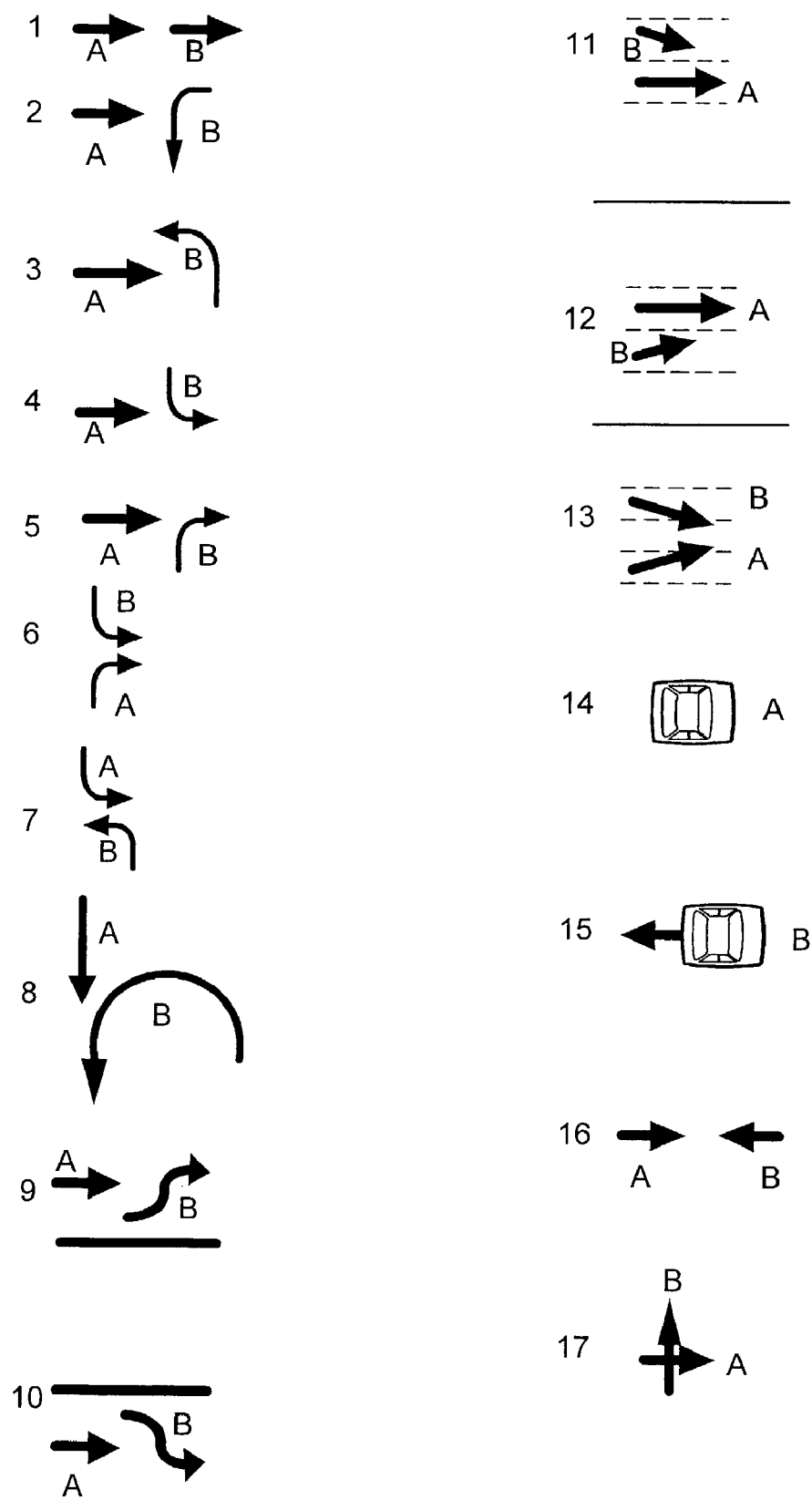
FIG. 4 is a diagram representing accident types according to one embodiment.

FIG. 4 illustrates graphical representations of various different accident types involving motor vehicles according to one embodiment. The arrows represent the paths of motor vehicle A and motor vehicle B at or near the time of the accident. Solid lines with no arrows represent the edge of a roadway. Dashed lines represent lanes. The user may select an accident type that corresponds to the real vehicle accident as shown in the screen shot in FIG. 47. As used herein, the term "user" generally refers to a claims adjuster or another individual employed by a claims organization. Accident types graphically represented in FIG. 4 may include: (1) a rear ender, (2) a left turn crossing traffic, (3) a left turn across traffic, (4) a left turn entering traffic, (5) a right turn entering traffic, (6) dual turns to same lane, (7) concurrent left turns, (8) a U-turn, (9) a parked vehicle merging into traffic from right, (10) a parked vehicle merging into traffic from left (e.g. on a one way street), (11) a merge from the left, (12) a merge from the right, (13) concurrent merges to a single lane, (14) a collision with a parked vehicle, (15) a collision while backing, (16) a head on, and (17) a straight cross traffic collision. Additionally, in some embodiments, a right turn across traffic accident type (not shown) may be represented.

Figure 5:
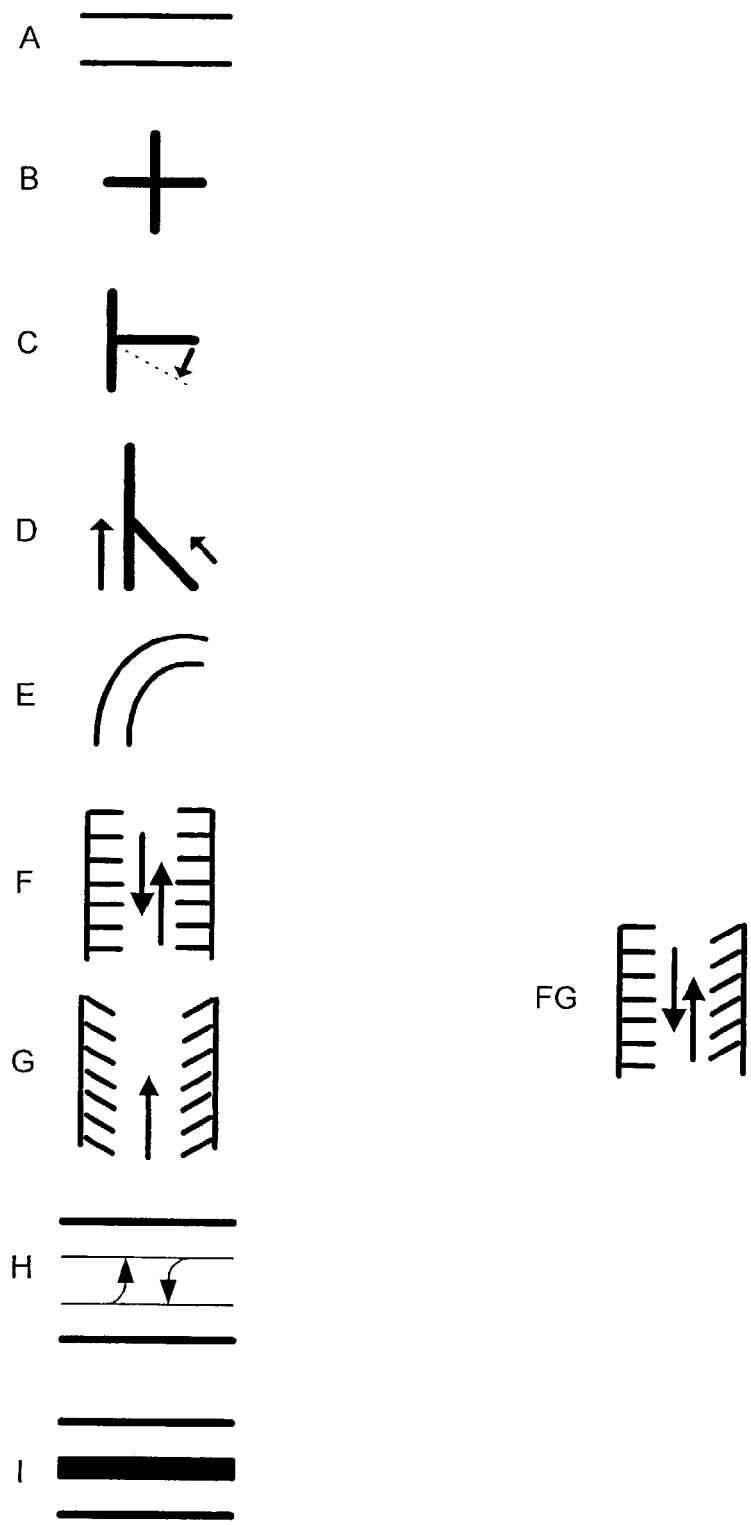
FIG. 5 is a diagram representing roadway configurations according to one embodiment.

FIG. 5 illustrates graphical representations of various different roadway configurations according to one embodiment. The user may select one of the roadway configurations that correspond to a real vehicle accident as shown in the screen shot in FIG. 47. Roadway configurations graphically represented in FIG. 5 may include: (A) a two or more lane road (including a divided road with a median that may be crossed), where the solid lines are the roadway and the space between is the median; (B) a four-way intersection with the lines representing the crossing roadways; (C) a T-angle intersection (the T-angle that may vary), where the solid lines are the roadway and where the dashed line represents the variation of the angle of the intersection; (D) a merging of one roadway into another with no turns and in one direction with the arrows showing the direction of the vehicles; (E) a curve with the lines showing the roadway; (F) a parking lot with two-way traffic where the arrows show the direction of the vehicles, the vertical lines represent the boundary of the parking lot, and the spaces between the horizontal lines represent the parking spaces; (G) a parking lot with one way traffic where the arrow shows the direction of the vehicles, the vertical lines represent the boundary of the parking lot, and the spaces between the diagonal lines represent the parking spaces; (H) a center turn lane with the bold lines representing the boundary of the roadway, the thin lines marking the boundary between the driving lanes and the center turn lane, and the arrows representing the direction of the center lane turns; (I) a two or more lane road divided by a physical barrier with the thicker center line representing the physical barrier and the thinner lines representing the outer boundaries of the roadway.

Alternatively, the roadway configurations of the parking lots, (F) and (G), may be represented by a single diagram, (FG), shown in FIG. 5. (FG) is the same as (F), except that the parking spaces on the right of the diagram are formed by diagonal lines. In an embodiment, (FG) may be used to represent a parking lot of any configuration.

FIG. 6 is a matrix illustrating the applicable roadway configuration/accident type combinations in liability estimation according to one embodiment. Accident types, (1) to (17) from FIG. 4, are listed on the vertical axis. Roadway configurations, (A) to (I) from FIG. 5, are listed on the horizontal axis. The alternative representation of the parking lots (F) and (G), (FG) is also included on the horizontal axis.

Figure 38:
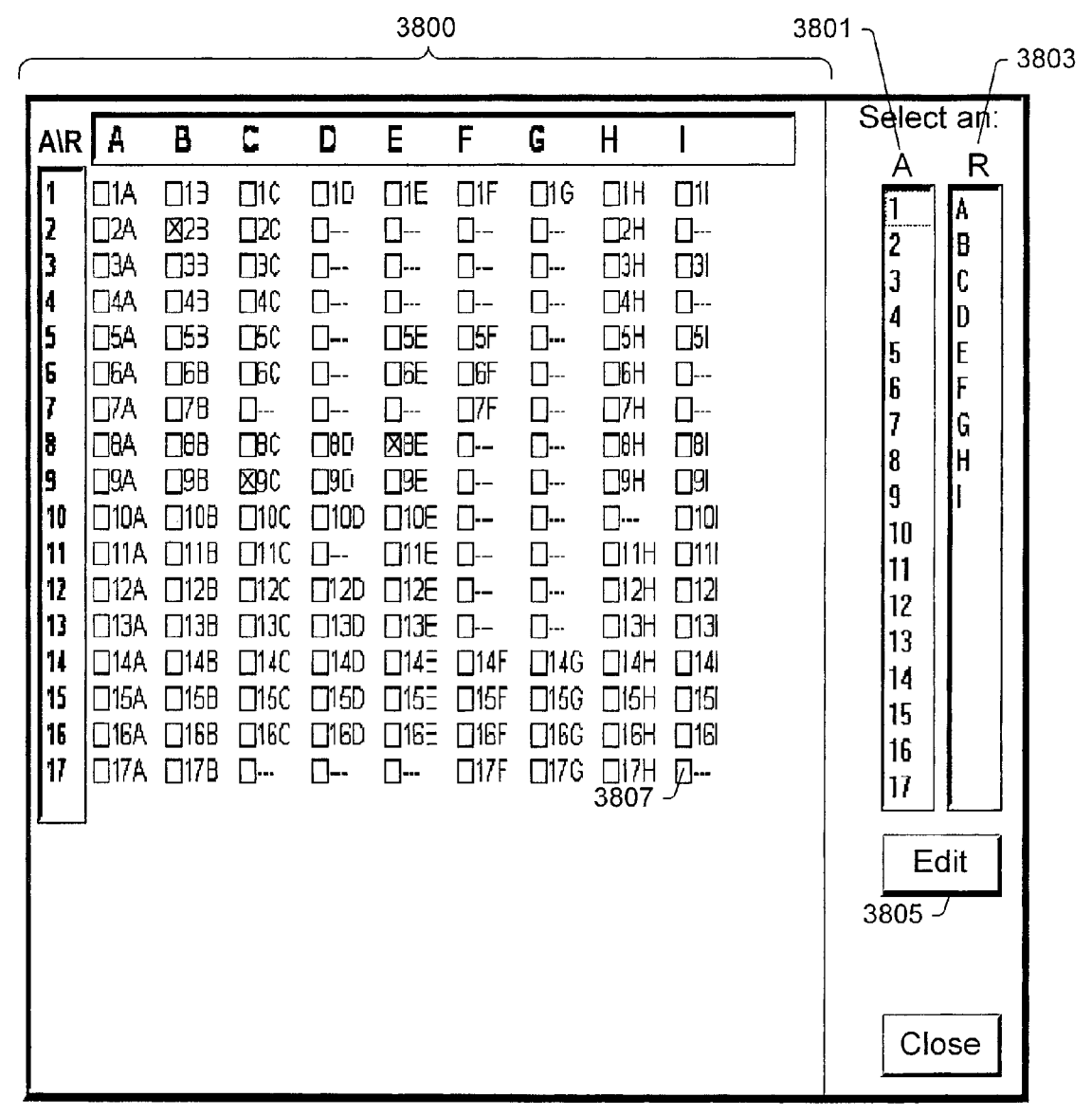

Experienced claims adjusters may consider combinations labeled "N" to be implausible accident scenarios and, therefore, not significant in liability assessment of motor vehicle accidents. Thus, combinations labeled "Y" may be considered a set of theoretical accident scenarios. FIG. 38 is a screen shot of a Knowledge Acquisition Utility, which shows a matrix of roadway configuration/accident types similar to FIG. 6. In FIG. 38, the elements of the matrix labeled with a "--" indicate implausible combinations. In the embodiment of FIG. 38, the implausible combinations are a subset of the combinations labeled with an "N" in FIG. 6 because the knowledge acquisition utility allows the user to consider some implausible combinations. An example of a combination marked as implausible in both FIGS. 6 and 38 is D2, left turn crossing traffic on a merge with no turns in one direction. An example of a combination that may be considered implausible in FIG. 6, but may be allowed for consideration in FIG. 38 is I16, a head on collision on a 2 or more lane road divided by a physical barrier.

FIGS. 7a and 7b depict flow charts for determining whether vehicle A or vehicle B has the right of way in traffic according to one embodiment. As used herein, the term "right of way" generally refers to the right of a vehicle to take precedence in traffic. The determination of right of way may require identification of one or more of the characteristics of the real accident (e.g., the roadway configuration, accident type, traffic control, or jurisdiction). Additionally, determining the right of way may require answering one or more questions concerning the accident. Alternatively, in some embodiments, the right of way may be specified by the user. FIG. 7b includes flow charts of determinations that appear in the flow chart in FIG. 7a. In FIG. 7b, the Intersection flow chart identifies the accident types that involve intersections. The Perpendicular Directions flow chart identifies the accident types that involve vehicles approaching from perpendicular directions. In Adjuster Preference, the claims adjuster may either assign the right of way to vehicle A or B, or defer to the insurance carrier's or claims organization's preference.

As shown by decision point 501 in FIG. 7a, the determination of the right of way may depend on the accident types illustrated in FIG. 4. The right of way may be determined from the accident type alone in some cases. For example, in accident types 9 and 10, merge of a parked vehicle, the vehicle already in traffic may have the right of way. Likewise, in accident types 11 and 12, the merge of a moving vehicle, the vehicle already in the lane may have the right of way. These determinations are shown by step 503 in which vehicle A in accident type diagrams 9, 10, 11 and 12 in FIG. 4 has the right of way. Additionally, as depicted in step 505, vehicle A may be determined to have the right of way if vehicle A is parked (accident type 14) or vehicle B is backing up (accident type 15).

For accident type 1, decision point 507 shows that the right of way may depend on which vehicle was ahead in the rearender. If vehicle B was ahead (as depicted in FIG. 4), step 511 shows that B may have the right of way. If vehicle A was ahead, step 509 shows that A may have the right of way. Alternatively, if it is unknown which vehicle was ahead (e.g., due to the circumstances or severity of the accident), step 513 indicates that the right of way may be undetermined. For an undetermined right of way the base liability of each vehicle may be set at 50%.

As shown in FIG. 7a, for accident types 2, 3, 4, 5, 6, 7, 8, 13, 16, and 17, the first step 515 is the intersection decision point, which is determination of whether the accident occurred at an intersection. The intersection flow chart is illustrated in FIG. 7b. Decision point 582 indicates that the presence of an intersection may be found from the accident type. If the accident type is 2, 3, 4, 5, 6, 7, 8, or 17, step 583 indicates that there may be an intersection. If the accident type is 1, 9, 10, 11, 12, 13, 14, 15, or 16, step 584 indicates an intersection may not be present. Alternately, in some embodiments, the presence of an intersection may be determined from roadway configuration information provided by the user. For example, roadway configurations A, E, F, G, I and FG may indicate that in intersection may not be present. Roadway configurations B, C, D, and H may indicate that an intersection may be present.

FIG. 7a shows that if there is no intersection, the next step is decision point 519. Decision point 519 is the determination of which vehicle left the lane it was in. As shown by steps 521 and 523, the vehicle that remained in the lane it was in may have the right of way. Alternatively, if both vehicles left their lanes, step 525 indicates that the right of way may be undetermined. In this case, the base liability may be assessed at 50% for each vehicle.

FIG. 7a shows that when there is an intersection, the next step is decision point 517 which is a determination of whether there is a traffic control for either vehicle A or B. If not, decision point 529 indicates that the right of way may depend on which vehicle left the lane it was in Steps 531, 533, and 535 are analogous to steps 521, 523, and 525. However, if neither vehicle left the lane it was in, step 525 indicates that the vehicle that controls the intersection may have the right of way as shown by flow chart 537. The vehicle that controls the intersection may be determined by flow chart 537 shown in FIG. 7b. Decision point 589 in FIG. 7b is the first step in determining who controls the intersection. Decision point 589 asks which vehicle arrived at the intersection first. As shown by steps 590 and 591, the vehicle that arrived first at an intersection may control it. If neither vehicle arrived first, decision point 592 asks which vehicle is to the right. Steps 593 and 594 show that the vehicle to the right may control the intersection.

As illustrated in FIG. 7a, if the answer to decision point 517 is yes, then decision point 527 is next which asks the type of traffic control. Decision point 539, which is reached if the traffic control is a sign, asks if the sign is obscured or down. If the sign is obscured or down, step 543 shows that right of way may be determined by the adjuster. Adjuster determination is shown by the flow chart in FIG. 7b. Decision point 585 in FIG. 7b is the adjuster's answer for which vehicle, A or B, has the right of way, which is shown as steps 586 and 587. If the adjuster does not have an answer, then the right of way may be the carrier's preference as shown by step 588.

However, if the answer to decision point 539 is no, decision point 545 asks which vehicle had a non-yielding traffic control. Step 547 shows that if A had the non-yielding traffic control, then B may have the right of way. Step 549 shows that if B had the non-yielding traffic control, then A may have the right of way. Step 551 applies if neither A nor B has the non-yielding traffic control. The right of way may be determined by the vehicle that controls the intersection, which may be determined by the flow chart shown in FIG. 7b.

Alternatively, if the answer to decision point 527 is a traffic light, then decision point 541 asks if the light was out for both vehicles. If the light was out for both, then right of way may be determined by who controls the intersection, which is shown in FIG. 7b. If the answer to decision point 541 is no, decision point 555 asks if the light was out for only one vehicle. If the light was out for only one vehicle, then right of way may be found from adjuster determination, which is given by the flow chart in FIG. 7b. However, if the answer to decision point 555 is no, decision point 559 is reached. Decision point 559 asks which vehicle has a non-yielding traffic control. As step 561 shows, if A has the non-yielding traffic control and B does not, then B may have the right of way. As step 563 shows, if B has the non-yielding traffic control and A does not, then A may have the right of way. If neither A nor B has the non-yielding traffic control, then decision point 565 is reached, which inquires whether both had a red light. If the answer to decision point 565 is yes, the right of way may be undetermined, as shown in step 567. In this case, the base liability may be assessed at 50% for each vehicle. If the answer to decision point 565 is no, then right of way may be determined by the vehicle that controls the intersection. The vehicle that controls the intersection may be determined by the flow chart shown in FIG. 7b. If both vehicles in decision point 559 have non-yielding traffic controls, then decision point 571 is reached. Decision point 571 asks whether the vehicles were approaching in perpendicular directions, which may be determined from the flow chart in FIG. 7b. As shown by decision point 595 in FIG. 7b, whether the vehicles were approaching in perpendicular directions may be determined from the accident types shown in FIG. 4. Step 596 shows that the answer is yes if the accident type is 3, 4, 5, or 17. Step 597 shows that the answer is no if the accident type is 1, 2, 6, 7, 8, 9, 10, 11, 12, 13, 14, 15, or 16. If the vehicles were approaching in perpendicular directions, then right of way may be determined by the adjuster. Adjuster determination may be given by the flow chart in FIG. 7b. If the vehicles were not approaching in a perpendicular direction, then decision point 529 shows that the right of way again may depend on which vehicle left the lane it was in Steps 577, 579, and 581 are analogous to steps 521, 523, and 525.

Figure 42:
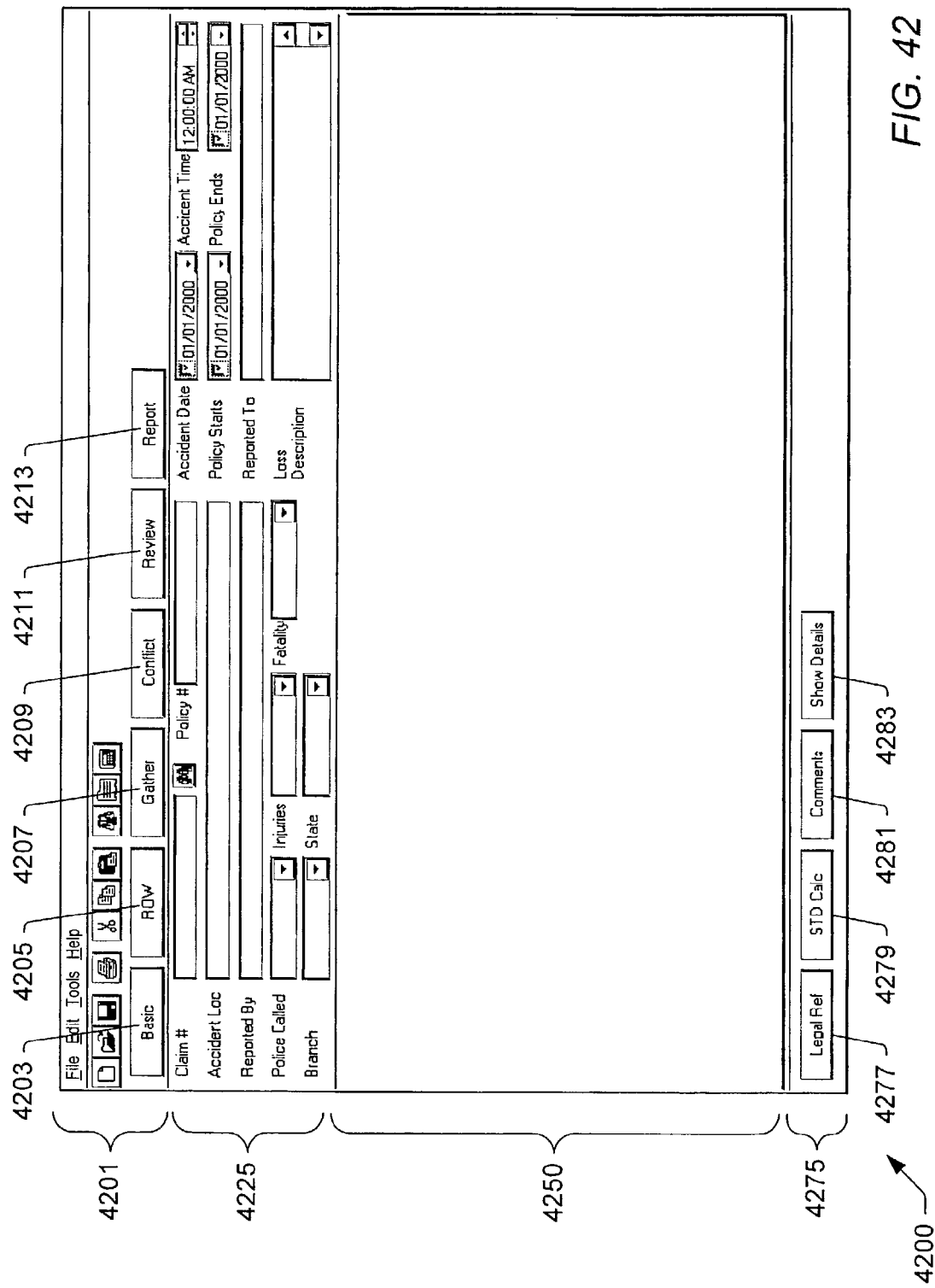
FIG. 42 is a screen shot of a Claim Data window according to one embodiment.
Figure 48:
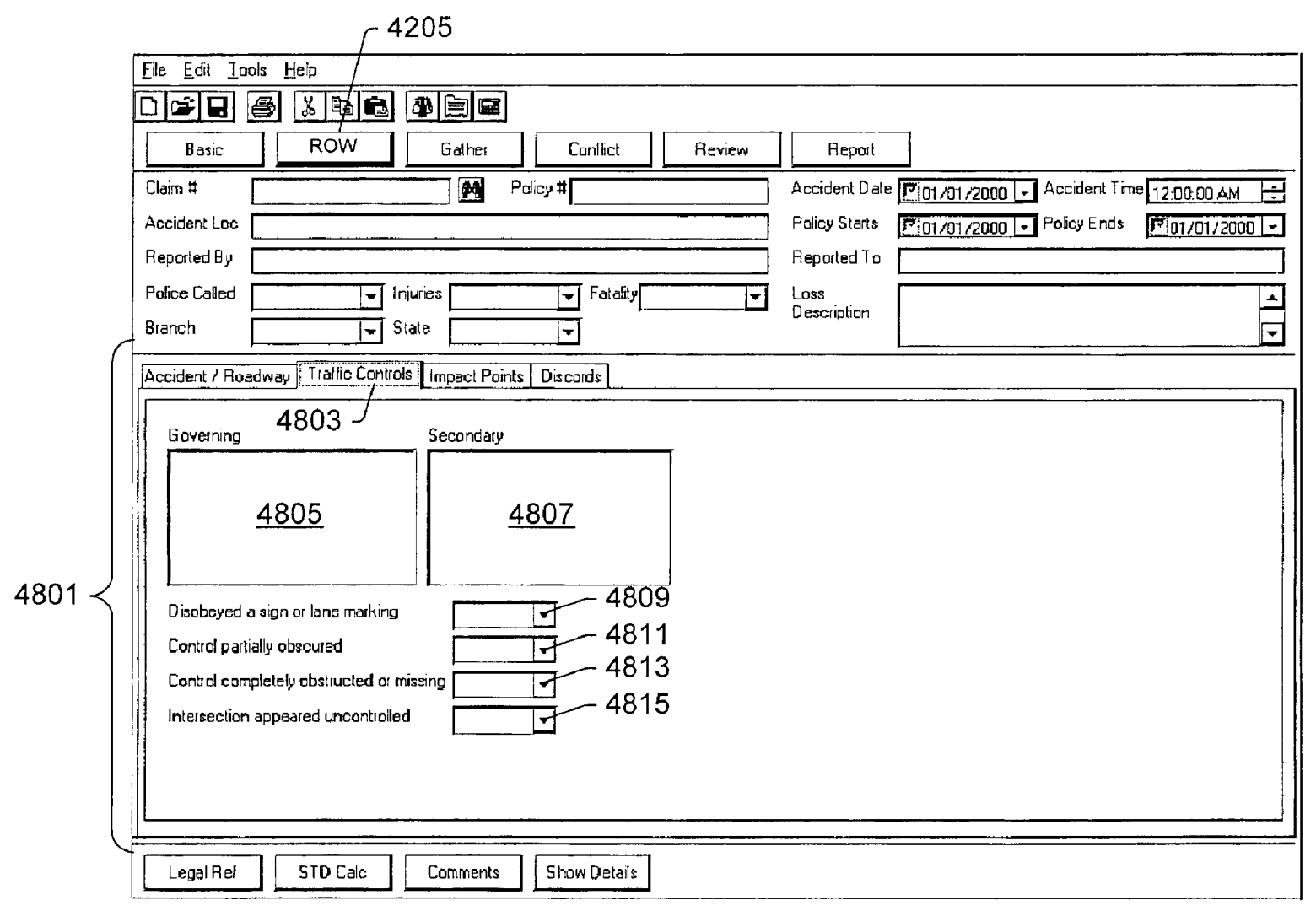

An example of a screen shot of user input of a traffic control is shown in FIG. 48. An example of a screen shot of user input of the jurisdiction is shown in FIG. 42. Jurisdiction may include each of the fifty states of the United States and territories of the United States. In another embodiment, jurisdiction may include any governmental entity with traffic laws, such as a foreign country. The vehicle that does not have the right of way may generally be referred to as the "tortfeasor" ("TF") and the vehicle that has the right of way may generally be referred to as the "other party" ("OP"). For the case of an undetermined right of way, both parties may be considered the "other party" when determining the effect of one or more factors on the liability.

In an embodiment, a traffic control may be considered as "yielding" or "nonyielding." As used herein, the term "yielding traffic control" generally refers to a traffic control that informs a driver that he or she must give way (or stop) for other traffic. As used herein, the term "nonyielding traffic control" generally refers to a traffic control that informs the driver that he or she may proceed. Traffic controls may be further divided into three categories: pure, other explicit controlling devices, and markings and signs. Yielding pure traffic controls may include, but are not limited to, no traffic control present, a red light, a stop sign, a yield sign, a flashing red light, or a police officer signaling stop. Nonyielding pure traffic controls may include, but are not limited to, a yellow light, a green light, a green arrow left, a green arrow right, a flashing yellow light, or a police officer signaling proceed.

Yielding other explicit controlling devices may include a crossing guard signaling stop, a flagger signaling stop, another person signaling stop, and a school bus loading or unloading. Nonyielding other explicit controlling devices may include a crossing guard signaling proceed, a flagger signaling proceed, or another person signaling proceed. In some embodiments, emergency vehicle may also be yielding traffic controls depending upon the jurisdiction.

Whether a traffic control in the pure category overrides a selection in the other explicit controlling devices category may depend upon the jurisdiction. For example, whether a vehicle with a green light must yield to an approaching emergency vehicle may vary depending on the jurisdiction.

In one embodiment, a user may only select one traffic control from each category. The user may not have to select a traffic control from more than one category. If a user does select more than one, then the user may select which category should be considered as the governing control. A secondary traffic control may be listed in a report as informational only.

Markings and signs such as lane markings may also be traffic controls. In some embodiments, the presence of markings or signs may be noted for informational purposes. For example the presence of a disobeyed marking may be noted for use as a negotiation or talking point rather than being used to estimate liability or right of way. The markings and signs may include, but are not limited to: a one way sign or marking, a do not enter sign or marking, a no passing sign or marking, a no parking zone sign or marking, a straight only sign or marking, a left turn only sign or marking, a right turn only sign or marking, no U turn sign or marking, a no right turn on red sign, cones and/or barricades, a solid yellow line, a solid white line, or a no stopping sign or marking.

Figure 8A:
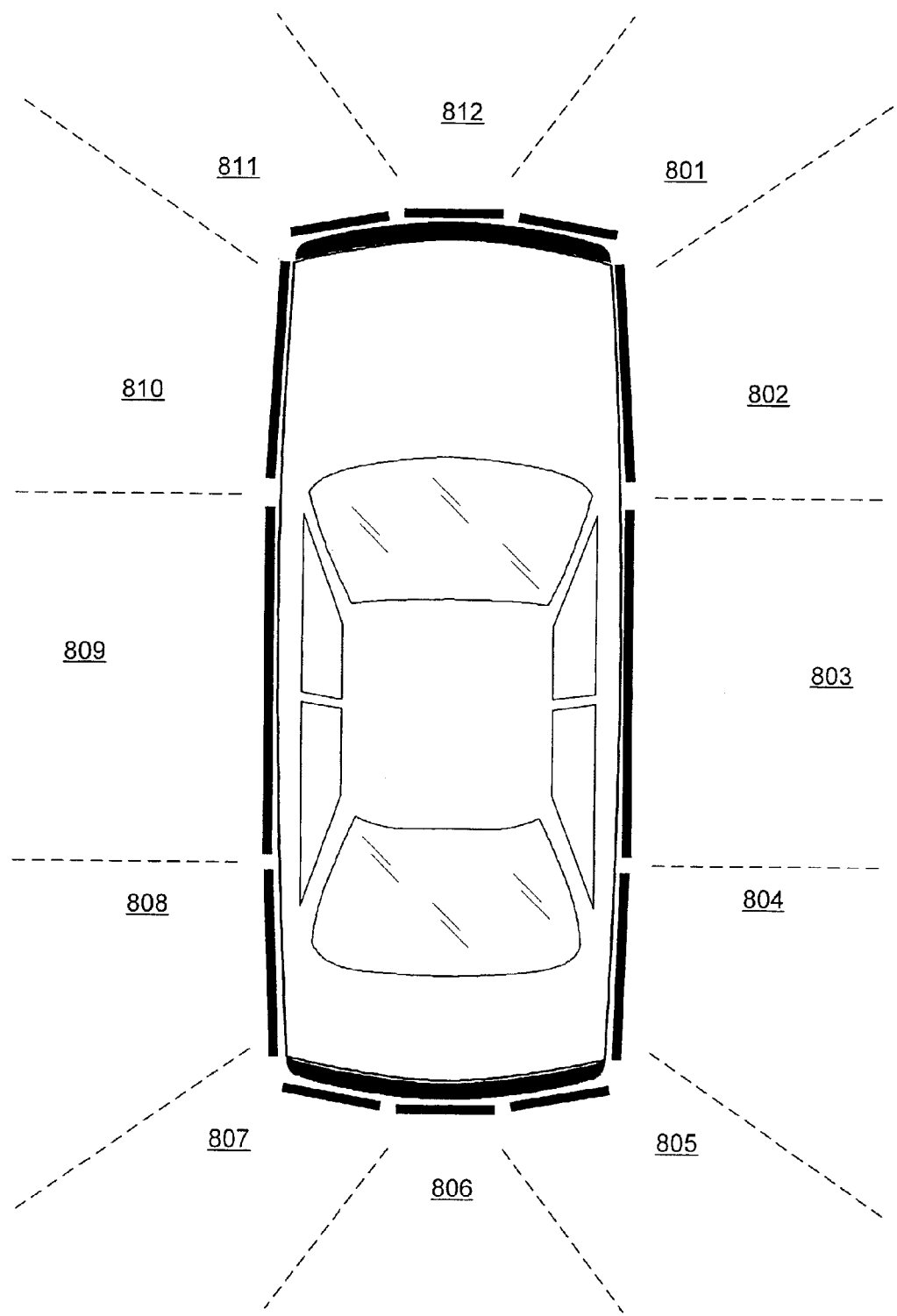
FIG. 8a is a diagram illustrating impact points on a motor vehicle according to one embodiment.

FIG. 8a is an illustration of a graphical representation of the impact points on a vehicle according to one embodiment. FIG. 8a is a graphical representation of a vehicle that is divided into twelve sections: 801—right front corner, 802—right front fender, 803—right middle, 804—right rear quarter-panel, 805—right rear corner, 806—rear middle, 807—left rear corner, 808—left rear quarter-panel, 809—left middle, 810—left front fender, 811—left front corner, and 812—front middle. Each of the labeled sections may correspond to a possible point of impact in a motor vehicle accident.

FIG. 8b is a table showing impact groups for combinations of roadway configuration and accident type according to one embodiment. A given roadway configuration/accident type combination may have a number of possible impact groups. As used herein, the term "impact group" generally refers to a collection of pairs of impact points for a past or theoretical accidents. A pair of impact points may include the impact point for each of two vehicles involved in an accident. In some embodiments, each pair of impact points may be associated with sets of liability estimate values. One set of values may correspond to vehicle A having the right of way and the other set of values to vehicle B having the right of way. Each set of values may include a value of base liability, a lower bound of liability, and an upper bound of liability for each vehicle. Alternately, in some embodiments, each impact group may be associated with sets of values corresponding to base liability values. It is anticipated that there may be various ways to arrange impact points in impact groups.

For example, as shown in FIG. 8b, impact points associated with the roadway configuration/accident type combination 2B (a four-way intersection with vehicle A from top turning left and B from bottom going straight), may be grouped into four impact groups. A first impact group may include three pairs of impact points: A811B809, A811B810, and A810B808. A and B refer to motor vehicle A and motor vehicle B, respectively, and the numbers refer to points on the impact point diagram in FIG. 8a. For example, the impact point pair, A811B809, corresponds to vehicle A with an impact point on the left front fender (811) and vehicle B with an impact point on the left middle (809).

In an embodiment, each of the pairs of impact points in a given impact group may have the same base liability and lower and upper bound of liability. The estimation of the base liability values, lower and upper bounds of liabilities, and the impact groups may be estimated by expert claims adjusters through a process called knowledge acquisition.

In an embodiment, the base liability and the bounds of the liability for two vehicles involved in an accident may be estimated for a real accident by first specifying the roadway configuration (as shown in FIG. 5), accident type (as shown in FIG. 4), and pair of impact points (as shown in FIG. 8a) of vehicles A and B for the real accident. The vehicle that had the right of way may be determined as shown in FIGS. 7a and 7b.

A table, like the one shown in FIG. 8b, may be searched for the impact group corresponding to the given roadway configuration/accident type combination that contains the specified pair of impact points that correspond to a past or theoretical accident. Once the roadway configuration/accident type combination and impact group of the past or theoretical accident are known, the base liability and bounds may be extracted from a table in a database that lists the base liabilities and bounds for each impact group for all applicable roadway configuration/accident type combinations.

FIG. 9a illustrates an embodiment of a method of estimating the effect of one or more factors on the liability. Factor adjustments may be considered for each vehicle based on data specific to condition of vehicles in the accident, condition of drivers in the accident, actions of drivers in the accident, or environmental conditions common to vehicles in the accident. Each factor may have an associated penalty value that may correspond to an amount that an experienced claims adjuster may add to the base liability when this factor is present alone. A user may identify the presence of factors in a real accident and provide a list of factors to the computer system.

In an embodiment, factors related to the condition of vehicles in the accident may include the presence of faulty equipment. As used herein, the term "faulty equipment" generally refers to any vehicle equipment malfunction that causes an action (e.g., stuck accelerator causes unwanted acceleration), prohibits the operator from taking action (e.g., failed braking system prevents stopping), or fails to perform an action (e.g., failed brake lights do not warn other drivers of braking). In an embodiment, factors related to environmental conditions common to the vehicle may include, but are not limited to, presence of a construction zone, an obstructed view or glare, a road condition, a road character, a road surface, a defective traffic control, weather or visibility. In an embodiment, the factors related to a driver's condition may include, but are not limited to, consumption of alcohol, consumption of illicit drugs, consumption of medications, driver inattention, lack of required corrective lenses, driver inexperience, driver fatigue, or driver illness. In an embodiment, factors related to a driver's actions may include, but are not limited to, following too closely, driving with headlights off, driving at an unsafe speed, a sudden stop or swerve, driving with taillights brake lights off, unsafe backing, failure to take evasive action, driving with high beams on, an improper lane change, improper parking, or improper signaling.

FIG. 9a is an illustration of one embodiment for estimating the effect on liability of one or more factors. The decision to apply a particular factor in a given situation may be made by an experienced claims adjuster. In alternate embodiments, the factor may be applied by a computer system based on input provided by a claims adjuster. The computer system may ask the claims adjuster one or more questions regarding the accident. Based on answers provided by the claims adjuster, the computer system may determine that one or more factors apply.

In the embodiment depicted in FIG. 9a, the effect of a factor on the liability may be adjusted by a situational weight for each roadway configuration/accident type and vehicle. A situational weight may have four levels: N/A (factor not applicable), low, normal, and high. An experienced claims adjuster may determine an appropriate situational weight to apply. In an alternate embodiment, a computer system may be configured to determine an appropriate situational weight based on information provided by a claims adjuster. For example, in a rear-ender, a factor related to the consumption of alcohol (e.g., being drunk) may be considered more important than it is in other types of accidents. Therefore, the situational weight may be "high" for the rear vehicle. However, whether the driver of the lead vehicle has consumed alcohol may be irrelevant. Thus, a situational weight of "N/A" may be assigned to the factor. Each level of the situational weight may be assigned a percentage. For example, the situational weight may be 50 percent for low and 150 percent for high.

In the example depicted in FIG. 9a, base liability values may have already been determined from a table of base liabilities of past or theoretical accidents, as was described in reference to FIG. 8b. For example, the insurance carrier may have determined that the base liability for the insured was 80%, with a lower bound of 50% and an upper bound of 100%. Consequently, base liability for the claimant may be 20%.

In an embodiment, the levels of the situational weights (e.g., N/A, low, normal, and high) may be represented as percent weights (e.g., 0%, 50%, 100%, and 150%, respectively). In some embodiments, for a given factor, the penalty value, the situational weight, the percent weight, and whether or not the factor may apply may be specified by the user. If the factor applies, the adjusted penalty may be estimated by multiplying the penalty value by the percent weight associated with the determined situational weight. For example, the adjusted penalty of 22.5% for alcohol for the insured may be estimated by multiplying the penalty (e.g., 15%) by the percent weight (e.g., 150%) associated with the determined situational weight (e.g., "high"). In an embodiment, answers to questions in the flow charts may be used to determine whether a situational weight associated with a factor is low, medium, high, or not applicable.

In other embodiments, the penalty, and/or situational weight may not be determined directly by a user. In such an embodiment, the penalty and/or situational weight may be determined from the answers to a series of questions. The questions may be specific to one party (e.g., the tortfeasor or other party). The questions may relate to roadway configuration, accident type, and/or other characteristics of the accident. FIGS. 10a to 36 are flow charts that depict methods of determining penalties values associated with various factors. In the FIGS. 10a to 36, the penalty values may be represented in certain of the flow chart terminuses as percentage values. In certain flow charts, the penalty values may be represented by the terms "low," "medium," or "high." These terms may represent variables that correspond to penalty values. For example, the "low" term may correspond to a penalty value of 10%, the "medium" term may correspond to a penalty value of 20%, and the "high" term may correspond to a penalty value of 30%. In some embodiments, the penalty values associated with each of these terms may be configurable by the claims organization. In some embodiments, all of the penalty values determined by methods such as those depicted in FIGS. 10a through 36 may be configurable by the claims organization.

In some cases, a factor may be determined to be a talking point ("TP"). As used herein, the term "talking point" generally refers to a factor that may not affect liability and may be informational only because the liability may be inherent in the base liability for the roadway configuration/accident type combination and the right of way. In certain embodiments, a computer system may gather information related to an accident and note for the user talking points identified from the information. Talking points may be useful if two or more parties must come to a negotiated agreement regarding the assessment of liability from the accident. A factor may also be determined to be an ALV.

In some embodiments, the situational weight for a factor may not be controlled directly by the user. In such embodiments, a factor ranking may be provided by the user to indirectly adjust the effect of a factor. For example, the user may rank factors on a scale of 0 to 5. The ranking factor may take into account the importance that a given factor has to a claims organization when it is not related to the characteristics of a particular accident. A knowledge acquisition utility may be provided via a computer system. The knowledge acquisition utility may ask the user a series of questions related to one or more factors, and determine a ranking factor from answers provided by the user. Alternately, the user may be presented directly with a list or factors and may be asked to rank each factor on a provided scale. In such embodiments, factors ranked as having a greater importance may be provided a situational weight. Such a method may be used in some embodiments to determine penalty values associated with one or more factors.

One method of applying the factor ranking to situational weights may be to assign a weight in terms of a percentage value between 0 and 100%. A rank of 0 may correspond to 0% and a rank of 5 may correspond to 100%. Ranks between 0 and 5 may be assigned values in 20% increments. If a value is assigned to the situational weight for a given factor, the situational weight may be adjusted by the ranking factor. For example, if the system estimates that high beams have a situational weight of 10 percent, and the claims organization gave a rank of 4 to high beams, the adjusted situational weight may be 8 percent.

As used herein, the term "penalty value" generally indicates that a portion of liability that would otherwise be assessed to a first party is not assessed to the first party. In some cases, that portion of the liability may be shifted to a second party, where the second party may be another driver involved in the accident. In other cases, the liability may be shifted to a third party, where the third party was not a driver involved in the accident. For example, the third party may be an owner of an animal that contributed to the accident.

Adjusting the base liability based on factors may be done in a number of ways. For example, a direct shift may be used. In an embodiment, a portion of the base liability assessed to the first party may be shifted to the second party. In such a case, a penalty factor may be a percentage of the liability to shift. For example, if the first and second party would each be assessed with 50% of the liability for the accident. A penalty value of 80% for the second party means that the first party is assessed with 10% of the liability and the second party is assessed with 90% of the liability.

In some embodiments, a debit/credit system may be used. In such embodiments, an effect on liability for a particular factor may be determined. One half of the determined penalty value may then be added to a first party, and the other half subtracted from the second party. After all of the factors may have been considered, the penalty values for each party may be summed and applied to the base liability. For example, FIGS. 9b and 9c depict examples of applying a debit/credit system for assessing the effect of several factors on the liability. In the example of FIG. 9b, Factors 1 and 2 apply to the first party, having penalty values of 20% (i.e., 10%+10%) and 30% (i.e., 15%+15%), respectively. Additionally, Factor 3 applies to the second party, having a penalty value of 10%. Therefore, a total of 20% may be added to the base liability of the first party, leaving a 70% liability assessment for the first party. The second party may receive a 30% liability assessment as a result of 20% being subtracted from the base liability of the second party. In some embodiments, effects on liability adjust the base liability by multiplying the sum of the effects on liability times the base liability. For example, using the same numbers as in FIG. 9c, but multiplying the sum by the base liability the first and second parties may be assessed with 60% and 40%, respectively. In addition to the calculation demonstrated in FIGS. 9b and 9c, one or more situational weights may be used to adjust the penalty values associated with each factor before the penalty values are assessed to the parties.

Figure 10A:
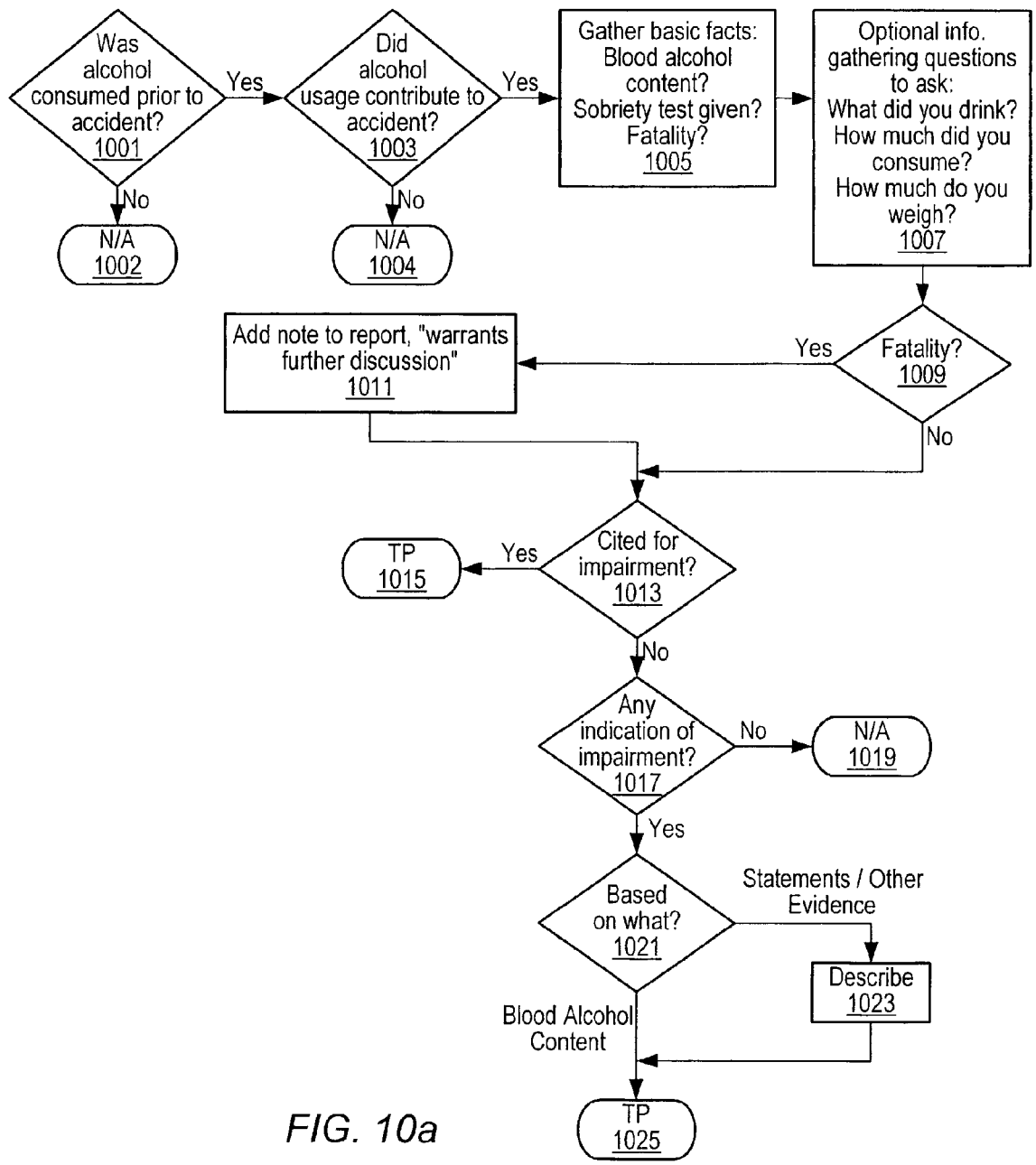
FIG. 10a is a flow chart for assessing the contribution of alcohol usage to liability in a motor vehicle accident according to a first embodiment.
Figure 10B:
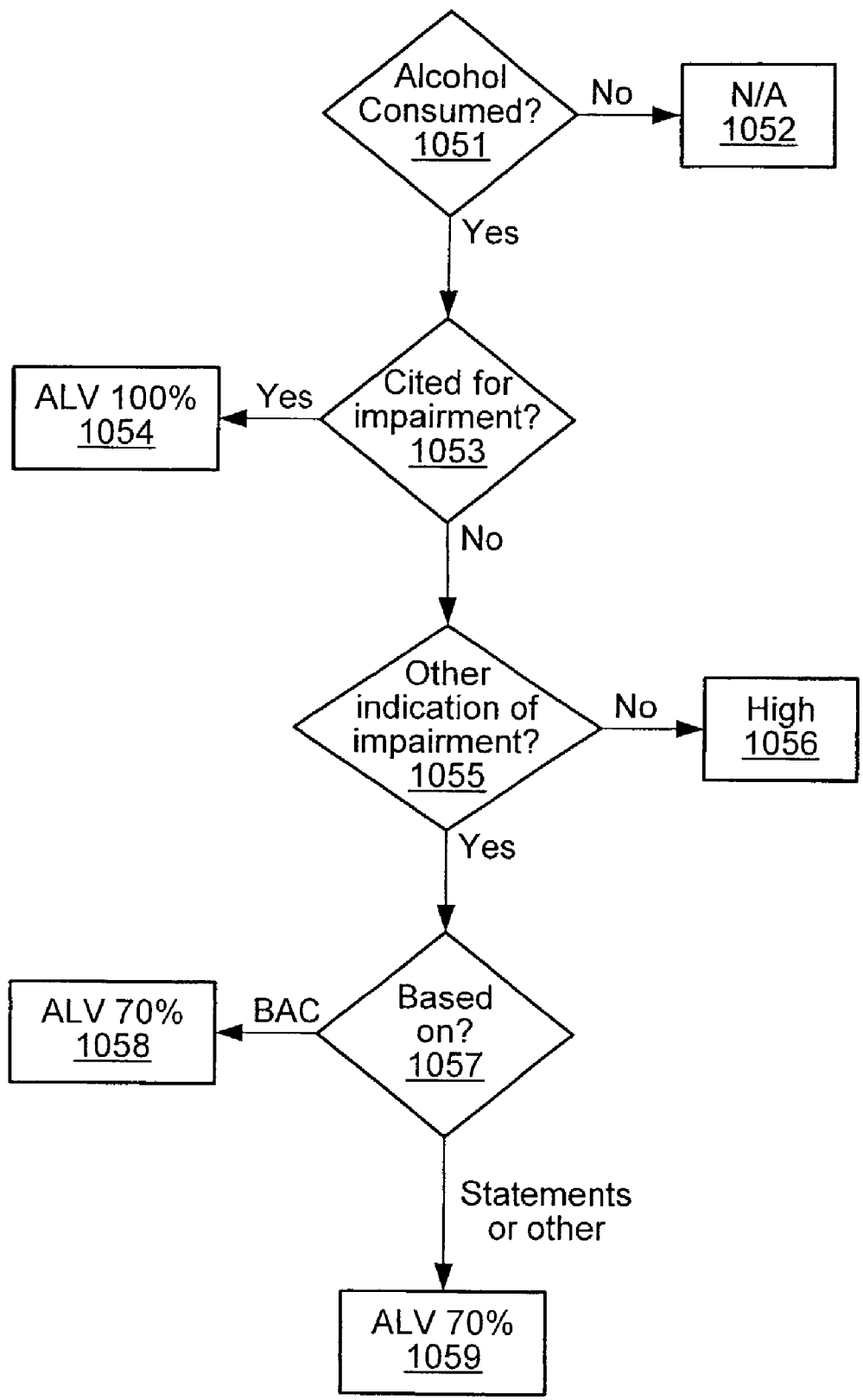
FIG. 10b is a flow chart for assessing the contribution of alcohol usage to liability in a motor vehicle accident according to a second embodiment.

FIGS. 10a and 10b depict flow charts of alternate embodiments of methods for estimating the effect on liability of an alcohol factor. In an embodiment, the alcohol factor may apply to either the tortfeasor or the other party for all accident types.

If at decision point 1001 in FIG. 10a, it is determined that alcohol was not consumed prior to the accident, then the alcohol factor may not be applicable as shown by step 1002. If alcohol was consumed prior to the accident, the next step, shown by decision point 1003, may be to determine if the alcohol usage contributed to the accident. If not, then the alcohol factor may not be applicable as shown by step 1004. If it is determined that alcohol usage did contribute to the accident, information of basic facts may be gathered as shown by step 1005. Basic information may include blood alcohol content, whether or not a sobriety test was given, and whether or not the accident involved a fatality. Optional information may also be gathered, as shown by step 1007, such as the type and amount of alcohol consumed, where the alcohol was served and by whom, and the weight of the user.

If the accident involved a fatality, as determined at decision point 1009 shown in FIG. 10a, "warrants further discussion" may be added to the accident report, as shown in step 1011. However, whether or not there was a fatality involved in the accident, the next decision point 1013 may be to determine if the user was cited for impairment. If the user was cited for impairment, a talking point may be reached, as shown by step 1015. If the user was not cited for impairment, the next decision point 1017 may be to determine if there was any indication of impairment. If there was no indication of impairment, the alcohol factor may not be applicable as shown by step 1019. If there was any indication of impairment, the next step may be to determine what the indication was based on at decision point 1021. A blood alcohol content may indicate a level of impairment. Statements or other evidence may also provide some indication of impairment, which would be described as shown by step 1023. After it is determined what the indication of impairment was based on, a talking point may be reached as shown by step 1025.

An alternate method of determining an effect on liability of alcohol is depicted in FIG. 10b. At step 1051, the method may include determining if alcohol was consumed by a driver of a vehicle involved in the accident prior to the accident. If it is determined that no alcohol was consumed prior to the accident, the factor may not apply, as shown by step 1052. If alcohol was consumed by a driver of a vehicle involved in the accident, step 1053 may determine whether the driver was cited for impairment. In certain embodiments, prior to step 1053, the method may also include a step to determine if the alcohol consumption contributed to the accident. If it is determined that the driver was cited for impairment, step 1054 may be reached and an ALV may assign 100% of the liability to the driver cited for impairment. If the driver was not cited for impairment, decision point 1055 may determine if other indications of impairment were present. If no indications of impairment were present, a "high" penalty value may be assessed to the driver that had consumed alcohol, as depicted in step 1056. If indications of impairment were present, the method may determine the nature of the indications of impairment at step 1057. Indications of impairment based on blood alcohol content (step 1058), or statements or other evidence (step 1059) may result in a penalty value of 70% of the liability to the impaired driver.

Figure 11:
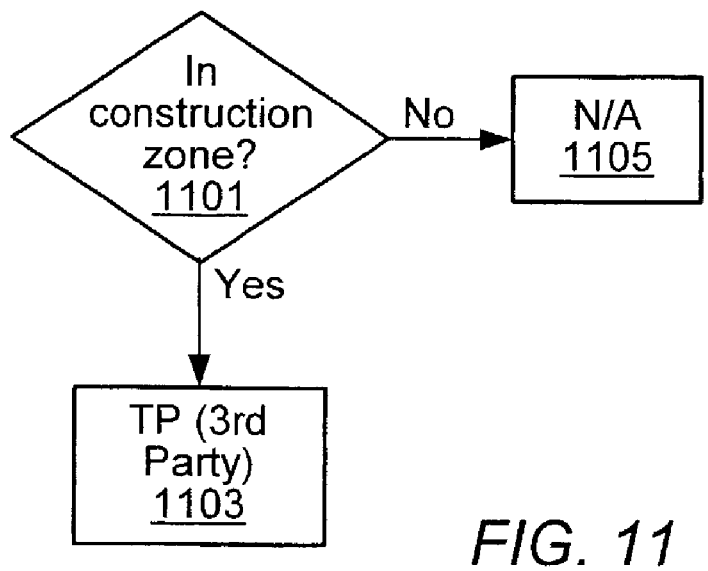
FIG. 11 is a flow chart for assessing the contribution of a construction zone to liability in a motor vehicle accident according to one embodiment.

FIG. 11 is a flow chart illustrating a method for estimating the effect on liability of a factor that accounts for the presence of a construction zone on a motor vehicle accident according to one embodiment. The construction zone factor may be applied to a tortfeasor and/or other party for any accident type.

If a motor vehicle accident occurred in a construction zone where a third party, other than the driver(s) or vehicle(s) involved in the accident may be involved, as determined at decision point 1101 in FIG. 11, then a talking point may be reached at step 1103. If the accident did not occur in a construction zone, then the factor may not be applicable in estimating liability, as shown by step 1105.

Figure 12:
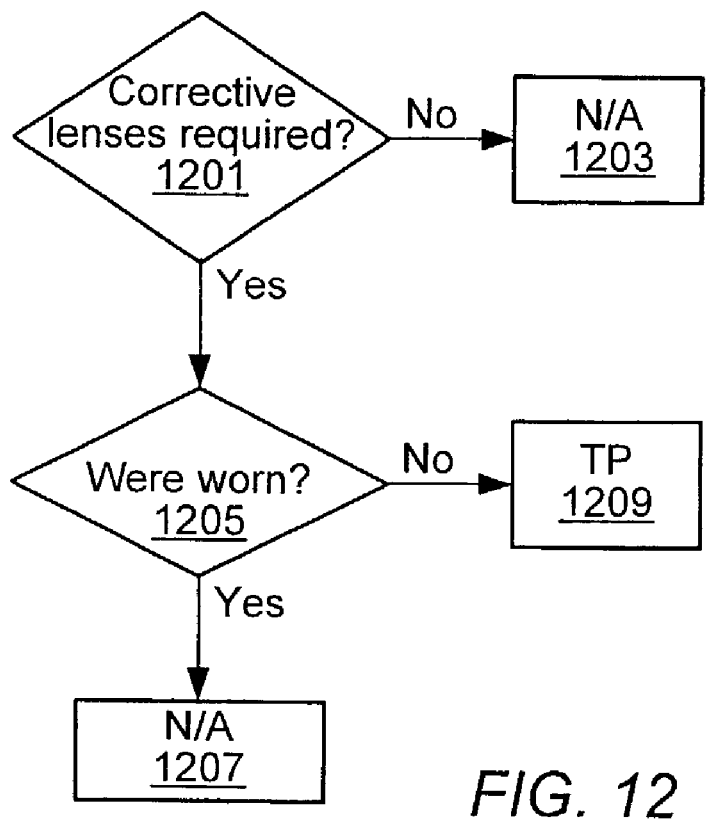
FIG. 12 is a flow chart for assessing the contribution of corrective lenses to liability in a motor vehicle accident according to one embodiment.

FIG. 12 is a flow chart for estimating the effect on liability of a factor that accounts for corrective lenses in a motor vehicle accident according to one embodiment. The corrective lenses factor may be applied to a tortfeasor and/or other party for any accident type.

If it is determined at decision point 1201 in FIG. 12 that a driver involved in a motor vehicle accident did not require corrective lenses, then the factor may not be applicable as shown by step 1203. If corrective lenses were required, the next decision point 1205 may be to determine whether they were worn at the time of the accident. If the corrective lenses were worn at the time of the accident, the factor may not be applicable in estimating liability, as shown by step 1207. If required corrective lenses were not worn by the driver at the time of the accident, a talking point may be reached as shown by step 1209.

Figure 13:
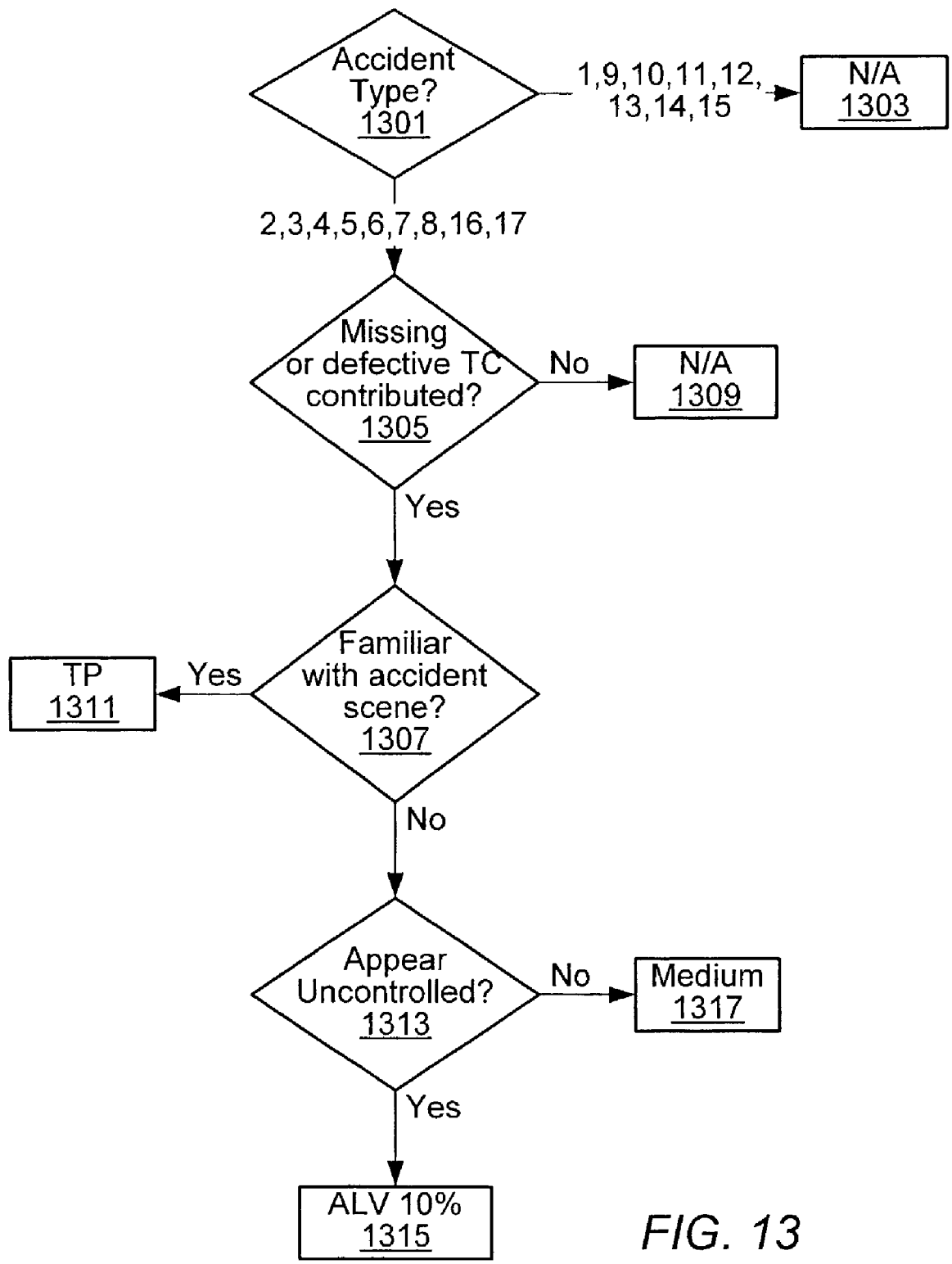
FIG. 13 is a flow chart for assessing the contribution of defective, obscured, or missing traffic control to liability in a motor vehicle accident according to one embodiment.

FIG. 13 is a flow chart for estimating the effect on liability of a factor that accounts for a defective, obscured, or missing traffic control on a motor vehicle accident according to one embodiment. The traffic control may be missing or completely obscured. A defective light may be one that may not be lit for either party (e.g., not lit for TF or not lit for OP). The traffic control factor may be applied to a tortfeasor and/or other party for accident types 2, 3, 4, 5, 6, 7, 8, 16, and 17.

If at decision point 1301 shown in FIG. 13, the accident type was determined to be 1, 9, 10, 11, 12, 13, 14, or 15, then the traffic control factor may not be applicable to estimating liability, as shown by step 1303. For accident types 2, 3, 4, 5, 6, 7, 8, 16, and 17, a decision point shown by step 1305 may be reached to determine if an obscured, defective, or missing traffic control contributed to the accident. If an obscured, defective, or missing traffic control did not contribute to the accident, then the factor may not applicable for estimating liability, as shown in step 1309.

If it is determined that an obscured, defective, or missing traffic control contributed to the accident, then decision point 1307 may be reached to determine if a driver was familiar with the accident location. If the answer is yes, then a talking point may be reached as shown by step 1311. If the answer is no, the next decision point 1313 may be whether or not the intersection appeared to be an uncontrolled intersection. If not, a "medium" penalty value may be assessed to the party in question, as shown in step 1317. If the intersection appeared to be a controlled intersection, an ALV of 10% may be assessed to the party in question.

Figure 14:
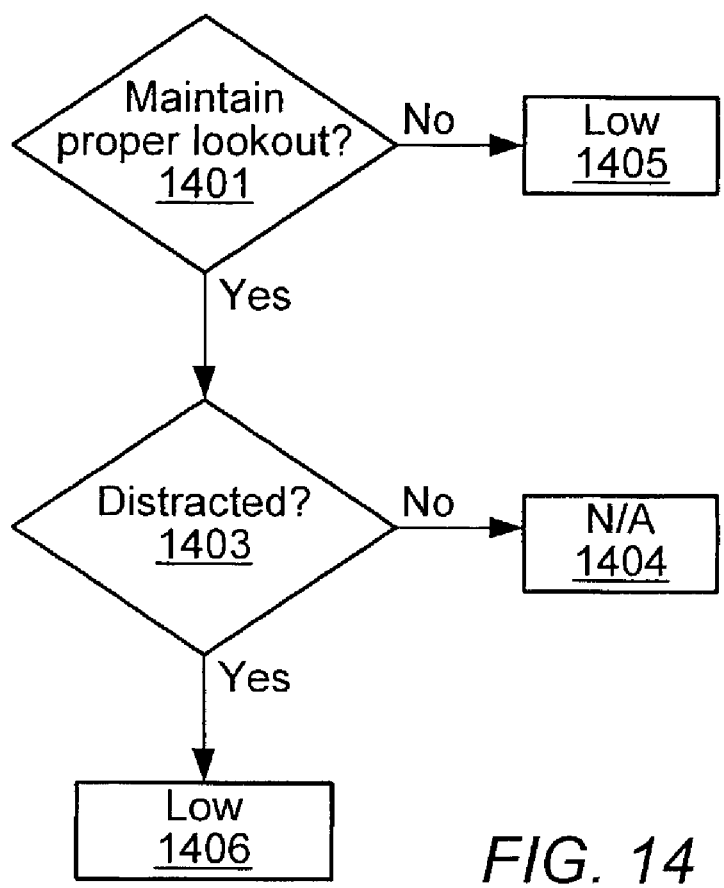
FIG. 14 is a flow chart for estimating the contribution of driver inattention to liability in a motor vehicle accident according to one embodiment.

FIG. 14 is a flow chart for estimating the effect on liability of a factor that accounts for the contribution of driver inattention to a motor vehicle accident according to one embodiment. The driver inattention factor may be applied to a tortfeasor and/or other party for any accident type.

As shown by decision point 1401 in FIG. 14, if the driver failed to maintain a proper lookout (e.g., not looking at the road ahead), then a "low" penalty value may be assessed against the driver, as shown in step 1405. If the driver maintained a proper lookout, the step 1403 may be reached. Step 1403 may determine if the driver was distracted prior to the accident (e.g., by a conversation, a cell phone, shaving, etc.). If the driver was distracted, then a "low" penalty value may be assessed to the driver at step 1406. If the driver was not distracted then, as step 1404 indicates, the factor may be not applicable for the driver.

Figure 15:
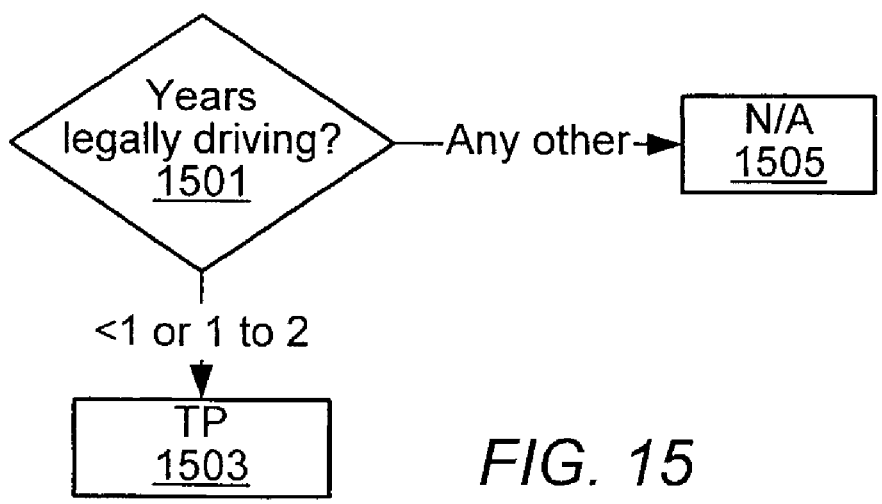
FIG. 15 is a flow chart for estimating the contribution of driver inexperience to liability in a motor vehicle accident according to one embodiment.

FIG. 15 is a flow chart for estimating the effect on liability of a factor that accounts for the contribution of driver inexperience to a motor vehicle accident according to one embodiment. The driver inexperience factor may be applied to a tortfeasor and/or other party for any accident type.

As shown by decision point 1501 in FIG. 15, the duration of time the driver has been legally driving may be a determining factor. If the driver has been driving for two years or less, then the factor may be a talking point as shown by step 1503. If the driver has been driving for more than two years, then the driver inexperience factor may not be applicable as shown by step 1505. In some embodiments, decision point 1501 may be directed to how long a driver has been legally driving a particular class of vehicle that was involved in the accident. For example, if the driver was driving a motorcycle at the time of the accident, decision point 1501 may determine how long the driver has been legally driving motorcycles.

Figure 16:
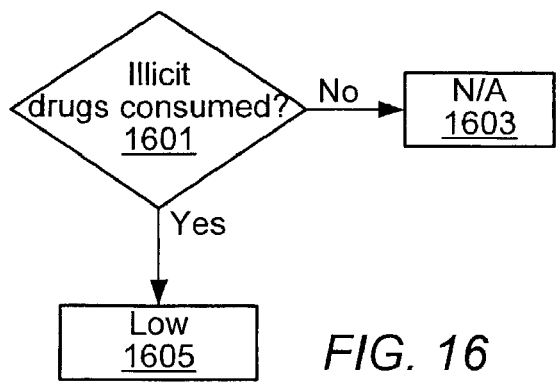
FIG. 16 is a flow chart for estimating the contribution of taking an illicit drug to liability in a motor vehicle accident according to one embodiment.

FIG. 16 is a flow chart for estimating the effect of a factor that accounts for the contribution of taking an illicit drug to a motor vehicle accident according to one embodiment. The illicit drug factor may be applied to a tortfeasor and/or other party for any accident type. As used herein, the term "illicit drug" generally refers to an illegal, or unlawfully used drug. For example, an unlawfully used drug may include a prescription drug taken in a fashion other than the prescribed manner or a prescription drug taken by a person to whom it has not been prescribed.

Decision point 1601 in FIG. 16 may determine if an illicit drug was consumed prior to the accident. If no illicit drug was taken before the accident, the illicit drug factor may be not applicable, as shown in step 1603. If an illicit drug was taken prior to the accident, a "low" penalty value may be assessed to the party that took the illicit drug, as shown in step 1605.

In other embodiments, factors accounting for the consumption of illicit drugs and the consumption of alcohol may be treated simultaneously through an alcohol factor flow chart as depicted in FIGS. 10a and 10b.

Figure 17:
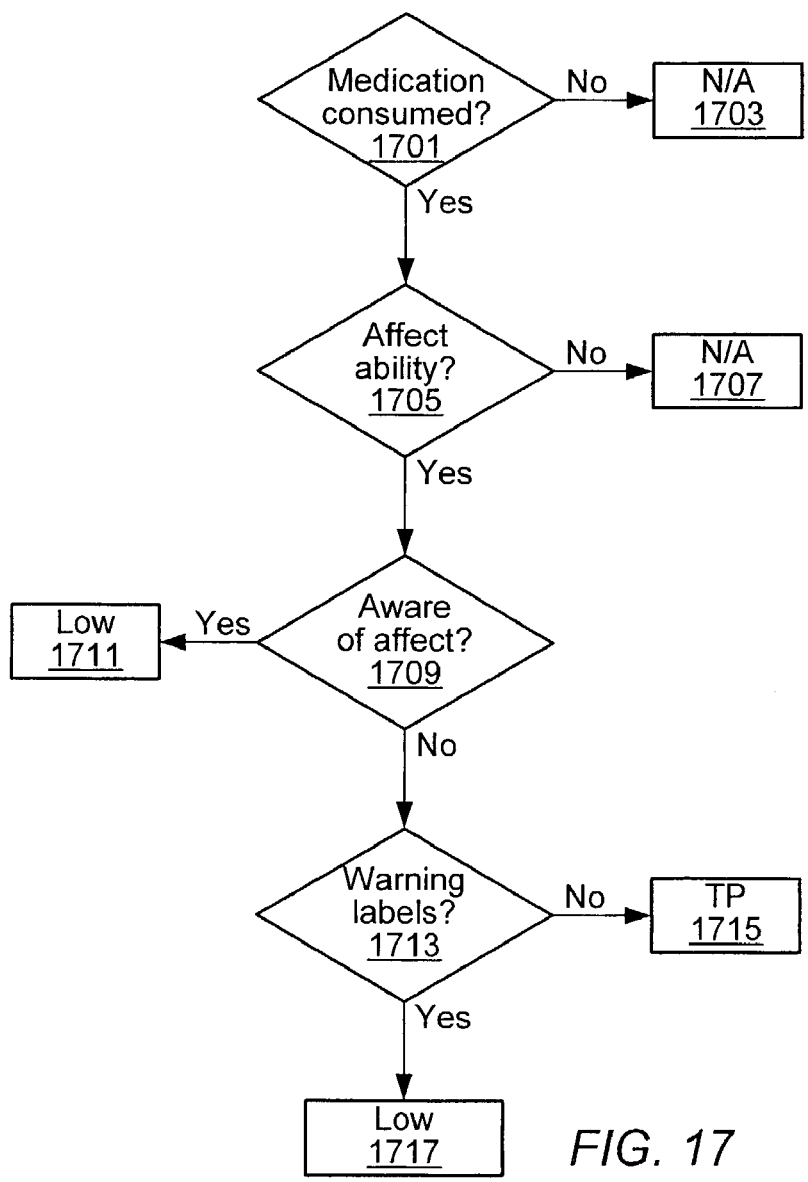
FIG. 17 is a flow chart for estimating the contribution of taking a medication to liability in a motor vehicle accident according to one embodiment.

FIG. 17 is a flow chart for estimating the effect of a factor that accounts for the contribution of an affirmative action of taking a medication to a motor vehicle accident according to one embodiment. The medication factor may be applied to a tortfeasor and/or other party for any accident type. In an embodiment, the medication factor may not include failing to take required medicine since the illness factor may take this into account. As used herein, the term "medication" generally refers to either a prescription drug, or an over-the-counter drug. Additionally, in some embodiments, a medication may include any legal chemical substance that may be consumed by an individual for medical reasons (e.g., herbs, or other nontraditional medications).

At decision point 1701 in FIG. 17, it is determined whether a medication was taken prior to the accident. If not, as shown by step 1703, then the medication factor may not be applicable. If a medication was taken prior to the accident, then the next decision point 1705 may determine if the medication had an affect on the ability to drive. If not, then the factor may not be applicable, as shown by step 1707.

If the medication affected the ability to drive, it may then be determined if the party was aware of this effect, as shown by decision point 1709. If the party was aware of the effect of the medication on the ability to drive, then a "low" penalty value may be assessed for the medication factor, as shown by step 1711. If the party was not aware of the effect of the medication on the ability to drive, then decision point 1713 may ask if the medication had appropriate warnings and labels. If there were not proper warnings or labels on the medication, then the factor may be a talking point as shown by step 1715. In some embodiments, if there were not proper warnings or labels on the medication, step 1715 may indicate that a portion of the liability may be attributed to a third-party (e.g., the medication vendor, or manufacturer). If the medication was properly labeled, then a "low" penalty value may be assessed to the party as shown by step 1717.

Figure 18:
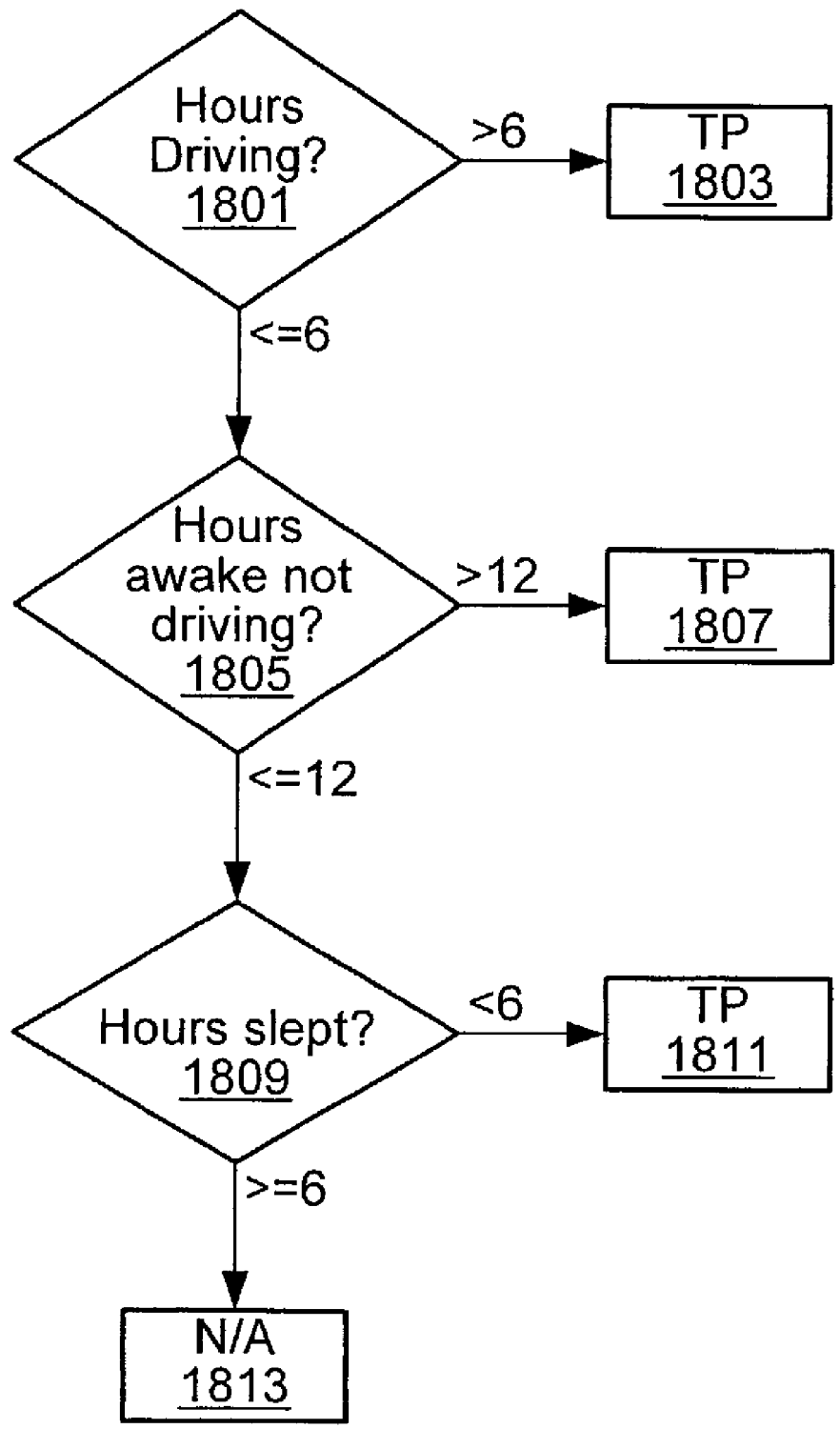
FIG. 18 is a flow chart for estimating the contribution of fatigue to liability in a motor vehicle accident according to one embodiment.

FIG. 18 is a flow chart for estimating the effect of a factor that accounts for the contribution of fatigue to a motor vehicle accident according to one embodiment. The fatigue factor may be applied to a tortfeasor and/or other party for any accident type.

At decision point 1801 in FIG. 18, the number of hours the party had been driving may be determined. If the driver had been driving for more then 6 hours, then the factor may be a talking point as shown by step 1803. If the driver had been driving for 6 hours or less, then decision point 1805 asks how long the driver had been awake, but not driving. If the driver was awake but not driving for more than 12 hours, then the factor may be a talking point as shown by step 1807. If the driver was awake for 12 hours or less prior to driving, then the number of hours the driver last slept may be determined at decision point 1809. If the driver slept less than 6 hours, the factor may be a talking point, as shown by step 1811. If the driver slept 6 hours or more, then the fatigue factor may not be applicable, as shown by step 1813.

Figure 19:
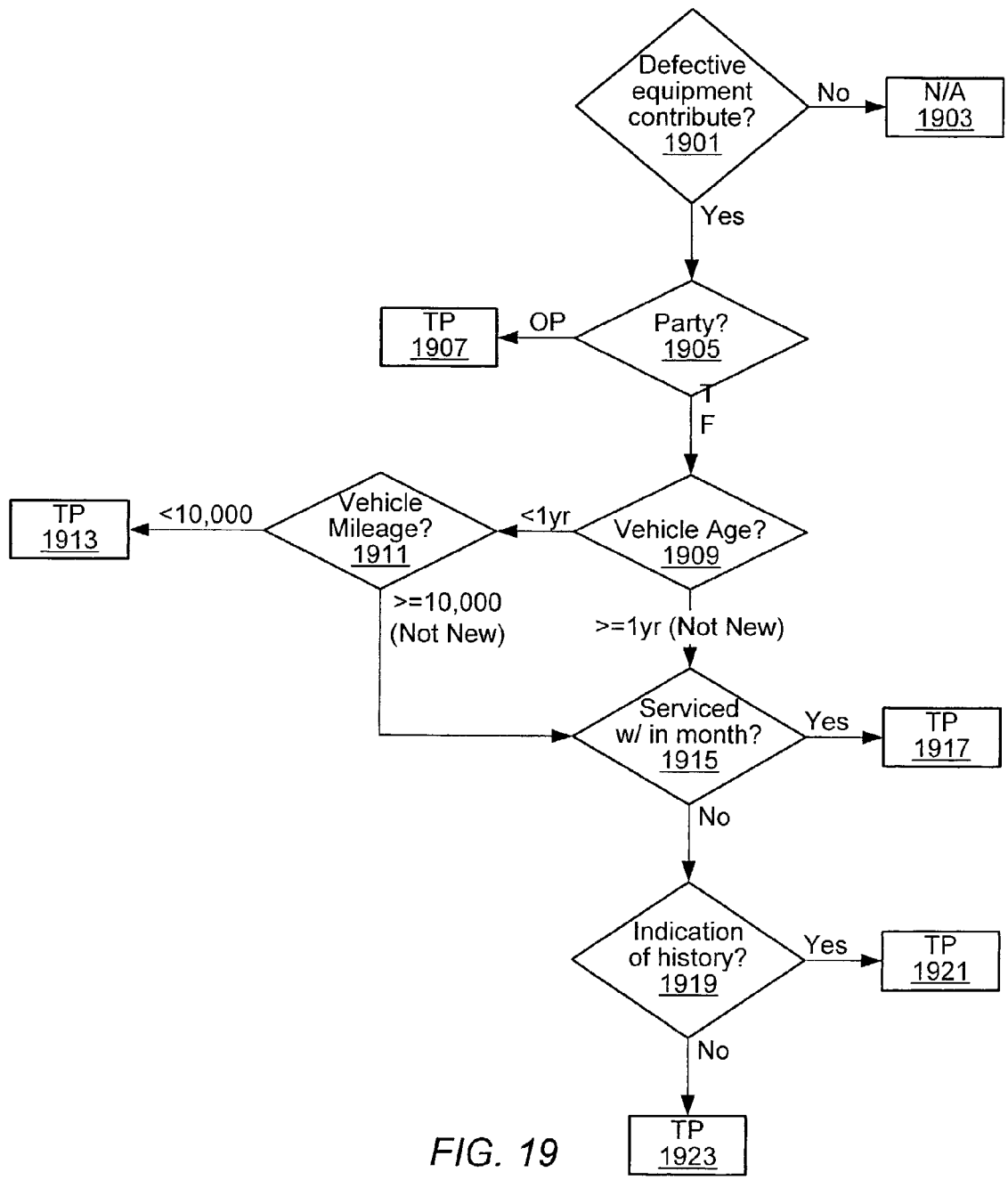
FIG. 19 is a flow chart for estimating the contribution of faulty equipment to liability in a motor vehicle accident according to one embodiment.

FIG. 19 is a flow chart for estimating the effect of a factor that accounts for the contribution of faulty equipment to a motor vehicle accident according to one embodiment. As used herein, the term "faulty equipment" generally refers to any vehicle equipment malfunction that causes an action, prohibits the operator from taking action, or fails to perform an action. In an embodiment, the faulty equipment factor may not apply to headlights, taillights, or brake lights that do not function as other factors may be provided that account for these potential equipment failures. The faulty equipment factor may be applied to a tortfeasor and/or other party for any accident type.

Decision point 1901 may ask whether defective equipment contributed to the accident, as depicted in FIG. 19. If defective equipment did not contribute to the accident, then the faulty equipment factor may not be applicable, as shown in step 1903. If defective equipment contributed to the accident, the next step may be decision point 1905, which may determine the party that faulty equipment affected. If the faulty equipment affected the other party, as shown in step 1907, then a talking point may be reached. If the faulty equipment affected the tortfeasor, the next step may be decision point 1909, which may determine the age of the vehicle.

If the vehicle was one year old or greater, then the vehicle may not be considered new. If the vehicle was less than one year old, then the next decision point 1911 may ask the mileage on the vehicle. If the vehicle mileage was less than 10,000 miles at the time of the accident, the vehicle may be considered new. If the vehicle mileage was 10,000 miles or greater at the time of the accident, the vehicle may not be considered new.

In some embodiments, if the vehicle was new, then step 1913 may be a talking point. Alternately, in some embodiments, step 1913 may indicate that the faulty equipment may be attributed to a third party. The third party may include the person or entity from which the vehicle was purchased or serviced. If the vehicle was not considered new by steps 1909 or 1911, the next step may be decision point 1915 that may ask whether the defective part was serviced within the last month. If service was performed on the defective part within the last month, a talking point may be reached, as shown by step 1917. In some embodiments, step 1917 may be an ALV of 0% for the driver of the vehicle with the defective part. In some embodiments, at least a portion of the liability for the accident may be attributed to a third party at step 1917. For example, the third party may be an individual or entity that last serviced the defective part. The third party may also include the manufacturer of the defective part. If the defective part was not serviced within the last month, decision point 1919 may ask if there was any indication or history of the problem. Whether or not there was an indication or history of the problem, the faulty equipment factor may reach a talking point as shown by steps 1921 and 1923. Steps 1921 and 1923 may be indicated differently in an assessment report as discussed with reference to FIG. 55. In alternate embodiments, if there was no indication or history of the problem at step 1919, another decision point may be reached. The decision point may be to determine whether or not unwanted acceleration occurred. If not, then a talking point may be reached and noted in the assessment report. However, if an unwanted acceleration did occur, the driver of the affected vehicle may be assessed an ALV of 0% liability. Additionally, a portion of the liability may be assessed to a third party. For example, the third party may include a manufacturer or seller of the vehicle or the defective part.

Figure 20A:
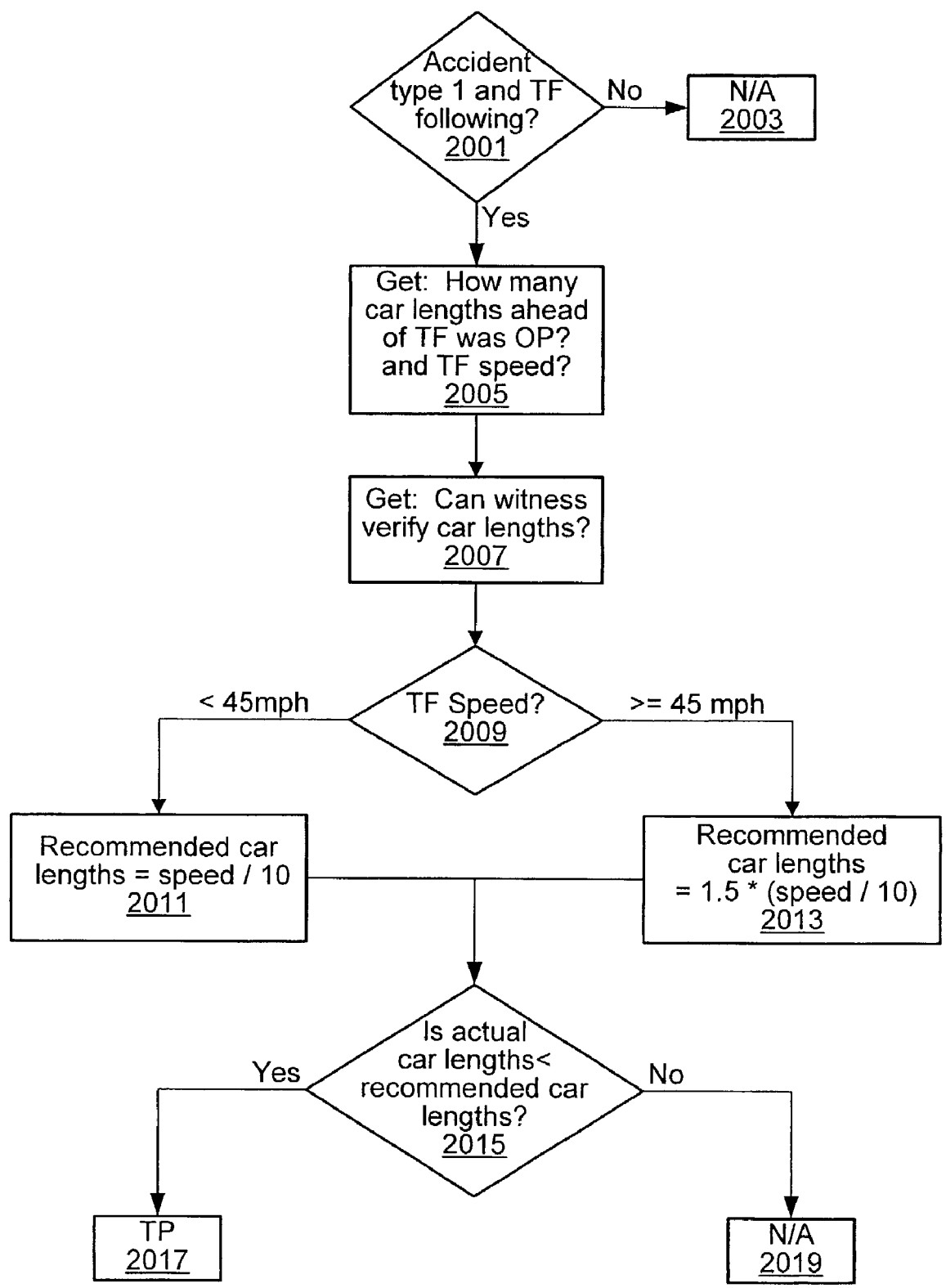
FIG. 20a is a flow chart for estimating the contribution of following too closely to liability in a motor vehicle accident according to a first embodiment.

FIG. 20*a* is a flow chart for estimating the effect of a factor that accounts for the contribution of following too closely to a motor vehicle accident according to a first embodiment. As used herein, the term "following too closely" generally refers to an action by the driver of a rear vehicle in which the driver of the rear vehicle fails to remain a safe distance from a vehicle in front of them before the accident, thus contributing to the accident. In some embodiments, the following too closely factor may be applied only to the tortfeasor and may only be applied for accident type 1.

As shown by decision point 2001 in FIG. 20*a*, if the accident type was not type 1 or the tortfeasor was not behind or following the other party, then the factor may not be applicable as shown by step 2003. If the accident type was type 1 and the tortfeasor was following the other party, then the next step 2005 may be to gather information regarding the accident. The information may include the number of vehicle lengths between the other party and the tortfeasor before the accident, and the speed that the tortfeasor was traveling. Additionally, as shown by step 2007, information may be gathered from any witnesses who may verify the number of vehicle lengths that were between the other party and the tortfeasor.

The next decision point 2009 may ask for the speed of the tortfeasor. The speed of the tortfeasor may be used to determine a recommended safe following distance the tortfeasor should have been traveling behind the other party in steps 2011 or 2013. For example, if the tortfeasor was traveling less than 45 mph, then the recommended safe following distance in vehicle lengths may be determined by: speed/10, as shown by step 2011. If the tortfeasor was traveling 45 mph or greater, the recommended safe following distance may be: 1.5*(speed/10), as shown by step 2013. From this determination, the decision point 2015 may ask whether the actual number of vehicle lengths was less than the recommended safe following distance. If the actual vehicle lengths were less than the recommended safe following distance, then the factor may be a talking point as shown by step 2017. If the actual vehicle lengths between the tortfeasor and other party were not less than the recommended safe following distance, then the following too closely factor may not be applicable, as shown by step 2019.

Figures 20B, 20C:
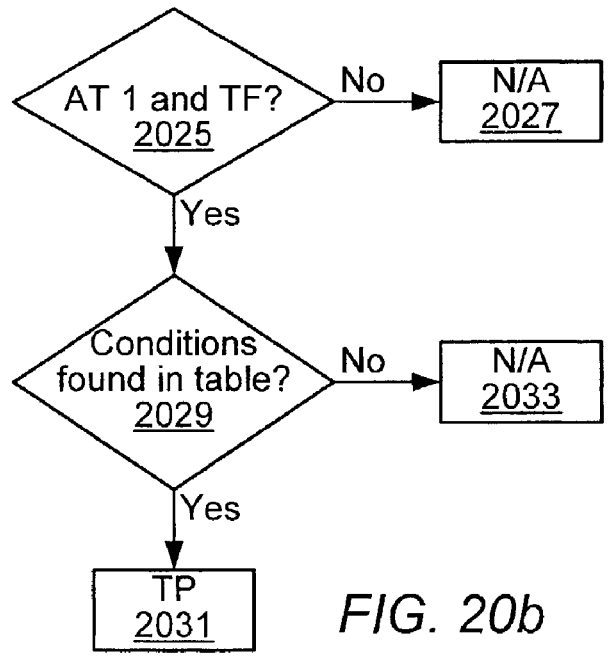
FIG. 20b is a flow chart for estimating the contribution of following too closely to liability in a motor vehicle accident according to a second embodiment.
FIG. 20c is a table for estimating the contribution of following too closely to liability in a motor vehicle accident according to the embodiment illustrated in FIG. 20b.

FIG. 20b is a flow chart for estimating the effect of a factor that accounts for the contribution of following too closely to a motor vehicle accident according to a second embodiment. As shown by decision point 2025 in FIG. 20b, if the accident type was not type 1 or the tortfeasor was not behind or following the other party, then the factor may not be applicable as shown by step 2027. If the accident type was type 1 and the tortfeasor was following the other party, then the next step 2029 may be to determine if the actual following distance was less than a recommended safe following distance according to the table in FIG. 20c.

FIG. 20c depicts a table for determining a recommended safe following distance. If the driver of the rear vehicle was traveling at less than or equal to 45 mile per hour (mph), then row 2050 may be used to determine the recommended safe following distance. If the driver of the rear vehicle was traveling at greater than 45 mph, then row 2052 may be used to determine the recommended safe following distance. Column 2054 may determine a surface of the road.

At speeds of less than or equal to 45 mph and with a gravel road surface the recommended safe following distance may be at least 20% of the speed in vehicle lengths (e.g., speed*0.2=number of vehicle lengths). Thus, at 40 mph, the recommended safe travel distance may be 8 vehicle lengths (i.e., 40*0.2=8 vehicle lengths). At speeds of greater than 45 mph and with a gravel road surface the recommended safe following distance may be at least 30% of the speed in vehicle lengths.

For non-gravel road surfaces, a condition of the road surface may be considered in column 2056. The condition of the road surface may include, but is not limited to, dry, wet, or muddy. In addition, the condition of the road surface may consider whether the road is covered with snow or ice, has patches of snow or ice, or has plowed snow or ice. In various embodiments, other road conditions may also be considered. For example, a road condition that may be prevalent in a particular region may be considered, such as having ruts. Once the road condition has been determined, a recommended safe following distance may be determined based on a percentage of the speed as specified in column 2058. It is envisioned that the specific percentage of speed specified by various combinations of speed, road surface, and road condition may be varied according to the preference of the insurance carrier, or regional or jurisdictional preferences.

Figure 21:
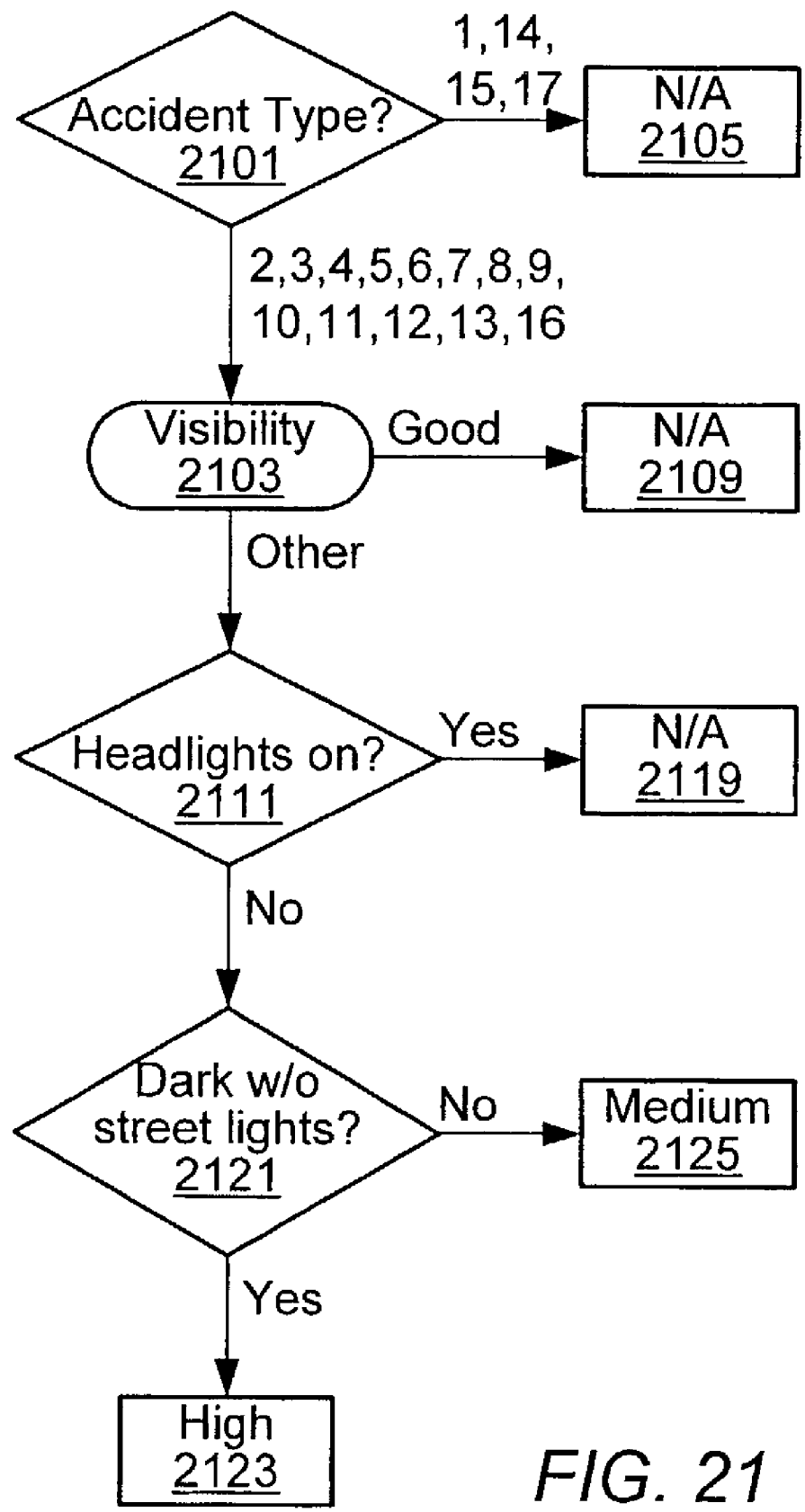
FIG. 21 is a flow chart for estimating the contribution of headlights being off to liability in a motor vehicle accident according to one embodiment.

FIG. 21 is a flow chart for estimating the effect of a factor that accounts for the contribution of driving with headlights off to a motor vehicle accident according to one embodiment. In some embodiments, the headlights off factor may not apply to accident types 1, and 14. The factor may be applied to a tortfeasor and/or other party.

Figure 35:
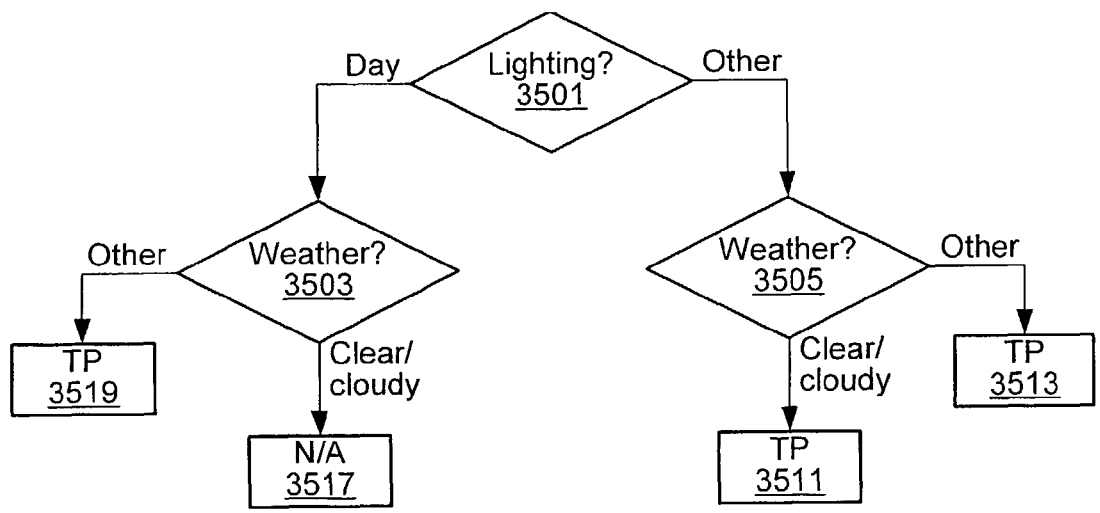
FIG. 35 is a flow chart for estimating the contribution of visibility to liability in a motor vehicle accident according to one embodiment.

In FIG. 21, decision point 2101 asks for the accident type. For accident types 1, and 14, the factor may not be applicable as shown by step 2105. Additionally, in some embodiments, the factor may not apply for accident types 15 and 17. For the remaining accident types, the next step may be decision point 2103 in which visibility at the time of the accident may be determined. The visibility factor is illustrated in FIG. 35. If visibility was good, then the driving with headlights off factor may not be applicable as shown by step 2109. Otherwise, if visibility was poor, decision point 2111 may determine if the party was driving with the vehicle's headlights on. If it is determined that the party had the headlights on, then the factor may not be applicable, as shown by step 2119. If the vehicle's headlights were off at the time of the accident, then decision point 2121 may be reached. Decision point 2121 asks whether the location of the accident was relatively dark, for example, without streetlights at the time. If it was dark without streetlights, the party may have a "high" penalty value assessed, as shown by step 2123. If it was not dark and/or streetlights were on, then the other party may have a "medium" penalty value assessed, as shown by step 2125.

In some embodiments, the method of determining the effect on liability of driving with headlights off may determine different penalty values depending on the party being considered. For example, if it is determined that the tortfeasor was driving with headlights off, a talking point may be reached. If it is determined that the other party was driving with headlights off, then penalty values as described above may be assessed to the other party.

In some embodiments, the method of determining the effect on liability of driving with headlights off may determine if both headlights were off or if only one headlight was off. If only one headlight was on, the method may determine if the one headlight would have provided adequate lighting for the driver of the vehicle to drive safely. If it is determined that the one headlight may not have provided adequate lighting, the method may proceed to step 2121 to determine a penalty value to assess. The method may also consider whether the one headlight would have made the vehicle visible to the driver of the other vehicle (e.g., was the one working headlight visible to the driver of the other vehicle). If it is determined that the one headlight may not have made the vehicle visible to the driver of the other vehicle, the method may proceed to step 2121 to determine a penalty value to assess.

Figure 22:
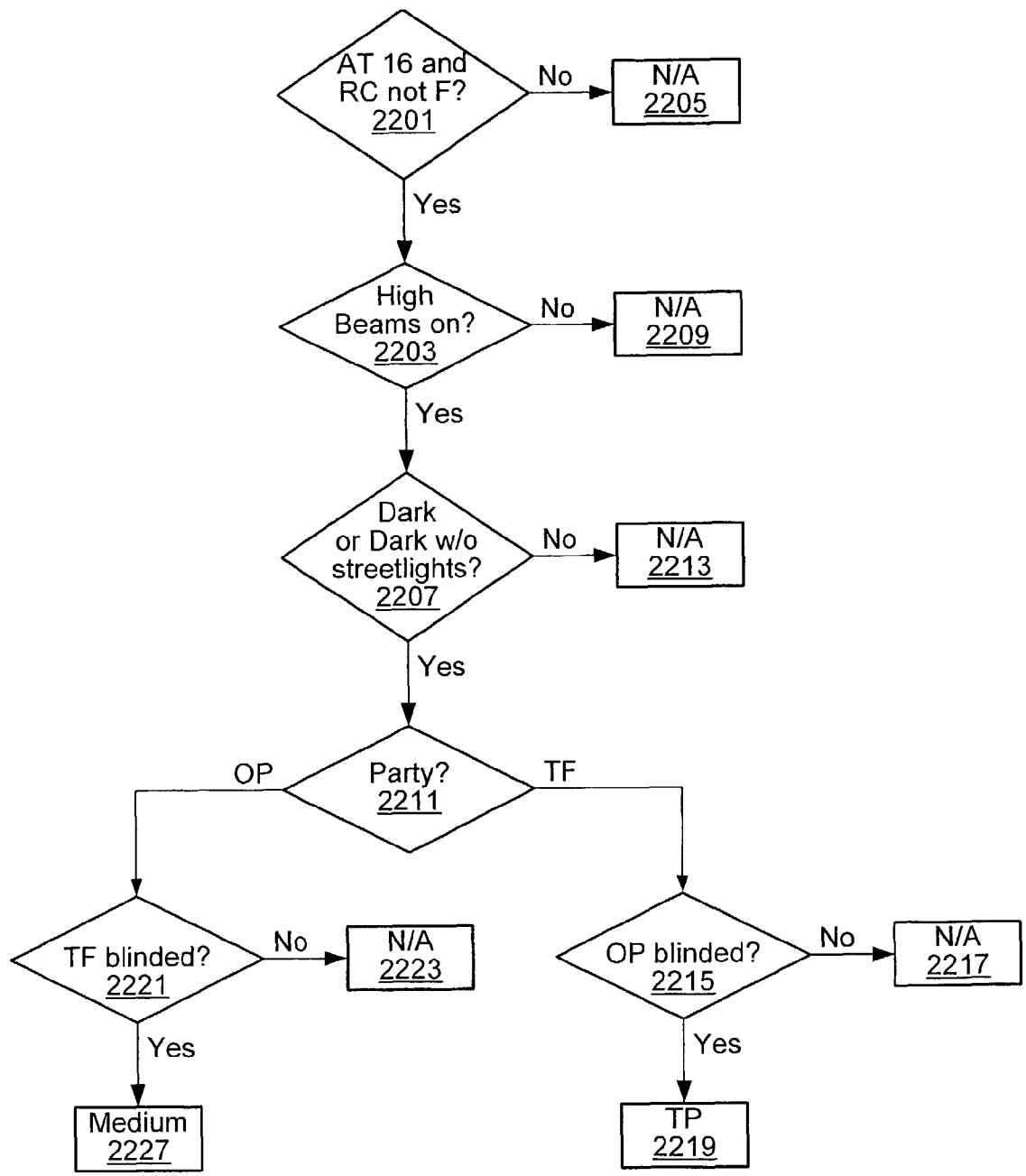
FIG. 22 is a flow chart for estimating the contribution of high beams being on to liability in a motor vehicle accident according to one embodiment.

FIG. 22 is a flow chart for estimating the effect of a factor that accounts for the contribution of driving with high beams on to a motor vehicle accident according to one embodiment. The high beams factor may be applied to a tortfeasor and/or the other party. In some embodiments, the factor may only be applied for accident type 16. In such embodiments, the factor may not be applied for the roadway configuration/accident type combination F16. The high beams factor may be related to glare that causes a driver to be blinded.

In FIG. 22, decision point 2201 and step 2205 indicate the factor may only be applicable for accident type 16, not including roadway configuration F. If the answer to decision point 2201 is yes, then decision point 2203 may ask whether high beams were on at the time of the accident. If not, then the factor may not be applicable, as shown by step 2209. If the high beams were on, the lighting may be determined at step 2207. If the lighting was dark, with or without streetlights, then liability may depend upon which party is being considered, as shown by decision point 2211. If the lighting was other than dark, with or without streetlights (e.g., daylight, dawn, or dusk) then the factor may not be applicable, as shown by step 2213. If the party is the tortfeasor, then decision point 2215 may ask whether the other party was blinded. If the other party was blinded, then the factor may be a talking point, as shown by step 2219. If the other party was not blinded, then the factor may not be applicable, as shown by step 2217. In other embodiments, a "medium" penalty value may be assessed to the tortfeasor if the other party was blinded, and a "low" penalty value may be assessed if the other party was not blinded.

If the party is the other party, then decision point 2221 may ask if the tortfeasor was blinded. If not, then the factor may not be applicable, as shown by step 2223. If the tortfeasor was blinded, the factor may apply a "medium" penalty value, as shown in step 2227. In alternate embodiments, if the tortfeasor was blinded, then another decision point may be reached that may depend on the roadway configuration. If the roadway configuration was E, then a "medium" penalty value may be assessed. If the roadway configuration was A, B, or H, then a "low" penalty value may be assessed. If the roadway configuration was other than A, B, E, or H, than the factor may not be applicable.

Figure 23:
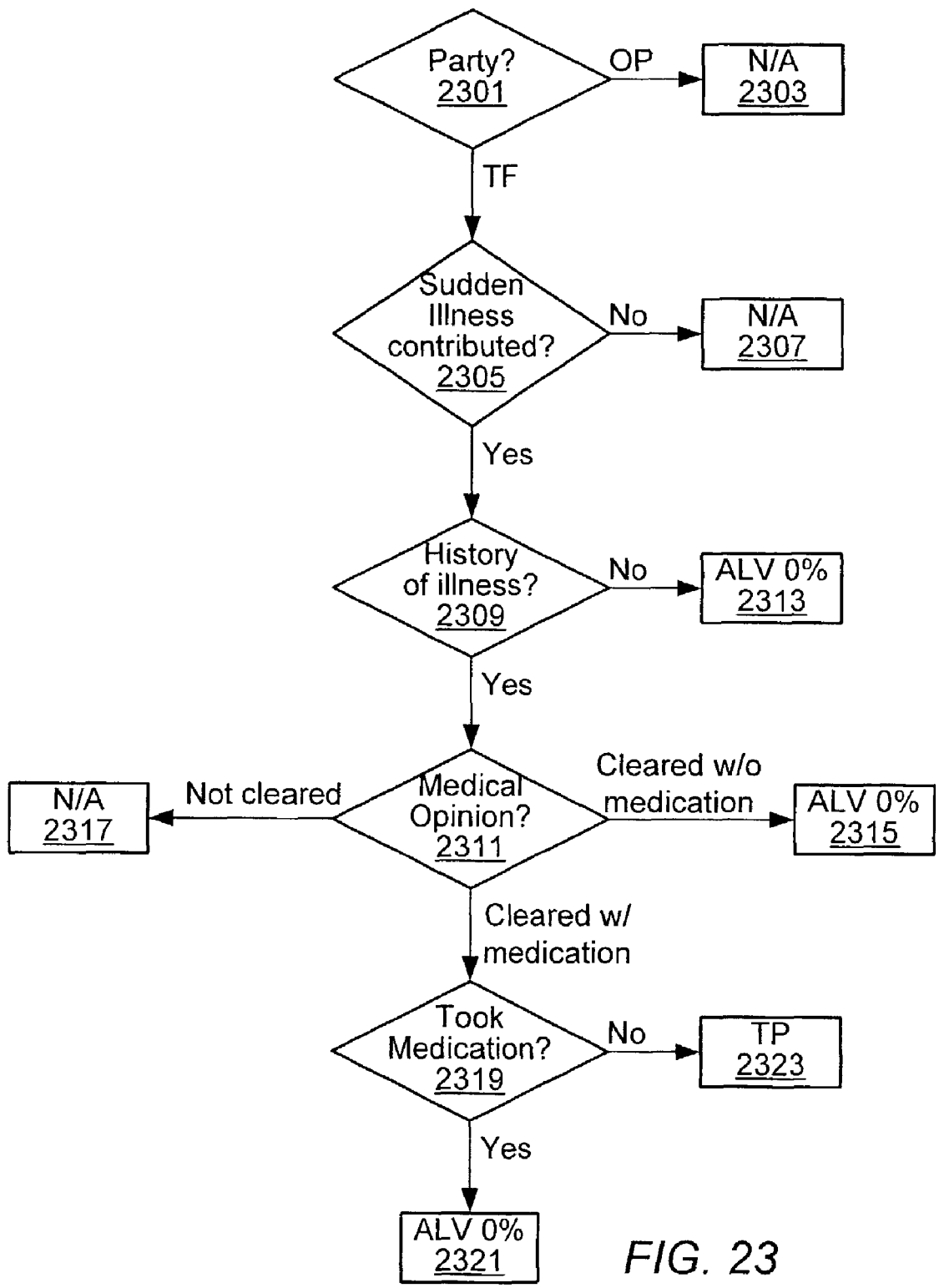
FIG. 23 is a flow chart for estimating the contribution of illness to liability in a motor vehicle accident according to one embodiment.

FIG. 23 is a flow chart for estimating the effect of a factor that accounts for the contribution of illness to a motor vehicle accident according to one embodiment. As used herein, the term "illness" generally refers to a physical condition that prohibits the safe operation of a vehicle. The illness factor may be applied to a tortfeasor only for any accident type.

If the party is determined to be the other party at decision point 2301 in FIG. 23, then the factor may not be applicable, as shown by step 2303. For the tortfeasor, the next step is decision point 2305, which may ask whether the illness contributed to the accident. If not, then the factor may not be applicable as shown by step 2307. If illness of the tortfeasor contributed to the accident, then decision point 2309 may ask if the tortfeasor had a history of the illness. If not, then an ALV of 0% liability may be assessed to the tortfeasor. If the tortfeasor had a history of illness, then decision point 2311 may ask if the tortfeasor was medically cleared to drive. If the tortfeasor was not cleared to drive, then the illness factor may not be applicable as shown by step 2317. If the tortfeasor was cleared to drive without medication, then an ALV of 0% liability may be assessed to the tortfeasor, as shown by step 2315. If the tortfeasor was medically cleared to drive with medication, then decision point 2319 may be reached, which may ask if the required medication had been taken. If the required medication had been taken, then an ALV of 0% liability may be assessed to the tortfeasor, as shown by step 2321. If the required medication had not been taken, then 2323 indicates that a talking point may be reached.

Figure 24A:
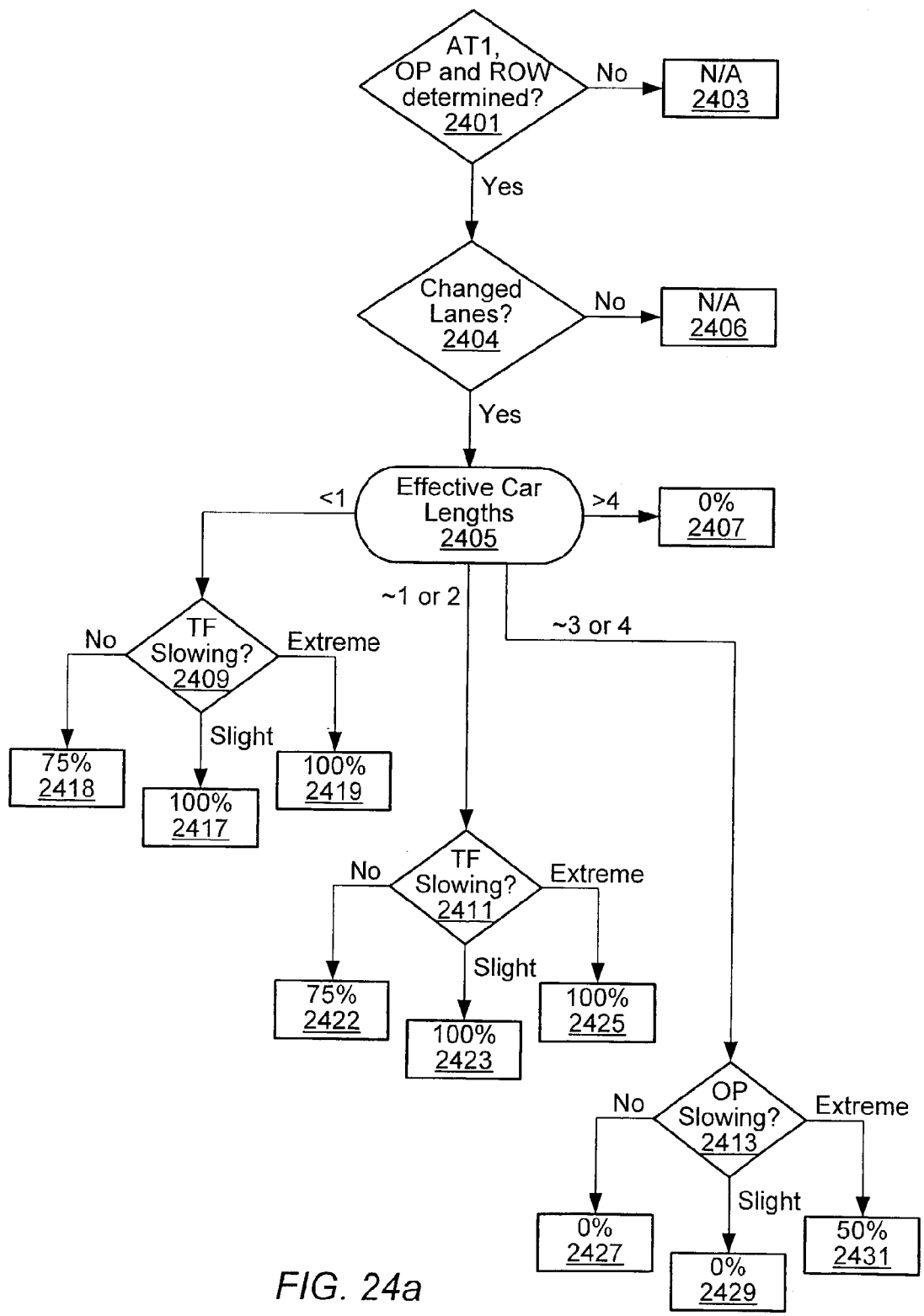
FIG. 24a is a flow chart for estimating the contribution of an improper lane change to liability in a motor vehicle accident according to one embodiment.
Figure 24B:
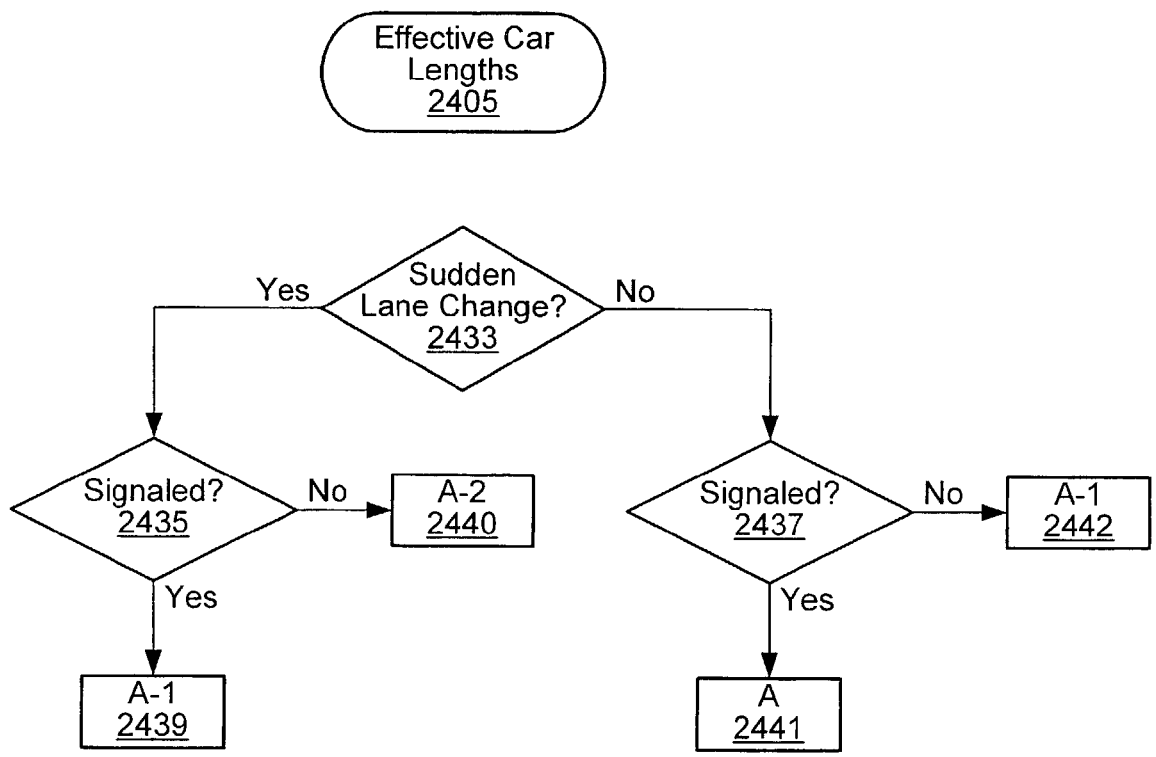
FIG. 24b is a flow chart corresponding to FIG. 24a according to one embodiment.

FIGS. 24*a* and 24*b* are flow charts for estimating the effect of a factor that accounts for the contribution of an improper lane change to a motor vehicle accident according to one embodiment. An improper lane change may be a lane change that was completed before the accident and contributed to the accident. The improper lane change factor may be applied to the tortfeasor and/or other party only for accident type 1. In an embodiment, the factor may determine the effect on liability of an improper lane change based on vehicle lengths between the vehicles before the accident and a subjective determination of the magnitude of deceleration of the parties. It is believed that an improper lane change may reduce the opportunity of the tortfeasor to avoid the accident and/or may reduce the tortfeasor's available stopping distance. For example, if other party and the tortfeasor are slowing and other party pulls in between the tortfeasor and whatever the other party and the tortfeasor are stopping for, the tortfeasor's available stopping distance may be reduced.

In FIG. 24*a*, decision point 2401 may ask whether the accident type was type 1, and whether the other party and right of way have been determined. If any of these conditions is not true, the factor may not be applicable, as shown in step 2403. If the accident type is 1, and the other party and right of way have been determined, then the next step 2404 may ask if the other party changed lanes prior to the accident. If the other party did not change lanes, then step 2406 indicates that the factor may not be applicable. If the other party changed lanes before the accident, the next step 2405 may be to determine effective vehicle lengths between the other party and the tortfeasor. The term "effective vehicle lengths," as used herein, generally refers to the actual vehicle lengths between the parties minus an adjustment.

The determination of the effective vehicle lengths 2405 is shown in FIG. 24*b*. Decision point 2433 may ask if the other party's lane change was a sudden lane change. If it was, then decision point 2435 may ask if the other party signaled the lane change. If the other party signaled, then the effective vehicle lengths may be the actual vehicle lengths minus one, as shown in step 2439. If the other party did not signal, then the effective vehicle lengths may be the actual vehicle lengths minus two, as shown by step 2440. If the answer to decision point 2433 is no, the decision point 2437 may ask if the other party signaled the lane change. If the other party did signal the lane change, then the effective vehicle lengths may be the actual vehicle lengths, as shown in step 2441. If the other party did not signal, then the effective vehicle lengths may be the actual vehicle lengths minus one, as shown by step 2442.

Turning again to FIG. 24*a*, if the effective vehicle lengths are less than 1, then decision point 2409 may ask if the tortfeasor was slowing down when the lane change took place. If the tortfeasor was not slowing down, then a penalty value of 75% of liability may be assessed to the other party, as shown by step 2418. Alternately, in an embodiment, if the tortfeasor was not slowing down, then the liability may be determined by an experienced claims adjuster. If the tortfeasor was slowing down in either a slight or an extreme manner, then a penalty value of 100% of liability may be assessed to the other party at step 2417 or 2419. In some embodiments, an ALV of 100% liability may be assessed at steps 2417 and 2419 rather than a penalty value.

If the effective vehicle lengths are about 1 or about 2, then decision point 2411 again may ask if the tortfeasor was slowing down. If the tortfeasor was not slowing down, then a penalty value of 75% of liability may be assessed to the other party, as shown by step 2422. Alternately, in an embodiment, if the tortfeasor was not slowing down, then the liability may be determined by an experienced claims adjuster. If the tortfeasor was slowing down in either a slight or an extreme manner, then a penalty value of 100% of liability may be assessed to the other party at step 2423 or 2425. In some embodiments, an ALV of 100% liability may be assessed at steps 2423 and 2425 rather than a penalty value.

If the effective vehicle lengths are about 3 or about 4, then decision point 2413 may ask if the other party was slowing down. If the other party was either not slowing down or slightly slowing, then no penalty value may be assessed to either party, as shown by steps 2427 and 2429. If the other party was slowing down in an extreme manner at the time of the lane change, then a penalty value of 50% of liability may be assigned to the other party, as shown by steps 2431.

If the effective vehicle lengths are greater than about 4, then no penalty value may be assessed to either party, as shown by steps 2407.

In other embodiments, the actual speed and/or distance between the vehicles before the accident or at the time of the lane change may be determined. An analysis like the one described above may then be used to determine the effect on liability of the lane change based on the actual speed and/or distance between the vehicles.

Figure 25:
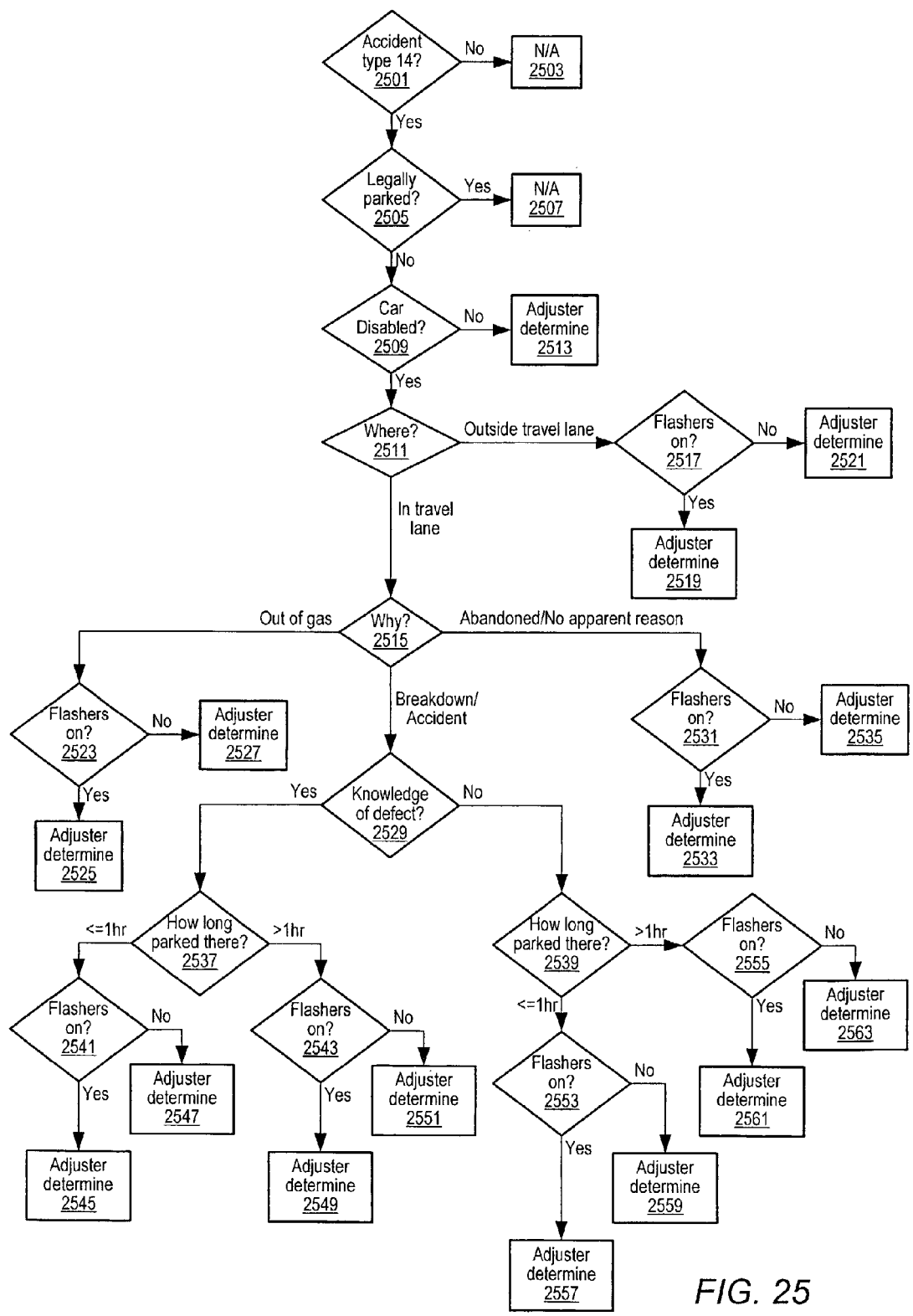
FIG. 25 is a logic diagram for estimating the contribution of improper parking to liability in a motor vehicle accident according to one embodiment.

FIG. 25 is a flow chart for estimating the effect of a factor that accounts for the contribution of an improperly parked vehicle to a motor vehicle accident according to one embodiment. The improperly parked vehicle factor may be applied only to the other party and only for accident type 14. In an embodiment, a parked vehicle may be considered legally parked, illegally parked, or disabled.

In FIG. 25, decision point 2501 and step 2503 indicate that the factor may not be applicable to accident types other than type 14. If the accident type is 14, then decision point 2505 may ask whether the vehicle was legally parked. If the vehicle was legally parked, then the factor may not be applicable, as shown by step 2507. If the vehicle was not legally parked, then decision point 2509 may ask if the vehicle was disabled. If the vehicle was not disabled and was not legally parked, then a penalty value may be estimated by an experienced claims adjuster, as shown by step 2513. If the vehicle was disabled and was not legally parked, then decision point 2511 may ask where the vehicle was parked. If the vehicle was outside a travel lane, then regardless of whether the vehicle had its flashers on, the factor may not be applicable, as shown by decision point 2517 and steps 2519 and 2521.

If the vehicle was parked in a travel lane, then decision point 2515 may ask why it was there. If the vehicle ran out of gas, then decision point 2523 asks if the vehicle had its flashers on. A penalty value may be determined by experienced claims adjusters in steps 2525 and 2527 for either a yes or no answer. If the vehicle was abandoned or there was no apparent reason why the vehicle was in the travel lane, then decision point 2531 may ask if the vehicle had its flashers on. A penalty value may be determined by an experienced claims adjuster in steps 2533 and 2535 for either a yes or no answer. If the vehicle was in the travel lane due to a breakdown or accident, then decision point 2529 may ask if the other party had knowledge of the defect, which may have caused the breakdown or accident. If yes, then decision point 2537 asks how long the vehicle had been parked at the location of the accident. If the vehicle was there for less than or equal to one hour, then decision point 2541 asks if the vehicle had its flashers on. A penalty value may be determined by experienced claims adjusters in steps 2545 or 2547 for either a yes or no answer. If the vehicle was sitting in the travel lane for more than one hour, then decision point 2541 asks if the vehicle had its flashers on. A penalty value may be determined by experienced claims adjusters in steps 2549 or 2551 for either a yes or no answer.

If the other party did not have knowledge of the defect at decision point 2529, then decision point 2539 may ask how long the vehicle had been parked at the location of the accident. If the vehicle was there for less than or equal to one hour, then decision point 2553 asks if the vehicle had its flashers on. A penalty value may be determined by experienced claims adjusters in steps 2557 or 2559 for either a yes or no answer. If the vehicle was sitting in the travel lane for more than one hour, then decision point 2555 may ask if the vehicle had its flashers on. A penalty value may be determined by experienced claims adjusters in steps 2561 or 2563 for either a yes or no answer, respectively.

In other embodiments, a parked vehicle may be assumed to always have the right of way. Thus, no improperly parked vehicle factor may be used.

Figure 26:
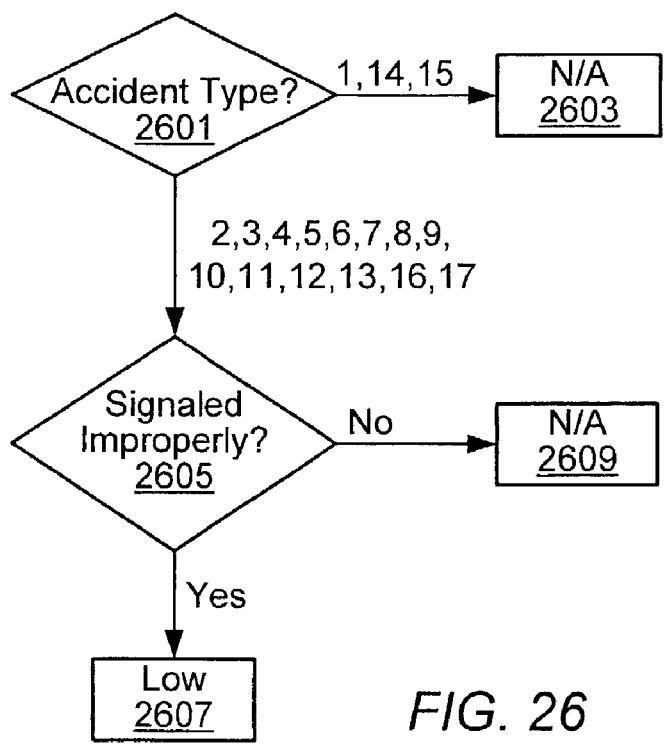
FIG. 26 is a flow chart for estimating the contribution of improper signaling to liability in a motor vehicle accident according to one embodiment.

FIG. 26 is a flow chart for estimating the effect of a factor that accounts for the contribution of improper signaling to a motor vehicle accident according to one embodiment. As used herein, the term "improper signaling" generally refers to signaling one action and doing another or not signaling at all. In certain embodiments, an improper signal may refer only to signaling one action and doing another (i.e., not to "no signal"). In such embodiments, an improper turn and lack of signal may not be part of the improper signaling factor. "No signal" and improper turn and lack of signal may already be taken into account by the roadway configuration/accident type combination.

As shown in FIG. 26, if it is determined at decision point 2601 that the accident type is 1, 14, or 15, then the factor may not be applicable, as shown in step 2603. For all other accident types, decision point 2605 may ask if a party signaled improperly. If the answer to decision point 2605 is no, then the factor may not be applicable, as shown by step 2609. If the answer is yes, then a "low" penalty value may be assessed against the party that signaled improperly, as shown in step 2607. In some embodiments, an additional decision point may follow decision point 2605 if a party did signal improperly. The additional decision point may determine which party signaled improperly. In such embodiments, if it is the other party that improperly signaled then a low penalty value may be assessed against the other party. If the tortfeasor improperly signaled, then a talking point may be reached.

Figure 27:
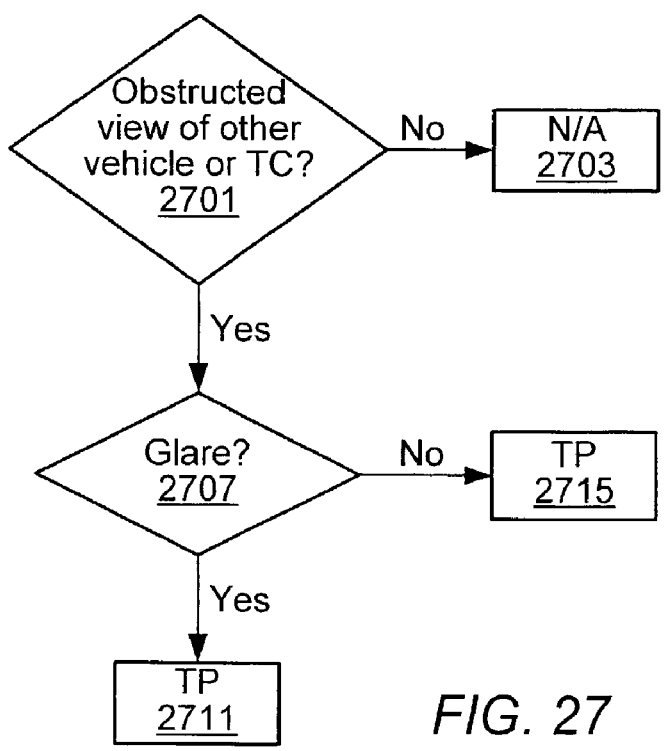
FIG. 27 is a flow chart for estimating the contribution of an obstructed view or glare to liability in a motor vehicle accident according to one embodiment.

FIG. 27 is a flow chart for estimating the effect of a factor that accounts for the contribution of an obstructed view or glare to a motor vehicle accident according to one embodiment. The obstructed view or glare factor may be applied to the tortfeasor and/or other party for any accident type. If an obstructed view or glare affected a party's view of other vehicles or a traffic sign, the factor may be a talking point.

In FIG. 27, decision point 2701 may ask if a driver's view of another vehicle or a traffic control was obscured. Step 2703 indicates that if the answer is no, then the factor may not be applicable. In some embodiments, if the answer to decision point 2701 is yes, then another decision point may ask if the obstructed view or glare contributed to the accident. If not, then the factor may not be applicable. If it is determined that the obstructed view or glare contributed to the accident, the decision point may lead to decision point 2707. Decision point 2707 may ask whether it was a glare obscured the driver's view. If it was a glare, then the factor may be a talking point, as shown by step 2711. In some embodiment, if the answer to decision point 2707 is no, then there may be a request to provide a description of the obstruction for use in an assessment report. In step 2715, the obstructed view may be a talking point.

Figure 28:
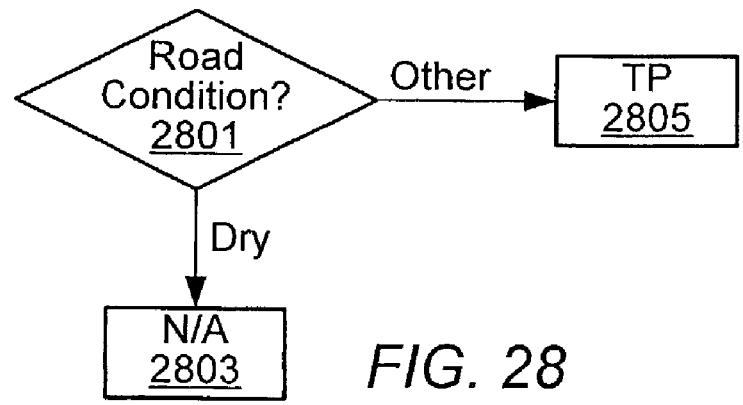
FIG. 28 are flow charts for estimating the contribution of the road condition to liability in a motor vehicle accident according to one embodiment.

FIG. 28 is a flow chart for estimating the effect of a factor that accounts for the contribution of road condition to a motor vehicle accident according to one embodiment. The road condition factor may be applied to the tortfeasor and/or other party for any accident type. As shown in FIG. 28, the road condition at decision point 2801 may be either dry or in some other condition. If the road condition is dry, then step 2803 may indicate that the factor may not be applicable. Other conditions may include, but are not limited to, a roadway that is wet, has snow and/or ice, is muddy, has plowed snow, has been salted, or has snow and/or ice patches. If other conditions apply to the roadway, then step 2805 may indicate that the factor may be a talking point.

Figure 29:
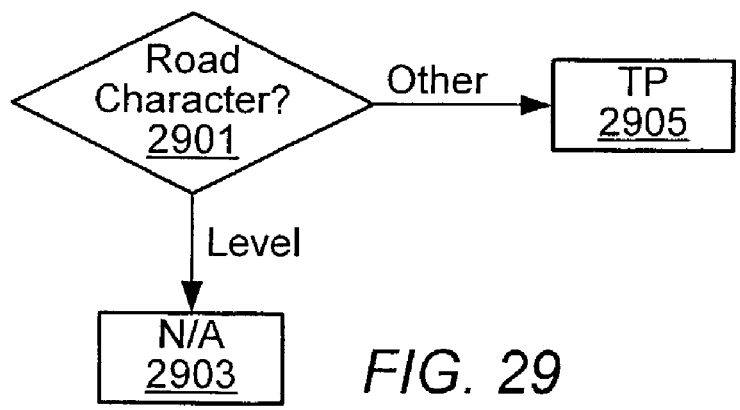
FIG. 29 are flow charts for estimating the contribution of the road character to liability in a motor vehicle accident according to one embodiment.

FIG. 29 is a flow chart for estimating the effect of a factor that accounts for the contribution of road character to a motor vehicle accident according to one embodiment. The road character factor may be applied to the tortfeasor and/or other party for any accident type. As shown in FIG. 29, the road character at decision point 2901 may be either level or some other character. If the road character is level, then step 2903 indicates that the factor may not be applicable. Other road characters may include, but are not limited to, a roadway that has a hill, a hillcrest, or a sag-bottom of a hill. If other road characters apply to the roadway, then step 2905 may indicate that the factor may be a talking point.

Figure 30:
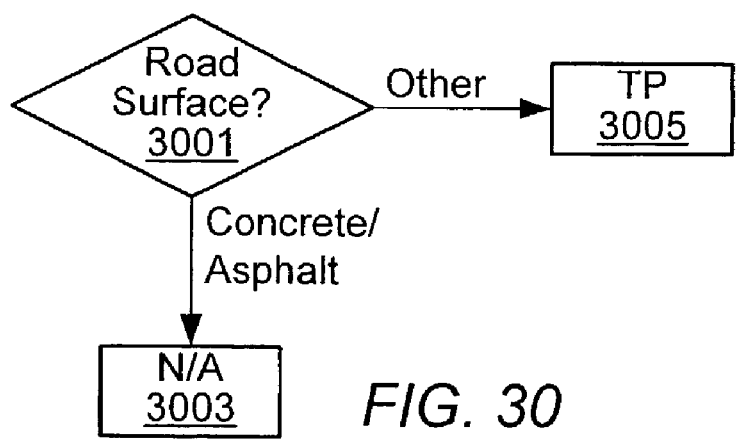
FIG. 30 are flow charts for estimating the contribution of the road surface to liability in a motor vehicle accident according to one embodiment.

FIG. 30 is a flow chart for estimating the effect of a factor that accounts for the contribution of road surface to a motor vehicle accident according to one embodiment. The road surface factor may be applied to the tortfeasor and/or other party for any accident type. As shown in FIG. 30, the road surface at decision point 3001 may be either concrete/asphalt or some other surface. If the road surface is concrete/asphalt, then step 3003 may indicate that the factor may not applicable. Other road surfaces may include, but are not limited to brick, dirt, or gravel. If other surfaces apply to the roadway, then step 3005 indicates that the factor may be a talking point.

Figure 31A:
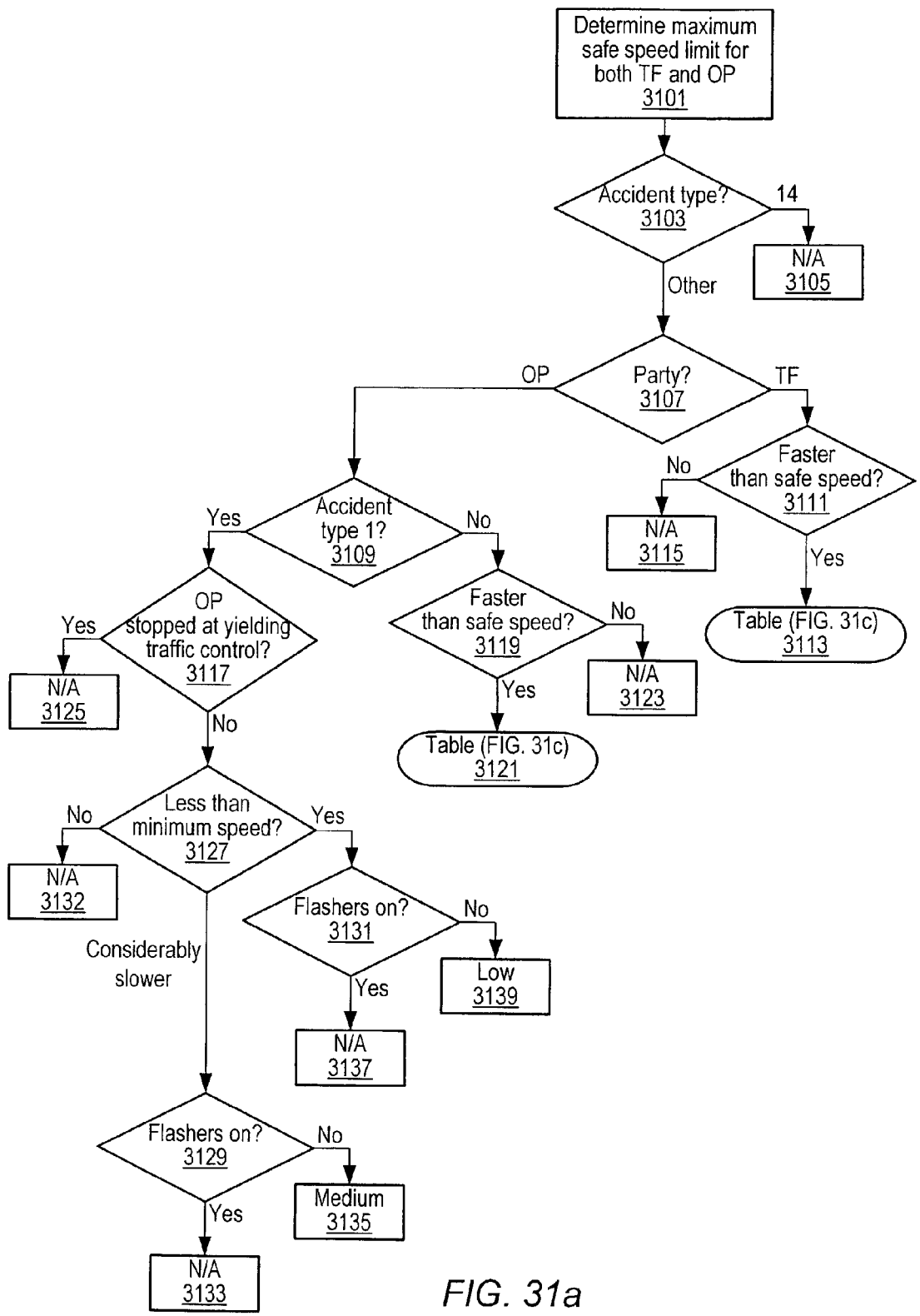
FIG. 31a is a flow chart for estimating the contribution of speed to liability in a motor vehicle accident according to a first embodiment.
Figure 31B:
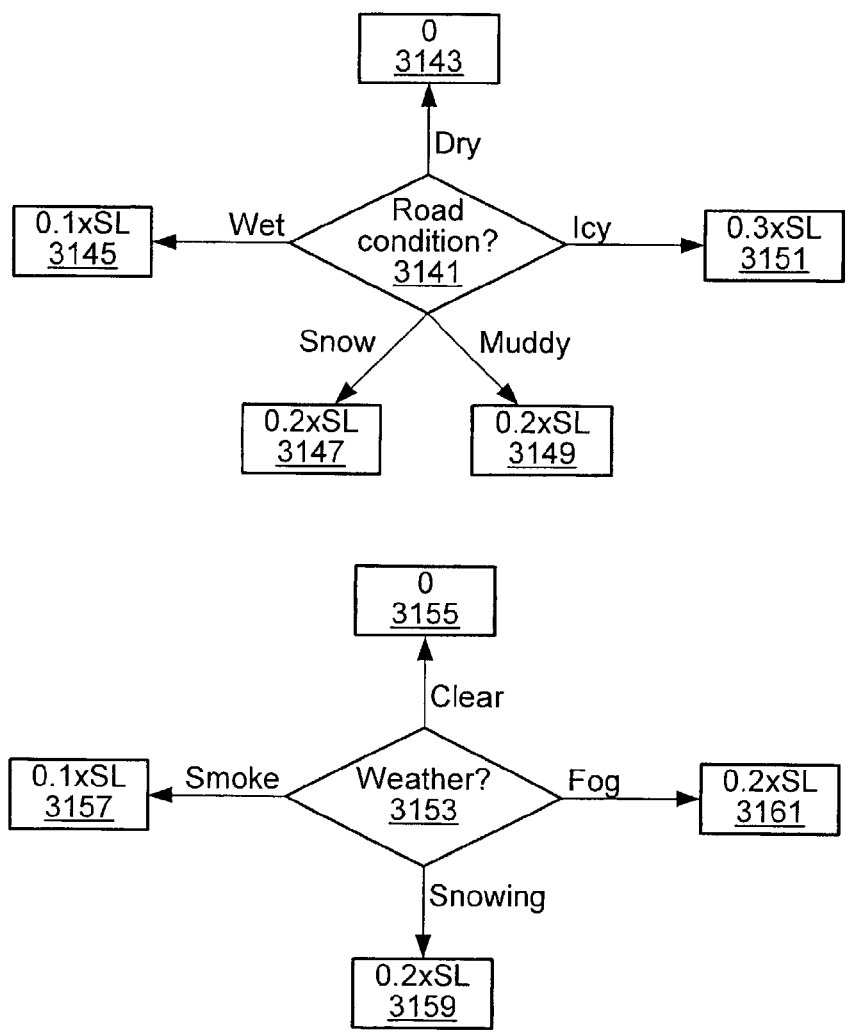
FIG. 31b is a flow chart for estimating the maximum safe speed for given road and weather conditions according to the first embodiment.

FIGS. 31*a-b* may be used in combination with FIG. 31*c* for estimating the effect of a factor that accounts for the contribution of speed to a motor vehicle accident according to a first embodiment. In some embodiments, the speed factor may not apply to accident type 14. The speed factor may be applied to either or both parties depending on the circumstances of the accident.

In FIG. 31*a*, step 3101 in estimating the speed factor may be to determine the maximum safe speed. In some embodiments, step 3101 may be directed to determining the maximum legal speed. Determination of the maximum safe speed is illustrated by the flow charts in FIG. 31*b*. As shown in FIG. 31*b*, the maximum safe speed may be determined by reducing the legal speed limit to account for adverse road conditions and/or weather conditions. If the road condition is dry and the weather clear, the maximum safe speed may be the legal speed limit. However, if the road condition is not dry and/or the weather is not clear, then the maximum safe speed may be less than the speed limit. Decision point 3141 in FIG. 31*b* may inquire as to the road condition at the accident scene. Steps 3143, 3145, 3147, 3149, and 3151 may provide the corrections when road conditions are dry (e.g., 0), wet (e.g., 0.1× legal speed limit), snow (e.g., 0.2×legal speed limit), muddy (e.g., 0.2×legal speed limit), and ice (e.g., 0.3×legal speed limit), respectively. Similarly, decision point 3153 in FIG. 31*b* may inquire as to the weather at the accident scene. Steps 3155, 3157, 3159, and 3161 may provide the corrections when the weather is clear (e.g., 0), smoke, etc. (e.g., 0.1×legal speed limit), snowing (e.g., 0.2×legal speed limit), and fog (e.g., 0.2×legal speed limit), respectively. For example, if the speed limit is 60 miles per hour, the road condition is wet, and the weather is snowing the safe speed may be: 60−(0.1×60)−(0.2×60)=60−6−12=42 miles per hour.

Step 3105 in FIG. 31*a* shows that if the answer to decision point 3103 is accident type 14, the factor may not be applicable. For any other accident type, decision point 3107 may ask which party is under consideration. If the party is the tortfeasor, then decision point 3111 may ask if the party was going faster than the maximum safe speed calculated in step 3101. If the answer is yes, then step 3113 may refer to the table in FIG. 31*c* to calculate the effect on the liability. If the party was not going faster than the maximum safe speed, then the factor may not be applicable, as shown in step 3115.

If the party being considered at decision point 3107 is the other party, then decision point 3109 may ask if the accident type is 1. If the accident type is not 1, then decision point 3119 may ask if the other party was going faster than the maximum safe speed calculated in step 3101. If the answer is yes, then step 3121 may refer to the table in FIG. 31*c* to calculate the effect on the liability. If the party was not going faster than the maximum safe speed, then step 3123 may indicate that the factor may not be applicable.

If the accident type is 1 at decision point 3109, decision point 3117 may ask if the other party was stopped at a yielding traffic control. If the answer is yes, then step 3125 indicates that the factor may not be applicable. If the answer is no, then decision point 3127 may ask if the other party was traveling at less than a minimum legal speed for the roadway. If not, then step 3132 indicates that the factor may not be applicable. If the party was traveling at less than the minimum legal speed, but not considerably slower, then decision point 3131 may ask if the vehicle's flashers were on. Step 3137 indicates that the factor may not be applicable if the vehicle's flashers were on. If the flashers were not on, step 3139 indicates that a "low" penalty value may be assessed against the other party. If the other party was traveling considerably slower than the minimum legal speed, then decision point 3129 may ask if the vehicle's flashers were on. Step 3133 indicates that the factor may not be applicable if the flashers were on. If the flashers were not on, step 3135 indicates that a "medium" penalty value may be assessed against the other party. In certain embodiments, other considerations may be used in determining the effect on liability of the other party traveling at less than the minimum legal speed. For example, in certain jurisdictions, various methods may be allowed to indicate a slow moving vehicle. For example, a sign or placard may be displayed on a vehicle or the vehicle may have a flashing yellow light. In such embodiments, the use of any approved method to provide warning to other traffic that the vehicle is moving slowly may result in the factor being not applicable.

FIG. 31*c* is a table illustrating the estimation of the effect of a factor that accounts for the contribution of speed to a motor vehicle accident according to the first embodiment. The first column of FIG. 31*c* may be related to the maximum safe speed calculated as shown in FIG. 31*b*. The second column of FIG. 31*c* may include an actual speed for the vehicle. The third column may include following distances subjectively estimated by an experienced claims adjuster for several ranges of the actual speed of a following vehicle. A following distance less than that specified for a given actual speed range may be considered close while a following distance greater than that specified may be considered far. The fourth and fifth columns may provide exemplary penalty values or ALVs to be assessed to a party under consideration.

For example, if the determined maximum safe speed is 50 miles per hour, a vehicle with an actual speed of 65 miles per hour following at a distance of 175 feet may have a penalty value assessed of 10% according to FIG. 31*c*. For the same maximum safe speed, a vehicle with an actual speed of 85 miles per hour may have an absolute liability value of 70% assessed.

Figure 32B:
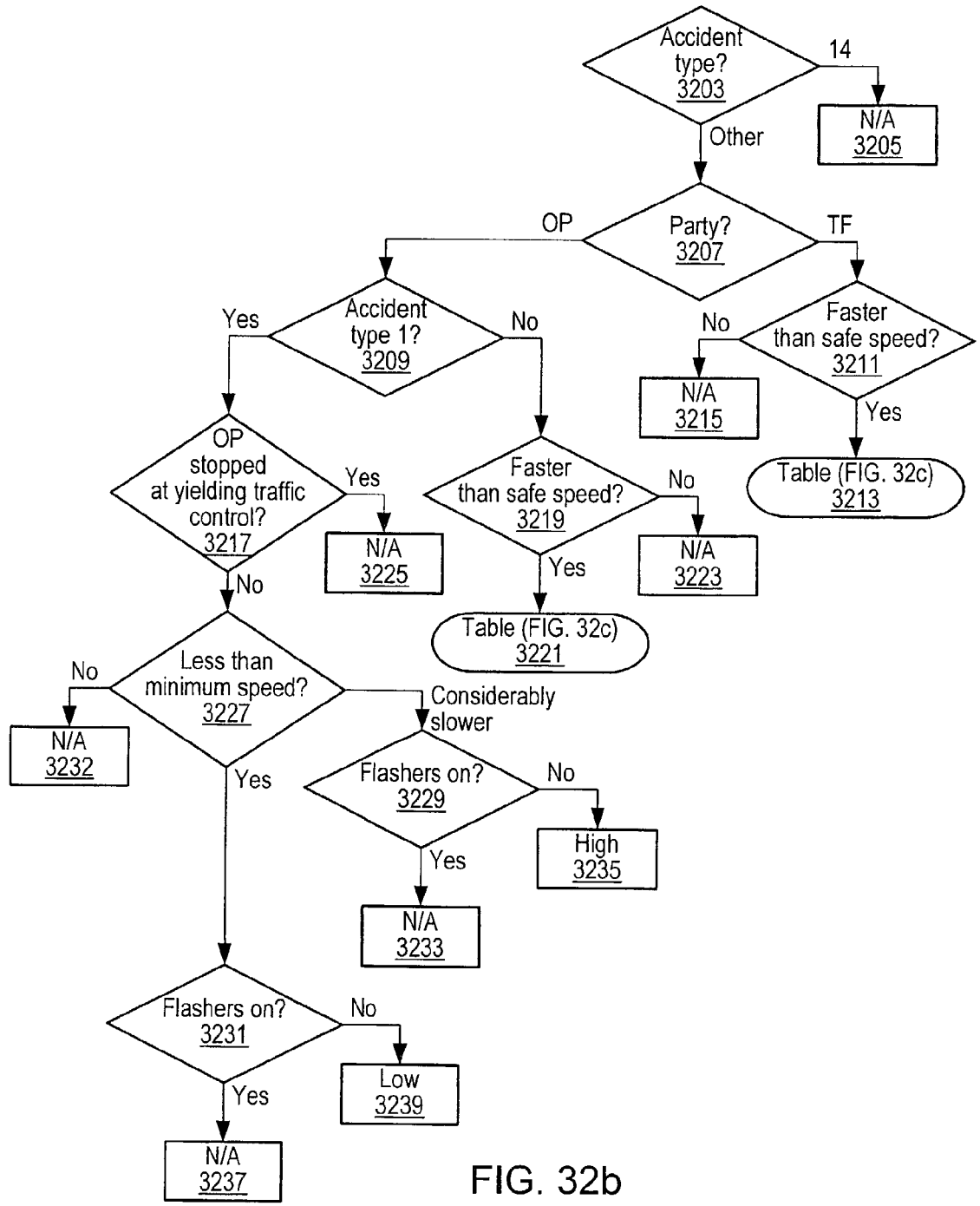
FIG. 32b is a flow chart for estimating the maximum safe speed for given road and weather conditions according to the second embodiment.

FIGS. 32*a-c* may be used for estimating the effect of a factor that accounts for the contribution of speed to a motor vehicle accident according to a second embodiment. In some embodiments, the speed factor may not apply to accident type 14, as shown in step 3205 of FIG. 32*b*.

Referring to FIG. 32*a*, a maximum safe speed may be estimated. The maximum safe speed may be estimated as a percentage of the maximum legal speed (i.e., speed limit) for the location. To estimate the percentage of the speed limit corresponding to the maximum safe speed, a road condition may be selected from the first column of the table. Each road condition may be associated with a percentage that may be used to estimate the maximum safe speed for the location. Thus, for example, a vehicle traveling on a dry road having a speed limit of 65 mph may be estimated as having a maximum safe speed of 65 mph. However, if the road is wet, the vehicle may be estimated to have a maximum safe speed of about 59 mph.

In some embodiments, after the safe speed from the table is determined an additional adjustment may be made to the estimate of the maximum safe speed based on the weather. For example, in some embodiments, if the weather is raining, sleeting or hailing the safe speed from the table in FIG. 32a may be reduced by 10%. If the weather is snowing, the safe speed determined from the table in FIG. 32a may be reduced by 20%. If the weather is foggy, smoky or smoggy the safe speed determined from the table in FIG. 32a may be reduced by 30%.

FIG. 32b depicts a flow chart for determining the effect of speed on liability in a vehicle accident. Step 3205 shows that if the answer to decision point 3203 is accident type 14, the factor may not be applicable. For any other accident type, decision point 3207 may ask which party is under consideration. If the party is the tortfeasor, then decision point 3211 may ask if the tortfeasor was going faster than the estimated maximum safe speed. If the answer is yes, then step 3213 may refer to the table in FIG. 32c to calculate the effect on the liability. If the tortfeasor was not going faster than the maximum safe speed, then the factor may not be applicable, as shown in step 3215.

If the party being considered at decision point 3207 is the other party, then decision point 3209 may ask if the accident type is 1. If the accident type is not 1, then decision point 3219 may ask if the other party was going faster than the estimated maximum safe speed. If the answer is yes, then step 3221 may refer to the table in FIG. 32c to calculate the effect on the liability. If the party was not going faster than the maximum safe speed, then step 3223 indicates that the factor may not be applicable.

However, if the accident type is 1 at decision point 3209, decision point 3217 may ask if the other party was stopped at a yielding traffic control. If the answer is yes, then step 3225 indicates that the factor may not be applicable. If the answer is no, then decision point 3227 may ask if the other party was traveling at less than a minimum legal speed for the roadway. In some embodiments, decision point 3227 may ask if the other party was traveling at less than a prevailing speed on the roadway. If the other party was not traveling at less than the minimum legal speed, then step 3232 indicates that the factor may not be applicable. If the other party was traveling at less than the minimum legal speed, but not considerably slower, then decision point 3231 may ask if the vehicle's flashers were on. Step 3237 indicates that the factor may not be applicable if the vehicle's flashers were on. If the flashers were not on, step 3239 indicates that a "low" penalty value may be assessed against the other party. If the other party was traveling considerably slower than the minimum legal speed, then decision point 3229 may ask if the vehicle's flashers were on. Step 3233 indicates that the factor may not be applicable if the vehicle's flashers were on. If the flashers were not on, step 3235 indicates that a "high" penalty value may be assessed against the other party. In certain embodiments, other considerations may be used in determining the effect on liability of the other party traveling at less than the minimum legal speed as discussed with reference to FIGS. 31a and 31b.

FIG. 32c may be used to estimate an effect on liability of the contribution of speed to a vehicle accident. The table of FIG. 32c may be used in the same manner described for FIG. 31c above.

Figure 33A:
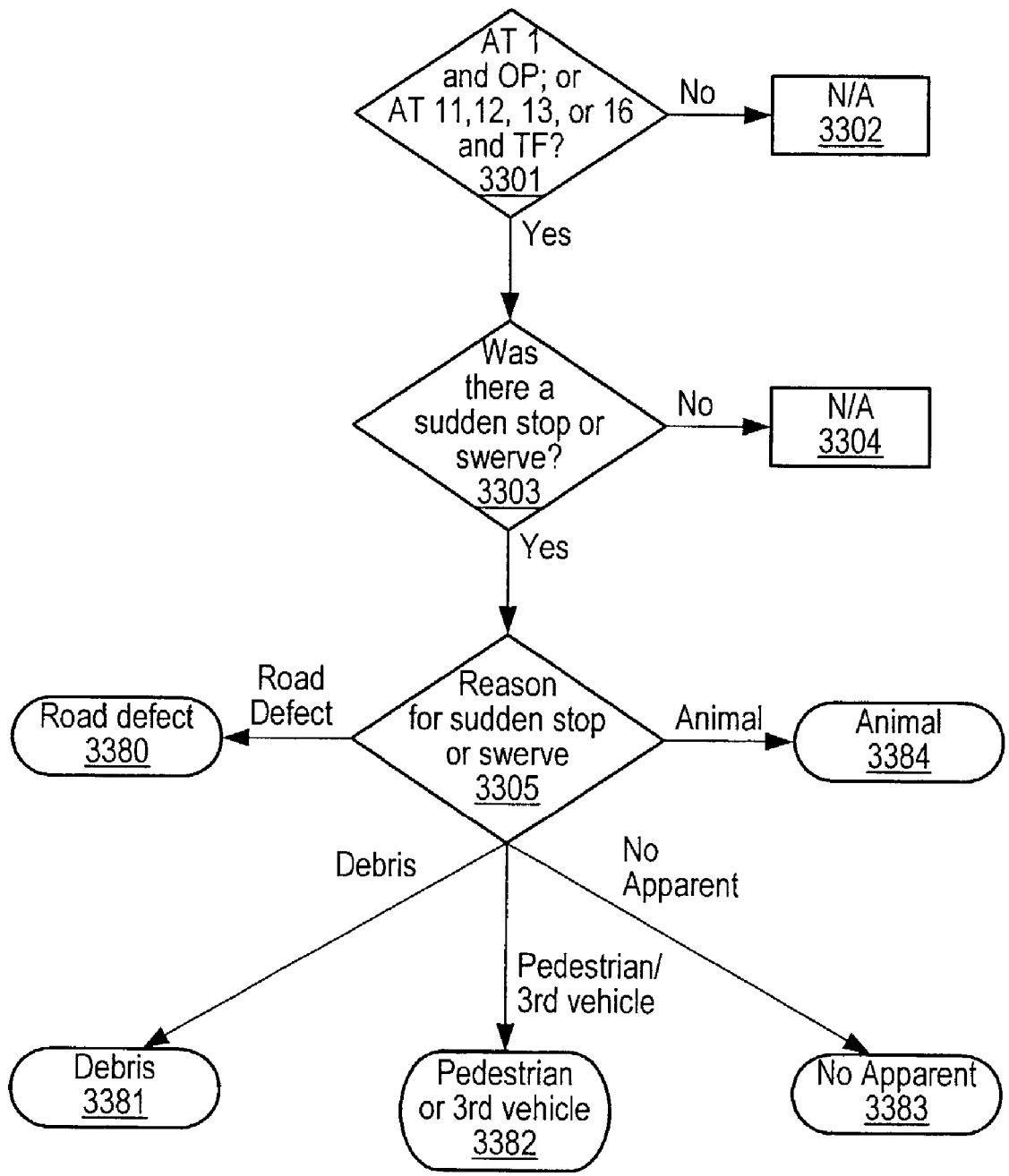
FIGS. 33a, 33b, 33c, 33d, 33e, and 33f are flow charts for estimating the contribution of a sudden stop or swerving to liability in a motor vehicle accident according to one embodiment.

FIG. 33a is a flow chart for estimating the effect of a factor that accounts for the contribution of a sudden stop or swerve to a motor vehicle accident according to one embodiment. As used herein, the term "sudden stop or swerve" generally refers to a rapid deceleration or change of direction. A sudden stop or swerve may typically be taken to avoid another object such as, but not limited to, an animal, pedestrian, road defect, another vehicle or road debris. FIGS. 33b-f are flow charts associated with FIG. 33a that estimate the effect on liability of a sudden stop or swerve. A sudden stop or swerve factor may be applied to the tortfeasor for accident types 11, 12, 13, and 16 or to the other party for accident type 1.

In FIG. 33a, decision point 3301 and step 3302 indicate that the factor may not be applicable to combinations other than to the tortfeasor for accident types 11, 12, 13, or 16 and to the other party for accident type 1. If the party and accident type under consideration are one of these combinations, then decision point 3303 asks whether there was a sudden stop or swerve in the accident. If there was not, then the factor may not be applicable, as shown by step 3304. If there was a sudden stop or swerve then the reason for the sudden stop or swerve may be solicited at decision point 3305. The reason may include a road defect, debris, a pedestrian, another vehicle, or an animal. In addition, FIG. 33a also considers the case of a sudden stop or swerve for no apparent reason.

Figure 33B:
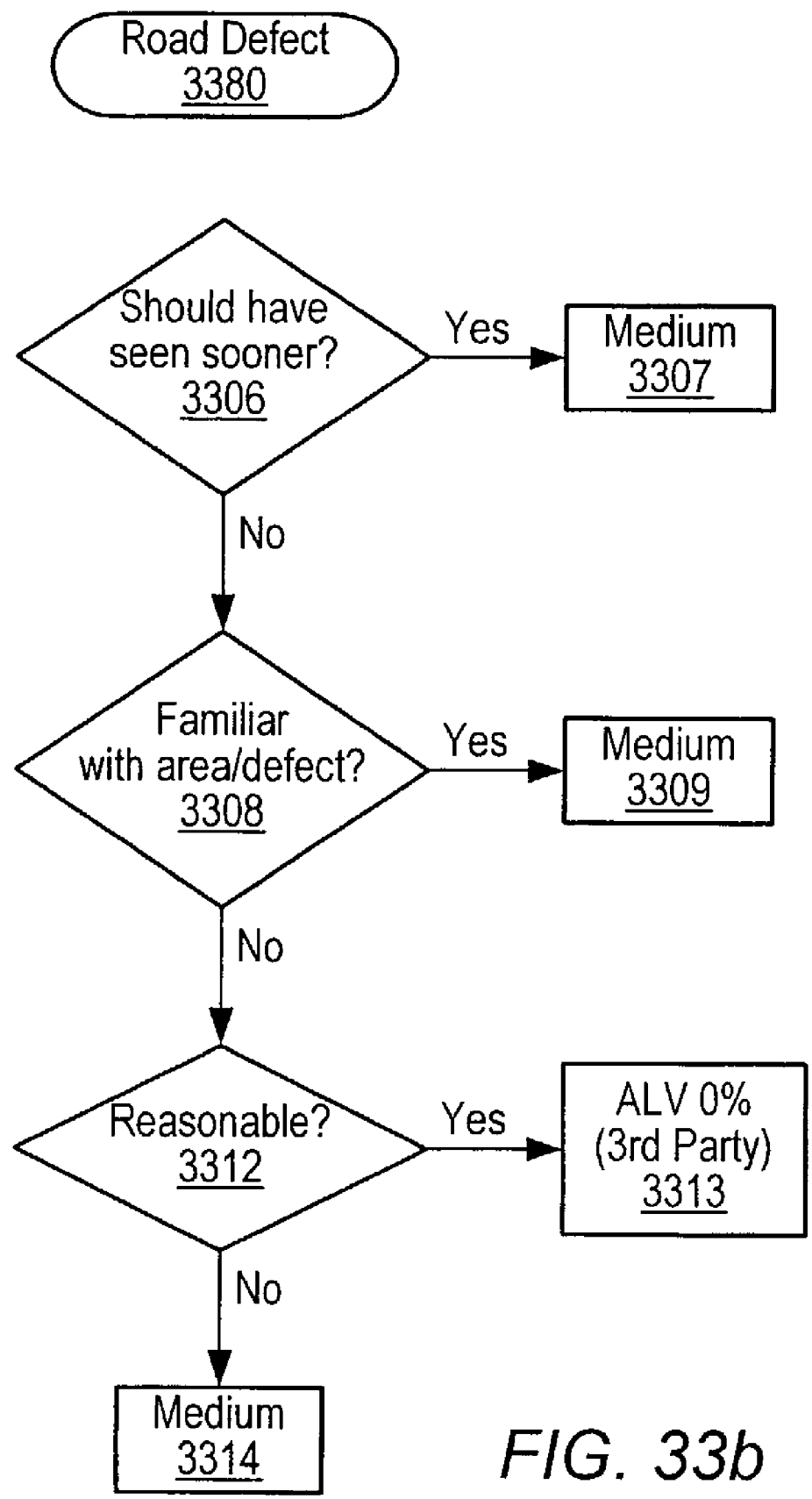

In FIG. 33a, if the reason is a road defect the flow chart may refer to a road defect flow chart 3380 as depicted in FIG. 33b. The first decision point 3306 in road defect flow chart 3380 may asks if the party should have seen the road defect sooner than the party did. If yes, then a "medium" penalty value may be assessed to the party under consideration as shown by decision point 3307. If the answer to decision point 3306 is no, then decision point 3308 may be reached where it is determined whether the party was familiar with the area of the accident and/or the defect. If the party was familiar with the area of the accident and/or the defect, then a "medium" penalty value may be assessed to the party, as shown by step 3309. If the party was not familiar with the area of the accident and/or the defect at decision point 3308, then decision point 3312 may ask if the sudden stop or swerve was reasonable. If the answer is yes, then an ALV of 0% liability may be assessed to the party at step 3313. In addition, it may be noted in an assessment report that a third party (e.g., a party responsible to maintain the road or a party that cased the defect) may have contributed to the accident, and may thus bear a portion of the liability. If at decision point 3312, it is determined that the action was not reasonable, then a "medium" penalty value may be assessed to the party at step 3314.

Figure 33C:
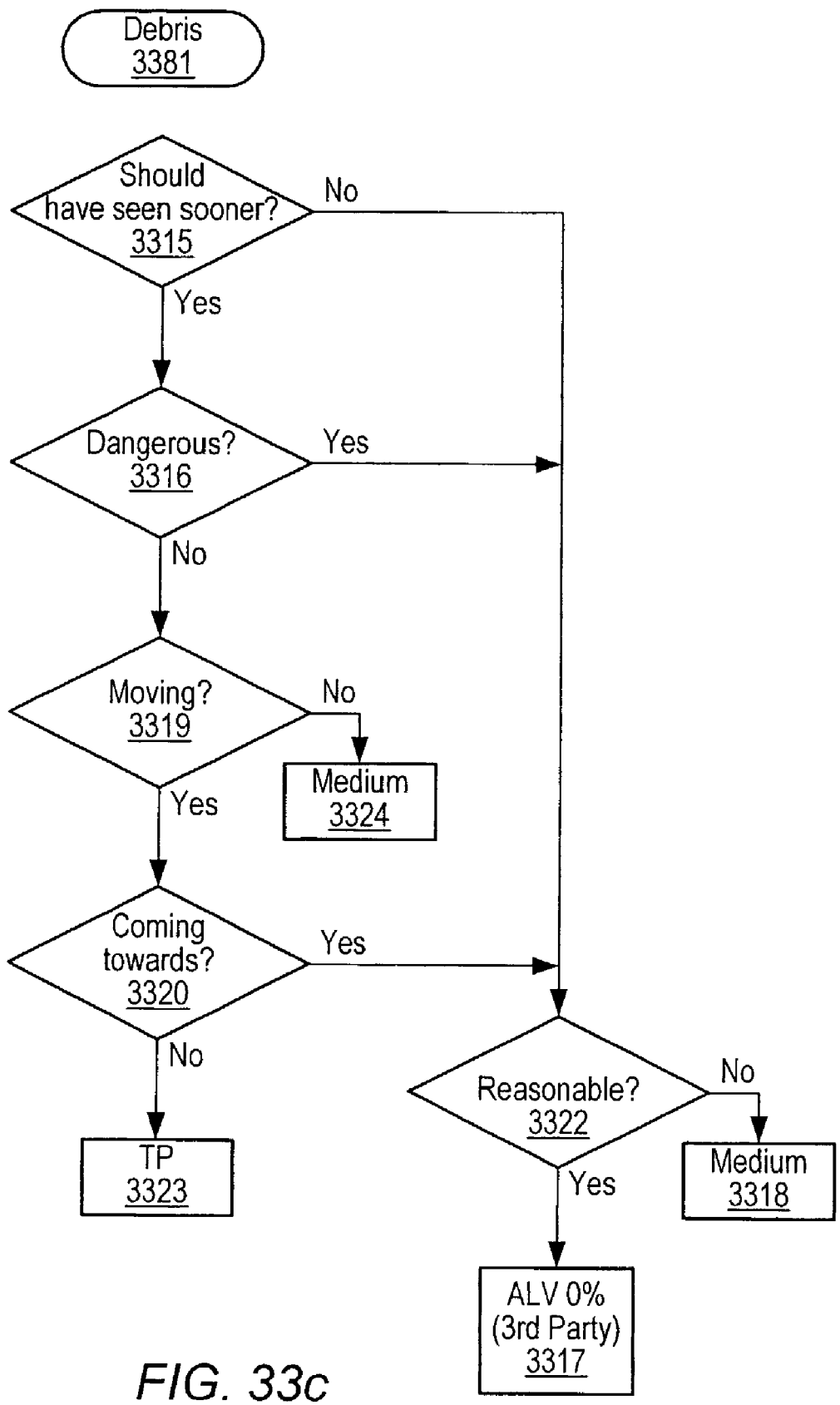

In FIG. 33a, if the reason for the sudden stop or swerve at decision point 3305 is debris, then the flow chart may refer to a debris flow chart 3381 as depicted in FIG. 33c. Decision point 3315 of debris flow chart 3381 may ask whether the party should have seen the debris sooner than the party did. If not, then decision point 3322 may be reached, which may ask if the sudden stop or swerve was reasonable. If the answer to decision point 3315 is yes, then decision point 3316 may determine whether the debris was dangerous. If the debris was dangerous, then decision point 3322 may ask if the sudden stop or swerve was reasonable. If the debris was not dangerous, then decision point 3319 may ask if the debris was moving. If the debris was not moving, then a "medium" penalty value may be assessed against the party. If the debris was moving, then decision point 3320 may inquire whether the debris was coming towards the party. If not, then a talking point may be reached in step 3323. If yes, then decision point 3322 may ask if the sudden stop or swerve was reasonable. At decision point 3322, if it is determined that the action was reasonable, then an ALV of 0% may be assessed against the party at step 3317. In addition, it may be noted in an assessment report that a third party (e.g., a party responsible for the debris) may have contributed to the accident, and may thus bear a portion of the liability. If at decision point 3322, it is determined that the action was not reasonable then a "medium" penalty value may be assessed to the party at step 3318.

Figure 33D:
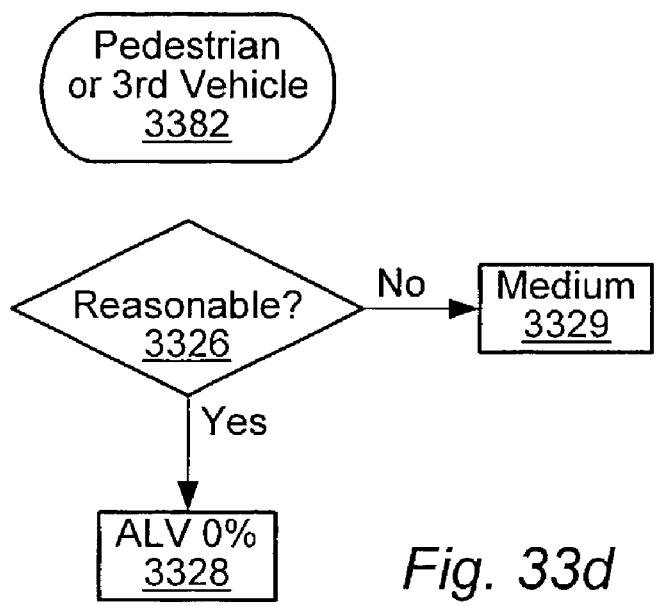

In FIG. 33a, if the reason for the sudden stop or swerve at decision point 3305 is a pedestrian or other vehicle, then the flow chart may refer to a pedestrian or 3rd vehicle flow chart 3382 as depicted in FIG. 33d. It may be determined at decision point 3326 whether the sudden stop and swerve was reasonable. If it was reasonable, then an ALV of 0% may be assessed to the party under consideration, as shown by step 3328. If the sudden stop and swerve at decision point 3326 is not reasonable, then a "medium" penalty value may be assessed to the party as shown by step 3329.

Figure 33E:
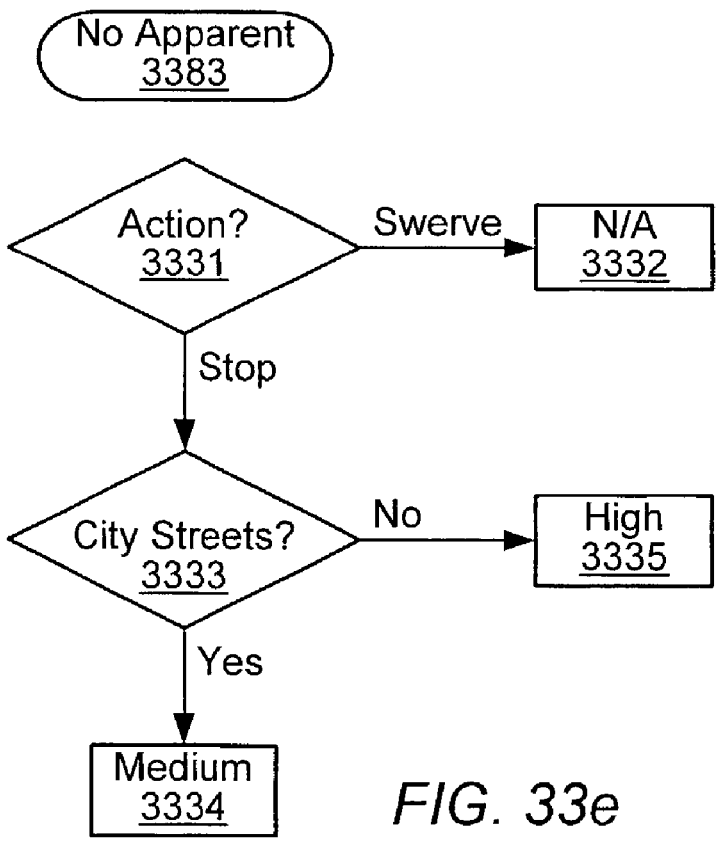

In FIG. 33a, if there is no apparent reason for the sudden stop or swerve at decision point 3305, then the flow chart may refer to a no apparent reason flow chart 3383 as depicted in FIG. 33e. If the action was a swerve, then the factor may not be applicable, as shown by step 3332. Alternately, in some embodiments, a "medium" penalty value may be assessed if the action was a swerve. If the action was a sudden stop, decision point 3333 may ask if the accident occurred on city streets. If yes, a "medium" penalty value may be assessed to the party as shown by step 3334. If not, a "high" penalty value may be assessed to the party as shown by step 3335.

Figure 33F:
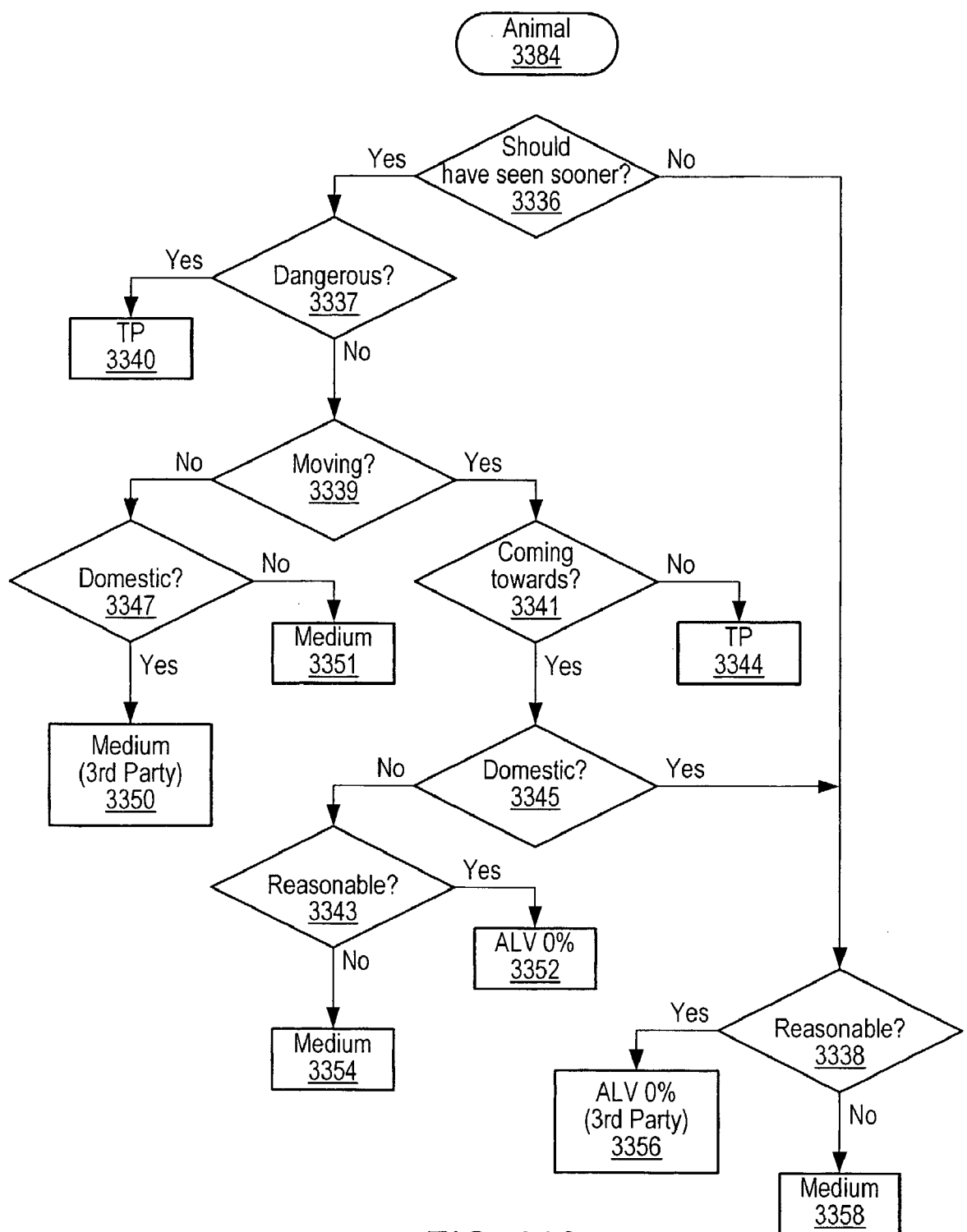

In FIG. 33a, if the reason for the sudden stop or swerve at decision point 3305 is an animal, then the flow chart may refer to an animal flow chart 3384 as depicted in FIG. 33f. It may be determined at decision point 3336 if the party should have seen the animal sooner. If not, then decision point 3338 may be reached which may ask if the sudden stop or swerve was reasonable. If the answer to decision point 3336 is yes, then decision point 3337 may ask if the situation was dangerous. If it is determined that the situation may have been dangerous, then a talking point may be reached at step 3340. If the situation was not dangerous, then decision point 3339 may ask if the animal was moving. If the animal was not moving, then decision point 3347 may ask if the animal was domestic as shown by decision point 3347. If the animal was domestic, then a "medium" penalty value may be assessed against the party. Additionally, it may be noted in an assessment report that a third party (e.g., the animal's owner) may bear a portion of the liability. If the animal was not domestic, then a "medium" penalty value may be assessed against the party.

If the animal was moving, in answer to decision point 3339, decision point 3341 may ask if the animal was coming towards the party. If the animal was not, then a talking point may be reached, as shown by step 3344. If the animal was coming towards the party, then decision point 3345 may determine if the animal was domestic. If the animal was not domestic, decision point 3343 may determine if the action was reasonable. If it is determined that the action was reasonable then an ALV of 0% may be assessed against the party at step 3352. If at decision point 3343, it is determined that the action was not reasonable then a "medium" penalty value may be assessed to the party at step 3354. If at decision point 3345 it is determined that the animal was domestic, decision point 3338 may determine if the sudden stop or swerve was reasonable. If it is determined that the action was reasonable, an ALV of 0% may be assessed against the party at step 3356. In addition, it may be noted in an assessment report that a third party (e.g., the animal's owner) may have contributed to the accident, and may thus bear a portion of the liability. If at decision point 3338, it is determined that the action was not reasonable then a "medium" penalty value may be assessed to the party at step 3358.

Figure 34:
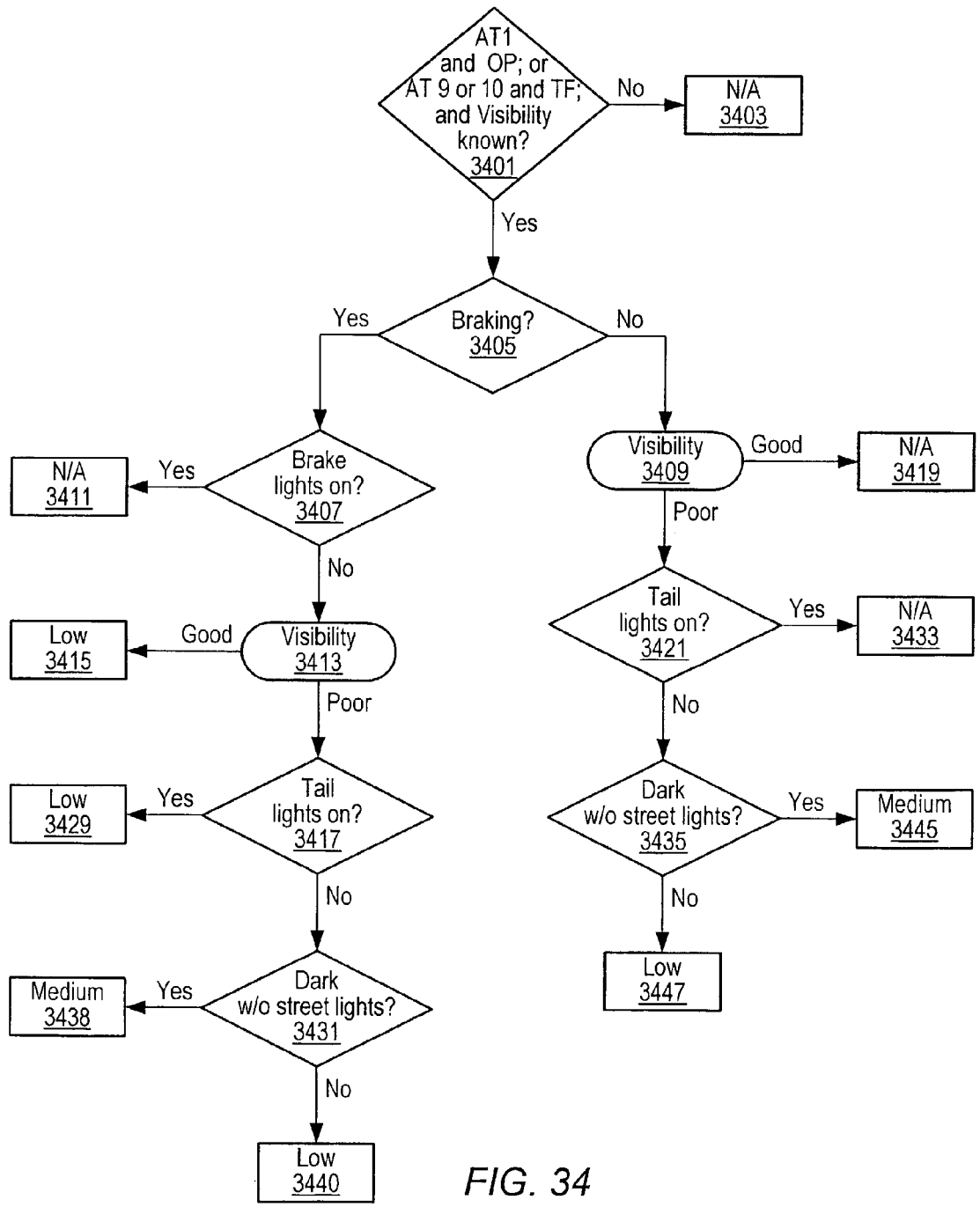
FIG. 34 is a flow chart for estimating the contribution of taillights or brake lights being off when they should have been on to liability in a motor vehicle accident according to one embodiment.

FIG. 34 is a flow chart for estimating the effect of a factor that accounts for the contribution of all taillights or brake lights being off when they should have been on to a motor vehicle accident according to one embodiment. The factor may apply to accidents where all taillights or brake lights on a vehicle were off when they should have been on and contributed to the accident.

In FIG. 34, decision point 3401 and step 3403 indicate that the factor may not be applicable for combinations other than to the tortfeasor for accident types 9 or 10 and to the other party for accident type 1. In each case, the visibility should be known. The next step for one of those combinations is decision point 3405, which may ask if the party was braking when the accident occurred. If the party was not braking, then decision point 3409 may ask the visibility at the accident scene. Determination of the visibility is discussed with regard to FIG. 35. Step 3419 indicates that the factor may not be applicable if the visibility is good. If the visibility is poor, then decision point 3421 may ask if the tail lights were on. In an embodiment, tail lights may be considered to be on if at least one tail light is on. Step 3433 indicates that the factor may not be applicable if the tail lights were on.

However, if tail lights were not on, decision point 3435 may ask whether it was dark without street lights. If the answer is yes to decision point 3435, a "medium" penalty value may be assessed against the party with the tail lights off at step 3445. Step 3447 indicates that if the answer to decision point 3435 is no, then a "low" penalty value may be assessed against the party with the tail lights off.

If the answer to decision point 3405 is yes, then decision point 3407 may ask whether brake lights were on. In an embodiment, brake lights may be considered on if at least one brake light was on. In other embodiments, brake lights may be considered to be on if two or more brake lights were on. Step 3411 indicates that the factor may not be applicable if brake lights were on. If brake lights were not on, decision point 3413 inquires into the visibility at the accident scene. If visibility was good, then a "low" penalty value may be assessed to the party with brake lights off, as shown by step 3415. If the visibility was poor, then decision point 3417 may ask if the tail lights were on. If the tail lights were on, then, according to step 3429, a "low" penalty value may be assessed to the party with the brake lights off. However, if the tail lights were not on then decision point 3431 may be reached. The steps 3438 and 3440 are identical to steps 3445 and 3447 previously described.

FIG. 35 is a flow chart for estimating the effect of a factor that accounts for the contribution of visibility to a motor vehicle accident according to one embodiment. The visibility factor may be applied to the tortfeasor and/or other party for any accident type. As used herein, the term "visibility" is generally defined as a combination of the weather and the lighting that adversely affects ability to see other vehicles, traffic controls, etc. In some embodiments, visibility may not be an adjusting or talking point factor in and of itself. It may be mentioned as a comment to the accident. Visibility may be an input to other factors. In some embodiments, weather may be a separate flow chart that may be used as an input to other factors. Lighting may include, but is not limited to, day, dawn, dusk, night with street lights, and night without lights. Weather may include, but is not limited to, clear, cloudy, raining, sleet/hail/freezing rain, snow, fog/smoke/smog/dust, and fog with rain.

FIG. 35 is a flow chart that estimates the effect of visibility on the liability. The first step in FIG. 35 is decision point 3501 that may ask the lighting conditions at the accident scene. If the lighting was daytime, then decision point 3503 may determine the weather conditions. If the weather is clear/cloudy as shown by step 3517, then the factor may not be applicable. Alternatively, if the weather is "all others" (i.e., other than clear or cloudy) as shown by step 3519, the visibility may be a talking point. As input into another flow chart, steps 3519 and 3513 may be considered poor visibility and steps 3517 and 3511 may be considered good visibility.

Similarly, the adverse weather may be determined at decision point 3505 if the answer to decision point 3501 is "other." If the answer to decision point 3505 is "clear/cloudy," then visibility may be a talking point in reference to lighting as shown by step 3511. If the answer to decision point 3505 is "all other," then visibility may be a talking point in reference to weather and lighting as shown by step 3513.

Figure 36:
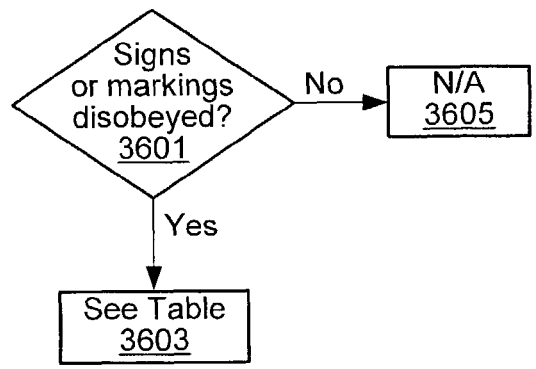
FIG. 36 is a flow chart and table for estimating the contribution of disobeyed signs or markings to liability in a motor vehicle accident according to one embodiment.

FIG. 36 depicts an embodiment of a flow chart and table for noting in an assessment report the effect of disobeyed signs or markings. In FIG. 36, decision point 3601 may determine if one or more signs or markings were disobeyed. If at decision point 3601, it is determined that no signs or markings were disobeyed, the factor may not be applicable as shown at step 3605. If signs or markings were disobeyed, the method may refer to table 3607 at step 3603.

Table 3607 may provide a list of potential signs and markings that may have been disobeyed in column 3609. If a sign or marking was disobeyed, a note may be added to an assessment report indicating the sign or marking disobeyed and whether a citation resulted. If no citation was issued, then a note from violation column 3613 corresponding to the sign or marking disobeyed may be added to the assessment report. If a citation was issued then a note from citation column 3615 corresponding to the sign or marking disobeyed may be added to the assessment report as discussed with reference to FIG. 55.

Figure 37:
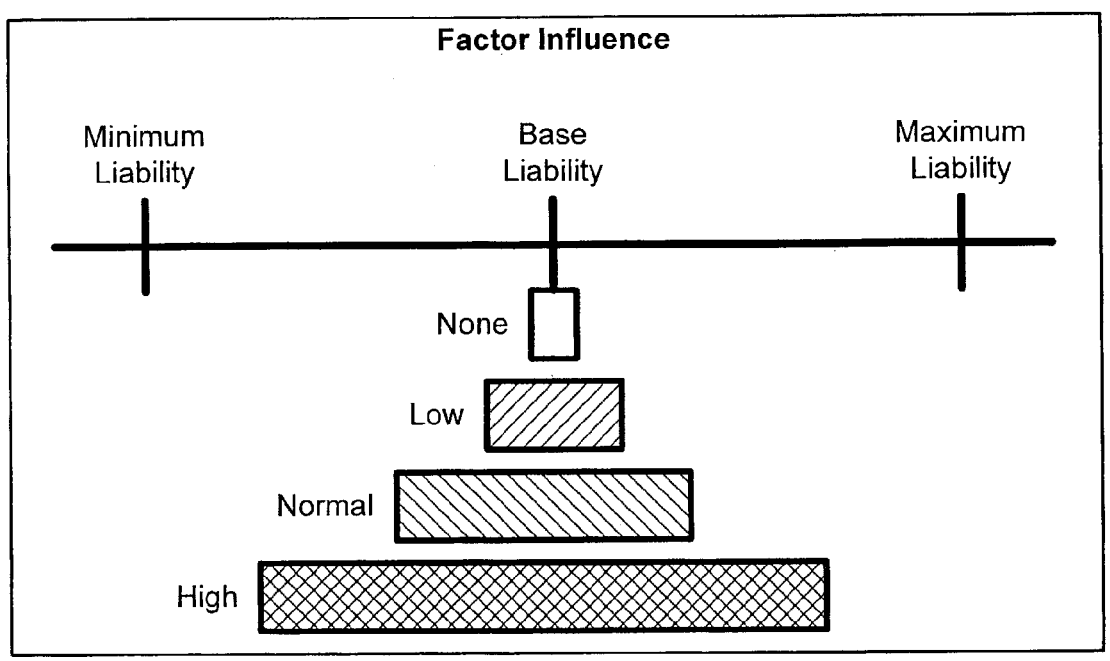
FIG. 37 illustrates the adjustment of a liability estimate by the factor influence according to one embodiment.

FIG. 37 is an illustration of how a factor influence may be used to adjust the effect of factors on the liability according to one embodiment. The factor influence may determine the effect the sum of the effects on liability resulting from factors may have on the base liability. As shown in FIG. 37, the factor influence may have four levels: none (no adjustment), normal, low, and high. A "high" factor influence may allow factors to modify the liability significantly. A "low" factor influence may reduce the influence of the factors below that determined by the "normal" factor influence. Each factor influence level may have a percentage value associated with it, for example, normal=100%, low=50%, and high=150%. Therefore, a "low" factor influence may cut in half the summation of all factor adjustments. In some embodiments, regardless of the factor influence setting, the lower and upper bounds of the liability may still constrain the final liability range.

Once a method is used to estimate the effect of the factors on the base liability, liability values ($L_A$ and $L_B$) for each vehicle may be calculated by combining the contribution for each vehicle with its corresponding base liability. Since the sum of the calculated liabilities may be greater than 100%, it may be necessary to calculate normalized liabilities from adjusted liabilities: $L_{AN}=L_A/(L_{AN}+L_A)$ and $L_{BN}=100\%-L_{AN}$. If $L_{AN}$ is greater than the upper bound, the final liability may be set equal to the upper bound. If $L_{AN}$ is less than the lower bound of the liability, the final liability may be set equal to the lower bound.

Alternatively, the effect of the factors on liability may be combined with the base liability according to a debit-credit method. A portion of the effect to liability of one vehicle may be added to that party's liability and the remainder may be subtracted from the other party's liability. For example, one half may be added to one party's liability and one half subtracted from the other party's liability.

In an embodiment, the liability may be expressed as a range rather than a single value. The range may be generated by a range radius. As used herein, the term "range radius" generally refers to a percentage value that may be added and subtracted from the final liability to create the range: $L_{AN}$±range radius. The range radius may be adjustable by the user and may be applied to all claims.

In one embodiment, a user may specify a range snap-to value. As used herein, the term "range snap-to" value generally refers to a multiple to round up or down to for the range. For example, the calculated liability may be 82±5%. If the range snap-to value is 5 percent, the liability may be adjusted to 80±5%.

The liability range may be adjusted if any part of it falls outside of the upper and lower bounds of liability. In one embodiment, the liability range may be shifted. If the maximum of the liability range is greater than the upper bound of liability, the maximum of the liability range may be shifted to the upper bound of liability. The minimum of the range may be shifted to the lower bound of liability if the liability range is larger than the upper bound to lower bound range. If the liability range is less than the upper bound to lower bound range, the minimum of the liability range may be shifted to the upper bound minus twice the range radius.

Similarly, if the minimum of the liability range is less than the lower bound of liability, the minimum of the liability range may be shifted to the lower bound of liability. The maximum of the range may be shifted to the upper bound of liability if the liability range is larger than the upper bound to lower bound range. If the liability range is less than the upper bound to lower bound range, the maximum of the liability range may be shifted to the lower bound plus the twice the range radius.

Alternatively, rather than shifting, the liability range may be truncated to keep as much of the original liability range as possible. If the maximum of the liability range is greater than the upper bound, the maximum of the range may be the upper bound of liability. If the minimum of the range is less than the upper bound, the minimum of the range may be the lower bound of liability.

In one embodiment, a knowledge acquisition utility may be provided to a user to allow the user to configure information associated with impact groups for roadway configuration/accident type combinations. For example, sets of impact groups associated with each roadway configuration and accident type may be configured. Further, each impact group may have one or more estimates of base liability associated with it. For example, each impact group in a roadway configuration and accident type combination may have a base liability, an upper range of liability, and a lower range of liability for each party associated with it. FIG. 38 is a screen shot of a window that may be used for selecting a roadway configuration/accident type combination according to one embodiment. As shown and discussed in reference to FIG. 8b, a given roadway configuration/accident combination may be associated with a plurality of impact groups where an impact group may be a collection of pairs of impact points. Impact points may be defined by the impact point diagram in FIG. 8a. Each of the pairs of impact points in the impact group may have the same base liability and lower and upper bounds of liability. A claims organization may designate a user such as an experienced claims adjusters to use the knowledge acquisition utility to determine the number of impact groups for each roadway configuration/accident type combination and the impact point pairs in each impact group.

A claims organization may further employ a user (e.g., an experienced claims adjusters) to assign base liabilities and lower and upper bounds of liability to each of the impact groups derived with the aid of the knowledge acquisition utility. As used herein, the term "knowledge acquisition utility" generally refers to an application that allows a claims organization to configure a system for estimating liability in an accident to meet the claims organizations needs. For example, the knowledge acquisition utility may allow the claims organization to set base liability, lower bound of liability and upper bound of liability for each impact group. The knowledge acquisition utility may also allow the claims organization to configure a numerical value associated with penalty factors. For example, a claims organization may use the knowledge acquisition utility to set a "low" penalty value equal to a 10% adjustment in liability. Likewise, a "medium" penalty value may be set at 20% and a "high" penalty value set at 30%. In various embodiments, other determinants of liability may also be configurable by the claims organization using the knowledge acquisition utility, including, but not limited to, situational weights associated with various factors, range radii, range snap-tos, etc.

In an embodiment, a knowledge acquisition utility may be used in conjunction with a tuning utility. A tuning utility may include a knowledge acquisition utility. In an embodiment of a tuning utility, the user may select a roadway configuration and accident type combination to edit from a window as described with reference FIGS. 38 and 39. The user may input base liabilities, lower, and upper bounds of liability for each of the impact groups corresponding to the roadway configuration/accident type combination. After the base liabilities are input, the user may run one or more pre-configured test scenarios built into the tuning utility. The user may then analyze the results and refine the base liabilities. The procedure may be repeated until the user is satisfied with the results produced by the liability estimation system. This process of entering estimates of liability or effect on liability, then testing those estimates by use or one or more pre-configured test scenarios is referred to herein as "tuning." The user may enter base liability information for all other roadway configuration and accident type combinations, run test scenarios, analyze output, refine tuning parameters, and repeat until satisfied. Likewise, the user may enter factor tuning information, as described with reference to FIG. 40, test each factor individually until satisfied, test combinations of factors, and adjust tuning parameters as necessary.

The window depicted in FIG. 38 contains a matrix 3800 of roadway configurations, R, and accident types, A. Diagrams representing roadway configurations are illustrated in FIG. 5. Diagrams representing accident types are illustrated in FIG. 4.

The elements of the matrix labeled with a "--" are combinations which may not be considered because the particular roadway configuration and accident type combination may be considered implausible. In the embodiment depicted, the implausible combinations are a subset of the combinations labeled with an "N" in FIG. 6. In some embodiments, all roadway configuration and accident type combinations may be available to the claims organization. In such embodiments, the claims organization may utilize the knowledge acquisition utility to designate one or more combinations implausible.

Figure 39:
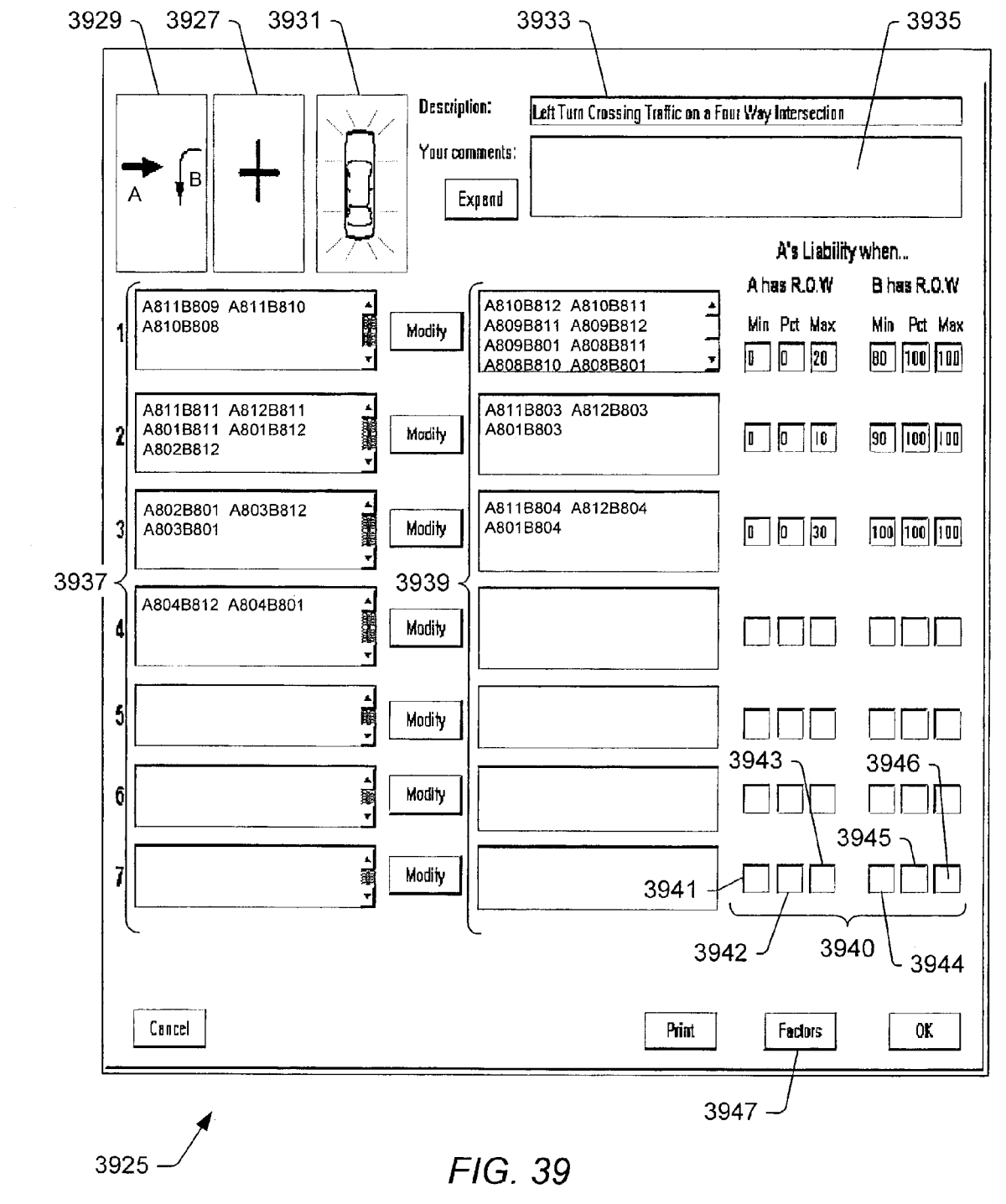

To configure a particular roadway configuration and accident type combination, a user may select the desired values of A and R from menus 3801 and 3803, respectively. Selecting Edit push-button 3805 may open an edit combination window (as depicted in FIG. 39), which may allow the user to edit impact groups for a given roadway configuration and accident type combination. Once a combination has been selected and configured, an indicator adjacent to combination 3807 may indicate that the combination has been configured. For example, a checkbox may be associated with each combination. In such embodiment, an "X" may appear in the check box to designate that a combination has been configured.

FIG. 39 is a screen shot of edit combination window 3925 from a knowledge acquisition utility according to one embodiment. The window may display a graphic representation of selected roadway configuration 3927 and accident type 3929. For example, in FIG. 39 the accident type shown is type 2, as shown in FIG. 4, and the roadway configuration is B, as shown in FIG. 5. A graphic representation of impact point diagram 3931 (as shown in FIG. 8*a*) may also be displayed. The window may display a text description of the accident type and roadway configuration combination 3933. For example, as depicted in FIG. 39, the text description may be, "Left Turn Crossing Traffic on a Four Way Intersection."

The user may also be provided with free-form text entry area 3935 to provide comments directed to the combination. For example, a claims organization may desire a particular comment to be displayed to a user entering claims information containing the combination.

Edit combination window 3925 may also include a plurality of impact group text areas 3937 configured to display impact groups and associated impact pairs. Associated with each impact group text area may be impact group edit area 3939. Impact group edit area 3939 may allow the user to enter one or more impact pairs to be associated with the impact group.

Also associated with each impact group text area 3937 may be liability input text area 3940. Liability input text area 3940 may include base liability field 3942, minimum liability field 3941, and maximum liability field 3943 associated with an accident where vehicle A has the right of way and base liability field 3945, minimum liability field 3944, and maximum liability field 3946 associated with an accident where vehicle B has the right of way. In an embodiment, liability input text area 3940 may allow the user to input estimates of liability for only one vehicle in the accident. For example, the liability input text area may be related to the liability of vehicle A only. In alternate embodiments, liability input text area 3940 may allow the user to input liability estimates for each vehicle. In either embodiment, liability input text area 3940 may display an estimate associated with a second vehicle. The liability estimate for the second vehicle may be determined from the liability estimates provided for the first vehicle on the assumption that liability must total to 100% between the two vehicles.

In an embodiment, the user may edit factors associated with the roadway configuration and accident type combination by selecting Factor button 3947 in editing combination window 3925. Selecting Factor button 3947 may bring up situational weight configuration window 3950, as depicted in FIG. 40.

FIG. 40 is a screen shot of situational weight configuration window 4001 according to one embodiment. Situational weight configuration window 4001 may be used to configure situational weights associated with one or more factors for a given roadway configuration and accident type combination. The situational weights may be used to adjust the magnitude of the effect of the factors on liability, as described with reference to FIG. 9*a*.

Situational weight configuration window 4001 may include a number of columns. First vehicle column 4003 (e.g., column "A") may include rows of data associated with a first vehicle (e.g., vehicle "A"). Second vehicle column 4007 (e.g., column "B") may include rows of data associated with a second vehicle (e.g., vehicle "B"). Factors column 4005 may include rows containing text descriptions of various factors. A user may select a situational weighting associated with each vehicle for each factor listed in factors column 4005. For example, in row 4009, the user has selected a "low" situational weight for vehicle A and a "high" situational weight for vehicle B for the speed factor.

In some embodiments, characteristics other than base liabilities, and factors may be adjusted by a knowledge acquisition utility. These characteristics include, but are not limited to, factor rankings, penalty values, range radii, range snaptos, and absolute liability values. Alternatively, penalty values may not be tunable since they may be estimated by a method as illustrated in the flow charts in FIGS. 10*a* to 36.

Figure 41:
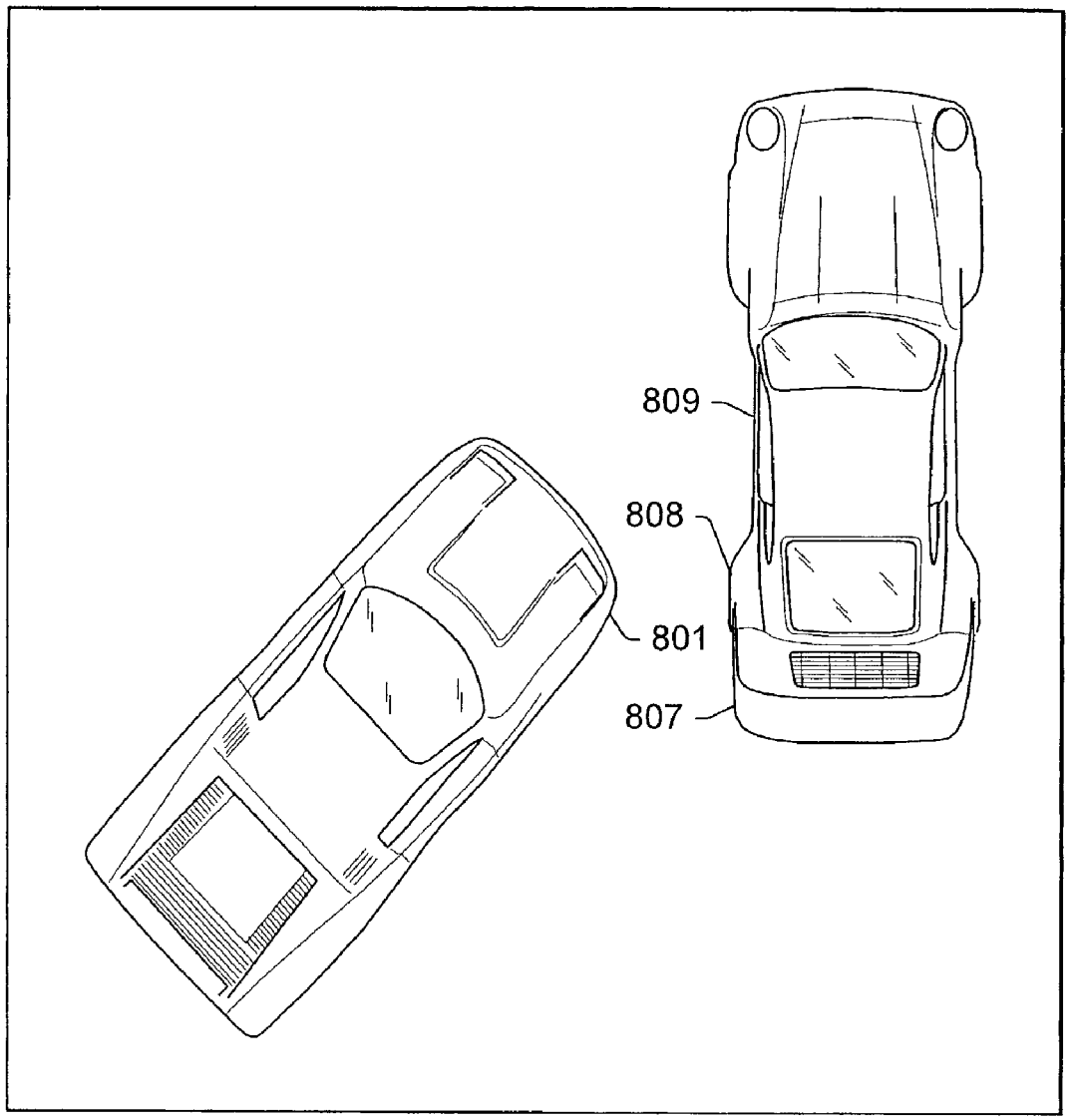
FIG. 41 is a screen shot of a Knowledge Acquisition utility or tuning utility for displaying pairs of impact points according to one embodiment.

FIG. 41 is a screen shot of impact point display window 4100 of a knowledge acquisition utility for displaying impact point pairs for a roadway configuration and accident type combination according to one embodiment. Impact point display window 4100 may provide a mechanism for displaying to the user of a knowledge acquisition utility what impact point combinations make up the impact group that is being considered by the user. Impact point display window 4100 along with the roadway configuration and accident type combination may provide a context within which to make decisions about base liability.

Impact point display window 4100 displays two vehicles with labeled impact points that belong to a given impact group. When the user selects an impact point on a first vehicle, the selected impact point and corresponding impact points on a second vehicle may be highlighted. The selected impact point on the first vehicle and the highlighted impact points on the second vehicle are pairs of impact points in the impact group. For example, in impact point display window 4100, impact point (801) on the vehicle on the left is selected resulting in impact points (807), (808), and (809) being highlighted on the vehicle on the right. Therefore, (801,807), (801,808), and (801,809) are pairs of impact points.

FIG. 42 illustrates a screen shot of Claim Data window 4200. Claim data window 4200 may be divided into a number of frames. Control frame 4201 may provide access to basic controls for the application. For example standard pull down menus may provide access to file, edit, tool and help menus as are commonly used. Additionally, controls frame 4201 may include a number of frame selection buttons (e.g., buttons 4203, 4205, 4207, 4209, 4211, and 4213). Each frame selection button may cause a data display frame 4250 to display different data. For example, selecting "ROW" frame selection button 4205 may cause data regarding right of way in a vehicle accident to be displayed. Claim data window 4200 may also include claim data frame 4225. Claim data frame 4225 may include basic claim data associated. In some embodiments, claim data frame 4225 may continuously display the basic claim data while data display frame 4250 allows other data related to the accident to be entered. Accessories frame 4275 may allow the user to select a number of tools that may be useful to the user as claim data is being entered. Legal reference button 4277 may allow the user to access information related to the laws of a jurisdiction in which the accident took place. Calculator button 4279 may allow the user to access a calculator feature. Comments button 4281 may allow the user to access a free-form text entry area in which comments may be entered. Show details button 4283 may allow the user to access a summary report screen that displays details related to the accident.

Claim data frame 4225 may contain data entry fields including, but not limited to, a claim number, a policy number, an accident location, who reported the accident, whether police where called, what branch of the police was called, whether there were any injuries, whether there were fatalities, what state the accident took place, the date of the accident, what time the accident took place, a policy start date, a policy end date, who the accident was reported to, and a description of the loss due to the accident. In an embodiment, a system may access a claims organization's database to retrieve information related to a policy or an insured party based on a policy number. For example, the policy start and end dates may be automatically entered by the system based on information in the claims organization's database.

Figure 43:
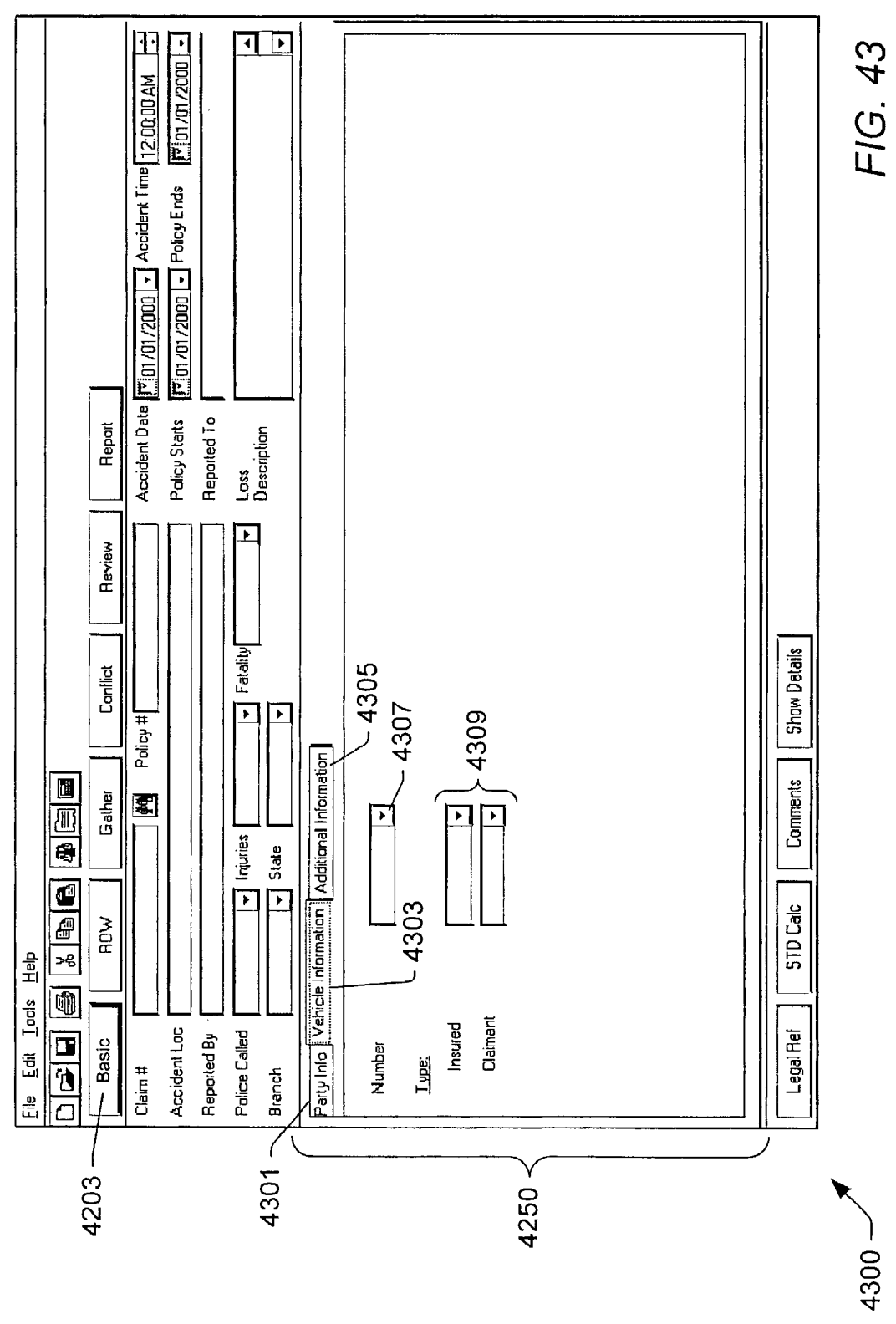

Vehicles frame 4300, as depicted in FIG. 43, depicts a frame for entering data related to the vehicles involved in the accident according to one embodiment. Vehicles frame 4300 may appear in data display frame 4250 if the user selects "Basic" frame selection button 4203 and vehicle information frame tab 4303. Other options available to the user when "Basic" frame selection button 4203 is selected may include party information frame tab 4301 and additional information frame tab 4305. The user may enter the number of vehicles involved in the accident in number field 4307. The user may enter the types of each vehicle in type fields 4309. In an embodiment, the number of type fields provided may correspond to the number of vehicles entered into vehicles field 4307. In some embodiments, two type fields 4309 may be provided by default. In such embodiments, a first type field may correspond to the insured party's vehicle type, and a second type field may correspond to the claimant party's vehicle type. In such embodiments, additional type fields may be provided if more than two vehicles were involved in the accident. Vehicle types may include, but are not limited to, an automobile, a light truck, and another type.

Figure 44:
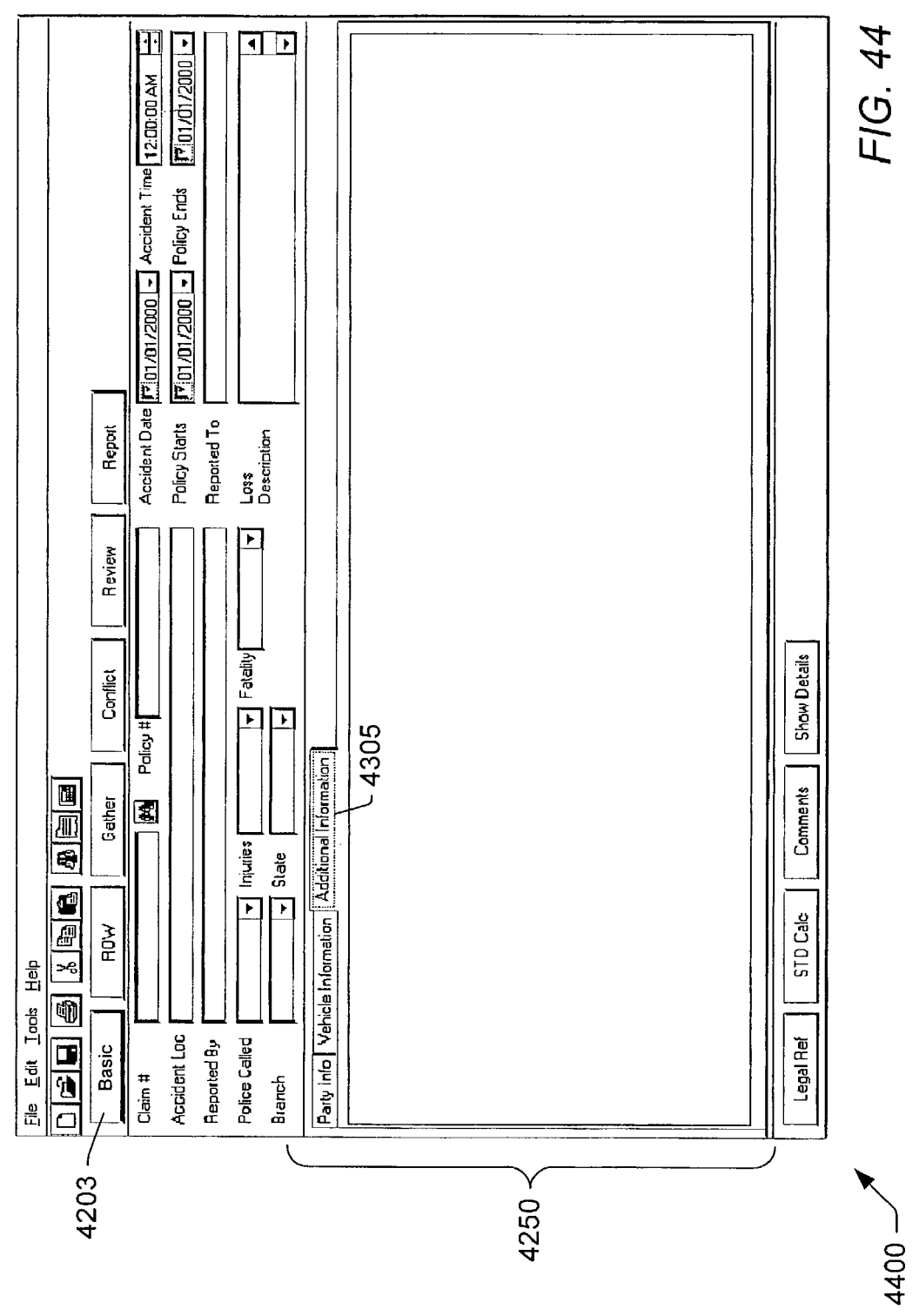

FIG. 44 is a screen shot of additional information screen 4400. Additional information screen 4400 may be displayed when Additional Information tab 4305 is selected. Additional information screen 4400 may allow the user to enter a description of the accident in a free-form text entry box.

Figure 45:
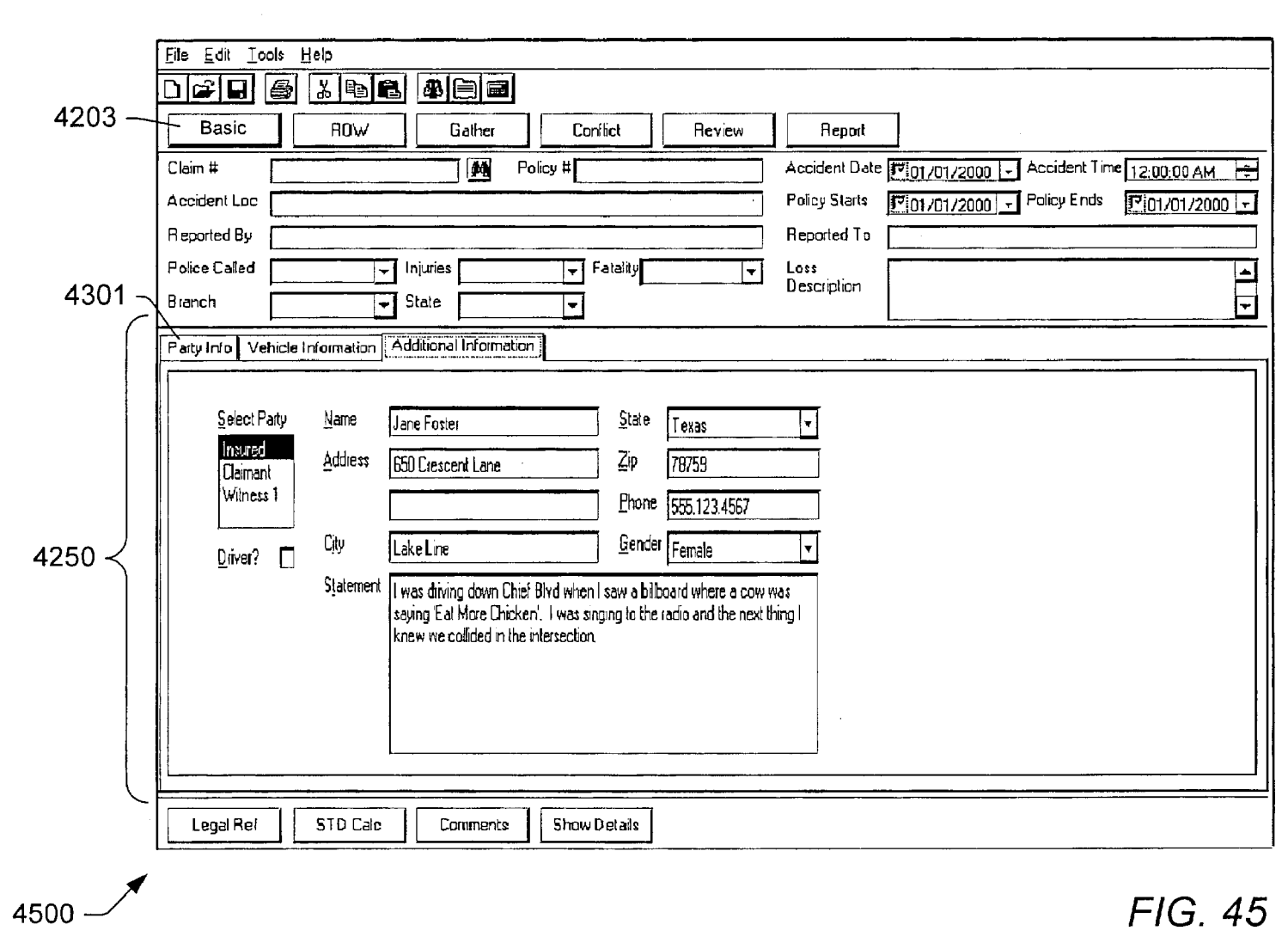

FIG. 45 illustrates a screen shot of party information frame 4500. Party information frame 4500 may be displayed in data display frame 4250 when Party Information tab 4301 is selected. The user may be prompted to select a party involved in the accident from the menu that may include: Insured, Claimant, or Witness. The user may be presented with input fields related to identifying information specific to the party selected. For example, the user may enter the selected party's name, address, city, zip code, phone number, gender, and state into entry fields. The user may enter a description of the accident made by the party into a free-form text entry box.

FIG. 46 depicts an embodiment of a legal reference screen. The legal reference screen may be accessed by selection of legal reference button 4277 in accessories frame 4275. The legal reference screen may provide the user with legal information for a jurisdiction in which the accident occurred. The legal information may be pertinent to determining liability in the accident. In an embodiment, the legal reference information may be accessed from a subscription legal reference service, such as the Westlaw legal information service, available from West Group of St. Paul, Minn. For example, laws pertaining to proportionate responsibility for the jurisdiction may be displayed. The jurisdiction may be determined by the state selected in claim data frame 4225.

Figure 47:
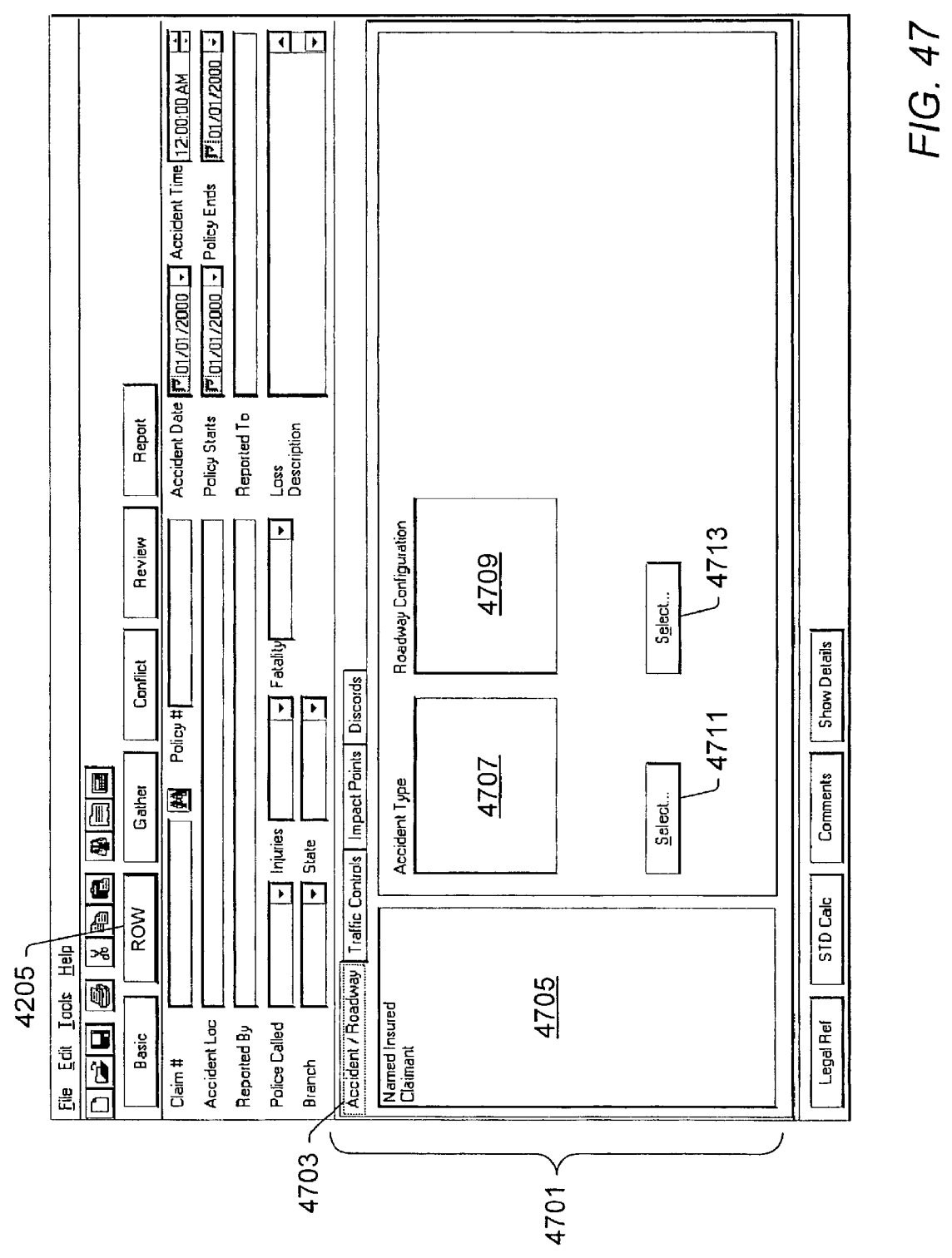

FIG. 47 illustrates an embodiment of right of way data frame 4701 that may be displayed if a user selects right of way button 4205 in controls frame 4201 and "Accident/Roadway" tab 4703. Based on data provided in right of way frame 4701, the system may determine a right of way in an accident by a method described with reference to FIGS. 7*a* and 7*b*. In some embodiments, a right of way data frame may allow a user to make a manual determination of right of way. Accident/Roadway tab 4703 may present a user with a list of vehicles involved in accident 4705 and selection frames for accident type 4707 and roadway configuration 4709. Accident type frame 4707 may display a graphical representation of a currently selected accident type. Roadway configuration frame 4709 may display a graphical representation of a currently selected roadway configuration. A user may select a different accident type or roadway configuration by using selection buttons 4711 and 4713, respectively.

FIG. 48 illustrates an embodiment of traffic controls data frame 4801 that may be displayed if a user selects right of way button 4205 in controls frame 4201 and "Traffic Controls" tab 4803. Using traffic controls data frame 4801, the user may enter information regarding one or more traffic controls that may have been present at the scene of an accident. The user may indicate a primary and a secondary traffic control in "primary traffic control" field 4805 and "secondary traffic control" field 4807, respectively. The user may also indicate if a traffic control was disobeyed in field 4809. The user may also indicate if a traffic control was partially obscured in field 4811. The user may indicate if a traffic control was completely obstructed or missing in field 4813. The user may indicate if an intersection appeared uncontrolled at the time of the accident in field 4815. Information provided in fields 4809, 4811, 4813, and 4815 may be used to determine the effect of a missing or defective traffic control on liability on the accident.

Figure 49:
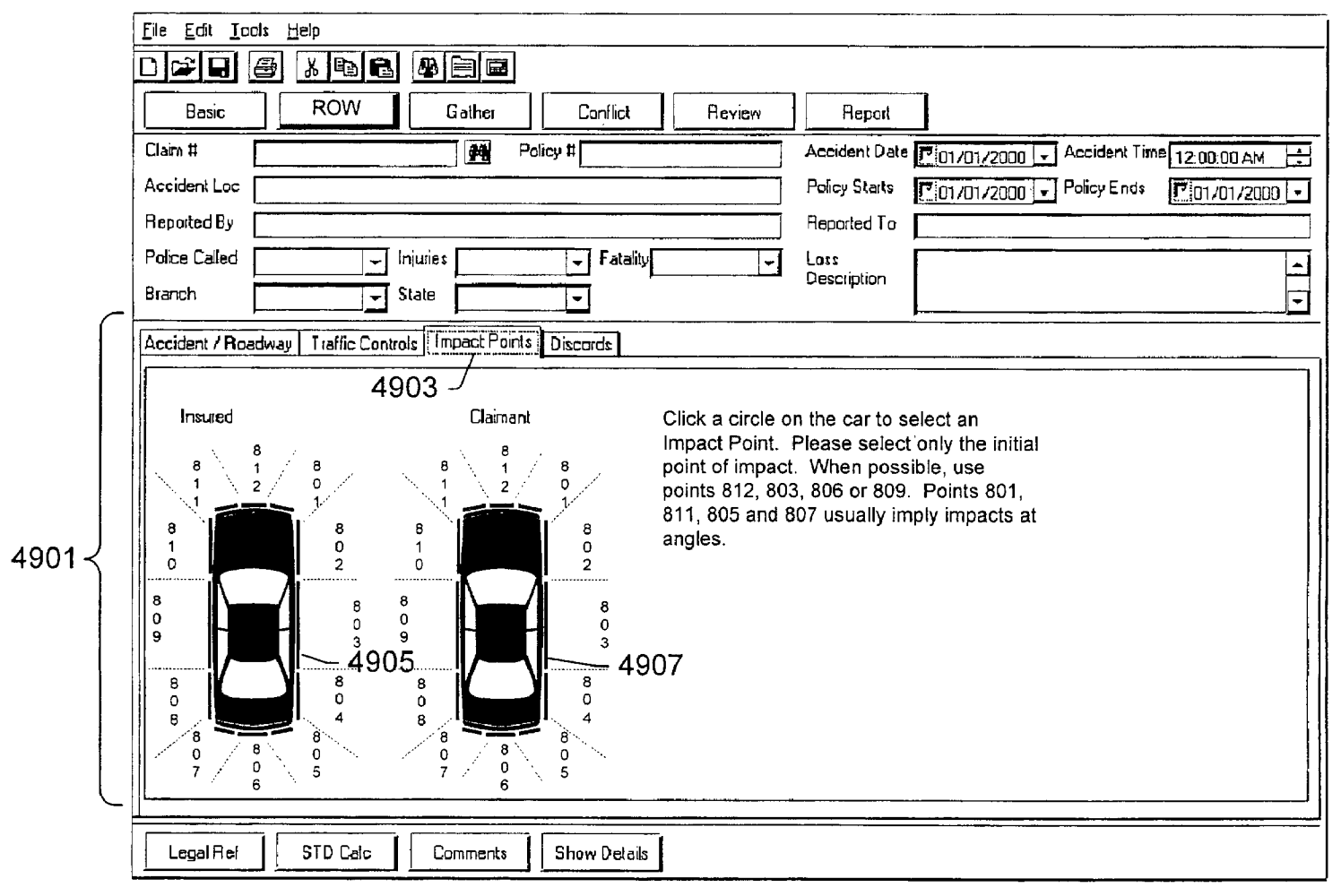

FIG. 49 illustrates an embodiment of impact points data frame 4901 that may be displayed if a user selects right of way button 4205 in controls frame 4201 and "Impact Points" tab 4903. Using impact points frame 4901, the user may enter information regarding impact points for each vehicle in the accident. In an embodiment, impact points data frame 4901 may present the user with graphical representations of the vehicles involved, referenced by numerals 4905 and 4907. In such embodiments, the user may be able to select the impact points on the graphical representation.

Figure 50:
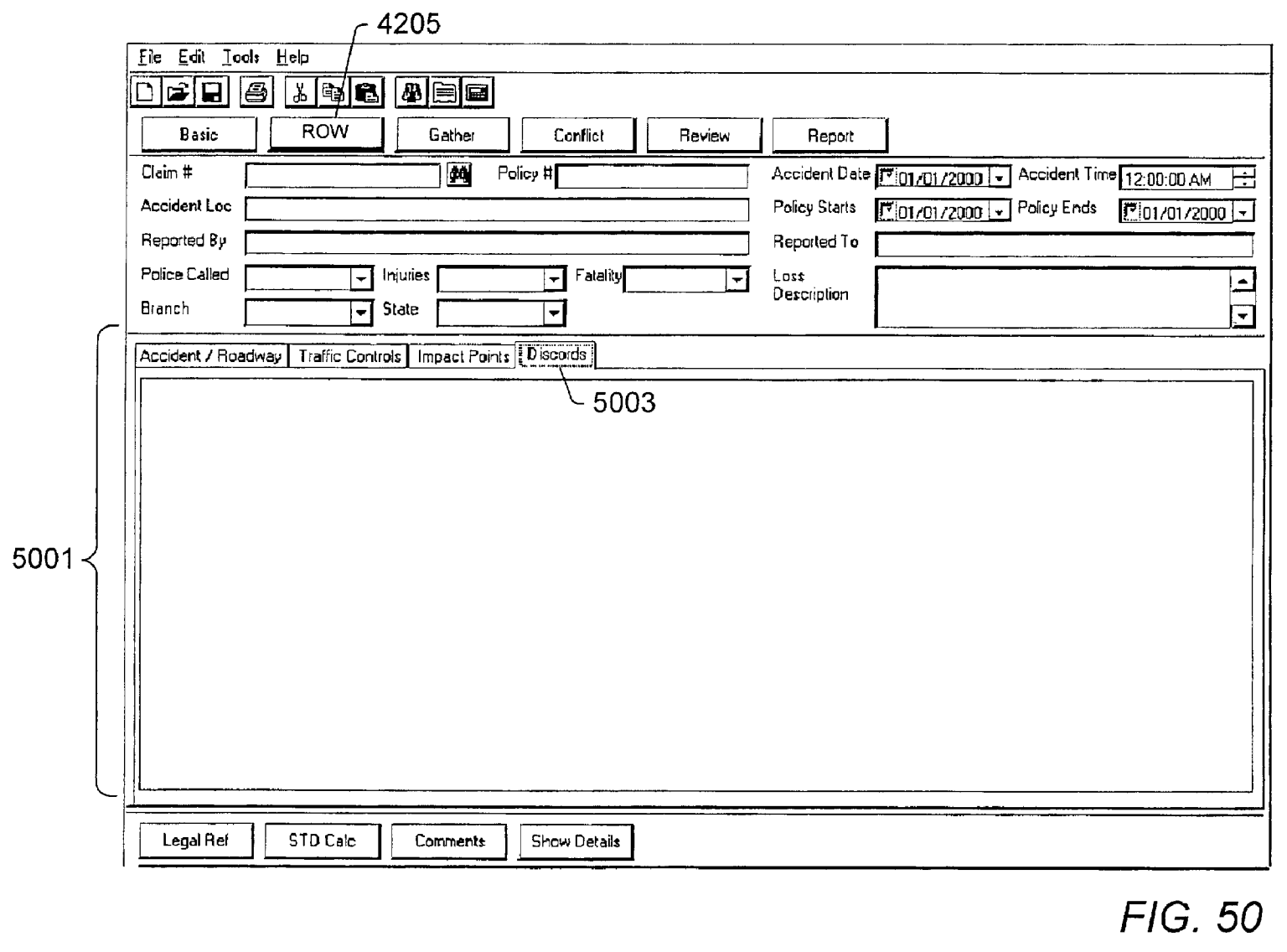

FIG. 50 illustrates an embodiment of discords report frame 5001 that may be displayed if a user selects right of way button 4205 in controls frame 4201 and "Discords" tab 5003. As a user selects information describing an accident, two or more pieces of information may describe an implausible circumstance. For example, an accident type of head on may be selected with a roadway configuration of merging from the left. This accident type and roadway configuration may be unlikely to occur. Discord report frame 5001 may display a report indicating to the user that an unlikely combination has been selected. This may allow the user to change one or more selections, or to proceed to a manual assessment of the accident using the existing selections.

FIG. 51 illustrates an embodiment of factors input frame 5101 that may be displayed if a user selects gather 4207 in controls frame 4201. Factors input frame 5101 may provide input area 5105 for each vehicle involved in the accident. For example, as depicted in FIG. 51, factors input frame 5101 has an input area for a claimant and an insured. The claimant input area may be accessed by selecting claimant tab 5103. Each input area 5105 may include questions column 5107, which may list questions to be asked during an accident investigation. Alternately, in some embodiments, questions column 5107 may provide a column of input fields in which an adjuster may enter questions that were asked during the accident investigation. Some embodiments may include both an area to input adjuster originated question and a list of system prompted questions.

Questions asked may pertain to individual factors or groups of factors. Factors category selection area 5104 may allow the user to select an individual factor or a category of factors for which information may be input. For example, by selecting a visibility factor category from factor category selection area 5104, the user may be provided a list of questions related to the visibility factor as described with regard to FIG. 35.

Factors input area 5101 may also include one or more versions columns for entering responses to questions provided by various parties. For example, insured version column 5109 and claimant version column 5111 are depicted in FIG. 51. If other parties provide answers to one or more questions, additional version columns may be generated by selecting add version button 5113. Alternately, a version column may be deleted by use of delete version button 5115. Version columns may be used to enter responses provided by a party regarding the questions in questions column 5107.

Figure 52:
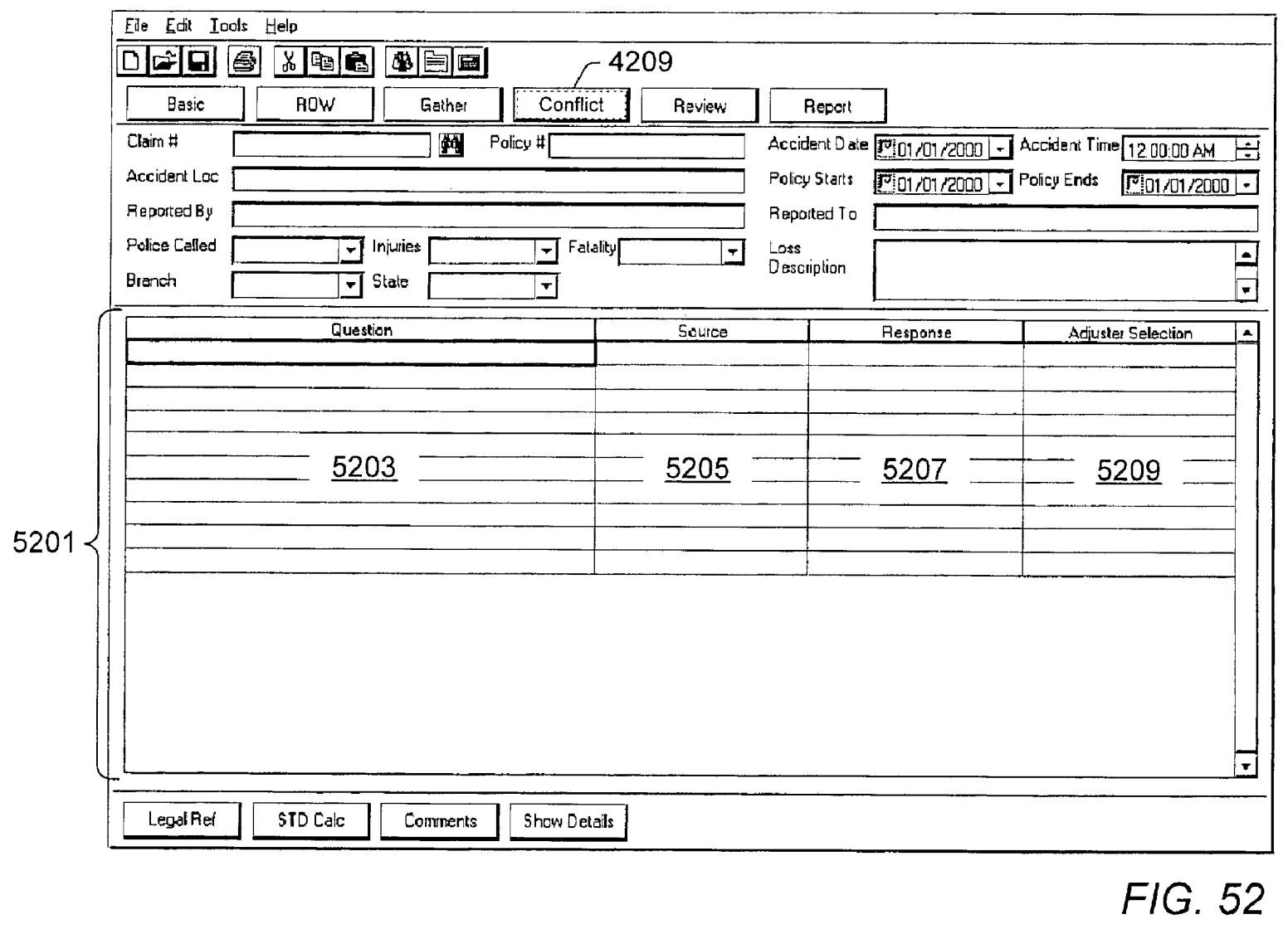

FIG. 52 depicts an embodiment of conflict identification frame 5201 according to one embodiment. Conflict identification frame 5201 may assist an adjuster in identifying two or more answers from witnesses that appear to be in conflict with one another. The assessment of liability in a motor vehicle accident may involve analysis of multiple statements of the description of an accident. In one embodiment, the consistency between different witness statements may be assessed. The statements may be from the drivers or passengers of vehicles involved, bystanders and/or other drivers not involved in the accident. In some instances, statements provided by these various witnesses may not agree on all of the details of the accident. For example, details that may be important in assessing liability may include, but are not limited to, speed of the vehicles, whether brakes were applied, whether signaling was improper or nonexistent, whether a vehicle yielded, the road condition, the road character, road defects, whether a traffic control was defective, visibility, whether a driver was wearing required corrective lenses, distance between the vehicle before the accident, whether headlights were off, the presence of an animal/pedestrian/other vehicle, whether a vehicle made a sudden stop or swerve, whether taillight or brake lights were off, whether a vehicle undertook unsafe backing, whether there was failure to take evasive action, whether a vehicle had high beams on, and whether a lane change was improper.

The system may compare answers given by each witness to various questions to determine if inconsistencies exist. In an embodiment, inconsistencies may be identified even if witnesses were not asked the same questions. For example, the system may flag an inconsistency if a driver answers no when asked, "Did you consume any alcohol prior to the accident?" but a witness answers yes when asked, "Did the drive of the vehicle seem to be impaired?" Claims adjusters may use details that are described inconsistently for informational purposes. The system may list inconsistencies identified in tabular form in conflict identification frame 5201. Details with inconsistent versions may be noted in the tabulation of results. For example, question column 5203 may list a general question having inconsistent responses. Continuing the previous example regarding alcohol, question column 5203 may contain the question, "Did the alcohol contribute to the accident?" Regarding the general question in column 5203, source column 5205 may list each source that provided an answer regarding the question. Response column 5207 may list responses associated with each source. Conflict identification frame 5201 may further provide the user with adjuster selection field 5209. Adjuster selection field 5209 may allow the user to select a response that the adjuster desires to designate as accurate. In other embodiments, the system may identify a most likely version of the accident. The most likely version may correspond to the version with the most responses that are consistent across all of the witnesses. For example, if 5 witnesses were asked about a particular detail and three provided consistent answers, the system may flag these answers as the most likely version of the accident.

Figure 53:
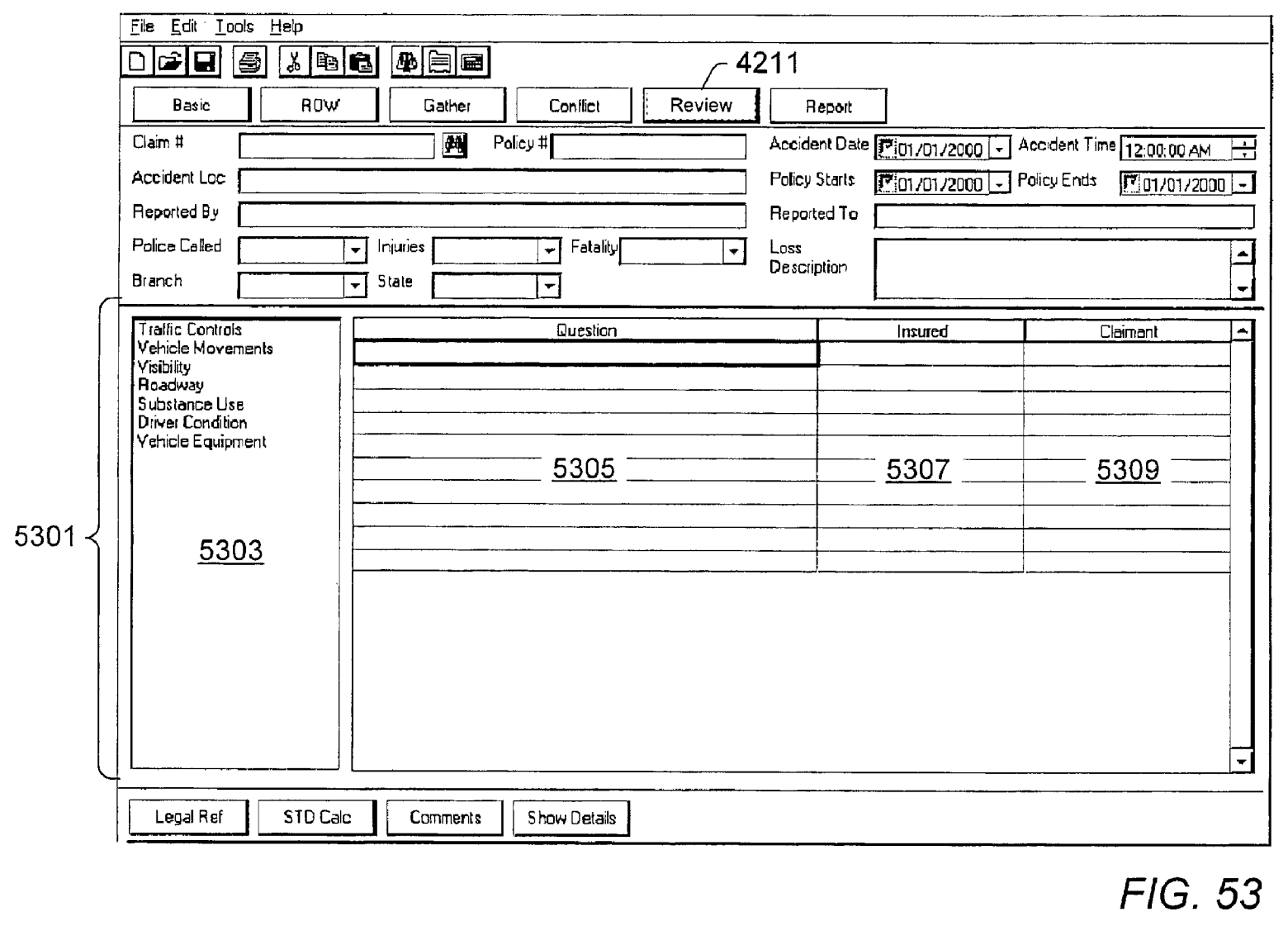

FIG. 53 depicts an embodiment of review frame 5301. After a determination of a most likely version of the accident has been made, the user may be provided with review frame 5301 to review the responses retained as the most likely version of the accident. The user may select a category of factors to review from a list of categories of factors 5303. Questions applicable to the selected category of factors may be displayed in questions column 5305. Answers from the determined most likely version of the accident may be displayed in answers columns 5307 and 5309.

In certain circumstances, the system may not be able to determine an accurate estimate of liability. For example, highly unusual circumstances of the accident may inhibit accurate assessment by the system. In such cases, manual assessment input screen 5401 may be provided, as depicted in FIG. 54. Manual assessment input screen 5401 may include insured liability field 5403 and claimant liability field 5405. Additionally, manual assessment input screen 5401 may include comments field 5407, where the user may provide comments regarding the need for the manual assessment and/or circumstances related to the accident.

Figure 55:
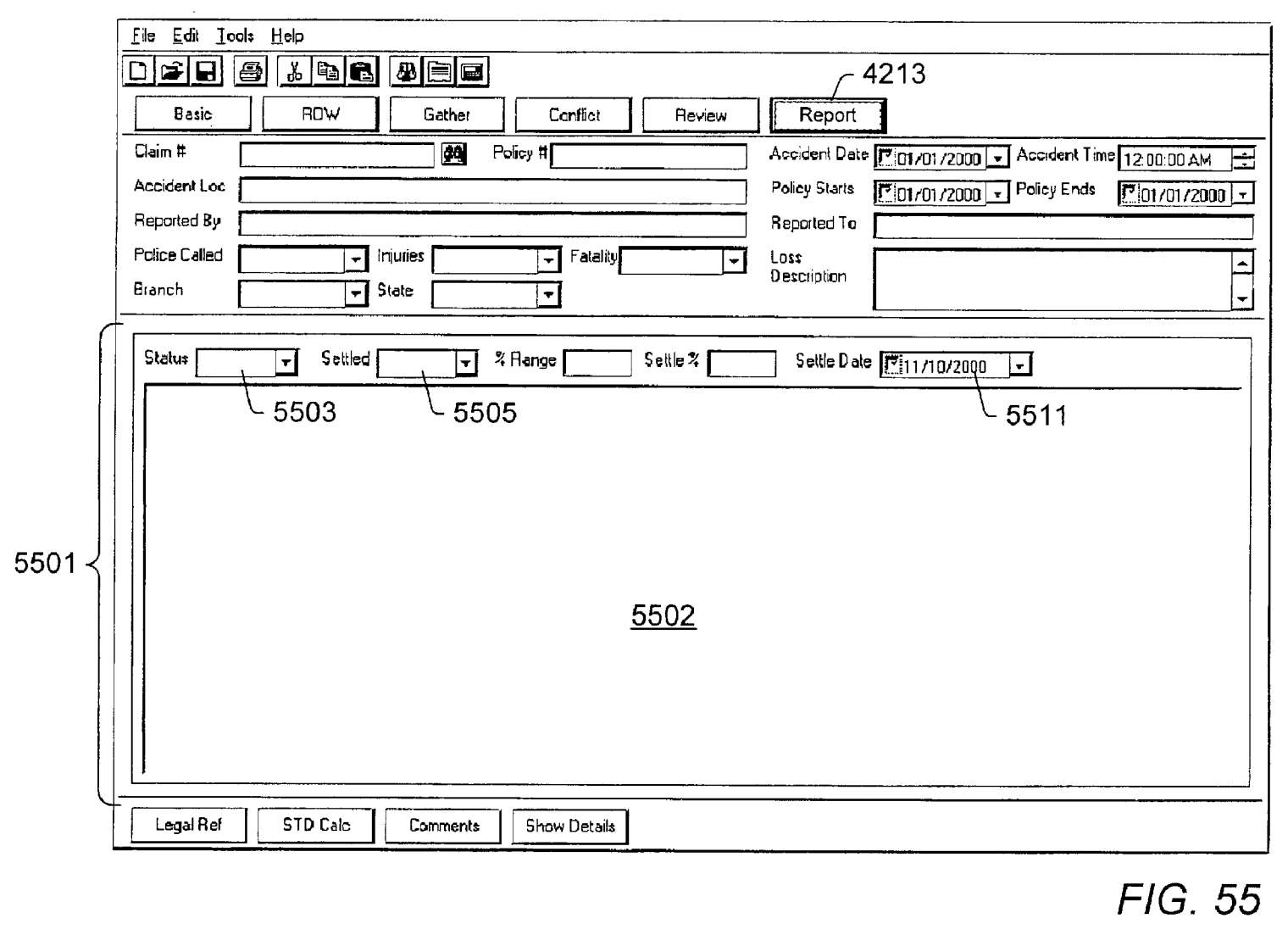

FIG. 55 depicts Consultation Report frame 5501 according to one embodiment. Consultation Report frame 5501 may include text box 5502 for displaying an Assessment Summary report. The Assessment Summary report may include a summary of data gathered and an assessment of liability. For example, the Assessment summary report may include, but is not limited to, the Claim Number, the minimum and maximum percentage of liability, the accident type, the roadway configuration, comments regarding one or more factors, proximate cause, accident date, whether the accident involved injuries, whether the police were called, the accident location, accident description, who the accident was reported by and reported to, jurisdiction, relevant traffic laws of the jurisdiction, identity of the claims adjuster that addressed the claim, and vehicle information for each vehicle. Vehicle information may include the Vehicle Identification Number ("VIN"), make, model, year, impact point, vehicle type, right of way, speed, factors that apply to the vehicle, and party who was driving the vehicle.

The user may indicate whether the assessment is complete or incomplete by using Assessment Status field 5503. The user may indicate whether the claim has settled using Settled field 5505. A settlement date may be entered in Settlement Date field 5511.

In an embodiment, notes may be added to an Assessment Summary report depending on the determination reached for each factor. With reference to FIGS. 10a to 36, each terminus of each factor may have a report message code associated with it. Report message codes listed in an assessment report may aid the adjuster in explaining the assessment and/or in negotiating a settlement. It may be especially helpful to the adjuster to have talking points reached in the assessment listed in the assessment report.

In an embodiment, other reports may be available to a user as well. For example, a user may be able to configure ad hoc reports related to historical accidents. The system may also provide one or more pre-configured reports. For example, a number of administrative or business reports may be available. Such reports may include, but are not limited to, reports pertaining to previous settlements reached, accidents claimed in a particular region or under a particular policy, and accidents associated with various categories of drivers or vehicles.

In another embodiment, a graphical user interface similar to that illustrated in FIGS. 42 to 54 may be combined with accident reconstruction methodology to assess the credibility of details in witness accident descriptions. Accident reconstruction software may be applied to determine details relating to speed, time, and distance of the vehicles involved in the accident. Such details may be inferred by accident reconstruction software from physical measurements. For example, the impact speed may be inferred from physical damage to vehicles. The results of the accident reconstruction software may then be compared to the description of the corresponding detail in the witness statements. The credibility of a witness statement may then be evaluated according to its consistency with the results of the accident reconstruction software.

Accident reconstruction software may employ accident reconstruction methods that may be dependent on a number of variables. Variables may be related to the preservation of the accident evidence, limitations in available specifications, and choice of accident reconstruction techniques. Accident reconstruction techniques may include damage-based and trajectory analysis techniques.

Variables related to accident evidence include the facts of the particular case, which may be unique for the case. Generally, access to some facts may not be under the direct control of an accident reconstructionist, however, the reconstructionist may request documentation and/or memorialization of these facts. The facts of a case may form the basis for the reconstruction. Facts may be preserved or memorialized in photos or measurements by police or other investigators at the time of the accident.

Accident evidence may include positions of rest of vehicles in the accident (e.g., where they stop), tire marks, roadway markings, damage to vehicles, and damage to property. The memorialization of these items may vary widely between cases. First, accident investigators (e.g., police on the scene of the accident) may identify the important aspects of the accident required to permit a detailed reconstruction. The determination of the requirements of a reconstruction may be incidental to other activities, for example, life-saving or the restoration of a safe environment to the accident site. An investigator may try to preserve as much of the evidence as possible. In this initial phase of memorialization, photography, paint markings of vehicles' positions of rest, impact marking, and debris may be used to preserve evidence. It may be advantageous to photograph items of evidence before putting paint marks on. Techniques for measuring various items at the scene may include sight estimates, pacing, tape measurements, and surveying type equipment. The variation in the accuracy of these techniques may detract from the ultimate accuracy of the speed estimates.

The vehicle damage data may not necessarily be preserved at the scene. Typically, vehicle damage may remain unchanged for weeks and/or years at a separate location while either waiting for repair or disposal.

Measurement of the extent of vehicle damage may be subject to some variation. However, typically, the variation of results of a damage-data based reconstruction may mainly be due to differences in the reconstruction and interpretation techniques rather than to the measurement devices used.

Measurements and vehicle specifications may be used as inputs to the equation that permit application of various physical laws to the accident reconstruction. Specifications may include the mass of the vehicles. Measurements may include the geometry of the collision. Determining the geometry of the collision may require the dimensions of the vehicles as inputs.

Additional specifications that may be used in a reconstruction may include roadway friction coefficients, wheel drag, and wheel steer, which may be used primarily for trajectory-based analysis. The friction coefficient, drag, and steer on the vehicle as it travels from impact to rest may be used to approximate the kinetic energy dissipated in a trajectory-based analysis.

The two general techniques for accident reconstruction include damage-based and trajectory-based methods. Damage-based methods typically reconstruct accidents based on damage to vehicles without applying accident scene data. Damage-based only reconstruction techniques generally assume a virtual linear relationship between the impact speed changes versus residual or static crush. The relationship is virtual since it involves equating the crush energy dissipated during the dynamic crushing of the vehicles to the residual or static crush. Damage-based reconstruction techniques may use a single full-scale crash test data point for a given vehicle combined with an assumption regarding a "no-damage" intercept to calculate custom-fitted coefficients for use in individual case reconstructions. Such an assumption may generally e recognized as a crude first-approximation procedure. Alternatively, some damage-based techniques may use multiple crash tests on an individual vehicle to create multiple data points for a given vehicle.

A trajectory-based analysis may directly provide estimates of the impact speed changes in the form of the differences between impact and separation velocities for each vehicle. The general concept or principle of a trajectory-based reconstruction may be the conservation of momentum. The conservation of momentum, which is based on Newton's second and third laws, is that the total momentum of an isolated system of masses remains constant. The conservation of momentum principle may serve as the theoretical basis for reconstruction of impact speeds in vehicle-to-vehicle collisions. The principal stipulates that the system momentum preceding a collision and the system momentum after a collision, for example at separation, are conserved in the absence of external forces. Therefore, if the individual speeds and directions of motion for each of the two vehicles in a collision to travel from separation to rest can be determined, then the direction and magnitude of this system momentum may be used to determine the magnitudes and directions of the velocities that may have existed prior to the collision, which are the impact velocities. Generally, the magnitude of external forces produced by the tires and other possible sources such as gouging and scraping of vehicle components on the ground during the collision may be considered small when compared to the magnitude of the forces of the collision. However, it may be necessary to consider such external forces for a comprehensive accident reconstruction.

Analyzing the total energy dissipated as the vehicles travel from separation to their positions of rest may be important for preparing a comprehensive trajectory-based reconstruction of a collision. When vehicles separate after a collision, they may move to rest positions against resistance forces produced primarily by tire-to-ground friction. Secondary contacts, which may occur with roadside obstacles and/or terrain features, may play significant roles in the dissipation of kinetic energy and may also produce redirection of the spinout trajectories.

In another embodiment, a graphical user interface like that illustrated in FIGS. 42 to 54 may be combined with a credibility assessment method to create a reliable accident description. The details relevant to the accident such as those described herein may be tested by a credibility assessment method such as the accident reconstruction software as described herein. The most credible version of the details may then be combined into a single, reliable version of an accident description.

Further Improvements

Figure 56:
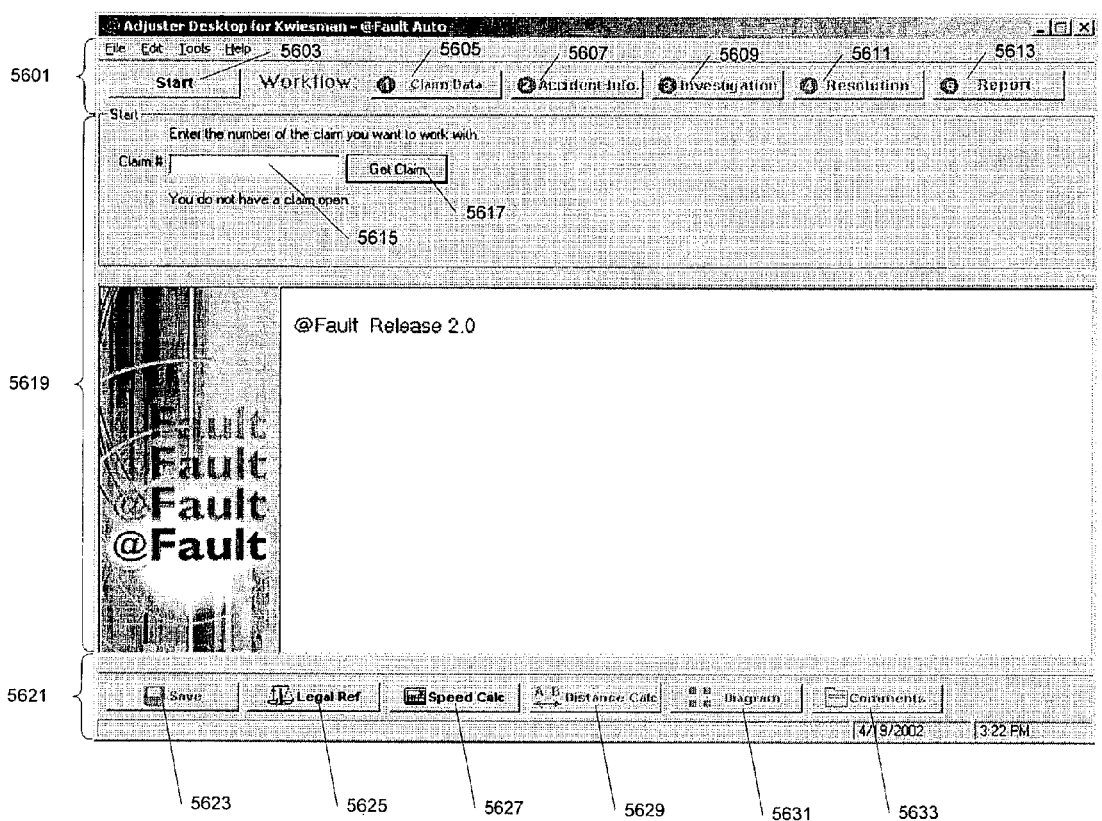
FIG. 56 depicts a screen shot of a graphical user interface of a system for estimating liability in a vehicle accident.

FIG. 56 illustrates a screen shot of another embodiment of a graphical user interface for a system for estimating liability in a vehicle accident. Control frame 5601 may provide access to basic controls for the application. Controls frame 5601 may include a number of window selection buttons (e.g., buttons 5603, 5605, 5607, 5609, 5611, and 5613). Each frame selection button may cause a data display frame 5619 to display different data. A user may select the frame selection buttons after entering a claim number in free form entry text box 5615 and selecting the "Get Claim" push button 5617. FIG. 56 also includes accessories frame 5621. Accessories frame 5621 may include a number of frame selection buttons (e.g., 5623, 5625, 5627, 5629, 5631, and 5633). For example, Speed Calc button 5627 may allow a user to perform speed, time, and distance calculations relating to an accident. In addition, Distance Calc button 5629 may allow a user to estimate a distance from the front of a vehicle to the start of a first lane of an intersection.

Figure 57:
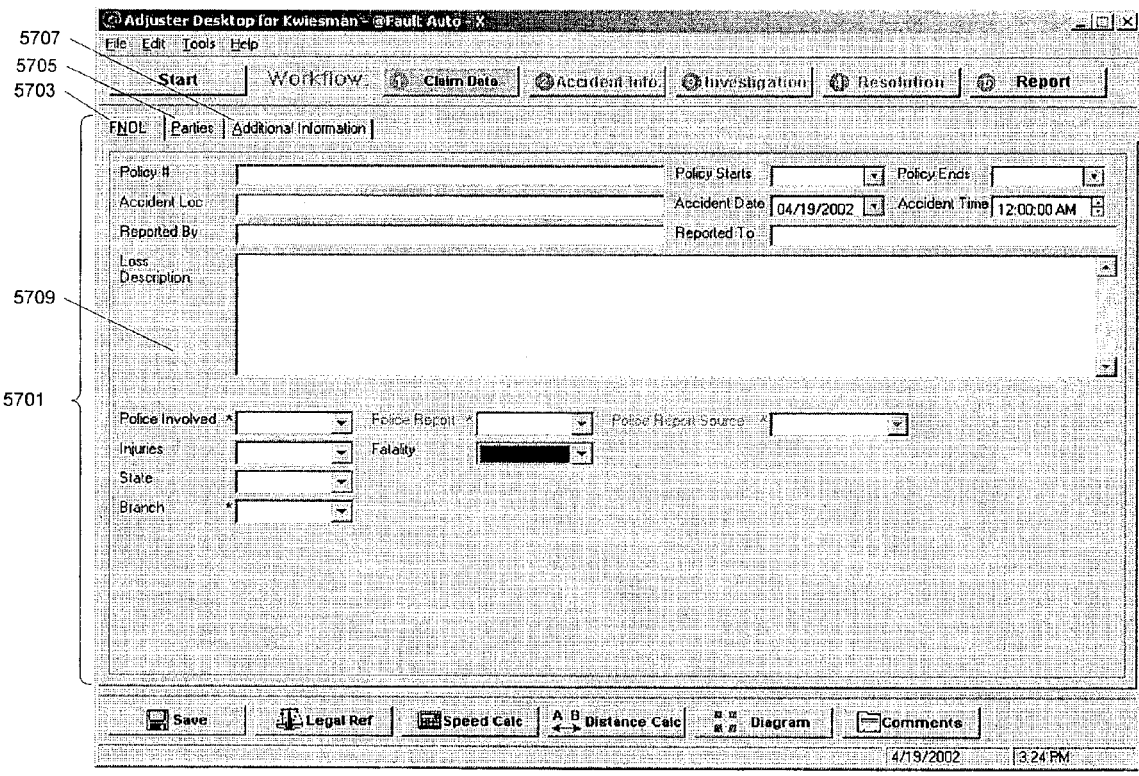
FIG. 57 depicts a screen shot of an embodiment of a claim data frame of a graphical user interface.

FIG. 57 illustrates a screen shot of an embodiment of claim data frame 5701 that is similar to FIG. 42. Claim data frame 5701 may be accessed by selecting the Claim Data frame selection button 5605 in FIG. 56. The claim data window may include several data frames that include an FNOL (first notice of loss) frame, a Parties frame, and an Additional Information frame. A data frame in the claim data window may be viewed by selecting the appropriate tab, 5703, 5705, or 5707. For example, the FNOL frame 5709 may be viewed by selecting FNOL tab 5703. FNOL frame 5703 includes free form entry text boxes for entering information relating to the accident. For example, the information shown in the FNOL data frame is similar to that shown in Claim Data frame 4225 in FIG. 42.

Figure 58:
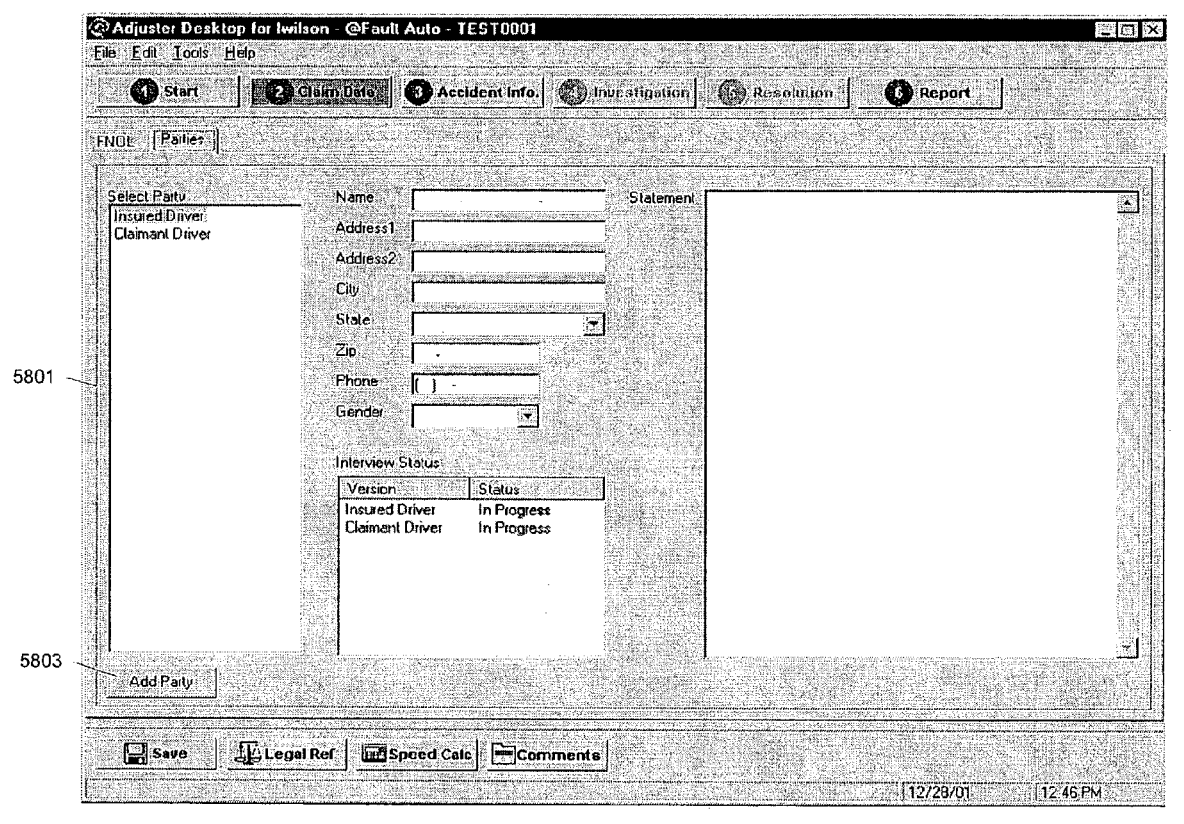
Figure 59:
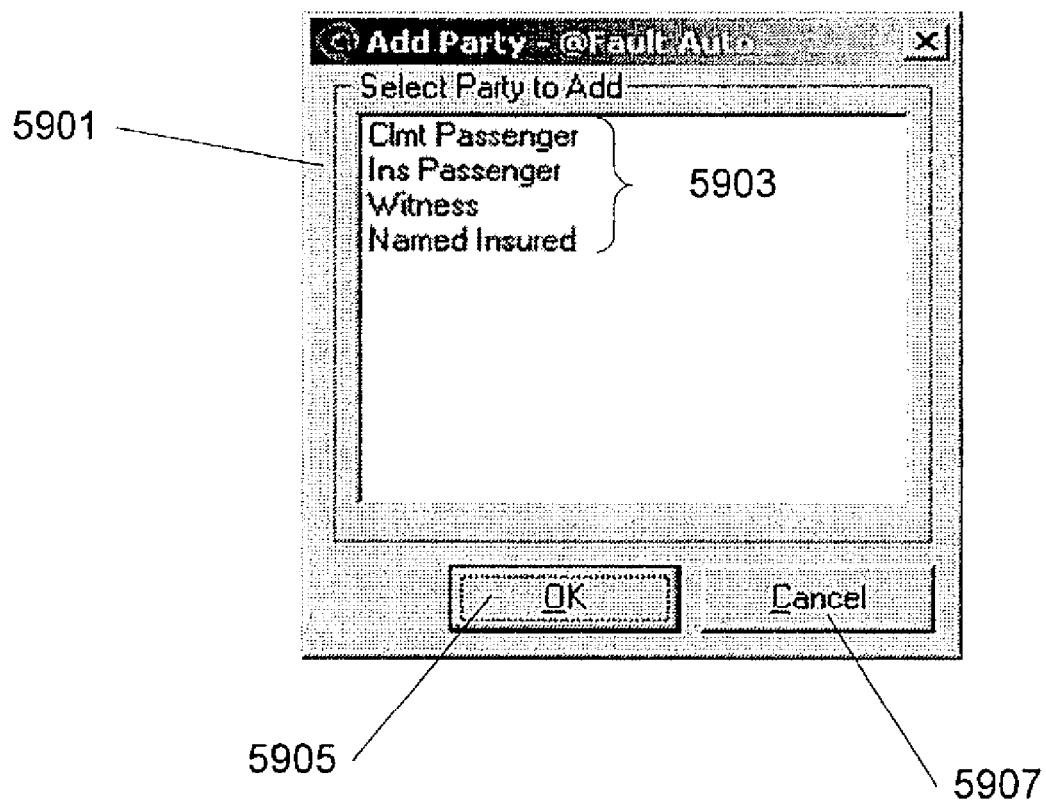
FIG. 59 depicts a screen shot of an embodiment of an Add Party pop-up window of a graphical user interface.

FIG. 58 illustrates a screen shot of an embodiment of Claim Data frame 5701, similar to FIG. 45, which depicts Parties frame 5801. The Parties frame may be viewed by selecting Parties tab 5705 in FIG. 57. The Parties frame includes a number of free form entry text boxes for entering information concerning parties involved in an accident. The information is similar to that that shown in data display frame 4250 in FIG. 45. The Parties frame also includes Add Party Selection button 5803. When a user selects the Add Party Selection button, Add Party pop-up window 5901 depicted in FIG. 59 may be displayed. The Add Party pop-up window may include additional parties 5903 that a user may add to the liability analysis. The additional parties may include, for example, a claimant passenger, an insured passenger, a witness, or a named insured. A user may select one or more additional parties and select OK button 5905 to add the one or more parties. If a user selects Cancel button 5907, no parties may be added.

Figure 60:
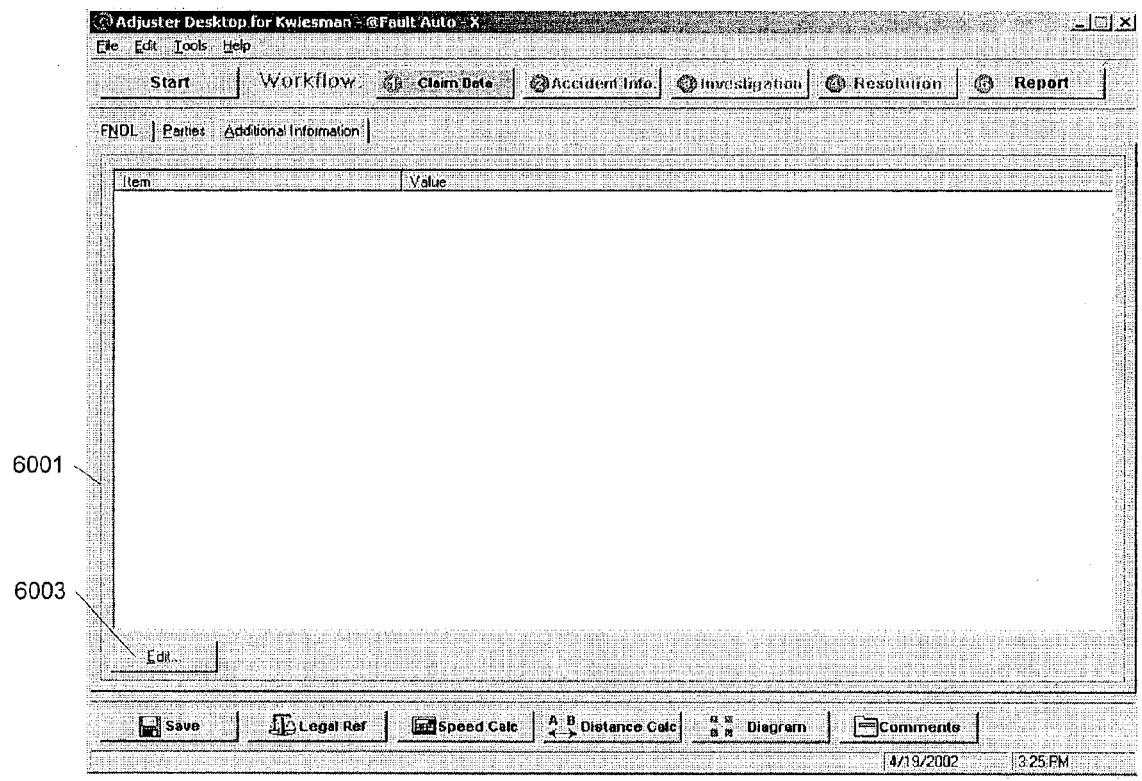
FIG. 60 depicts a screen shot of an embodiment of a claim data frame of a graphical user interface.

FIG. 60 illustrates a screen shot of an embodiment of Claim Data frame 5701, which depicts Additional Information frame 6001. The Additional Information frame may be viewed by selecting Additional Information tab 5707. As described in reference to FIG. 44, Additional information frame 6001 may allow the user to enter a description of the accident in a free-form text entry box. The user may enter text by selecting Edit push button 6003.

Figure 61:
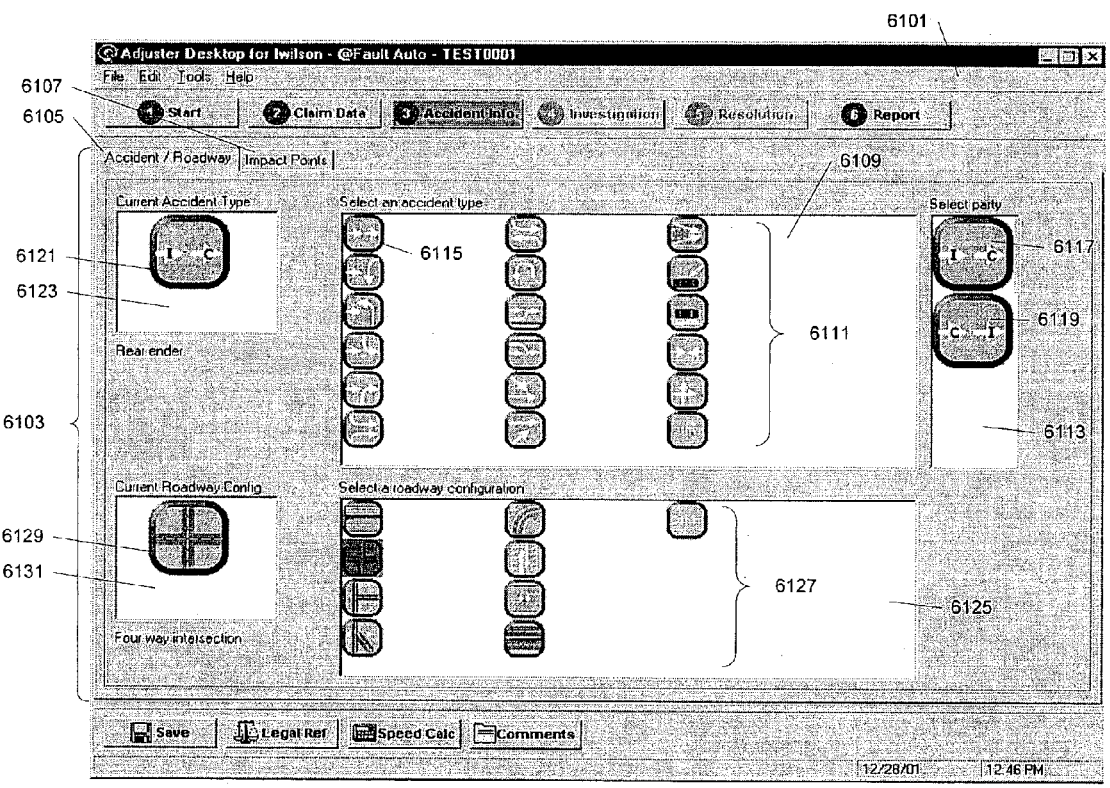
FIG. 61 depicts a screen shot of an embodiment of an Accident Information frame of a graphical user interface.

FIG. 61 illustrates a screen shot of an embodiment of Accident Info window 6101. Accident Info window 6001 allows users to enter information relating to roadway configuration, accident type, and impact points. Accident Info window 6101 may be accessed by selecting frame selection button 5607 in FIG. 56. Accident Info window 6101 may include data frames such as an Accident/Roadway data frame and an Impact Points data frame. Accident/Roadway data frame 6103 may be accessed by selecting Accident/Roadway tab 6105. Data frame 6103 may include several windows for viewing and selecting accident types and roadway configurations for a claimant and an insured. In one embodiment, window 6109 may allow a user to select an accident type. Window 6109 may include graphical images of accident type diagrams depicted in FIG. 4. A user may select one of the graphical images 6111 in window 6109 that corresponds to a desired accident type.

In some embodiments, window 6113 may allow a user to associate the claimant and insured with the vehicles in the accident types depicted in window 6109. Two graphical images of the selected accident type may be displayed in window 6113. One of the graphical images may include one arrow or diagram representing a vehicle labeled as a claimant and the other arrow or diagram labeled as an insured. The other graphical images may have the labels reversed. For example, accident type 1 displayed as image 6115 is the selected accident type in FIG. 61. Images 6117 and 6119 of accident type 1 with labeled arrows are displayed in window 6113. The user may then select one of the images. Graphical image 6121 of the selected accident type may be displayed in window 6123.

In an embodiment, window 6125 may allow a user to select a roadway configuration. Window 6125 may include graphical images of roadway configuration diagrams depicted in FIG. 5. A user may select one of the graphical images 6127 in window 6125 that corresponds to a roadway configuration. Graphical image 6129 of the selected roadway configuration may be displayed in window 6131.

Figure 62:
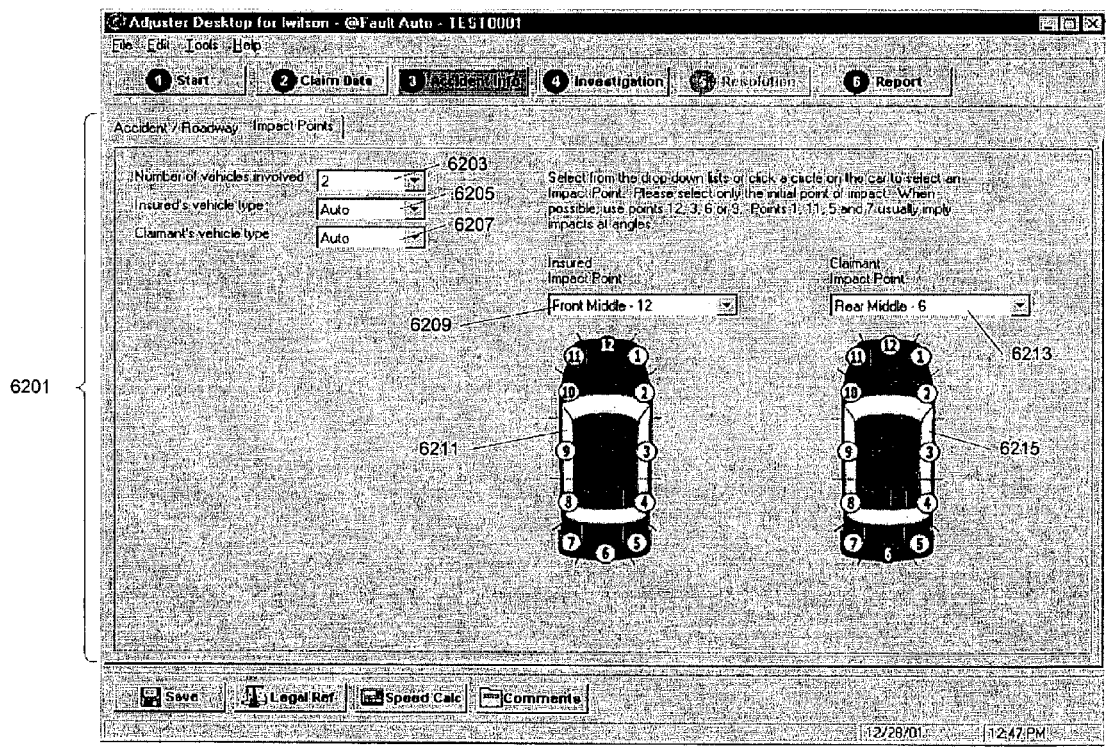
FIG. 62 depicts a screen shot of an embodiment of an impact points data frame of a graphical user interface.

FIG. 62 illustrates a screen shot of impact points data frame 6201 that is similar to FIG. 49. Impact points data frame 6201 may be accessed by selecting Impact Points tab 6107. Data frame 6201 may include drop down menus (e.g., 6203, 6205, 6207) for selecting the number and types of vehicles involved in an accident. FIG. 62 may also include graphical images 6211 and 6215 for selecting impact points of the insured and claimant vehicles. Graphical images 6211 and 6215 may include impact points labeled in a manner similar to FIG. 8a. Drop down menus 6209 and 6213 may allow a user to select the impact points for the insured and the claimant.

A number of details relating to an accident may be important for assessing liability in an accident. Information relating to an accident is typically collected during the course of an accident investigation. An insurance adjuster may obtain information relating to an accident from a number of sources. An embodiment of a method of estimating liability for an accident using a computer system may include generating one or more questions relating to an accident. A user may provide one or more sets of answers corresponding to the one or more questions. A set of answers may include answers to a question obtained from one or more sources. For example, the one or more sources may include an insurance adjuster or user, an insured, a claimant, witnesses, passengers, a police report, physical evidence, a weather report, and an accident reconstruction report. The method may further include estimating the effect of at least one factor on liability using at least one answer.

In one embodiment, a question may be generated on one or more topics relating to the accident. For example, topics may include traffic control, right of way, environment, roadway characteristics, driver action, driver condition, and vehicle equipment. A user may select an answer from the set of answers obtained from the one or more sources. In an embodiment, selecting an answer from the set of answers may include identifying inconsistencies in the answers obtained from two or more sources and selecting the most reliable answer. The selected answer may correspond to one of the sources that supplied the answer. In one embodiment, the user may select the answer supplied by the user.

Figure 63A:
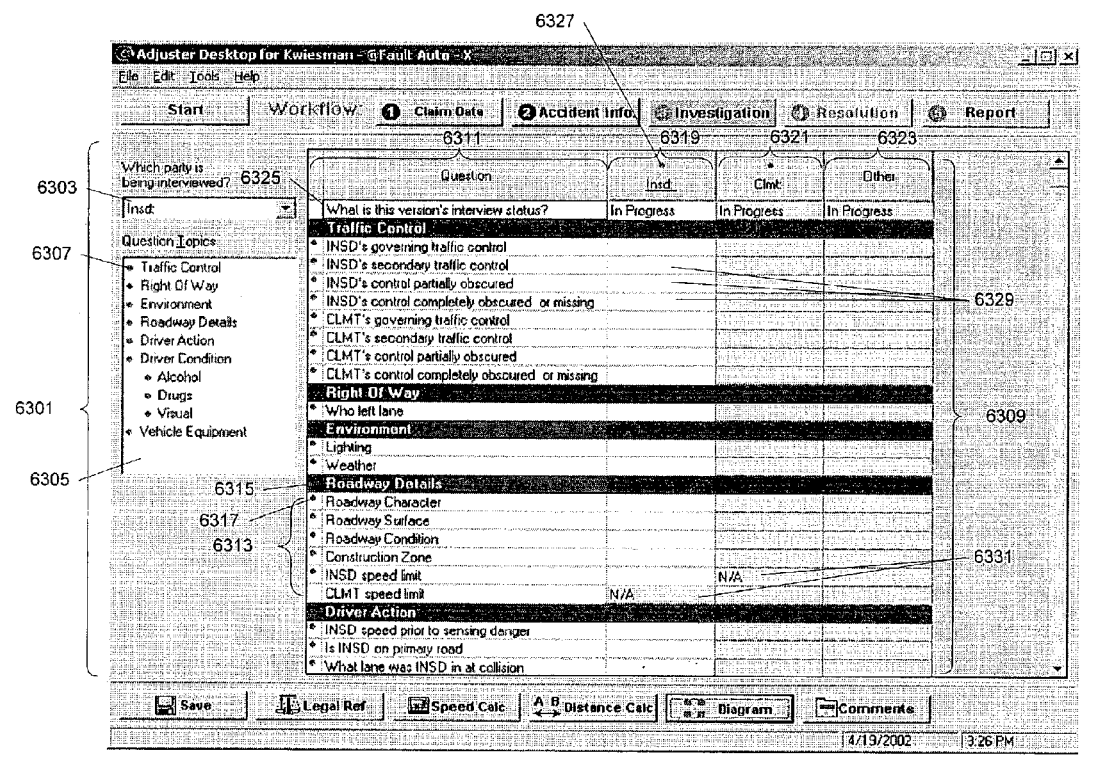

FIG. 63a illustrates an embodiment of Investigation window 6301 that may be displayed if a user selects Investigation frame selection button 5609 in controls frame 5601. FIG. 63 may include pull down menu 6303 for selecting the source from which information is obtained. The source from which information is obtained may be referred to as the "version party." A "subject party" refers to the party about which a question is asked. A subject party may be either the insured or the claimant. For example, an insured is the subject party in a question that asks whether the insured consumed alcohol prior to an accident. A subject party passenger refers to a passenger in the vehicle of a subject party. The Topic selection area 6305 may include a list of topics relating to the accident. A user may select a topic to view a list of questions relating to the topic. In one embodiment, an indicator, for example, indicator 6307, may appear adjacent to the text of a topic in area 6305 when all answers have been provided to the questions corresponding to the topic.

In one embodiment, window 6301 includes question and answer area 6309 for displaying questions and entering answers. Column 6311 includes questions corresponding to topics listed in area 6305. For example, questions 6313 relating to Roadway Details are listed under label 6315. Roadway Details include roadway characteristics that are discussed herein. In one embodiment, an indicator such as indicator 6317 may appear adjacent to a question to indicate that an answer has not been provided for a question. Area 6309 may further include columns 6319, 6321, and 6323 for entering answers obtained from sources to the questions in column 6311. For example, a user may select column 6319 to enter answers to questions obtained from the insured. Area 6309 may include row 6325 for indicating the status of the investigation with respect to a particular source. For example, if an adjuster has obtained all answers that a source is able to provide, the investigation is complete with respect to that source. However, if an adjuster may be able to obtain additional answers from a source, then the investigation may be in progress. In an embodiment, an indicator such as indicator 6327 may appear in a column to indicate that one or more answers have not been obtained from a source. Answers to questions may be entered into data entry fields 6329. Data entry fields 6329 may be free form entry text boxes. Alternatively, data entry fields 6329 may be pull down menus that may include two or more answers to a question. In some embodiments, a user may be inhibited from entering an answer in a data entry field for a particular question and source, for example, data entry fields 6331. "N/A" appears in data entry fields 6331 to indicate that a user may not enter an answer.

In certain embodiments, at least one answer to a question may be associated with a set of additional questions. The set of additional questions may be generated by the computer system when the at least one answer is selected by a user. The user may then provide a set of answers corresponding to the set of additional questions to the computer system. The method may further include using at least one answer to estimate the effect of a factor on liability in the accident.

In some embodiments, the set of additional questions generated may depend on the source of the answer. For example, the set of additional questions generated when the version party is the same as the subject party may be different from the additional questions generated when the version party is not the same as the subject party.

Figure 63B:
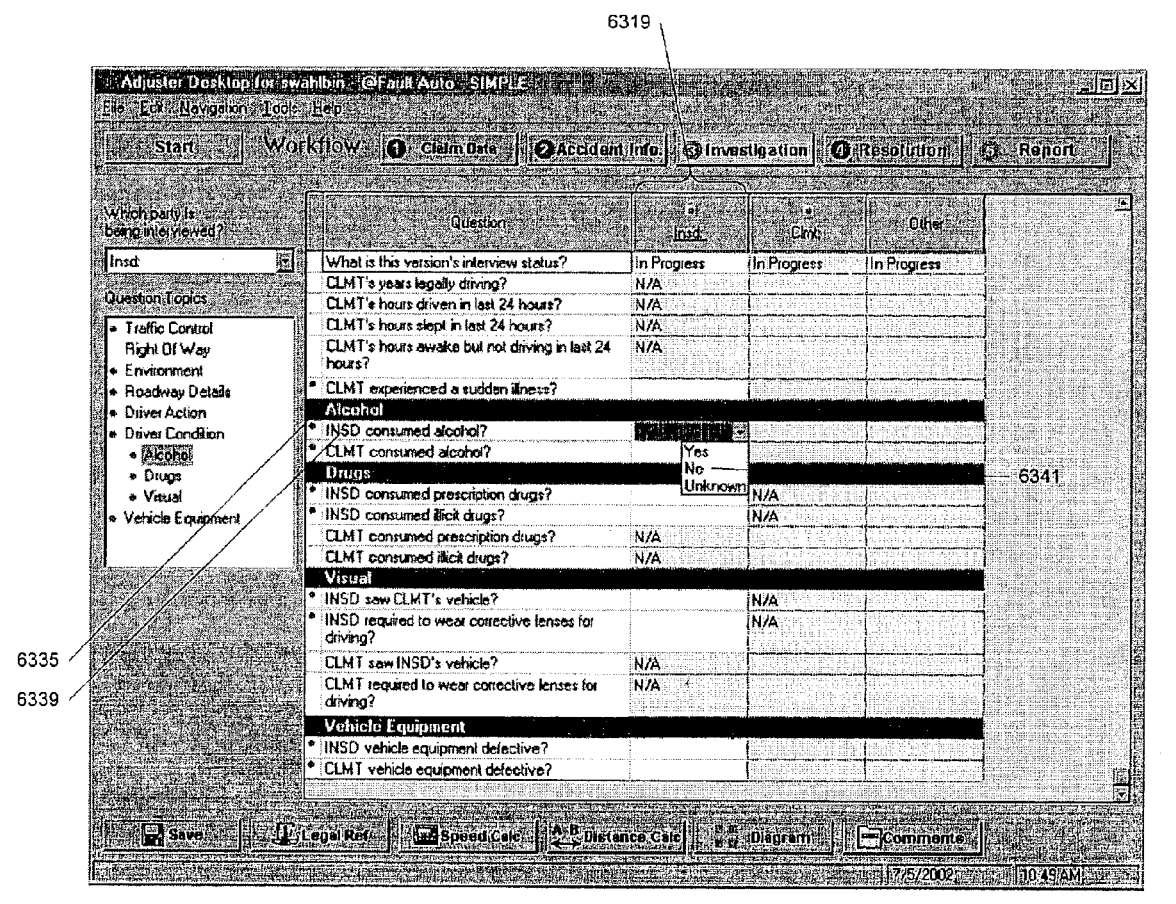

FIG. 63b is a screenshot that depicts an embodiment of Investigation Window 6301. In FIG. 63b, Column 6319 is selected for answering questions obtained from the insured. The screenshot also illustrates answering questions relating to the alcohol topic under label 6335. Question 6339, "INSD consumed alcohol?" asks the insured whether he/she consumed alcohol prior to the accident. Pull down menu 6341 illustrates the set of answers to question 6339: "Yes", "No", and "Unknown."

Figure 63C:
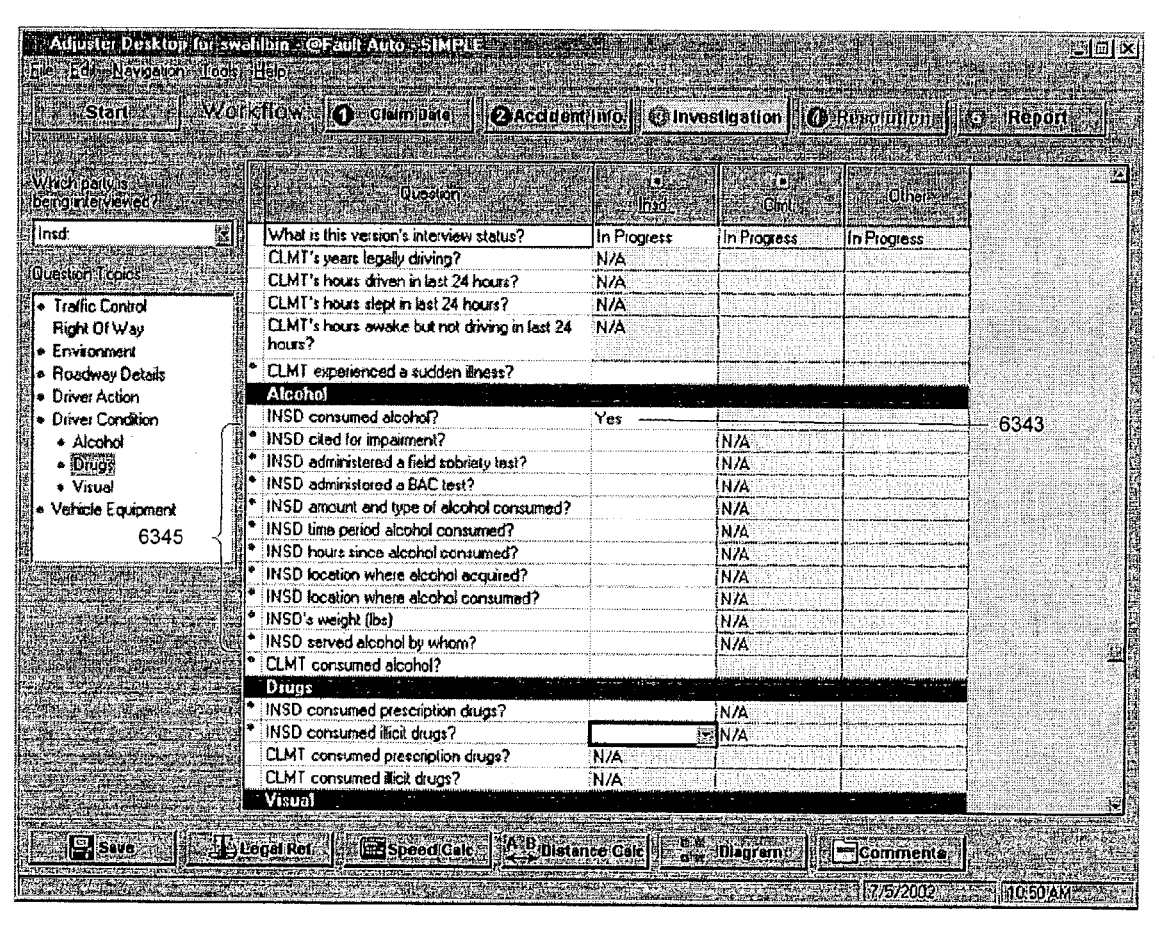

FIG. 63c is a screenshot that depicts an embodiment of Investigation Window 6301 with an answer to question 6339 selected. Data entry field 6343 illustrates that "Yes" is the selected answer. The answer "Yes" to question 6339 is associated with a set of additional questions. Set of additional questions 6345 are generated under question 6339 as shown in FIG. 63c.

Figure 63D:
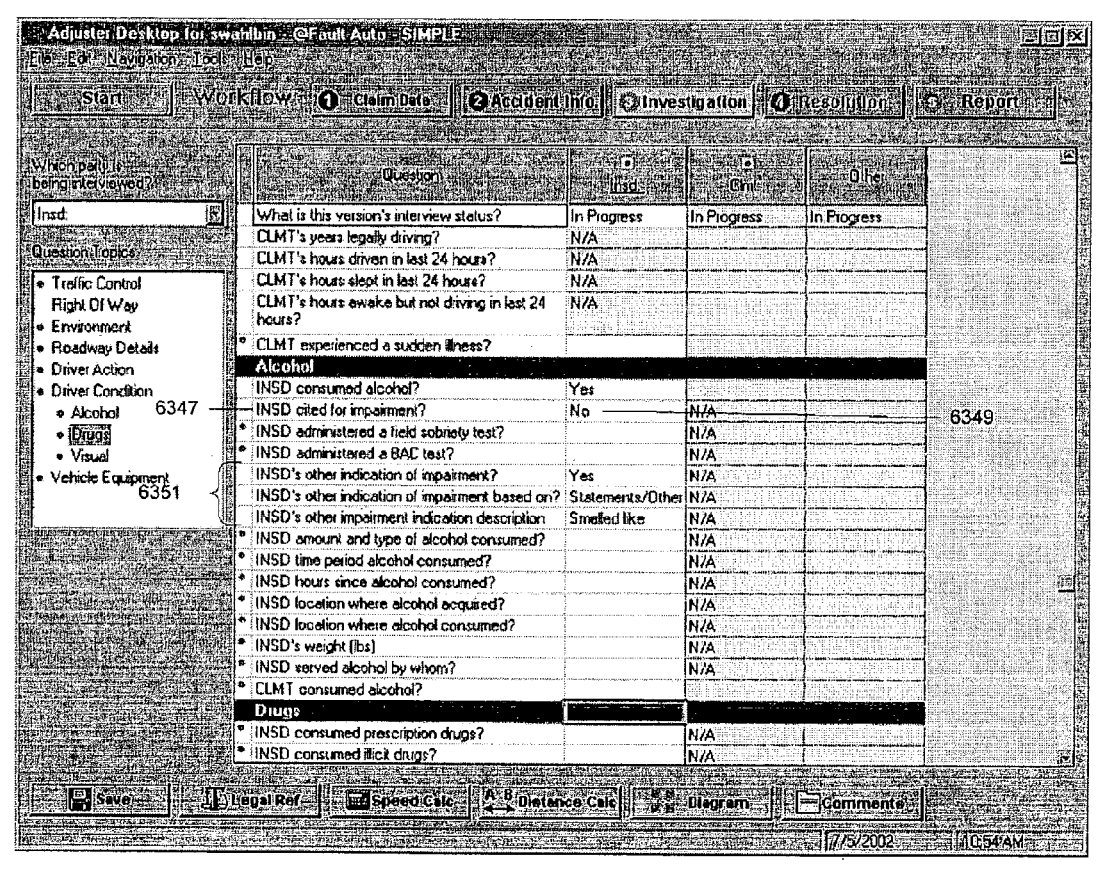

FIG. 63d is a screenshot that depicts an embodiment of Investigation Window 6301 with answers to some of the set of additional questions 6345 selected. For example, data entry field 6349 illustrates that "No" is the selected answer for question 6347. The answer "No" to question 6347 is associated with set of additional questions 6351, which are generated in response to the selected answer.

Figure 63E:
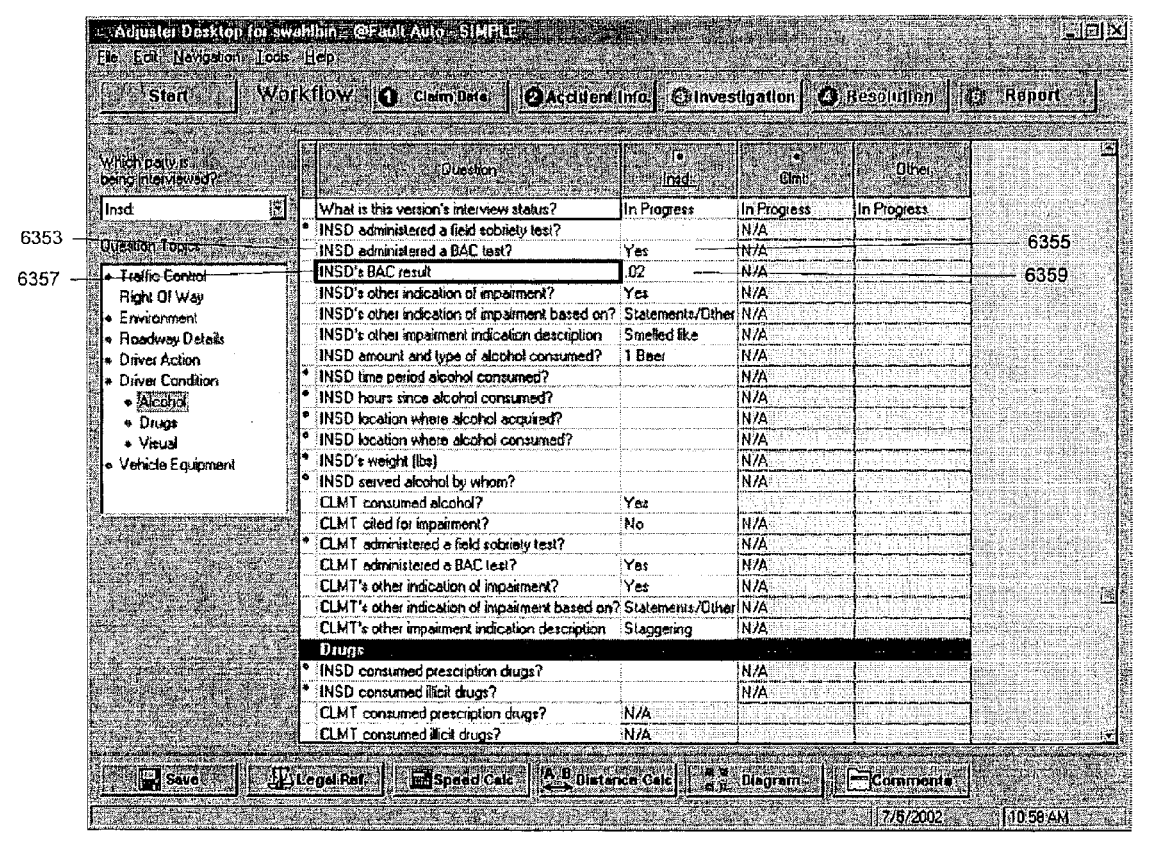

FIG. 63e is a screenshot that depicts an embodiment of Investigation Window 6301. FIG. 63e depicts a selected answer in data entry field 6355, "Yes" to question 6353, "INSD administered BAC test?." The selected answer "Yes" is associated with additional question 6357, "INSD's BAC Result", that was generated due to the selection of "Yes." An answer of "0.02" depicted in data entry field 6359 is selected for question 6357. The selected answer "0.02" did not generate additional questions.

Figure 63F:
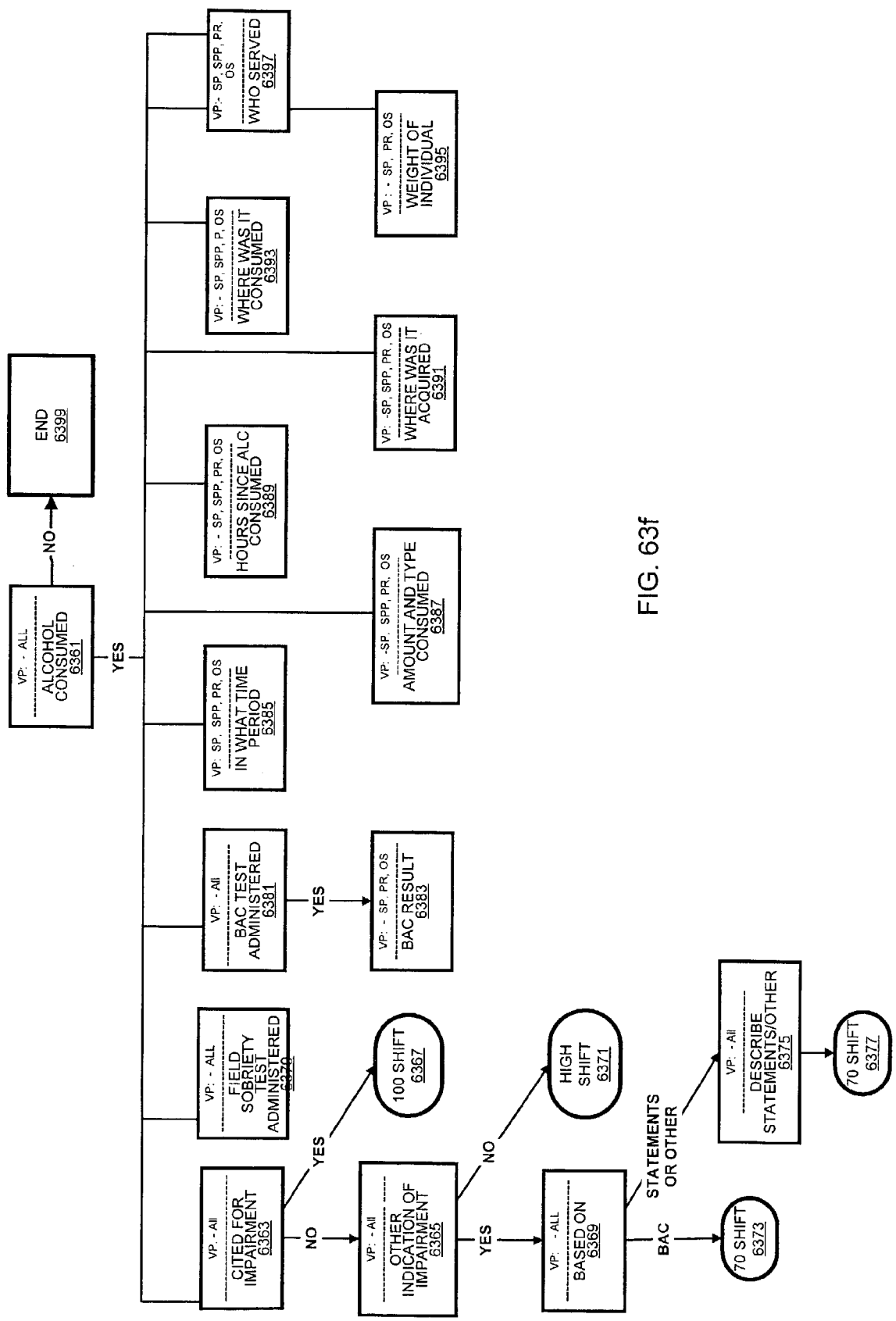
FIGS. 63$a$-$e$ depict embodiments of an Investigation window of a graphical user interface.

The set of additional questions generated by selecting answers may be depicted by a flow chart. FIG. 63f depicts a flow chart of the questions generated relating to the Alcohol topic. Each of the steps in the flow chart represents a question that may be displayed. Step 6361 represents the "Alcohol Consumed" question. "VP", which refers to version party, corresponds to the sources that may be asked a particular question. The one or more sources may include, for example, subject party (SP), subject party passenger (SPP), police report (PR), and other party (OP). Other party refers to the party other than the subject party that is involved in an accident. For example, if the version party is the insured, the other party is the claimant. The "Alcohol Consumed" question asks whether a subject party consumed alcohol prior to an accident. Step 6361 indicates that "Alcohol Consumed" may be asked of all sources: SP, SPP, PR, and OP. If the answer to the "Alcohol Consumed" question is "No", then no further questions are generated, as shown at step 6399. If the answer to the "Alcohol Consumed" question is "Yes", then a set of additional questions may be generated, as shown by steps, 6363, 6379, 6381, 6385, 6387, 6389, 6391, 6393, 6395, and 6397. The questions at steps 6363, 6365, 6369, and 6375 may be generated and asked of all sources.

If the selected answer to the question in step 6363, "Cited for impairment", is "Yes", then no further questions are generated and a 100 percent shift in liability to the subject party may be made, as shown by step 6367. If the selected answer is "No", then step 6365 indicates that the question "Other Indication of Impairment" may be asked of all sources. If the selected answer the question is "No", then a high shift in liability is made to the subject party, a shown by step 6371. If the answer to the question is "Yes", then step 6369 illustrates that the question of what "Other Indication of Impairment" was "Based On" may be generated. Step 6373 indicates that a 70 percent shift in liability may be made to the subject party if the other indication of impairment was based on BAC (blood alcohol content). If the other indication of impairment was based on "Statements or Other", then the version party is asked to "Describe Statements/Other" as shown by step 6375. Step 6377 indicates that a 70 percent shift in liability may then be made to the subject party.

Additionally, steps 6379, 6381, 6385, 6389, 6393, and 6397 include questions that are generated if the selected answer to the "Alcohol Consumed" question is "Yes." Step 6379 indicates that all sources may be asked if a "Field Sobriety Test was Administered." Step 6381 indicates that all sources may be asked if a "BAC Test was Administered." If the selected answer is "Yes", then the "BAC Result" question is generated for the subject party, police report, and other source. Step 6385 indicates that the question "In What Time Period" was "Alcohol Consumed" is generated for the subject party, subject party passenger, police report, and other source. Step 6387 indicates that the question of the amount and type of alcohol consumed is generated for the subject party, subject party passenger, police report, and other source. Step 6389 indicates that the question regarding the time since alcohol was consumed is generated for the subject party, subject party passenger, police report, and other source. Step 6391 indicates that the question of where the alcohol was acquired is generated for the subject party, subject party passenger, police report, and other source. Step 6393 indicates that a question of where the alcohol was consumed is generated for the subject party, subject party passenger, police report, and other source. Step 6395 indicates that the weight of the subject party is asked of the subject party, police report, and the other source. Step 6397 indicates that the question of who served the alcohol is asked of the subject party, subject party passenger, police report, and the other source.

Figure 64:
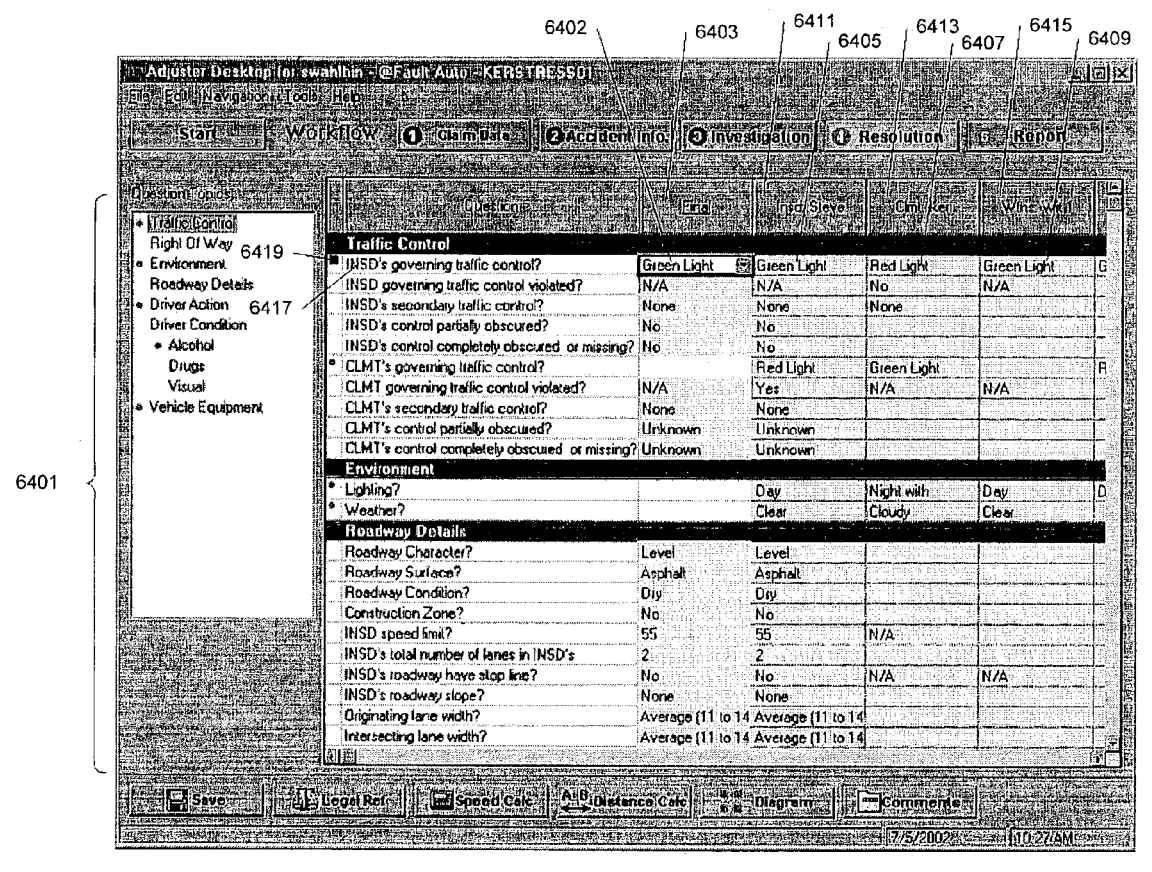

FIG. 64 illustrates an embodiment of Resolution window 6401 that may be displayed if a user selects Investigation frame selection button 5611 in controls frame 5601. A user may use Window 6401 to select an answer from the set of answers provided by two or more sources for use in estimating liability in an accident. Data entry field 6402 may be a pull down menu that includes answers provided by the sources. A user may resolve inconsistencies in a set of answers provided by the sources. For example, a user may select one of the answers. Window 6401 may include column 6403, entitled "Final", that includes answers to be used for estimating liability. Inconsistencies between answers from different sources may be resolved in column 6403. For example, as illustrated by data fields 6405, 6407, and 6409, the sources corresponding to columns 6411 and 6415 have selected answers inconsistent with the selected answer of the source in column 6413 for question 6417. Indicator 6419 indicates the presence of an inconsistency among the answers to question 6417. Data entry field 6402 indicates that the selected answer to question 6417 for use in estimating liability is "Green Light." In some embodiments, a user may provide an answer for use in estimating liability different from the answers provided by the sources.

Figure 65A:
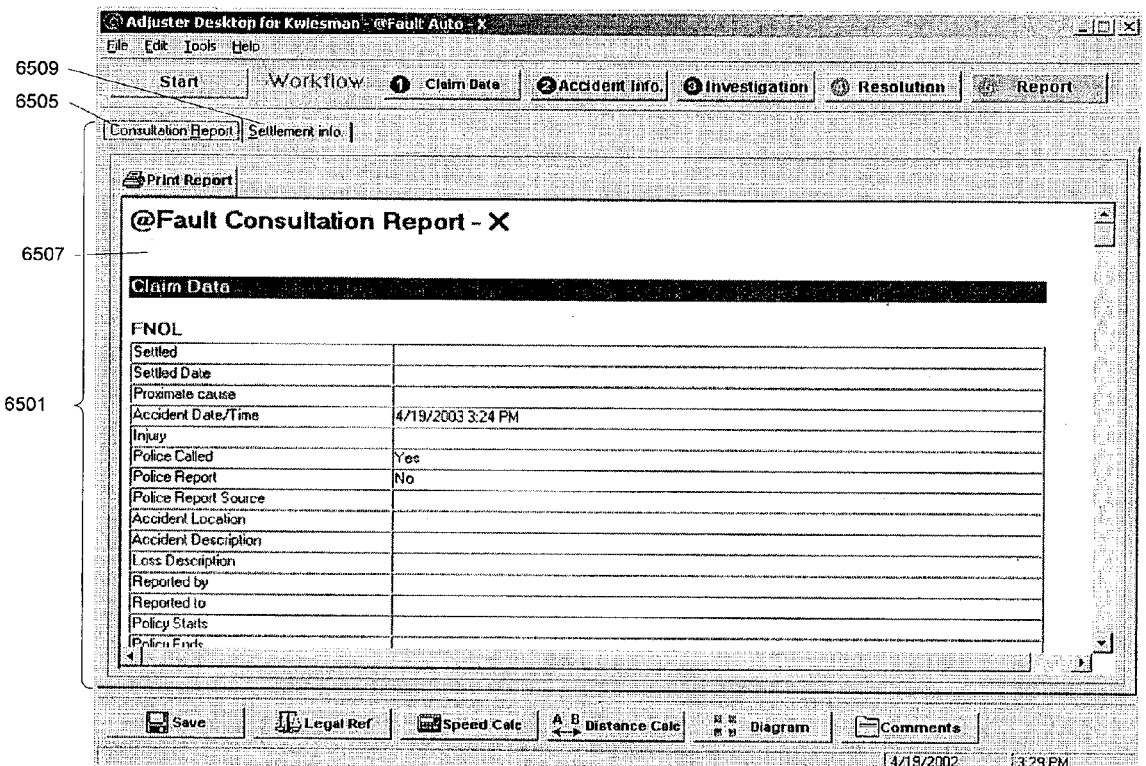
FIG. 65$a$ depicts a screen shot of an embodiment of a report frame of a graphical user interface.

FIG. 65a illustrates a screen shot of an embodiment of Report window 6501. Report window 6501 may be accessed by selecting Report frame selection button 5611 in FIG. 56. The Report window may include several data frames such as Consultation Report frame and Settlement info. frame. A data frame in the Report window may be viewed by selecting an appropriate tab. For example, Consultation Report frame 6507 may be displayed by selecting tab 6505. Frame 6507 may include a summary of information relating to the accident and liability assessment. The summary may include claim data, accident information, right of way, and information obtained from the accident investigation depicted in FIGS. 63a-e. The summary may also include recommended ranges of liability for the insured and claimant.

In addition, the summary may include a list of questions from Investigation Window 6301 that have conflicting answers, unanswered question, and unknown questions. An "unknown question" is a question that was not answered in the Investigation window because the answer was not known by the source interviewed. FIG. 65b depicts an embodiment of a report that includes a list of questions that have conflicting answers from sources. Questions that have conflicting answers are listed in column 6511. Column 6513 and 6515 indicate whether a conflict has been resolved or unresolved. Conflicts may be resolved in column 6403 in FIG. 64. Indicator 6517 in column 6513 indicates that question 6519 has been resolved.

FIG. 65c depicts a table with unanswered and unknown questions for several sources. Column 6521 includes a list of questions with unanswered and unknown questions for one or more sources. Columns 6523, 6525, 6527, and 6529 correspond to columns 6403, 6411, 6413, and 6415 in FIG. 64. For example, indicator 6531 indicates that question 6535 was unanswered from the source corresponding to column 6529. Additionally, indicator 6533 indicates that question 6537 is an unknown question for the source corresponding to column 6525.

Figure 66:
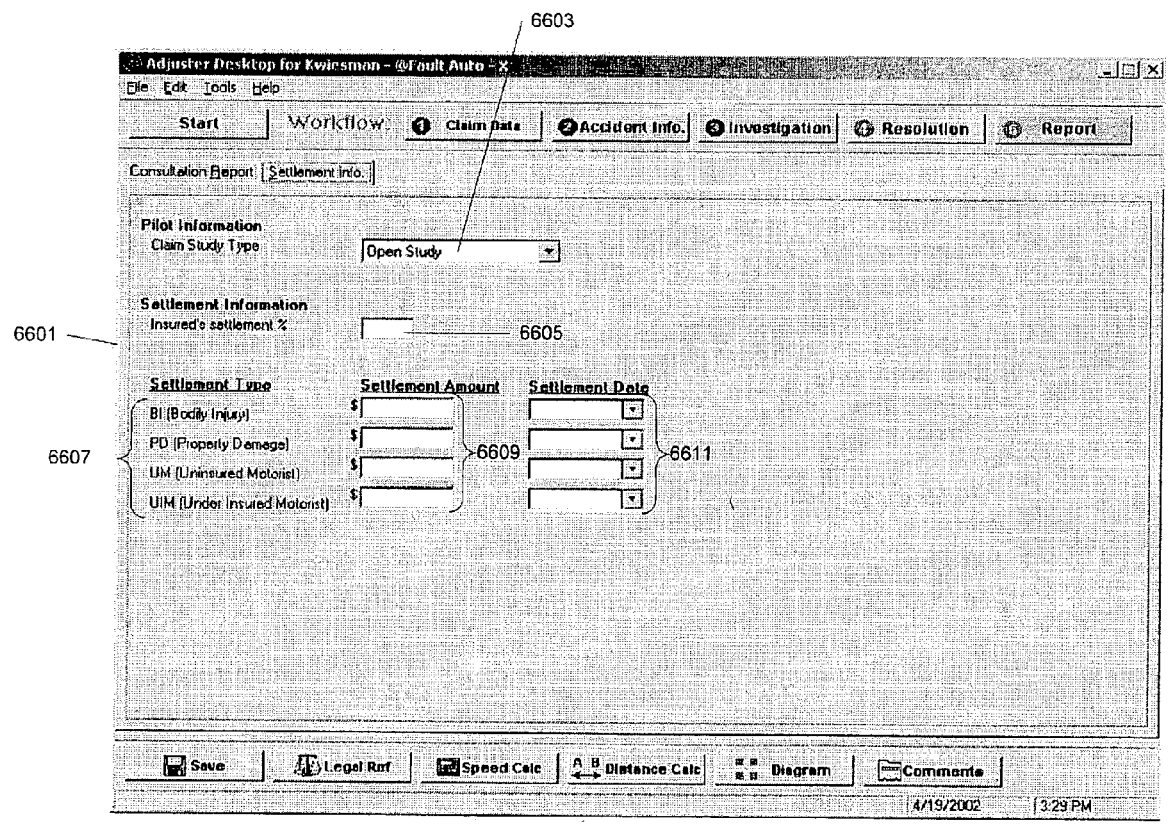
FIG. 66 depicts a screen shot of an embodiment of report frame of a graphical user interface.

FIG. 66 illustrates a screen shot of an embodiment of Report window 6501 with Settlement Info. data frame 6601 displayed. Settlement Info. data frame 6601 may be displayed by selecting tab 6509. Frame 6601 may be used to enter information relating to a settlement between a claimant and an insured. Frame 6601 may include pull down menu 6603 for selecting a claim study type. The liability of the insured in a settlement may be entered into free form entry text box 6605. In another embodiment, a dollar amount of a settlement for one or more types of settlement types may be entered. As shown by text 6607, settlement types may include, but are not limited to, bodily injury, property damage, uninsured motorist, and under insured motorist. Settlement amounts for the one or more settlement types may be entered in free form entry text boxes 6609. The date of the settlement of the one or more settlement types may be entered into pull down menus 6611.

Figure 67:
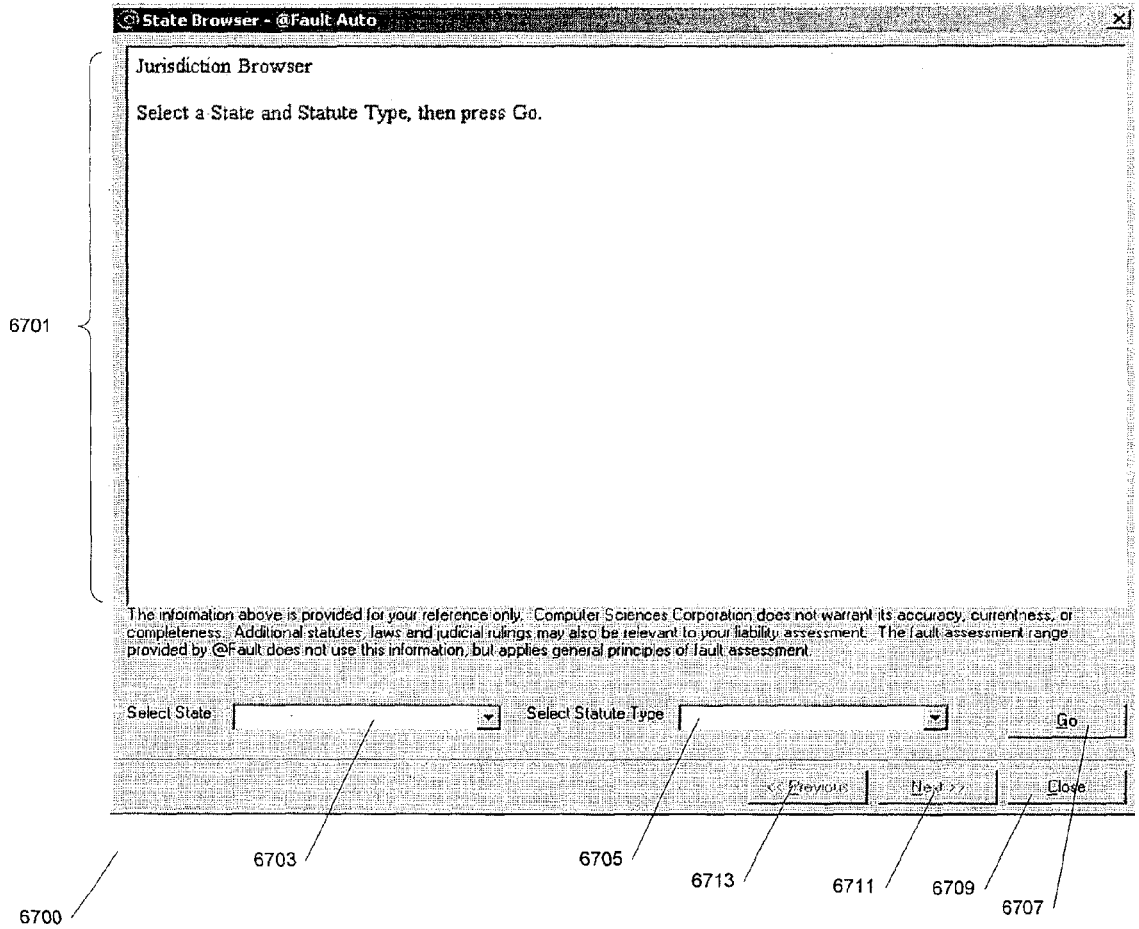
FIG. 67 depicts a screen shot of an embodiment of a Legal reference window of a graphical user interface.

FIG. 67 is an illustration of a screen shot of Legal Reference window 6700 which may be displayed by selecting frame selection button 5625 in FIG. 56. Legal Reference window 6700 allows a user to view statutes relating to liability assessment by state. A state may be selected using pull down menu 6703. The type of statute may be selected using pull down menu 6705. After selecting the state and type of statute a user may select push button 6707 to display the state statute of interest. The statute is displayed in frame 6701. A user may advance through the selected statute by selecting push button 6711. Alternatively, the user may display a previous frame of the selected statute by selecting push button 6713. A user may close Legal Reference window 6700 by selecting push button 6709.

Figure 68:
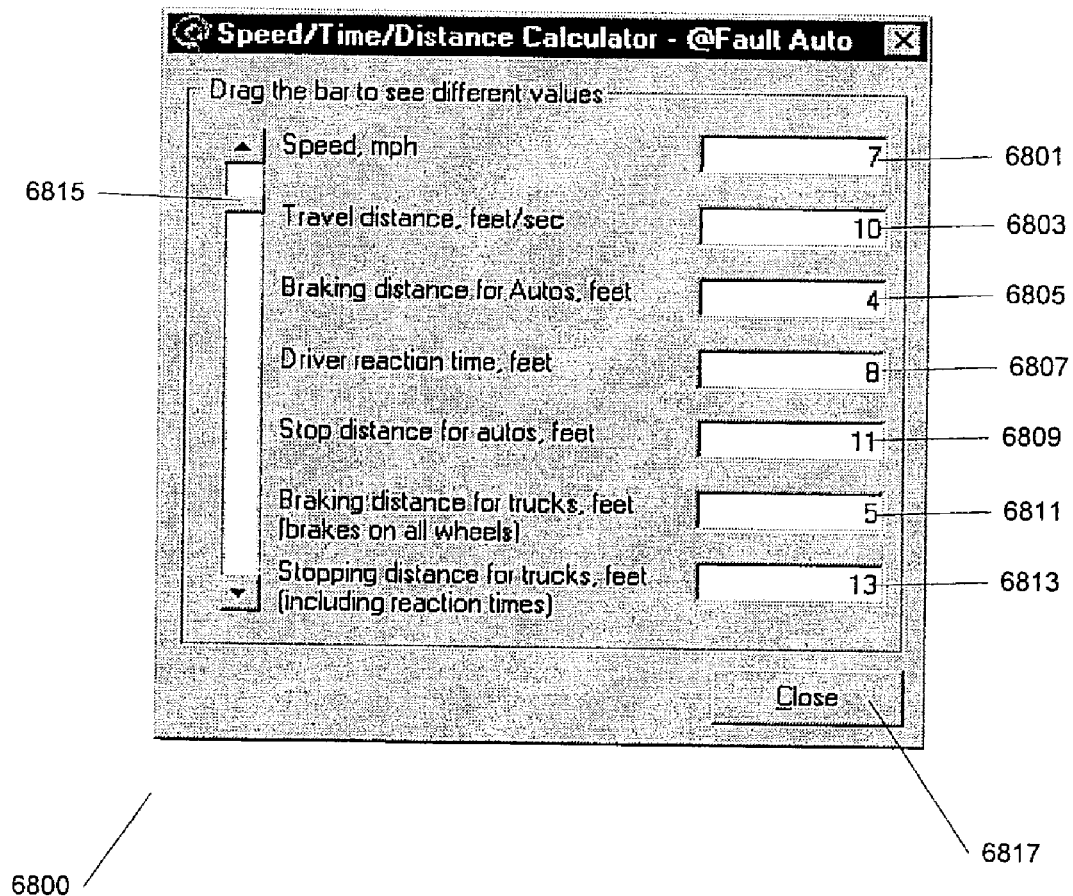
FIG. 68 depicts a screen shot of an embodiment of Speed/Time/Distance Calculator window of a graphical user interface.

FIG. 68 illustrates a screen shot of an embodiment of Speed/Time/Distance Calculator window 6800 which may be displayed by selecting frame selection button 5627. Window 6800 may include text boxes 6801 for speed in miles per hour, 6803 for travel distance in feet/sec, 6805 for braking distance for autos in feet, 6807 distance traveled during driver reaction time in feet, 6809 for stopping distance for autos in feet, 6811 for braking distance for trucks in feet, and 6813 for stopping distance for trucks in feet including reaction time. In one embodiment, text box 6801 may be a text entry box and text boxes 6803, 6805, 6807, 6809, 6811, and 6813 may be disabled or read-only. Values in text boxes 6803, 6805, 6807, 6809, 6811, and 6813 may be calculated using the value in text box 6801. In other embodiments, one of the text boxes 6803, 6805, 6807, 6809, 6811, or 6813 may be text entry boxes and the values in the other text boxes including text box 6801 may be calculated from the value in the text entry box.

In one embodiment, window 6800 may include increment/decrement bar 6815. A user may drag bar 6815 downward to increment the speed in text box 6801 or drag the bar upward to decrement the speed in text box 6801. The values in text boxes 6803, 6805, 6807, 6809, 6811, and 6813 may change in response to an increment or decrement in speed. A user may close window 6800 by selecting push button 6817.

Figure 69:
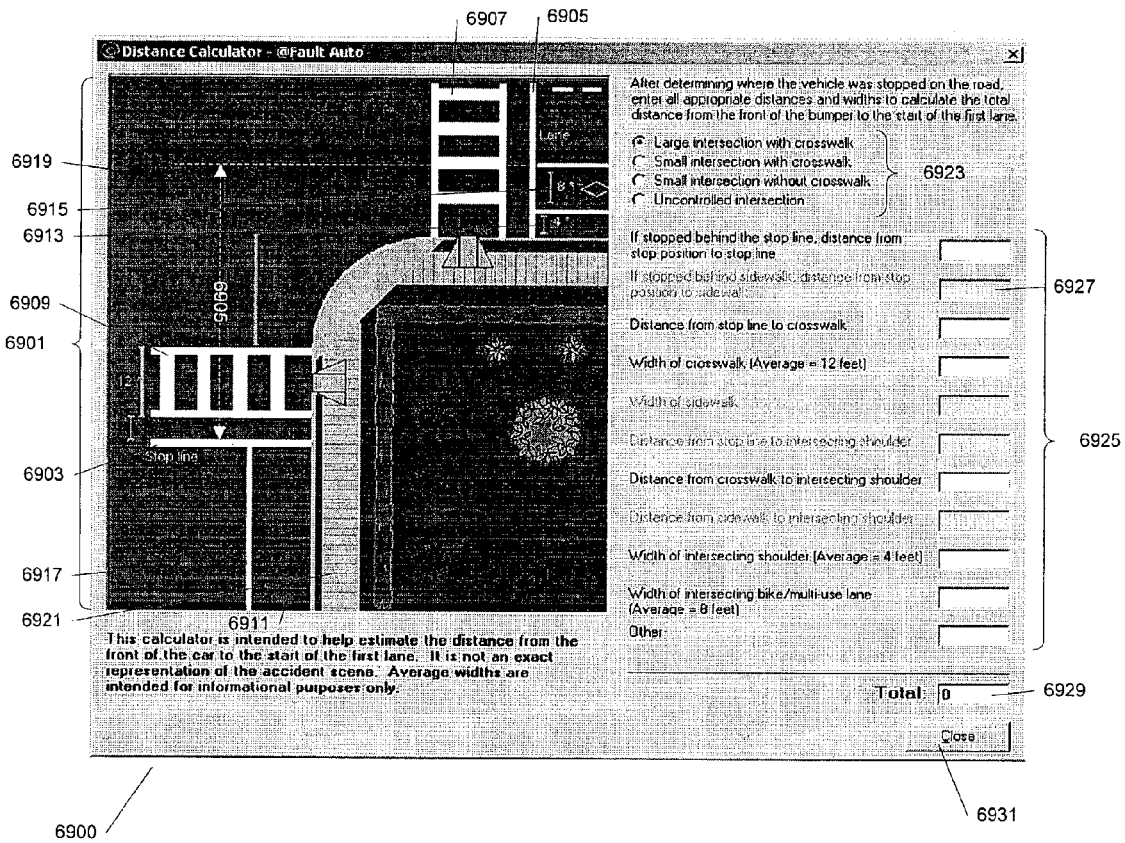
FIG. 69 depicts a screen shot of an embodiment of a Distance Calculator window of a graphical user interface.

FIG. 69 illustrates a screen shot of Distance Calculator window 6900 according to one embodiment. Window 6900 may be displayed by selecting frame selection button 5629. Window 6900 may include graphical image 6901 that may depict an approximate representation of an accident scene. Window 6900 may be used to estimate a distance from the front of a vehicle at or near an intersection to the start of the first intersecting lane. For example, for a vehicle with its front at stop line 6903, window 6900 may calculate distance 6905. Image 6901 may include stop line 6903, intersecting stop line 6905, crosswalk 6909, intersecting crosswalk 6907, shoulder 6911, intersecting shoulder 6913, intersecting bicycle/multi-use lane 6915, lane 6917, intersecting lane 6919, and sidewalk 6921.

In one embodiment, the distance from the front of a vehicle to the start of a first intersecting lane may be determined for several types of intersections. For example, in FIG. 69, a user may select 6923 one of four types of intersections. A graphical image of the selected intersection may be displayed. For example, "Large intersection with crosswalk" is selected in FIG. 69 and is displayed as graphical image 6901. As FIG. 69 shows, a "Small intersection with crosswalk," a "Small intersection without crosswalk," and "Uncontrolled intersection" may be selected. In some embodiments, other types of intersections may be selected.

In certain embodiments, calculation of the distance from the front of a vehicle to the start of the first intersecting lane may require input of one or more intersection parameters. Intersection parameters may include, but are not limited to, a distance from the stop position to a stop line, a distance from a stop position to a sidewalk, a distance from a stop line to a crosswalk, a width of a crosswalk, a width of a sidewalk, a distance from a stop line to an intersecting shoulder, a distance from a crosswalk to an intersecting shoulder, a distance from a sidewalk to an intersecting shoulder, a width of an intersecting shoulder, and a width of an intersecting bike/multi-use lane. FIG. 69 includes free form entry text boxes 6925 for entering intersection parameters for use in calculating the distance from the front of a vehicle to the start of the first intersecting lane. One or more of the free form entry text boxes for the intersection parameters may be disabled if the corresponding intersection parameters may not be relevant to the type of intersection selected. For example, a distance from a stop position to sidewalk is not relevant for a large intersection with a crosswalk, therefore, text entry box 6927 is disabled. When the user enters the relevant intersection parameters into free form entry text boxes, the distance from the front of a vehicle to the start of the first intersecting lane may be calculated. The distance may be displayed in text box 6929. Window 6900 may be closed by selecting push button 6931.

Figure 70:
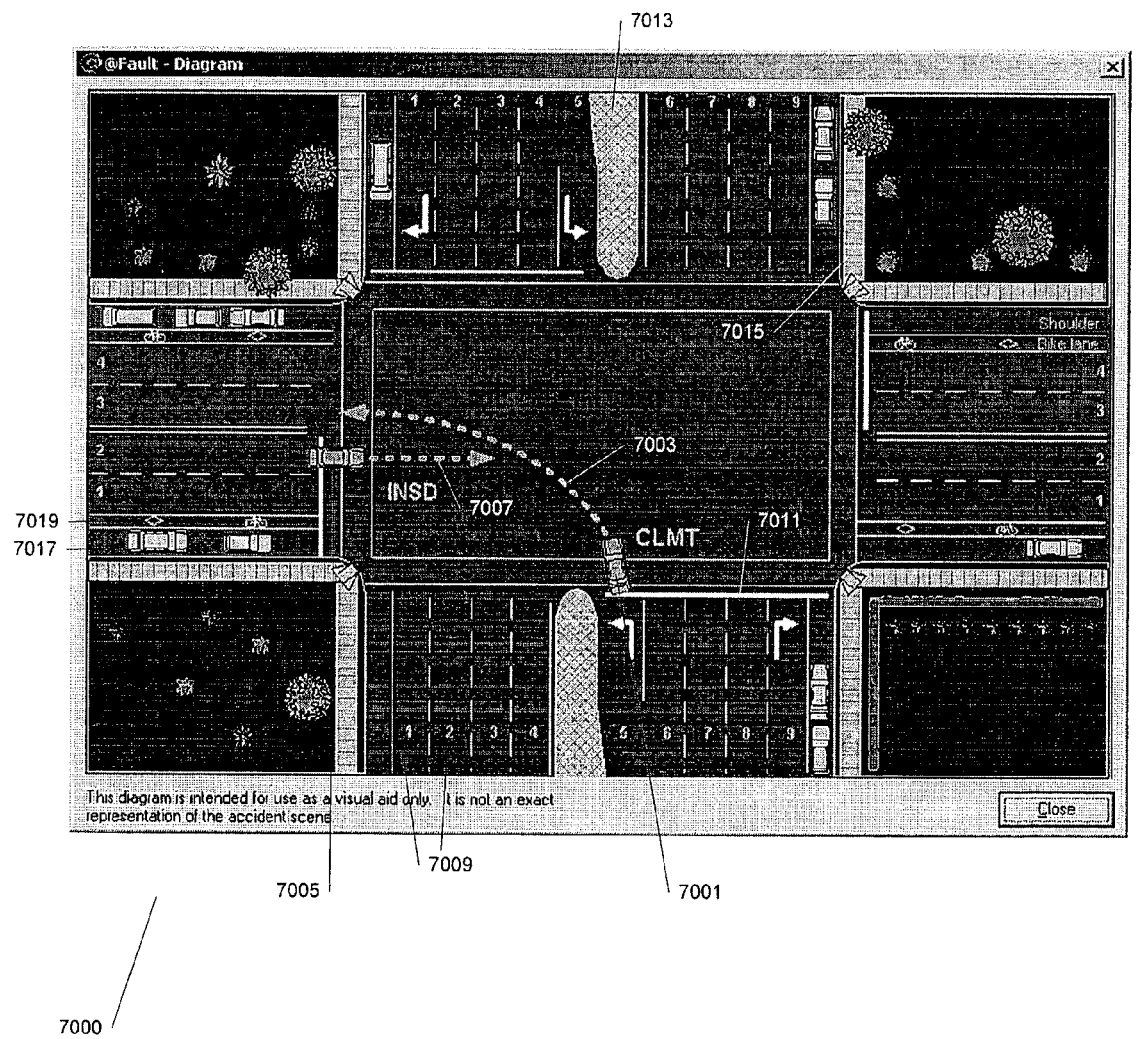
FIG. 70 depicts a screen shot of an embodiment of an Accident Scene window of a graphical user interface.
Figure 71:
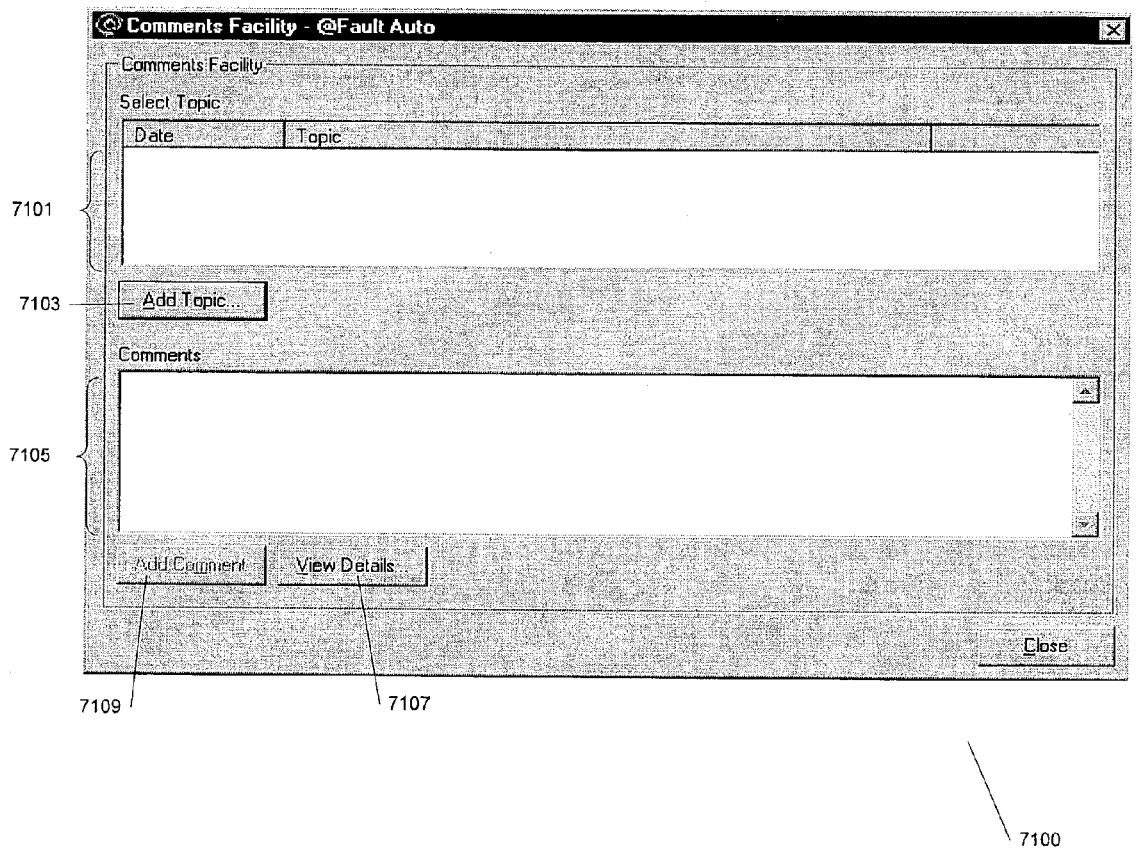
FIG. 71 depicts a screen shot of an embodiment of a Comments Facility window of a graphical user interface.

In certain embodiments, a graphical image of an accident scene may be depicted. The graphical image may be used as a visual aid in liability assessment. For example, the graphical image may be used in answering questions relating to roadway details or roadway characteristics in Investigation window 6501 shown in FIG. 65. In an embodiment, the roadway details or roadway characteristics may be used in a method of assessing liability using the speed and time and distance traveled by vehicles in an accident as depicted by the flow chart in FIG. 72. A graphical image may correspond to a particular combination of accident type and roadway configuration. FIG. 70 illustrates a screen shot of an embodiment of Accident Scene window 7000 for accident type 3 from FIG. 4 and roadway configuration B from accident type 5. Accident Scene window 7000 may be accessed by selecting frame selection button 5631 in FIG. 56. Accident Scene window 7000 may provide a user with an approximate representation of an accident scene corresponding to an accident type and roadway configuration combination. In one embodiment, Accident Scene window 7000 may depict diagrams of the insured and the claimant's vehicles and their trajectories. For example, diagram 7001 may represent claimant's vehicle and trajectory 7003 may correspond to the trajectory of the claimant vehicle. Similarly, diagram 7005 may represent an insured's vehicle and trajectory 7007 may represent the trajectory of the insured's vehicle. In addition, window 7000 may also include a number of roadway characteristics that may be common in the particular accident type and roadway configuration combination. For example, window 7000 depicts lanes 7009, stop line 7011, median 7013, sidewalk 7015, shoulder 7017, and multi-use lane 7019 may be depicted in window 7000 FIG. 71 illustrates a screen shot of an embodiment of Comments Facility window 7100. Comments Facility window 7100 may be accessed by selecting frame selection button 5633 in FIG. 56. In an embodiment, window 7100 may allow a user to enter comments relating to one or more topics relating to the accident and/or liability assessment. Select Topic text box 7101 may include a list of topics that correspond to comments that have previously been entered by a user. Add Topic push button 7103 may allow a user to create a new topic for comments. In addition, a user may select a comment from the list in text box 7101 to view the comments on a selected topic. Comments text box 7105 may display previously entered comments on a topic. To view a previously entered comment on a topic, a user may select View Details push button 7107. Alternatively, text box 7105 may be used to enter comments on a new topic or add to comments on an existing topic. A user may enter comments by selecting Add Comments push button 7109.

In one embodiment, the speed, time, and distance of vehicles involved in an accident may be used to assess the liability of a vehicle in an accident. For example, analysis of the trajectories of the vehicles may indicate whether a vehicle may have avoided an accident. In one embodiment, a method of using a computer system for assessing liability in a vehicle accident may include estimating a theoretical path of a reference vehicle. A "reference" or "timing" vehicle refers to a vehicle that is used to set one or more times during an accident. The method may also include estimating a theoretical path of a reacting vehicle. The "reacting" vehicle reacts to the danger of an accident with the reference vehicle. The opportunity of the reacting vehicle to avoid the accident may then be assessed. The method may further include assessing a contribution to liability to the reacting vehicle based on the opportunity of the reacting vehicle to avoid the accident.

Figure 72:
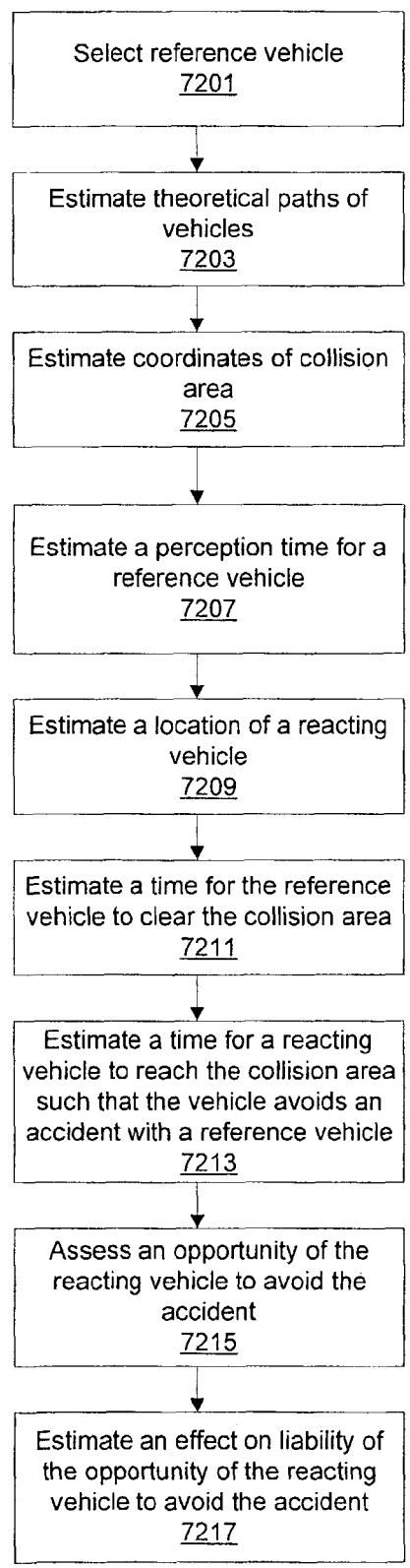
FIG. 72 depicts a flow chart of an embodiment of a method of estimating liability using the speed, time, and distance of vehicles in an accident.

An embodiment of a method of assessing liability using the speed, time, and distance of vehicles in an accident is depicted by the flow chart in FIG. 72. In step 7201, the method may include selecting a reference vehicle. The one or more times that the reference vehicle is used to set may include the starting time of the accident, a perception time, and the total time of the accident. At step 7203, theoretical paths of the vehicles in the accident may be estimated. A theoretical path for a vehicle may be estimated from a starting point of the vehicle and an intended end position of the vehicle. An intended end position refers to the position of a vehicle, past the location of the accident, that the vehicle may have been at had the accident not occurred. In some embodiments, a theoretical path may be approximated by a straight line for a vehicle traveling in substantially a straight trajectory. In other embodiments, a theoretical path may be approximated by a curve, such as an ellipse, for a turning vehicle. In addition, a collision area may be estimated using the theoretical paths of the vehicles at step 7205. A "collision area" refers to an area of the roadway where there is a high probability that vehicles may collide. The collision area includes positions that the reference vehicle and reacting vehicle are likely to occupy at impact.

In an embodiment, a perception time for a reference vehicle may be estimated at step 7207. A "perception time" may refer to a time for a reference vehicle to travel from a perception point to a collision area. A "perception point" is the point on the trajectory of the reference vehicle at which the reacting vehicle should first notice danger. At step 7209, a location of the reacting vehicle may be estimated using the perception point and the perception time. A time for the reference vehicle to clear the collision area starting from the location of the collision may then be estimated at step 7211. At step 7213, a time for a reacting vehicle to reach the collision area using the time for the reference vehicle to clear the collision area may be estimated. At step 7215, an opportunity of the reacting vehicle to avoid the accident may be assessed. In addition, an effect on liability of the opportunity of the reacting vehicle to avoid the accident may be assessed at step 7217.

Figure 73:
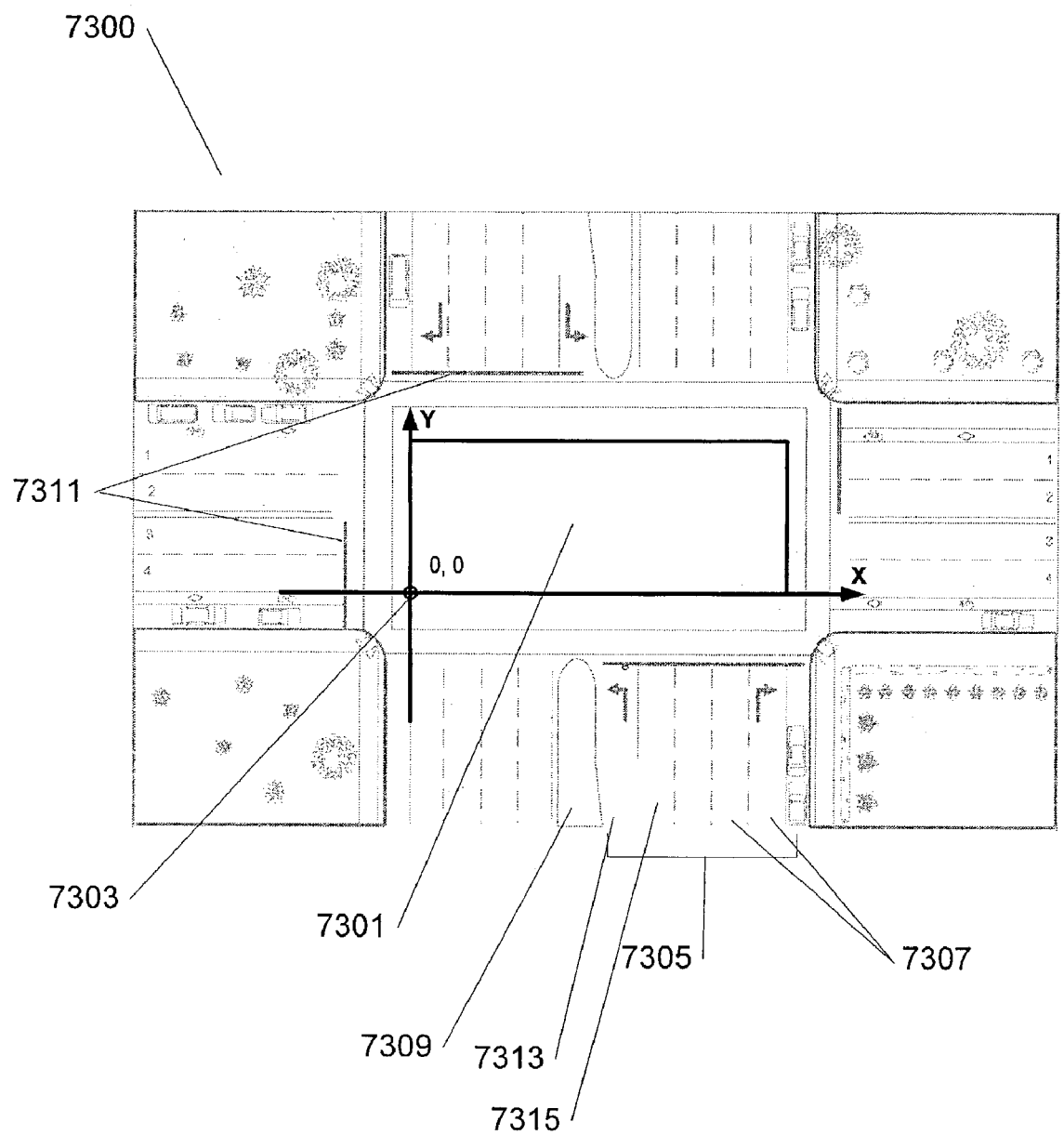
FIG. 73 depicts an illustration of an embodiment of an intersection box.

FIG. 73 depicts an illustration of intersection 7300 that includes intersection box 7301 with a coordinate system. Origin 7303 is located at the lower left hand corner of intersection box 7301. In one embodiment, an intersection box may be defined by the outer edges of the outermost lanes. The coordinate of any point in the intersection or roadways may be referred to by the name of the point followed by "x" or "y." Roadway 7305 may include one or more lanes 7307. Lanes may be specified in one half lane increments. For example, lane 1 may be in the middle of lane 7313 and 1.5 may be on the line separating lane 7313 and lane 7315. A roadway may also include median 7309 that separates traffic traveling in opposite directions. The roadway may also include stop lines 7311 that delineate a safe location for a vehicle to stop before the intersection.

Figure 74:
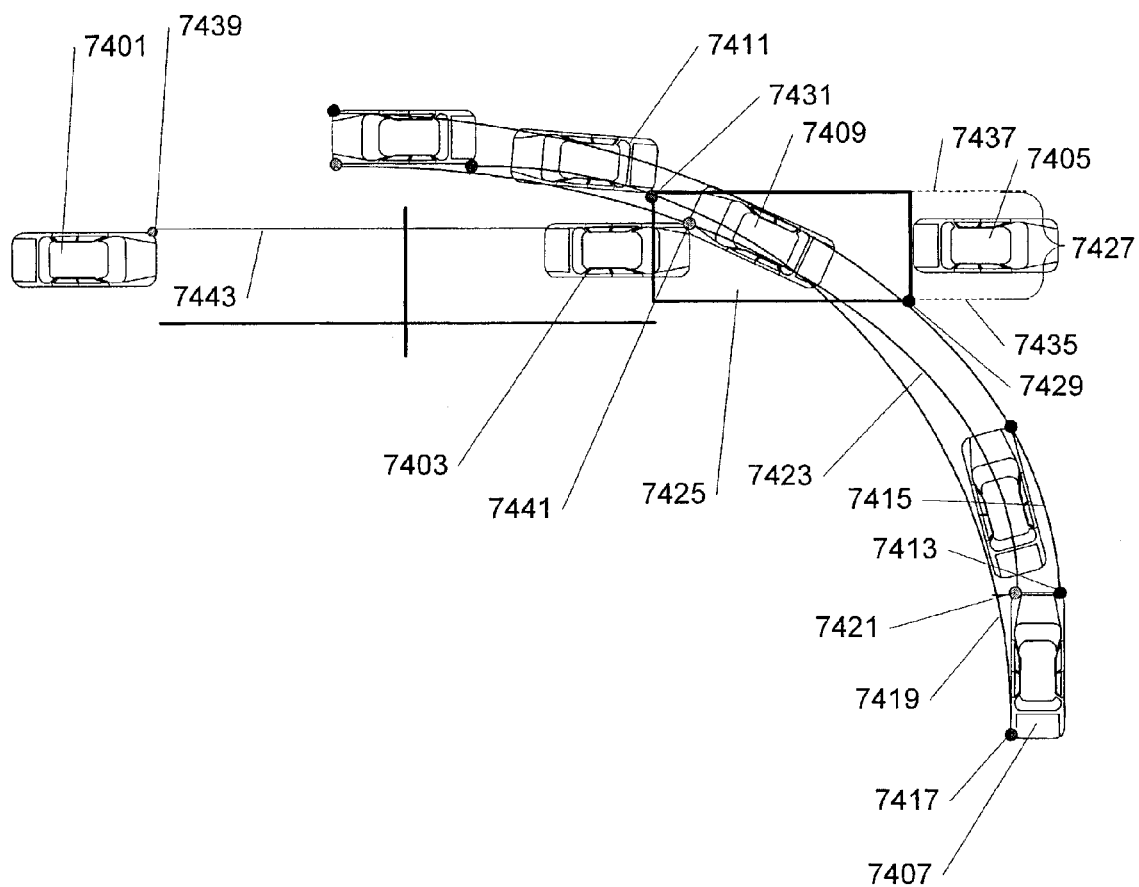
FIG. 74 depicts an illustration of an embodiment of trajectories of vehicles.

In several of the accident types shown in FIG. 4, one of the vehicles, A, is traveling in a straight trajectory and another vehicle, B, is turning and traveling in a curved trajectory. As used herein, vehicle A may be referred to as the "straight vehicle" and vehicle B may be referred to as the "turning vehicle." FIG. 74 illustrates the trajectories of a straight vehicle and a turning vehicle in an accident that correspond to accident type 3 in FIG. 4. Diagram 7401 represents vehicle A with a straight trajectory at a position prior to a collision traveling in collision lane 7427. As used herein, a "collision lane" is the lane occupied by the straight vehicle and in which the vehicles collide. Diagram 7403 represents vehicle A at the position of a collision. Diagram 7405 represents vehicle A in a position it may have occupied had the collision not occurred. Diagram 7405 may represent an intended end position of vehicle A. Diagram 7407 represents a vehicle B at a position prior to a collision. Diagram 7409 represents vehicle B at the position of the collision. Diagram 7411 represents vehicle B in a position it may have occupied had the collision not occurred. Diagram 7411 may represent an intended end position of vehicle B.

In some embodiments, the trajectory of at least one point on a vehicle may represent the path of the vehicle. Vehicle points may correspond to impact points as shown in FIG. 8*a*. For example, diagram 7407 includes vehicle point 7413 with trajectory 7415, vehicle point 7417 with trajectory 7419, and vehicle point 7421 with trajectory 7423. In certain embodiments, trajectories of vehicle points on vehicle B may be used to define collision area 7425. Vehicle point 7421 may correspond to the collision point of the turning vehicle and the straight vehicle.

Figure 75:
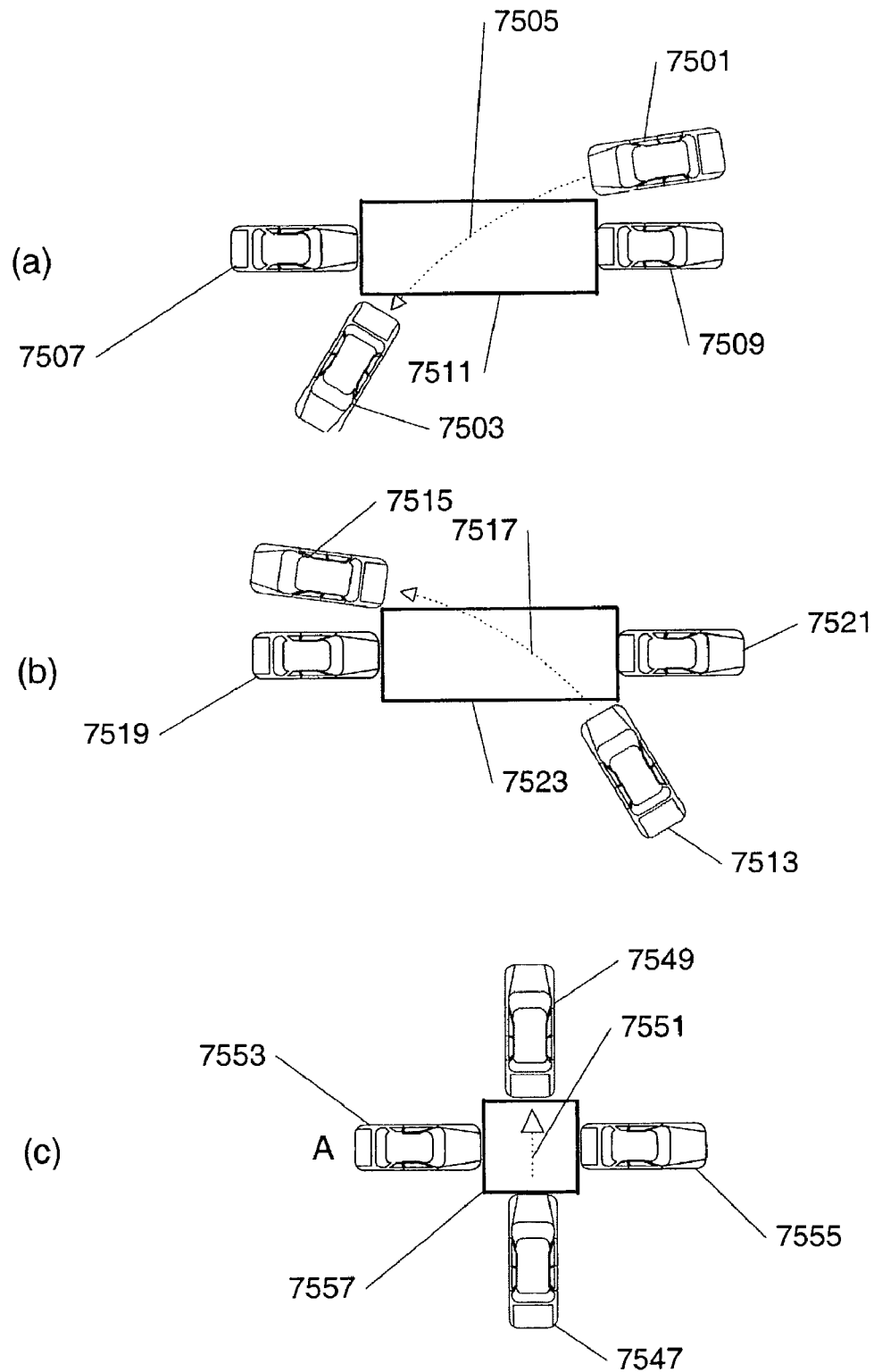
FIGS. 75$a$-$g$ depict illustrations of the application of speed, time, and distance analysis of vehicles for several accident types.
Figure 75:
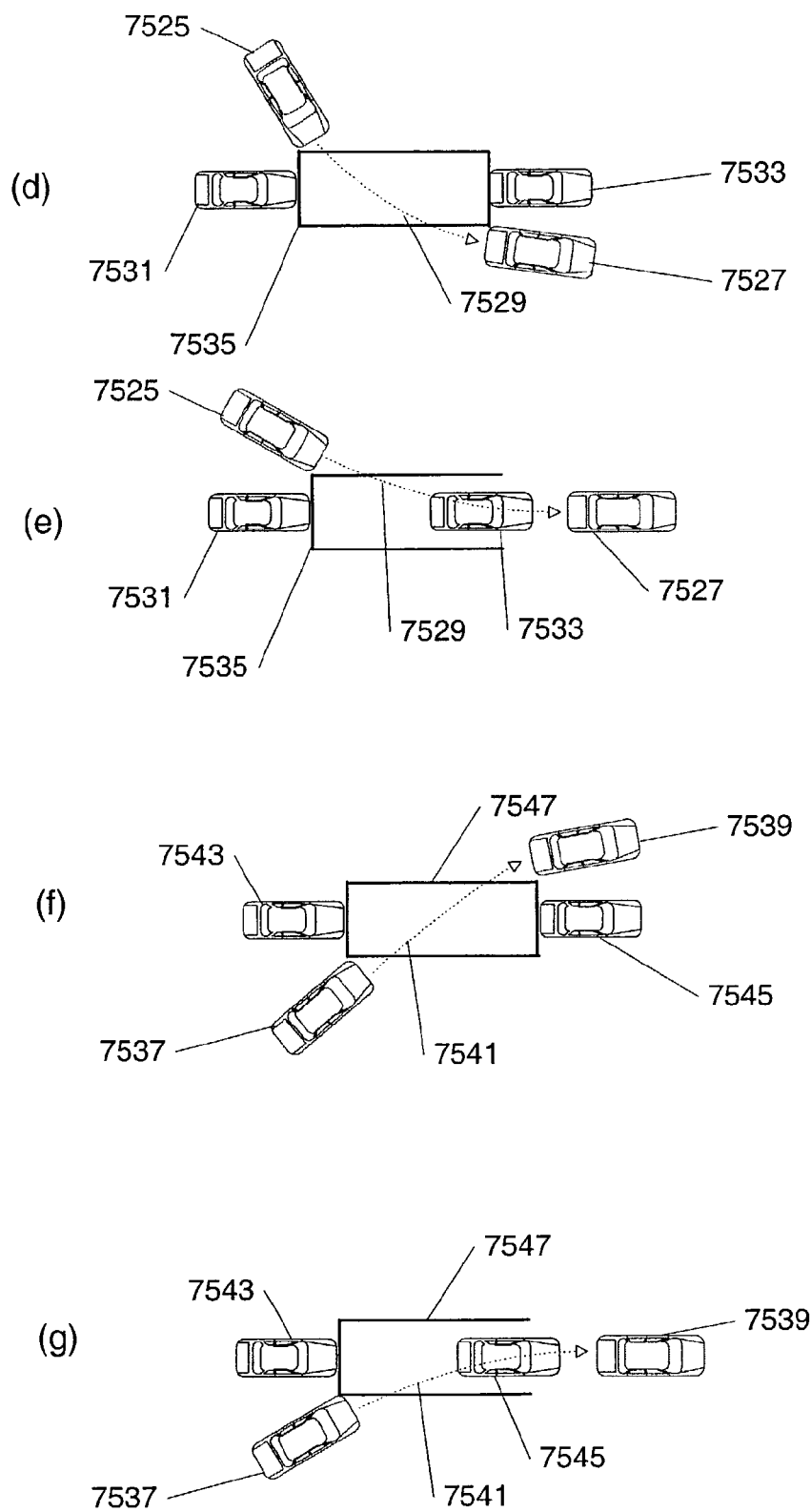

In an embodiment, speed, time, and distance analysis of an accident for the purpose of liability assessment may be applied to at least one of the accident types illustrated in FIG. 4. FIGS. 75*a-g* illustrate application of speed, time, and distance analysis of vehicles in an accident for several accident types. FIGS. 75*a-c* represent accident types in which vehicle B is crossing traffic. FIGS. 75*d-g* represent accident types in which vehicle B is entering traffic. FIG. 75*a* illustrates accident type 2 from FIG. 4. Diagram 7501 represents vehicle B prior to the collision. The path of vehicle B is depicted by trajectory 7505. Diagram 7503 represents vehicle B in an intended end position. Similarly, diagram 7507 represents vehicle A prior to a collision. Diagram 7509 represents vehicle A in an intended end position. Diagram 7511 represents the collision area.

FIG. 75*b* illustrates accident type 3 from FIG. 4. Diagram 7513 represents turning vehicle B prior to the collision. The path of vehicle B is depicted by trajectory 7517. Diagram 7515 represents turning vehicle B in an intended end position. Similarly, diagram 7519 represents vehicle A prior to a collision. Diagram 7521 represents vehicle A in an intended end position. Diagram 7523 represents the collision area.

FIG. 75*c* illustrates accident type 17 from FIG. 4. Diagram 7547 represents vehicle B prior to the collision. The path of vehicle B is depicted by trajectory 7551. Diagram 7549 represents B in an intended end position. Similarly, diagram 7553 represents vehicle A prior to a collision. Diagram 7555 represents vehicle A in an intended end position. Diagram 7557 represents the collision area.

FIGS. 75*d* and 75*e* illustrate embodiments of accident type 4 from FIG. 4. FIG. 75*d* depicts a vehicle B crossing traffic into a lane different from a vehicle A in traffic. Alternatively, FIG. 75*e* depicts a vehicle B entering traffic into the same lane as a vehicle A in traffic. Diagram 7525 represents vehicle B prior to the collision. The path of vehicle B is depicted by trajectory 7529. Diagram 7527 represents turning vehicle B in an intended end position. Similarly, diagram 7531 represents vehicle A prior to a collision. Diagram 7533 represents vehicle A in an intended end position. Diagram 7535 represents the collision area. In the case of FIGS. 75*e* and 75*g*, the collision area may not terminate on the right side because the intended end position of vehicle B does not clear the collision lane.

FIG. 75*f* and 75*g* illustrate embodiments of accident type 5 from FIG. 4. FIG. 75*f* depicts a vehicle B crossing traffic into a lane different from a vehicle A in traffic. Alternatively, FIG. 75*g* depicts a vehicle B entering traffic into the same lane as a vehicle A in traffic. Diagram 7537 represents vehicle B prior to the collision. The path of vehicle B is depicted by trajectory 7541. Diagram 7539 represents vehicle B in an intended end position. Similarly, diagram 7543 represents a vehicle A prior to a collision. Diagram 7545 represents vehicle A in an intended end position. Diagram 7547 represents the collision area.

An embodiment of the method depicted in FIG. 72 may include selecting 7201 a reference vehicle. In one embodiment, a reference vehicle may be selected from the vehicles involved in an accident. The reference vehicle may be vehicle A in accident types 2, 3, 4, and 5 shown in FIG. 4. Alternatively, the reference vehicle may be vehicle B in accident types 2, 3, 4, and 5 shown in FIG. 4. The starting time for trajectory analysis may be determined, for example, using a landmark, such as a stop line, that the reference vehicle passes.

In some embodiments, the selection of the reference vehicle may be determined by the reaction of a vehicle to the danger of a collision. For example, if the reaction of either vehicle A or vehicle B, but not both, is braking from a constant rate of speed or braking from accelerating, then the vehicle that is not braking may be the reference vehicle. Alternatively, if the reaction of both vehicle A and vehicle B is continuing from a constant rate of speed or continuing from accelerating and the right of way is known, the vehicle that does not have the right of way may be the reference vehicle.

Figure 76A:
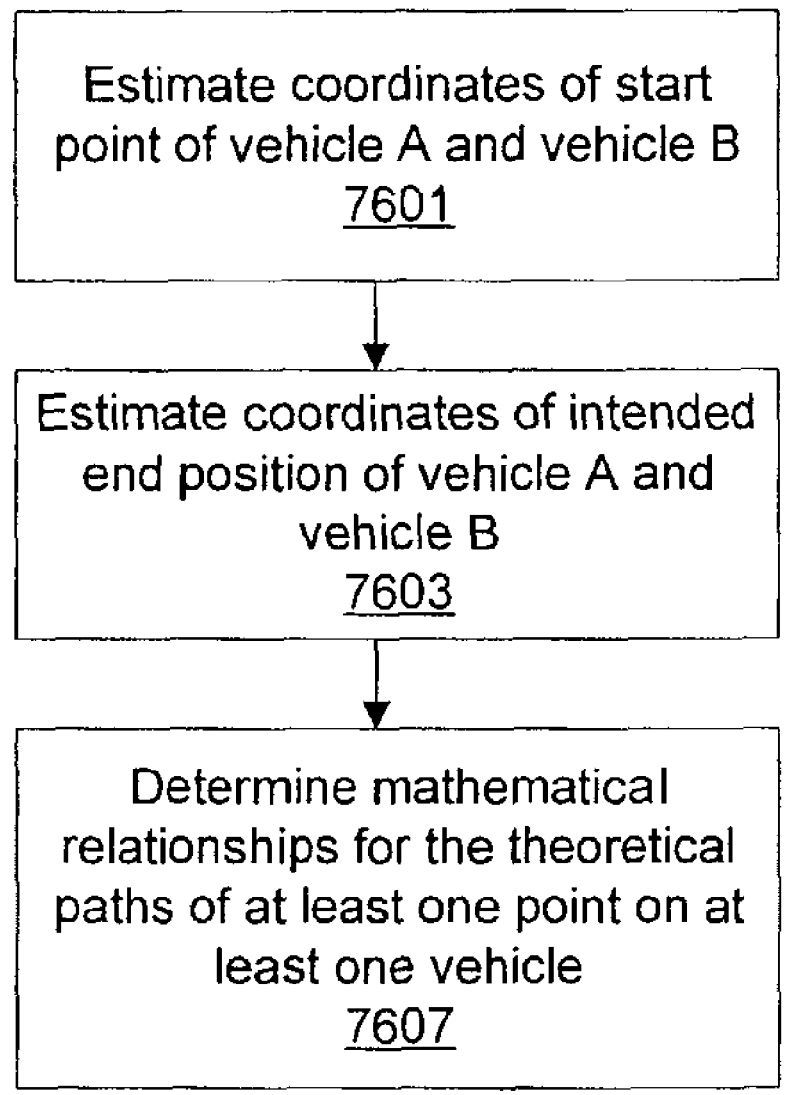
FIG. 76$a$ depicts a flow chart of an embodiment of a method for estimating the theoretical paths of vehicles.

In one embodiment, speed, time and distance analysis may include estimating 7203 the theoretical paths of the vehicles in the accident. For example, the theoretical paths of vehicle A and vehicle B in the accident type diagrams of FIG. 4 may be estimated. A flow chart illustrating a method for estimating the theoretical paths of vehicles is shown in FIG. 76*a*. At step 7601, the coordinates of the start point of at least one point on vehicles A and B may be estimated. The coordinates of the intended end position of at least one point on the vehicles may be estimated at step 7603. The method may further include determining mathematical relationships for the theoretical paths of a least one point on at least one of the vehicles using the start point and intended end positions.

Figure 76B:
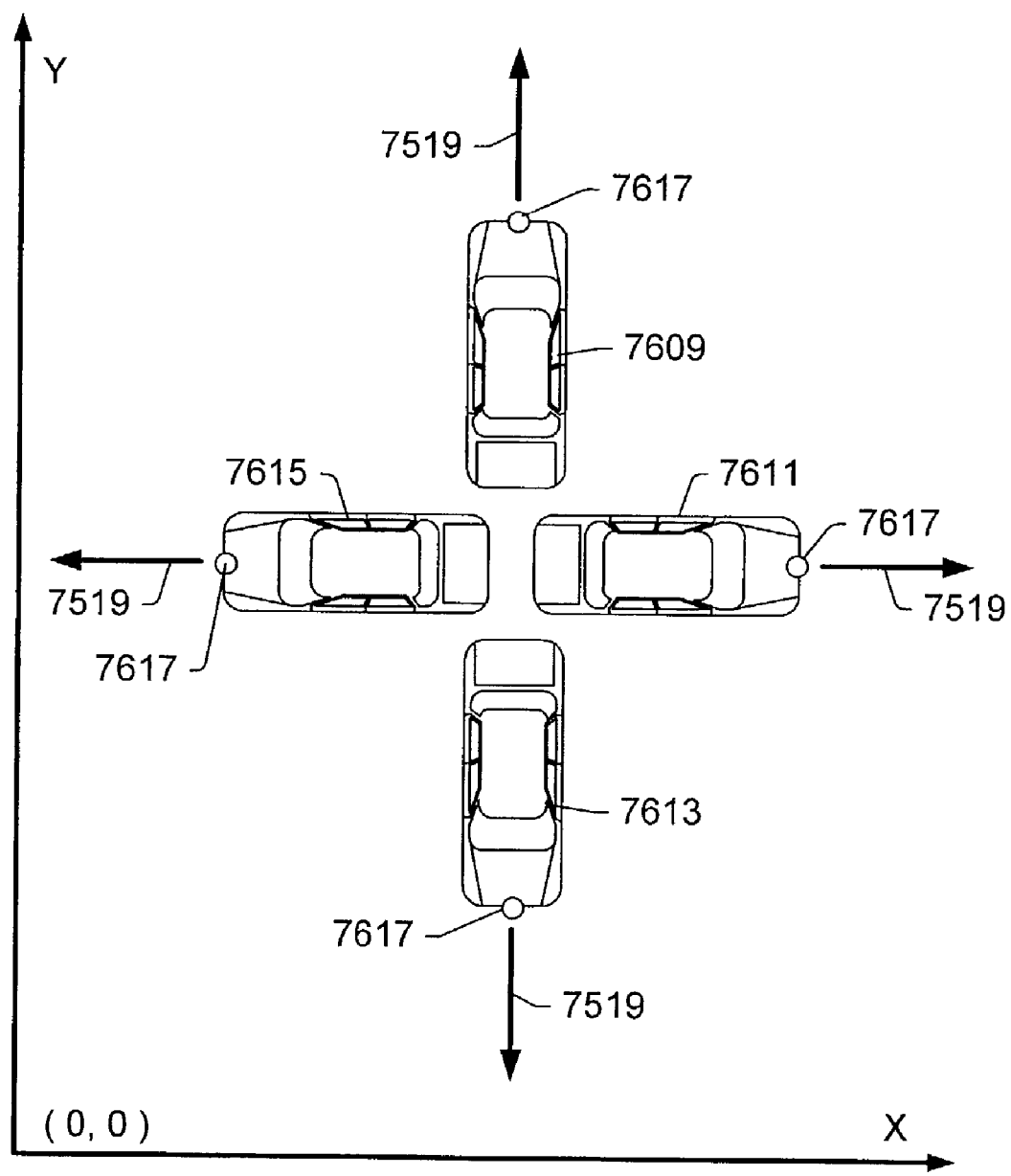

In an embodiment, the (x, y) coordinate of at least one point on a vehicle at the start point and intended end positions may be estimated. The (x, y) coordinate of at least one point and the orientation of the vehicle may then be used to estimate the coordinates of any other point on the vehicle. The orientation of a vehicle in relation to an origin, for example, origin 7303 in FIG. 73, may be depend on the accident type. FIG. 76*b* depicts vehicle orientation in relation to an origin. Diagram 7609 corresponds to the orientation at the start point of vehicle B for accident types 3, 5, and 17. Arrows 7619 indicate the direction of travel of the vehicle. Points 7617 correspond to impact point 812 from FIG. 8*a* for each diagram. Diagram 7611 corresponds to the orientation at the start point of vehicle A for all of the accident types illustrated in FIG. 4. Diagram 7613 corresponds to the orientation at the start point of vehicle B for accident type 4. Diagram 7615 corresponds to the orientation at the start point of vehicle B for accident type 2.

In certain embodiments, the start point and intended end positions of vehicles in an accident may depend upon the accident type, the roadway type, roadway characteristics, the position of a vehicle on the roadway, and driver action or action of a vehicle characteristics. Table 1 includes a list of roadway characteristics that may be used in speed, time, and distance analysis of vehicles in an accident according to one embodiment. Table 1 also lists possible values for the roadway characteristics.

TABLE 1

ROADWAY CHARACTERISTICS AND POSSIBLE VALUES

| ROADWAY CHARACTERISTIC | POSSIBLE VALUES |
|---|---|
| A Speed Limit | Integer |
|  | Unknown |
| B Speed Limit | Integer |
|  | Unknown |
| A Total Lanes | Integer |
|  | Unknown |
| B Total Lanes | Integer |
|  | Unknown |
| Intersecting Road Total Lanes | Integer |
|  | Unknown |
| A Lane Width | Narrow (10 feet or less) |
|  | Average (11 to 13 feet) |
|  | Wide (14 feet or more) |
|  | Unknown |
| B Lane Width | Narrow (10 feet or less) |
|  | Average (11 to 13 feet) |
|  | Wide (14 feet or more) |
|  | Unknown |
| Originating Lane Width | Narrow (10 feet or less) |
|  | Average (11 to 13 feet) |
|  | Wide (14 feet or more) |
|  | Unknown |
| Intersecting Lane Width | Narrow (10 feet or less) |
|  | Average (11 to 13 feet) |
|  | Wide (14 feet or more) |
|  | Unknown |
| A Median Width | None |
|  | Small (1 to 5 feet) |
|  | Narrow (6 to 10 feet) |
|  | Average (11 to 20 feet) |
|  | Wide (21 feet or more) |
|  | Size Unknown |
|  | Presence Unknown |
| B Median Width | None |
|  | Small (1 to 5 feet) |
|  | Narrow (6 to 10 feet) |
|  | Average (11 to 20 feet) |
|  | Wide (21 feet or more) |
|  | Size Unknown |
|  | Presence Unknown |
| Originating Median Width | None |
|  | Small (1 to 5 feet) |
|  | Narrow (6 to 10 feet) |
|  | Average (11 to 20 feet) |
|  | Wide (21 feet or more) |
|  | Size Unknown |
|  | Presence Unknown |
| Intersecting Median Width | None |
|  | Small (1 to 5 feet) |
|  | Narrow (6 to 10 feet) |
|  | Average (11 to 20 feet) |
|  | Wide (21 feet or more) |
|  | Size Unknown |
|  | Presence Unknown |
| A Median After Lane # | Integer |
|  | Unknown |
| B Median After Lane # | Integer |
|  | Unknown |
| Intersecting Road Median After Lane # | Integer |
|  | Unknown |
| Originating Road Median After Lane # | Integer |
|  | Unknown |
| A Inside Shoulder Width | None |
|  | Narrow (2 to 3 feet) |
|  | Standard (4 feet or more) |
|  | Size Unknown |
|  | Presence Unknown |

TABLE 1-continued

ROADWAY CHARACTERISTICS AND POSSIBLE VALUES

| ROADWAY CHARACTERISTIC | POSSIBLE VALUES |
|---|---|
| B Inside Shoulder Width | None |
|  | Narrow (2 to 3 feet) |
|  | Standard (4 feet or more) |
|  | Size Unknown |
|  | Presence Unknown |
| Originating Inside Shoulder Width | None |
|  | Narrow (2 to 3 feet) |
|  | Standard (4 feet or more) |
|  | Size Unknown |
|  | Presence Unknown |
| Intersecting Road Inside Shoulder Width | None |
|  | Narrow (2 to 3 feet) |
|  | Standard (4 feet or more) |
|  | Size Unknown |
|  | Presence Unknown |
| A Center Turn Lane | Yes |
|  | No |
|  | Unknown |
| B Center Turn Lane | Yes |
|  | No |
|  | Unknown |
| Originating Center Turn Lane | Yes |
|  | No |
|  | Unknown |
| Intersecting Center Turn Lane | Yes |
|  | No |
|  | Unknown |
| A Slope Grade | None |
|  | Uphill Slight (4% or less) |
|  | Uphill Moderate (5% to 10%) |
|  | Uphill Steep (10% or more) |
|  | Downhill Slight (4% or less) |
|  | Downhill Moderate (5% to 9%) |
|  | Downhill Steep (10% or more) |
|  | Unknown |
| B Slope Grade | None |
|  | Uphill Slight (4% or less) |
|  | Uphill Moderate (5% to 10%) |
|  | Uphill Steep (10% or more) |
|  | Downhill Slight (4% or less) |
|  | Downhill Moderate (5% to 9%) |
|  | Downhill Steep (10% or more) |
|  | Unknown |
| A Total Lanes in A Direction | Integer |
|  | Unknown |
| B Total Lanes in B Direction | Integer |
|  | Unknown |
| A Had Stop Line | Yes |
|  | No |
|  | Unknown |
| B Had Stop Line | Yes |
|  | No |
|  | Unknown |
| A Distance From Stop Line to start of first lane | Integer |
|  | Unknown |
| B Distance From Stop Line to Start of First Lane | Integer |
|  | Unknown |

Table 2 includes a list of driver action or action of a vehicle characteristics that may be used in speed, time, and distance analysis of a vehicle in the accident according to one embodiment. Table 2 also lists possible values for the driver action characteristics.

TABLE 2

DRIVER ACTION CHARACTERISTICS AND POSSIBLE VALUES

| DRIVER ACTION CHARACTERISTICS | POSSIBLE VALUES |
|---|---|
| B Start Lane | Integer |
| | Unknown |
| B Target Lane | Integer |
| | Unknown |
| A Collision Lane | 0.5 |
| | 1 |
| | 1.5 |
| | 2 |
| | 2.5 |
| | 3 |
| | 3.5 |
| | 4 |
| | 4.5 |
| | 5 |
| | 5.5 |
| | 6 |
| | 6.5 |
| | 7 |
| | 7.5 |
| | 8 |
| | 8.5 |
| | 9 |
| | 9.5 |
| | 10 |
| | 10.5 |
| | 11 |
| | 11.5 |
| | 12 |
| | 12.5 |
| | Median |
| | Inside Shoulder (Delete This) |
| | Outside Shoulder (Delete This) |
| | Unknown |
| A Action Prior | Accelerating from a stop |
| | Constant or Slowing |
| | Unknown |
| B Action Prior | Accelerating from a stop |
| | Constant or Slowing |
| | Unknown |
| A Distance When Danger Sensed | Integer |
| | Unknown |
| B Distance When Danger Sensed | Integer |
| | Unknown |
| A Skid Marks | Yes |
| | No |
| | Unknown |
| B Skid Marks | Yes |
| | No |
| | Unknown |
| A Length of Skid Marks | Integer |
| | Unknown |
| B Length of Skid Marks | Integer |
| | Unknown |
| A Braking Force | Moderate |
| | Hard, Controlled |
| | Slammed On |
| B Braking Force | Moderate |
| | Hard, Controlled |
| | Slammed On |
| A Acceleration Rate | Slow |
| | Medium |
| | Fast |
| | Unknown |
| B Acceleration Rate | Slow |
| | Medium |
| | Fast |
| | Unknown |
| A Stop Position | Behind First Lane |
| | At First Lane |
| | After Start of First Lane |
| | Unknown |

TABLE 2-continued

DRIVER ACTION CHARACTERISTICS AND POSSIBLE VALUES

| DRIVER ACTION CHARACTERISTICS | POSSIBLE VALUES |
|---|---|
| B Stop Position | Behind First Lane |
| | At First Lane |
| | After Start of First Lane |
| | Unknown |
| A distance stop position to start first lane | Integer |
| | Unknown |
| B Distance stop position to start First Lane | Integer |
| | Unknown |
| A Stop Lane | 0.5 |
| | 1 |
| | 1.5 |
| | 2 |
| | 2.5 |
| | 3 |
| | 3.5 |
| | 4 |
| | 4.5 |
| | 5 |
| | 5.5 |
| | 6 |
| | 6.5 |
| | 7 |
| | 7.5 |
| | 8 |
| | 8.5 |
| | 9 |
| | 9.5 |
| | 10 |
| | 10.5 |
| | 11 |
| | 11.5 |
| | 12 |
| | 12.5 |
| | Median |
| | Unknown |
| B Stop Lane | 0.5 |
| | 1 |
| | 1.5 |
| | 2 |
| | 2.5 |
| | 3 |
| | 3.5 |
| | 4 |
| | 4.5 |
| | 5 |
| | 5.5 |
| | 6 |
| | 6.5 |
| | 7 |
| | 7.5 |
| | 8 |
| | 8.5 |
| | 9 |
| | 9.5 |
| | 10 |
| | 10.5 |
| | 11 |
| | 11.5 |
| | 12 |
| | 12.5 |
| | Median |
| | Unknown |
| B target lane closest? | Yes |
| | No |
| | Unknown |
| A Speed | Integer |
| | Unknown |
| B Speed | Integer |
| | Unknown |
| B Actual Speed Less Than Minimum Legal | Yes |
| | Considerably |

TABLE 2-continued

DRIVER ACTION CHARACTERISTICS
AND POSSIBLE VALUES

| DRIVER ACTION CHARACTERISTICS | POSSIBLE VALUES |
|---|---|
| Speed/Prevailing Speed | No |
| | Unknown |
| B Hazard Lights On | Yes |
| | No |
| | Unknown |
| Primary Road | Yes |
| | No |
| | Unknown |
| A Speed at Impact | Integer, |
| | Unknown |
| B Speed at Impact | Integer |
| | Unknown |
| B Stopped | Yes |
| | No |
| | Unknown |

Table 3 includes a list of vehicle types that may be used in speed, time, and distance analysis of an accident according to one embodiment. Table 3 also lists approximate vehicle lengths that may correspond to the vehicle types.

TABLE 3

VEHICLE TYPES AND SIZES

| VEHICLE TYPE | VEHICLE LENGTH (FEET) |
|---|---|
| Car - Mid Size | 15.5 |
| Car - Compact | 14.5 |
| Car - Full Size | 16.7 |
| SUV - Compact | 13.1 |
| SUV - Mid Size | 15.3 |
| SUV - Full Size | 17.5 |
| Truck - Mid Size | 16.3 |
| Truck - Full Size | 18.8 |
| Vans - Passenger/Mini-Vans | 16.1 |

Figure 77:
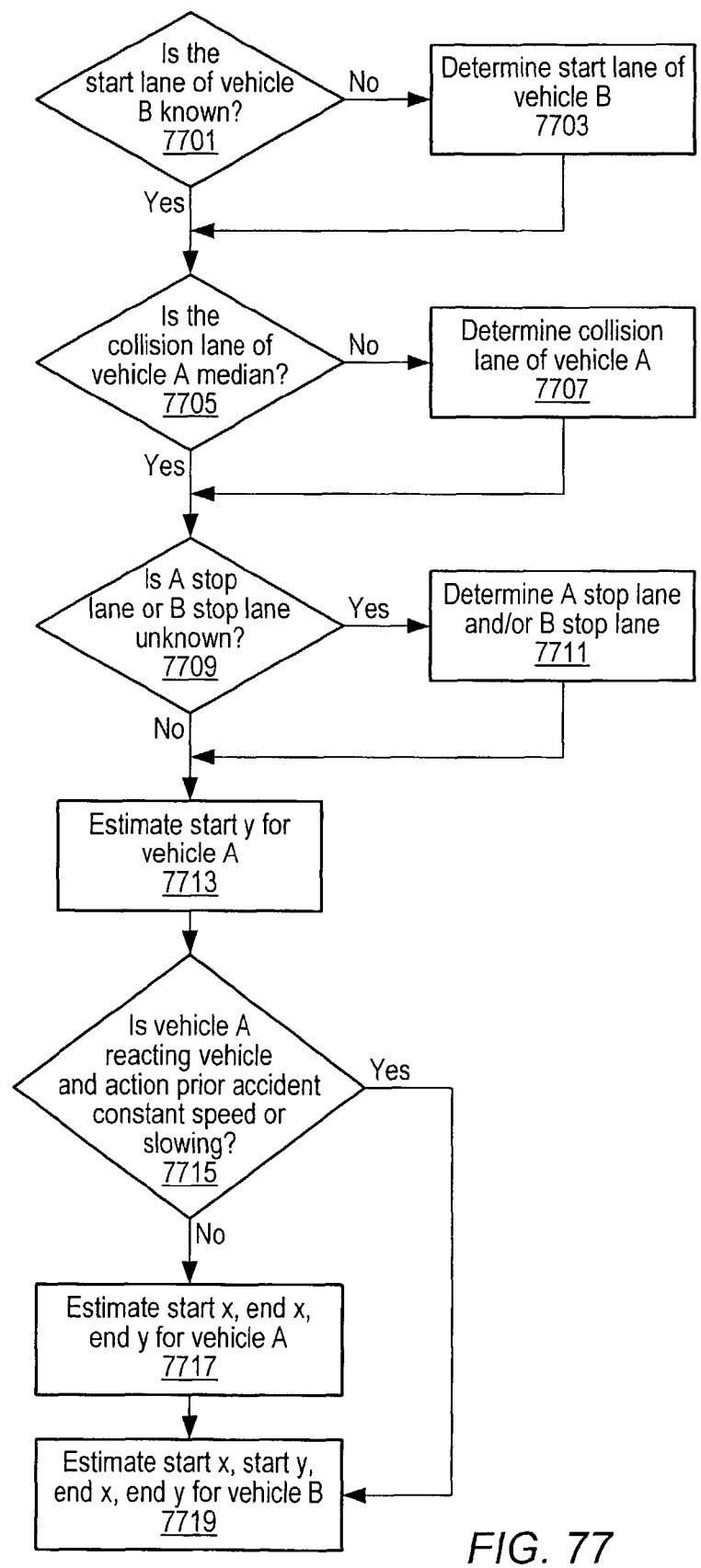
FIG. 77 depicts a flow chart of an embodiment for estimating the start point and intended end position of vehicles in an accident.

FIG. 77 depicts a flow chart of an embodiment for estimating the start point and intended end position of vehicles in an accident. At decision point 7701, it is determined whether the start lane for vehicle B is known. If not, then the start lane for vehicle B may be determined 7703. In one embodiment, the start lane may depend upon the accident type, the median width, the total number of lanes in the direction that vehicle A is traveling, and the total lanes in the direction that vehicle B is traveling. For accident type 2, if there is no median for vehicle B, then vehicle B start lane may be given by $B$ Start Lane=[$A$ Total Lanes in $A$ Direction]+1

If there is there is a median for vehicle B, then B start lane may be $B$ Start Lane=[$B$ Median after Lane Number]+1

For accident type 3, if there is no median for vehicle B, then B start lane may be $B$ Start Lane=[$B$'s Total Lanes]−[$B$ Total Lanes in $B$ Direction]+1

If there is a median for vehicle B, then B start lane may be $B$ Start Lane=[$B$ Median after Lane Number]+1

For accident type 4, B start lane may be $B$ Start Lane=[$B$ Total Lanes in $B$ Direction]

For accident type 5, B start lane may be $B$ Start Lane=[$B$ Total Lanes]

At decision point 7705, it is determined whether the collision lane of vehicle A is a median. If the answer is positive, then a collision lane of vehicle A is determined at step 7707. The collision lane for vehicle A may be determined from, for example, the median width, the originating lane width, and a shoulder width. The originating lane refers to the lane from which vehicle A started. In one embodiment, for accident type 2, the collision lane of vehicle A may be the originating median after lane number plus 0.5. In addition, for accident types 3, 4, 5, and 17, the vehicle A collision lane may be a median after lane number plus 0.5.

At decision point 7709, it is determined whether a vehicle A stop lane or vehicle B stop lane is unknown. It the answer is positive, then a vehicle A stop lane and/or vehicle B stop lane may be determined 7711. In one embodiment, the vehicle A stop lane may be set to one. In addition, for accident types 3, 5, and 17 the vehicle B stop lane may be set to 1. If the accident type is 2, the vehicle B stop lane may be set to the total lanes of the intersecting roadway. If the accident type is 4, a B stop lane may be set to the total lanes in the direction that vehicle B is traveling.

In some embodiments, the method may further include estimating the y coordinate of the start point (start y) of vehicle A at step 7713. Start y for vehicle A may be determined using roadway characteristics. At decision point 7715, it is determined if vehicle A is the reacting vehicle and whether the action of vehicle A prior to the accident was constant speed or slowing. If the answer is negative, then the x coordinate of the start point (start x) of vehicle A, the x coordinate of the intended end position (end x) of vehicle A, and the y coordinate of the intended end position (end y) of vehicle A may be estimated 7717. If the answer to decision point 7715 is positive, then the method proceeds to step 7719. The start point of vehicle A may be estimated at step 7209 in FIG. 72. At step 7719, start x, start y, end x, and end y for vehicle B may be estimated.

In some embodiments, a method for estimating start x for vehicle A from roadway characteristics may be given by:
If [A action prior]="constant or slowing"
   If [A had stop line]=yes: A start x=−1*[A distance from stop line to start of first lane]
   If [A had stop line]=no: assume edge of intersection: A start x=0
If [A action prior]="accelerate from a stop"
   If [A stop position]="behind first lane": A start x=−1*[A distance stop position to start first lane]
   If [A stop position]="at first lane": A start x=0
   If [A stop position]="after start of first lane" started in intersection
     If AT 2
       Get laneWidth of lanes crossed=[intersecting road lane width]
       If [Intersecting road median width]=0 ("none") then A start x=([A stop lane]−0.5)*laneWidth
       If [Intersecting road median width] greater than 0 ("none") and [A stop lane]="median" then
          A start x=[Intersecting road median after lane #]*laneWidth+[Intersecting road median width]÷2*[Intersecting road inside shoulder width]
       If [Intersecting road median width] greater than 0 ("none") and [A stop lane] less than [Intersecting road median after lane #] then
          A start x=([A stop lane]−0.5)*laneWidth If [Intersecting road median width] greater than 0 ("none") and [A stop lane] is greater than [Intersecting road median after lane #] then A start x=([A stop lane]−0.5)*laneWidth+[Intersecting road median width]+2*[Intersecting road inside shoulder width]

If AT 3, 4, 5, 17

Get laneWidth of lanes crossed [B lane width]

If [B median width]=0 ("none") then

A start x=([A stop lane]−0.5)*laneWidth

If [B median width] greater than 0 ("none") and [A stop lane]="median" then

A start x=[B median after lane #]*laneWidth+[B median width]+2*[B inside shoulder width]

If [B median width] greater than 0 ("none") and [A stop lane] less than [B Median after lane #] then A start x=([A stop lane]−0.5)*laneWidth If [B median width] greater than 0 ("none") and [A stop lane] is greater than [B median after lane #] then A start x=([A stop lane]−0.5)*laneWidth+[B median width]+2*[B inside shoulder width]

In some embodiments, start y for vehicle A may be given by [A collision lane−0.5]*[A lane width].

In some embodiments, the start x, start y, end x, and end y for vehicle B may be determined from roadway characteristics. However, in certain embodiments, at least one of the coordinates may be derived from at least one of the other coordinates. The method of determining the starting and intended end coordinates for vehicle B may depend on the accident type and roadway configuration.

Figure 78:
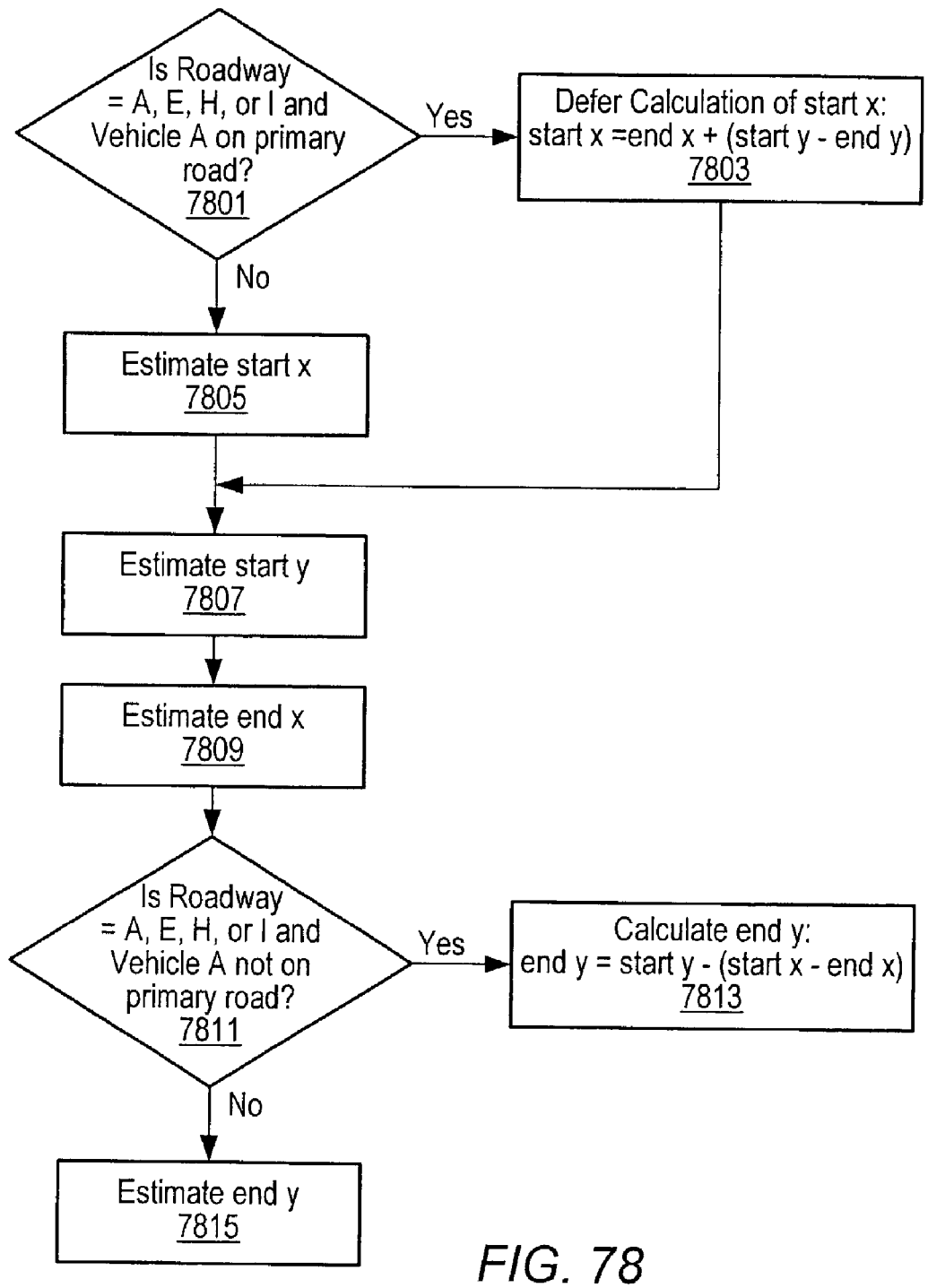
FIG. 78 depicts a flow chart of an embodiment of a method for estimating the start point and intended end position of vehicles in an accident.
Figure 79A:
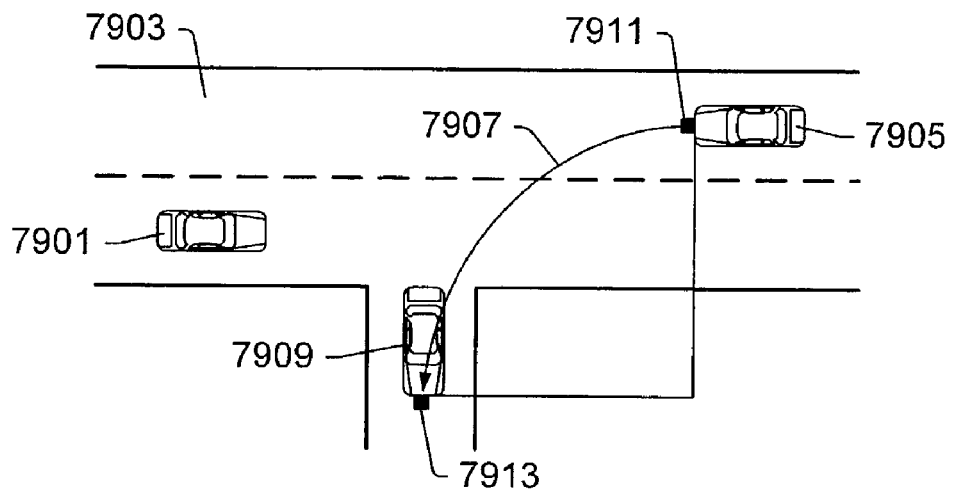
FIGS. 79$a$-$b$ depict illustrations of an accident.

An embodiment of a method for determining start x, start y, end x, and end y for vehicle B for accident type 2 is depicted in FIG. 78. At decision point 7801, it is determined whether the roadway configuration is A, E, H, or I and if vehicle A is on a primary road, as is depicted in FIG. 79a. If the answer to decision point 7801 is positive, then start x may be determined 7803 from start y, end x, and end y. The calculation of start x may be deferred until start y, end x, and end y are estimated from roadway characteristics. In FIG. 79a, vehicle A 7901 on primary road 7903 is approaching vehicle B 7905. Vehicle B is turning with trajectory 7907 to secondary road 7909. Start x, y are given by point 7911 and end x, y are given by point 7913.

Alternatively, if the answer to decision point 7801 is negative, then start x is estimated 7805 from roadway characteristics, start y is estimated 7807 from roadway characteristics, and end x is estimated 7809 from roadway characteristics.

Figure 79B:
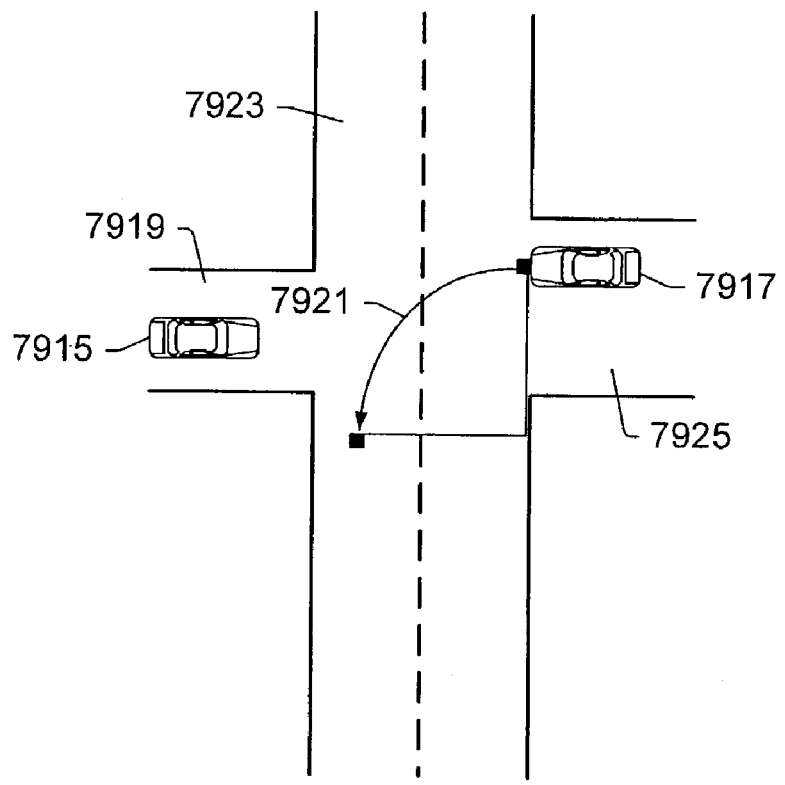

At decision point 7811, it is determined whether the roadway configuration is A, E, H, or I and if vehicle A is not on a primary road. If the answer to decision point 7811 is positive, then end y may be calculated from start y, start x, and end x. Such a situation is depicted in FIG. 79b. FIG. 79b depicts an accident scene similar to that in FIG. 79a, however, vehicle A 7915 on secondary road 7919 is approaching vehicle B 7917 on secondary road 7925. Vehicle B is turning with trajectory 7921 on to primary road 7923. If decision point 7811 is negative, then end y may be calculated from roadway characteristics.

Figure 80:
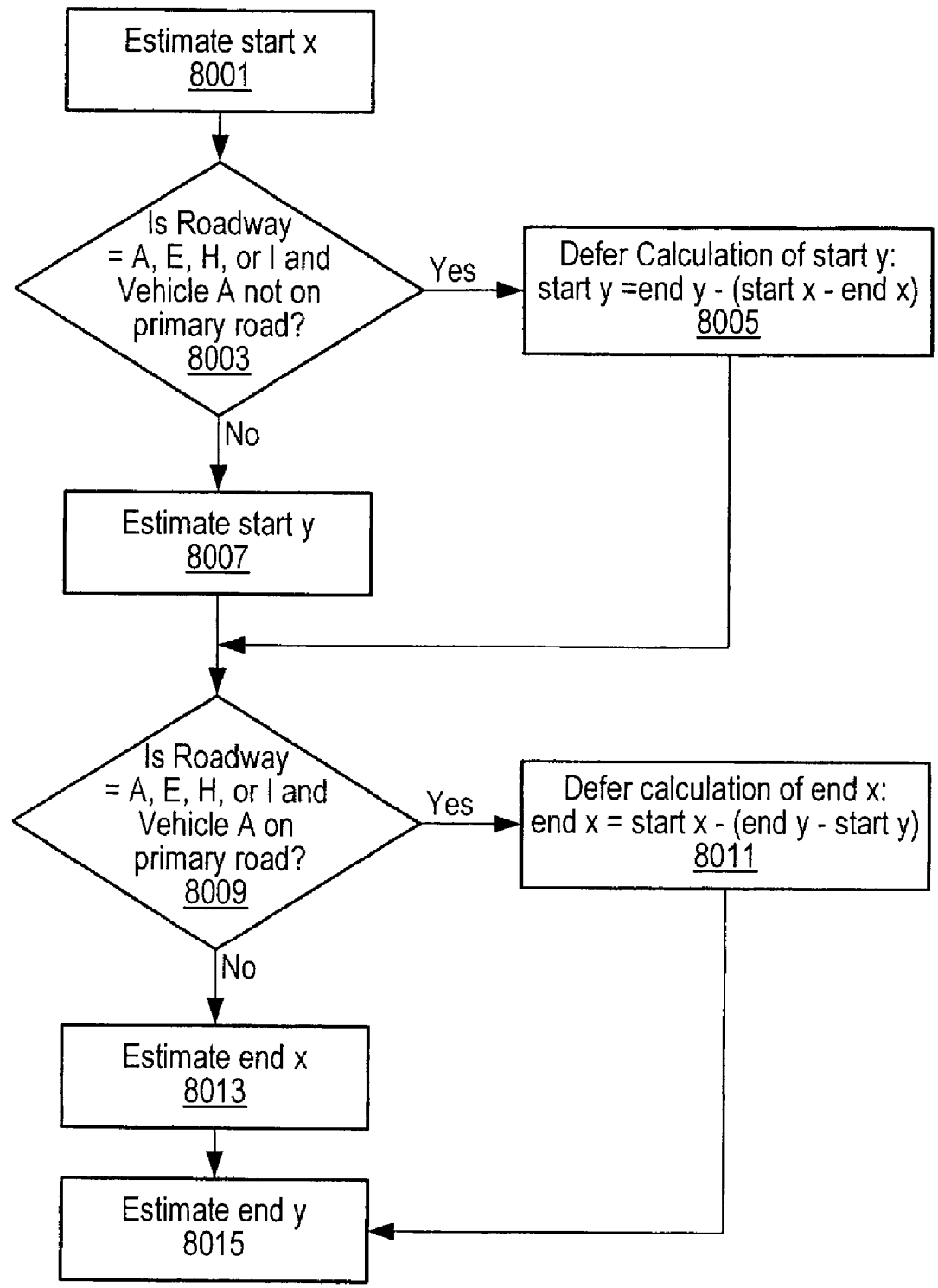
FIG. 80 depicts a flow chart of an embodiment of a method for estimating the start point and intended end position of vehicles in an accident.
Figure 81A:
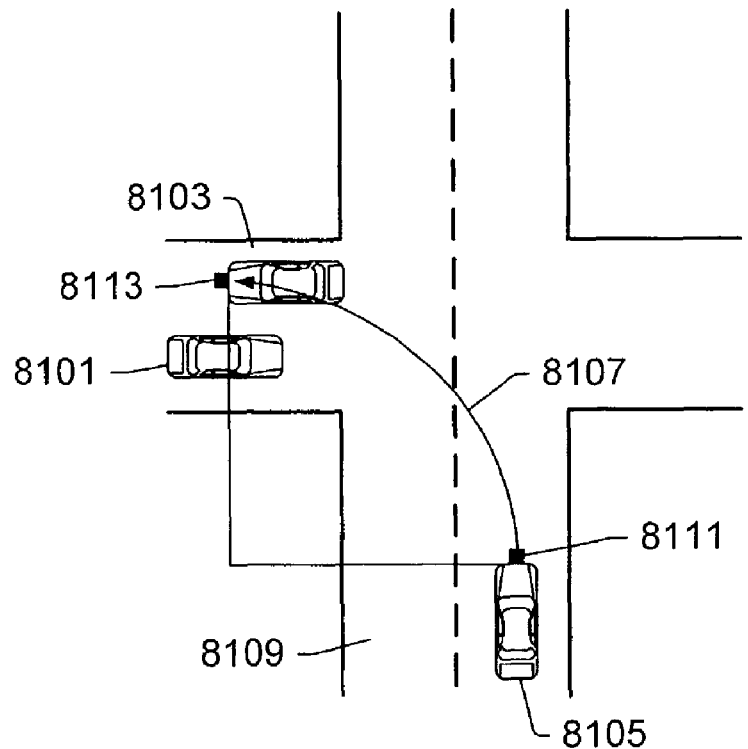
FIGS. 81$a$-$b$ depict illustrations of an accident.

An embodiment of a method for determining start x, start y, end x, and end y for vehicle B for accident type 3 is depicted in FIG. 80. At step 8001, start x may be estimated from roadway characteristics. At decision point 8003, it is determined whether the roadway configuration is A, E, H, or I and if the vehicle A is not on a primary road as depicted in FIG. 81a. In FIG. 81a, vehicle A 8101 on secondary road 8103 is approaching turning vehicle B 8105. Vehicle B is turning with trajectory 8107 from primary road 8109 to secondary road 8103. Start x, y are given by point 8111 and end x, y are given by point 8113. If the answer to decision point 8003 is positive, then start y may be calculated 8005 from start x, end x, and end y. The calculation of start y may be deferred until start x, end x, and end y are estimated from roadway characteristics. The method continues to decision point 8009. If the answer to decision point 8003 is negative, then start y is estimated 8007 from roadway characteristics.

Figure 81B:
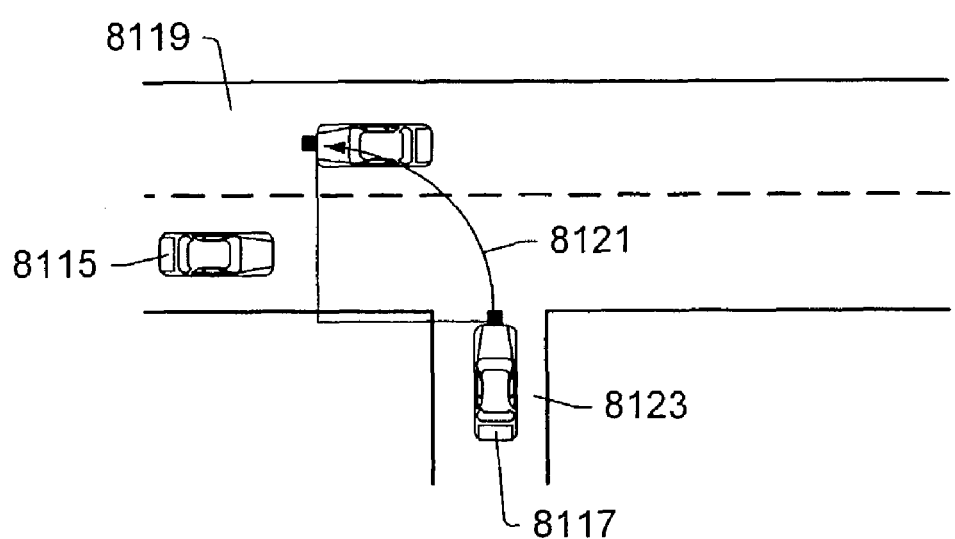

At decision point 8009, it is determined whether the roadway configuration is A, E, H, or I and if the vehicle A is on a primary road as depicted in FIG. 81b. FIG. 81b depicts an accident scene similar to that in FIG. 81a, however, vehicle A 8115 on primary road 8119 is approaching vehicle B 8117. Vehicle B is turning with trajectory 8121 from secondary road 8123 to primary road 8119. If the answer to decision point 8009 is positive then end x may be calculated from start x, end y, and start y. The calculation of end x may be deferred until end y is estimated from roadway characteristics. The method then proceeds to step 8015. If the answer to decision point 8009 is negative, then end x may be estimated 8013 from roadway characteristics. End y is then estimated 8015 from roadway characteristics.

Figure 82:
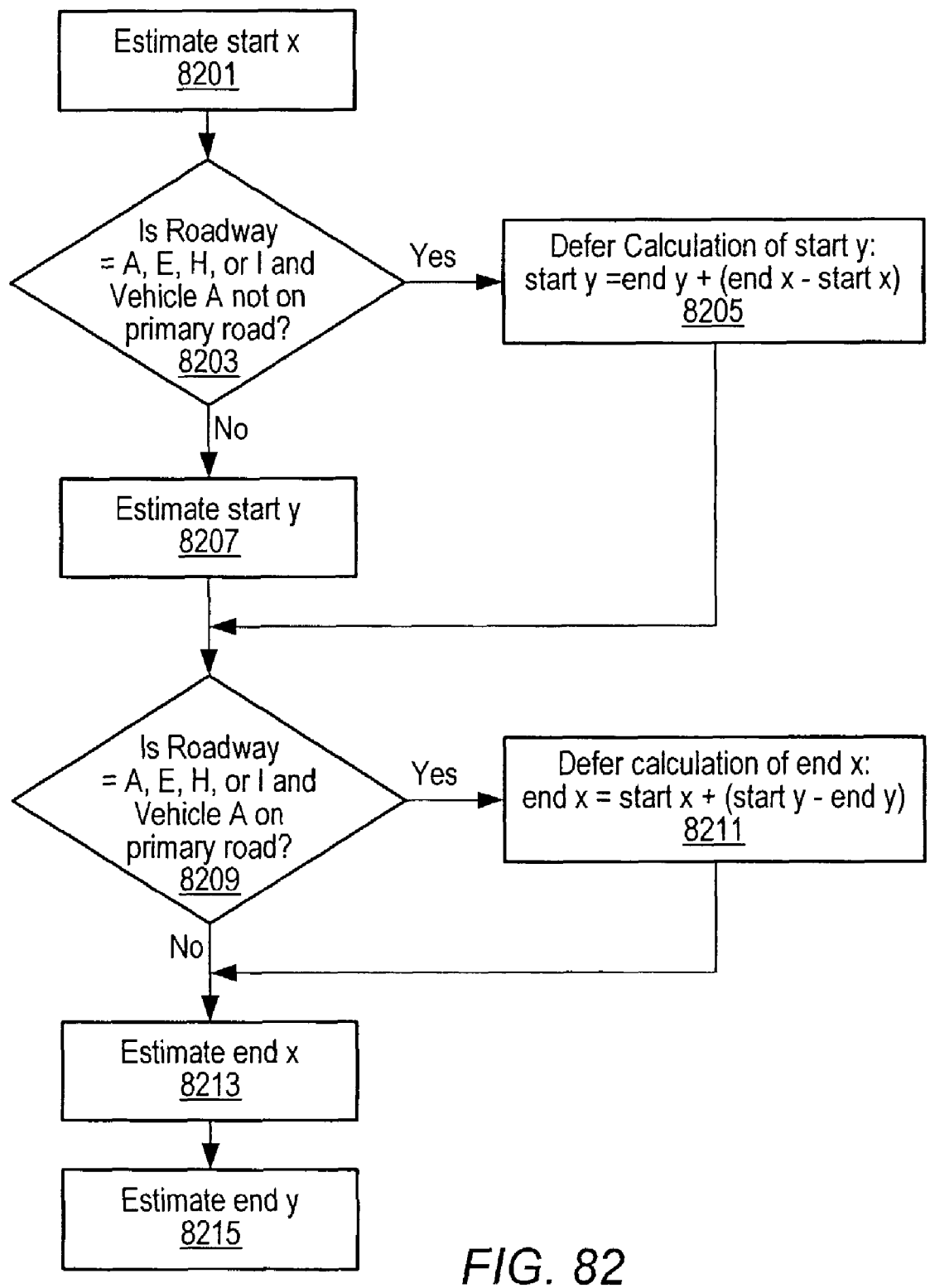
FIG. 82 depicts a flow chart of an embodiment of a method for estimating the start point and intended end position of vehicles in an accident.
Figure 83A:
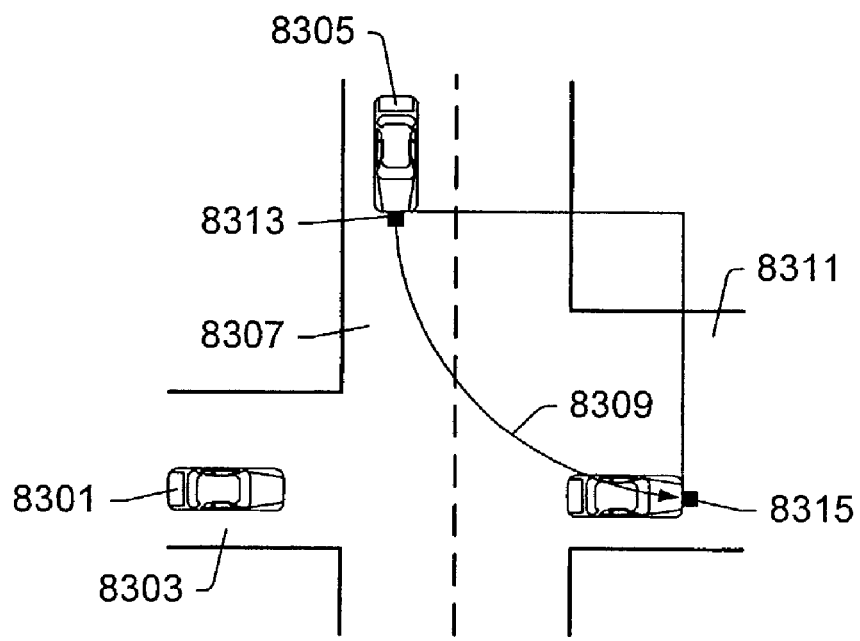
FIGS. 83$a$-$b$ depict illustrations of an accident.

An embodiment of a method for determining start x, start y, end x, and end y for vehicle B for accident type 4 is depicted in FIG. 82. Start x may be estimated 8301 from roadway characteristics. At decision point 8203, it is determined whether roadway configuration is A, E, H, or I and if the vehicle A is not on a primary road as depicted in FIG. 83a. In FIG. 83a, vehicle A 8301 on secondary road 8303 is approaching turning vehicle B 8305 on primary road 8307. Vehicle B is turning with trajectory 8309 to secondary road 8311. Start x, y are given by point 8313 and end x, y are given by point 8315. If the answer to decision point 8203 is positive, then start y may be calculated 8205 from start x, end x, and end y. The calculation of start y may be deferred until start x, end x, and end y are estimated from roadway characteristics. The method continues to decision point 8209. If the answer to decision point 8203 is negative, then start y is estimated from roadway characteristics.

Figure 83B:
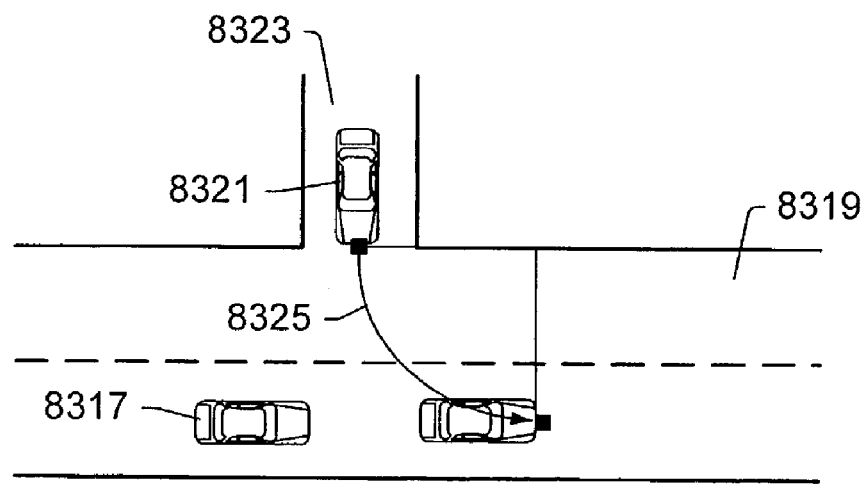

At decision point 8209, it is determined whether roadway configuration is A, E, H, or I and if the vehicle A is on a primary road as depicted in FIG. 83b. FIG. 83b depicts an accident scene similar to that in FIG. 83a, however, vehicle A 8317 on primary road 8319 is approaching vehicle B 8321 on secondary road 8323. Vehicle B is turning with trajectory 8325 on to primary road 8319. If the answer to decision point 8209 is positive then end x may be calculated from start x, end y, and start y. The calculation of end x may be deferred until end y is estimated from roadway characteristics. The method then proceeds to step 8215. If the answer to decision point 8209 is negative, then end x may be estimated 8213 from roadway characteristics. End y is then estimated 8215 from roadway characteristics.

In some embodiments, a method for estimating start x for vehicle B from roadway characteristics for accident type 2 and an orientation of 4 may be given by:

If [B action prior]="constant or slowing"

If [B had stop line]=yes,

B start x=[B distance from stop line to start of first lane]+[intersecting road lane width]*[intersecting road total lanes]+[intersecting road median width]+2*[intersecting road inside shoulder width]

Adjust for median and inside shoulder if necessary. The width and presence of them are combined in to one question—"none"=0 ft.

If [B had stop line]=no,
    B start x=[intersecting road lane width]*[intersecting road total lanes]+[intersecting road median width]+2*[intersecting road inside shoulder width]
    Adjust for median and inside shoulder if necessary. The width and presence of them are combined in to one question—"none"=0 ft.
If [B action prior]="accelerate from a stop" (they were stopped at some point)
    If [B stop position]="behind first lane"
        B start x=[distance stop position to start first lane]+[intersecting road lane width]*[intersecting road total lanes]+[intersecting road median width]+2*[intersecting road inside shoulder width]
    If [B stop position]="at first lane" (width of intersection box)
        B start x=[intersecting road lane width]*[intersecting road total lanes]+[intersecting road median width]+2*[intersecting road inside shoulder width]
    If [B stop position]="after start of first lane" started in intersection
        If [intersecting road median width]=0 ("none")
            B start x=([B stop lane]-0.5)*[intersecting road laneWidth]
        If [intersecting road median width] greater than 0 ("none") and [B stop lane] is less than [intersecting road median after lane #] then
            B start x=([B stop lane]-0.5)*[intersecting road laneWidth]
        If [intersecting road median width] greater than 0 ("none") and [B stop lane]="median" then
            B start x=[intersecting road median after lane #]*[intersecting road laneWidth]
        If [intersecting road median width] greater than 0 ("none") and [B stop lane] is greater than [intersecting road median after lane #] then
            B start x=([B stop lane]-0.5)*[intersecting road laneWidth]+[intersecting road median width]+2*[intersecting road inside shoulder width]

In some embodiments, a method for estimating start y for vehicle B from roadway characteristics for accident type 2 and an orientation of 4 may be given by:
    If [originating median width]=0 ("none")
        B start y=[B Start Lane]*[originating lane width]
    If [originating median width]] 0 (not "none")
        B start y=[B Start Lane]*[originating lane width]+[originating median width]+2*[originating inside shoulder width]

In some embodiments, a method for estimating start x for vehicle B from roadway characteristics for accident type 3, 5, or 17 and an orientation of 1 may be given by:
    If [B median width]=0 ("none")
        B start x=([B Start Lane]-0.5)*[B lane width]
    If [B median width] 0 (not "none")
        B start x=([B Start Lane]-0.5)*[B lane width]+[B median width]+2*[B inside shoulder width]

In some embodiments, a method for estimating start y for vehicle B from roadway characteristics for accident type 3, 5, or 17 and an orientation of 1 may be given by:
If [B action prior]="constant or slowing"
    If [B had stop line]=yes,
        B start y=-1*[B distance from stop line to start of first lane]
    If [B had stop line]=no,
        B start y=0

If [B action prior]="accelerated from a stop"
    If [B stop position]="behind first lane"
        B start y=-1*[B distance stop position to start first lane]
    If [B stop position]="at first lane"
        B start y=0
    If [B stop position]="after start of first lane" started in intersection
    Get [B stop lane] and validate
        If [B stop lane]="median" or is greater than [A collision lane] set [B stop lane] to [A collision lane]
        B start y=([B stop lane]-0.5)*[A lane width]

In some embodiments, a method estimating start x for vehicle B from roadway characteristics for accident type 4 and an orientation of 3 may be given by:
B start x=([B Start Lane]-0.5)*[B lane width]

In certain embodiments, a method for determining start y for vehicle B from roadway characteristics for accident type 4 and an orientation of 3 may be given by:
If [B action prior]="constant or slowing"
    If [B had stop line]=yes
    If [A median width]=0 ("none")
        B start y=[B distance from stop line to start of first lane]+[A lane width]*[A total lanes]
    If [A median width] 0 (not "none")
        B start y=[B distance from stop line to start of first lane]+[A lane width]*[A total lanes]+[A median width]+2*[A inside shoulder width]
    If [B had stop line]=no
    If [A median width]=0 ("none")
        B start y=[A lane width]*[A total lanes]
    If [A median width] 0 (not "none")
        B start y=[A lane width]*[A total lanes]+[A median width]+2*[A inside shoulder width]
If [B action prior]="accelerated from a stop"
    If [B stop position]="behind first lane"
    If [A median width]=0 ("none")
        B start y=[B distance stop position to start first lane]+[A lane width]*[A total lanes]
    If [A median width] 0 (not "none")
        B start y=[B distance stop position to start first lane]+[A lane width]*[A total lanes]+[A median width]+2*[A inside shoulder width]
    If [B stop position]="at first lane" (width of intersection box)
    If [A median width]=0 ("none")
        B start y=[A lane width]*[A total lanes]
    If [A median width]] 0 (not "none")
        B start y=[A lane width]*[A total lanes]+[A median width]+2*[A inside shoulder width]
    If [B stop position]="after start of first lane" started in intersection
    If [A median width]=0 ("none")
        B start y=([B stop lane]-0.5)*[A laneWidth]
    If [A median width] 0 ("none") and [B stop lane]="median" then
        B start y=[A median after lane #]*[A lane width]
    If [A median width] greater than 0 ("none") and [B stop lane] is less than or equal to [A median after lane #] then
        B start y=([B stop lane]-0.5)*[A lane width]
    If [A median width] greater than 0 ("none") and [B stop lane] is greater than [A median after lane #] then
        B start y=([B stop lane]-0.5)*[A lane width]+[A median width]+2*[A inside shoulder width]

In some embodiments, a method for estimating end x for vehicle B from roadway characteristics for accident type 2 and an orientation of 3 may be given by:

$B$ intended end $x$=([$B$ target lane]−0.5)*[intersecting road lane width]

In some embodiments, a method for estimating end y for vehicle B from roadway characteristics for accident type 2 and an orientation of 3 may be given by:
If [$B$ target lane closest]="Yes", then
 B intended end y=−2*[B Vehicle Length]
If [B target lane closest] is "No" then B intended
 B intended end y=−3*[B Vehicle Length]
In some embodiments, a method for estimating end x for vehicle B from roadway characteristics for accident type 3 and an orientation of 4 may be given by:
If [B target lane closest]="Yes" then
 B intended end x=−2*[B Vehicle Length]
If [B target lane closest] is "No" then
 B intended end x=−3*[B Vehicle Length]
In some embodiments, a method for estimating end y for vehicle B from roadway characteristics for accident type 3 and an orientation of 4 may be given by:

$B$ intended end $y$=([$B$ target lane]−0.5)*[$A$ lane width]+[$A$ median width]+2*[$A$ inside shoulder width]

In some embodiments, a method for estimating end x for vehicle B from roadway characteristics for accident type 4 or 5 and an orientation of 2 may be given by:
If [B target lane closest]="Yes", then
 B intended end x=[B Total Lanes]*[B lane width]+[B median width]+2*[B inside shoulder width]+2*[B Vehicle Length]
If [B target lane closest] is "No", then
 B intended end x=[B's Total Lanes]*[B lane width]+[B median width]+2*[B inside shoulder width]+3*[B Vehicle Length]
In some embodiments, a method for estimating end y for vehicle B from roadway characteristics for accident type 4 or 5 and an orientation of 2 may be given by:

$B$ intended end $y$=([$B$ target lane]−0.5)*[$A$ lane width]

In some embodiments, a method for determining end x for vehicle B from roadway characteristics for accident type 17 and an orientation of 1 may be given by:

B intended end x=start x for B

In some embodiments, a method for determining end y for vehicle B from roadway characteristics for accident type 17 and an orientation of 1 may be given by:

$B$ intended end $y$=([$A$ Collision Lane])*[$A$ Lane width]+2*[$B$ Vehicle Length]

As indicated in FIG. 76a at step 7607, an embodiment of a method for estimating the theoretical path of vehicles in an accident may include determining mathematical relationships for the path of at least one point of on at least one vehicle, for example, turning vehicle B. In one embodiment, the path of a point on a vehicle may be described by a portion of an ellipse.

In one embodiment, the method depicted in FIG. 77 may include estimating the start and end coordinates of at least one point on a vehicle, for example, impact point 812 (vehicle point 12 or vehicle12), as shown in FIG. 8a. The start and end coordinates of a vehicle point may be used to determine a mathematical relationship for a trajectory between the start and end coordinates.

In certain embodiments, the start and end coordinates of at least one additional vehicle point may be determined from the start and end coordinates of at least one other vehicle point. Table 4 lists the coordinates of vehicle points with respect to vehicle point 812 for the four vehicle orientations in FIG. 76b. The numbers in the "Point" column refer to vehicle points depicted in FIG. 8a. "W" is the width unit of a vehicle and "L" is the length unit of the vehicle.

TABLE 4

COORDINATES OF VEHICLE POINTS WITH RESPECT TO VEHICLE POINT 12

| | Orientation | | | | | | | |
|---|---|---|---|---|---|---|---|---|
| | 1 | | 2 | | 3 | | 4 | |
| Point | x | y | X | Y | x | y | x | y |
| 801 | W | 0 | 0 | −W | −W | 0 | 0 | W |
| 802 | W | −L | −L | −W | −W | L | L | W |
| 803 | W | −2L | −2L | −W | −W | 2L | 2L | W |
| 804 | W | −3L | −3L | −W | −W | 3L | 3L | W |
| 805 | W | −4L | −4L | −W | −W | 4L | 4L | W |
| 806 | 0 | −4L | −4L | 0 | 0 | 4L | 4L | 0 |
| 807 | −W | −4L | −4L | W | W | 4L | 4L | −W |
| 808 | −W | −3L | −3L | W | W | 3L | 3L | −W |
| 809 | −W | −2L | −2L | W | W | 2L | 2L | −W |
| 810 | −W | −L | −L | W | W | L | L | −W |
| 811 | −W | 0 | 0 | W | W | 0 | 0 | −W |
| 812 | 0 | 0 | 0 | 0 | 0 | 0 | 0 | 0 |

In one embodiment, pseudo-code for determining the coordinates of a vehicle point from the coordinates of vehicle point 12 may be given as:
// get starting values
X12=x value for vehicle point 12
Y12=y value for vehicle point 12
TW=get total width of vehicle for vehicle class
TL=get total length of vehicle from vehicle class (or ask???)
W=TW/2
L=TL/4
// get starting offset for orientation 1
 // get x offset xo
 if pt 6, 12 xo=0
 else if pt 1-5 xo=W
 else xo=−W
 // get y offset yo
 if pt 12 yo=0
 else if pt 6 yo=−4L
 else if pt 7-11 yo=(pt−11)*L
 else yo=(pt−1)*−1*L // pts 1- 5
 // put values somewhere else temporarily so we can swap, if needed
 startXO=xo
 startYO=yo
// modify to fit others, if orientation is not 1
 if orientation=2 // swap x & y; negate x
  xo=startYO*−1
  yo=startXO
 else if orientation=3 // negate x and y
  xo=startXO*−1
  yo=startYO*−1
 else if orientation=4 // swap x & y; negate y
  xo=startYO
  yo=startXO*−1
 // xo, yo already correct for orientation 1

// get x, y based on point 12 and offset
    x=X12+xo
    y=Y12+yo

FIG. 84 depicts a flow chart of an embodiment of a method of estimating a mathematical relationship for a trajectory of one or more vehicle points. The method may include selecting 8401 one or more vehicle points, such that the start and end coordinates of at least one vehicle point are known. For example, the start and end coordinates of vehicle point 12 may be known from the method in FIG. 76a. It may be desirable to select vehicle points that may be used to estimate the coordinates of a collision area shown in FIG. 74. For example, the first vehicle point (vehicleFP), the last vehicle point (vehicleLP), and a collision vehicle point (vehicleCP) may be selected. As used herein, the "first vehicle point" refers to the first point on a turning vehicle to occupy a collision area. For example, vehicle point 7413 may correspond to a first vehicle point. Similarly, the "last vehicle point" refers to the last point on a vehicle to occupy the collision area. For example, vehicle point 7417 may correspond to a last vehicle point. In addition, the "collision point" refers to the point on the roadway within the collision area where impact points of vehicles in the accident meet. For example, vehicle point 7421 may correspond to a collision point. In one embodiment, the first point and last point may depend on the accident type. Table 5 lists the vehicle points that correspond to several accident types.

TABLE 5

VEHICLE POINTS CORRESPONDING TO ACCIDENT TYPES

| Accident Type | VehicleFP | VehicleLP |
|---|---|---|
| 2 | 811 | 805 |
| 3 | 801 | 807 |
| 4 | 801 | 807 |
| 5 | 811 | 805 |
| 17 | 812 | 806 |

The collision vehicle point may correspond to the vehicle B impact point.

In some embodiments, a method may further include determining 8403 the start and end coordinates of vehicle points that are unknown from the known coordinates of a vehicle point. For example, the start and end coordinates of vehicleFP and vehicleLP may be determined from the coordinates of vehicle12 using Table 4.

In certain embodiments, a method may include determining 8405 a mathematical relationship or curve between the start and end coordinates of at least one vehicle point. The mathematical relationship may represent the trajectory of at least one vehicle point. The mathematical relationship may be determined using the start and end coordinates of at least one vehicle point. For example, trajectory 7415 in FIG. 74 may be a curve for vehicleFP (FP curve), trajectory 7419 may be a curve for vehicleLP (LP curve), and trajectory 7423 may be a curve for vehicleCP (CP curve).

Figure 85:
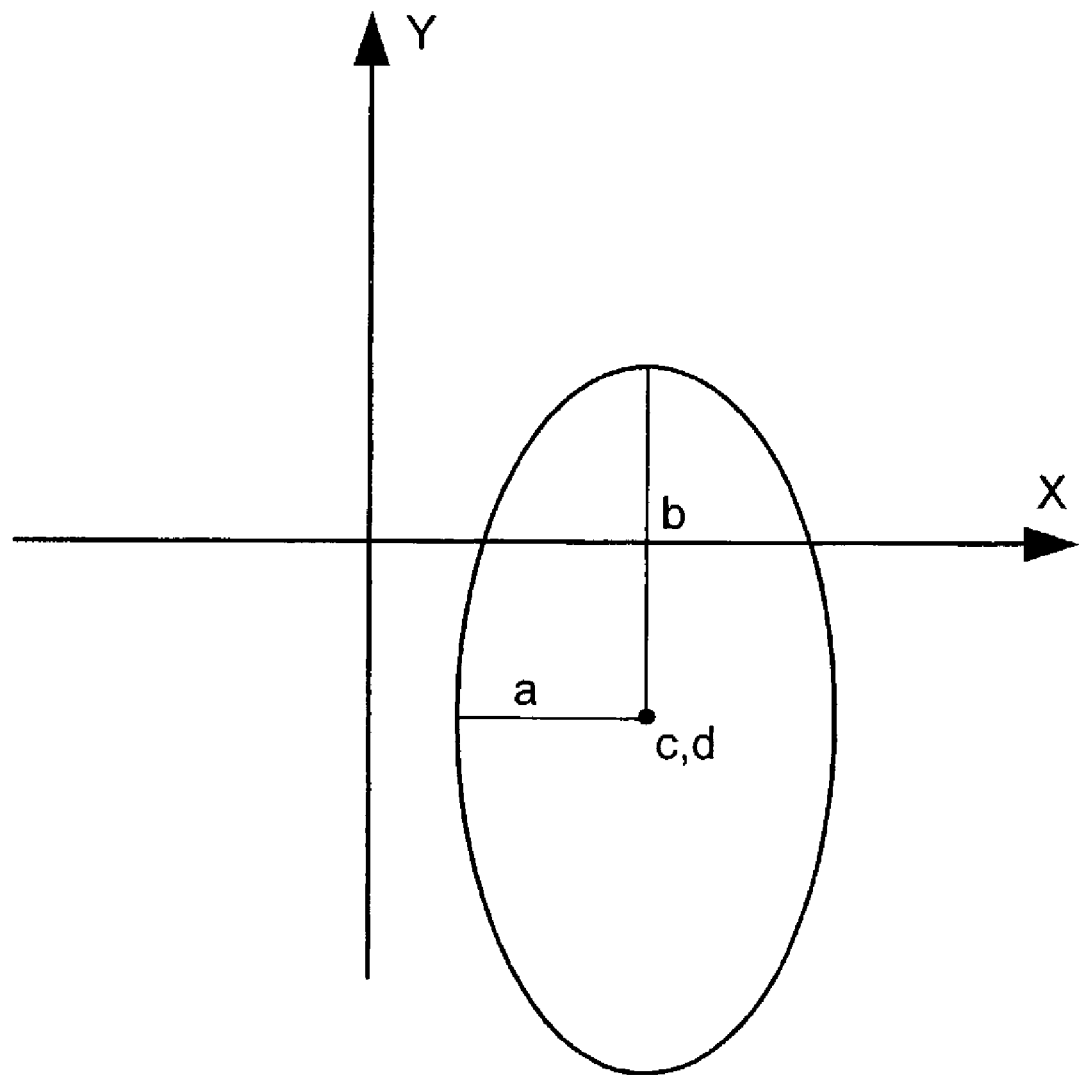
FIG. 85 depicts an ellipse with axes "a" and "b" centered at (c, d).

In one embodiment, a mathematical relationship for a trajectory of a vehicle point may be a portion of an ellipse. The general equation for an ellipse is given by:

$$(x-c)^2/a + (y-d)^2/b$$

where "a" is the length of a first axis of the ellipse and "b" is the length of a second axis of the ellipse that is centered at (c, d). FIG. 85 depicts an ellipse with axes "a" and "b" centered at (c, d).

In some embodiments, the starting point of a curve, such as an ellipse, that describes a trajectory of vehicle B may not correspond to a start point (start x and start y) of vehicle B. In an embodiment, the starting point may not correspond to the start of a curve when vehicle B accelerated from a stop prior to the accident. For example, vehicle B may have accelerated from a stop that was further back from the point where vehicle B started an elliptical path. A method of estimating the coordinates of the start of an ellipse (ES x, ES y) and the distance from the ellipse start to the start point ($D_{SP\ to\ ES}$) may be given by:

If Orientation 1
    Find Ellipse Start y
        If Vehicle12 y at Start is less than −[B Vehicle Length], then Vehicle ES y value=−[B Vehicle Length].
        If Vehicle12 y at Start is greater than or equal to −[B Vehicle Length], then
        Vehicle ES y value=Vehicle12 y at Start
    Find Ellipse Start x
        Vehicle ES x value=Vehicle12 x at Start
    Find $D_{SP\ to\ ES}$
        $D_{SP\ to\ ES}$=ABS(Vehicle ES y−Vehicle 12 y)
If Orientation 3
    Find Ellipse Start y
        If Vehicle12 y at Start is greater than [A lane width]*[A total lanes]+[A median width]+2*[A inside shoulder width]+[B Vehicle Length], then
        Vehicle ES y=[A lane width]*[A total lanes]+[A median width]+2*[A inside shoulder width]+[B Vehicle Length]
        If Vehicle12 y at Start is less than or equal to [A lane width]*[A total lanes]+[A median width]+2*[A inside shoulder width]+[B vehicle Length], then
        Vehicle ES y value=Vehicle12 y at Start
    Find Ellipse Start x
        Vehicle ES x value=Vehicle 12 x at Start
    Find $D_{SP\ to\ ES}$
        $D_{SP\ to\ ES}$=ABS(Vehicle 12 y−vehicle ES y)
If Orientation 4
    Find Ellipse Start x
        If Vehicle 12 x at Start is greater than [intersecting road lane width]*[intersecting road total lanes]+[intersecting road median width]+2*[intersecting road inside shoulder width]+[B Vehicle Length], then
        Vehicle ES x=[intersecting road lane width]*[intersecting road total lanes]+[intersecting road median width]+2*[intersecting road inside shoulder width]+[B Vehicle Length]
        If Vehicle 12 at Start is less than or equal to [intersecting road lane width]*[intersecting road total lanes]+[intersecting road median width]+2*[intersecting road inside shoulder width]+[B Vehicle Length], then
        Vehicle ES x value=Vehicle 12 x at Start
    Find Ellipse Start y
        Vehicle ES y value=Vehicle 12 y at Start
    Find $D_{SP\ to\ ES}$
        $D_{SP\ to\ ES}$=ABS(Vehicle 12 x−vehicle ES x)

In one embodiment, the values of a, b, c, and d may be determined for at least one vehicle point to generate an equation for an ellipse of the trajectory of the vehicle point. The value of "a" for a vehicle point may be determined from:

$a$=Absolute value(vehicle point ellipse start $x(ES\ x)$−end $x$ of vehicle point)

The value of "b" for a vehicle point may be determined from:

b=Absolute value(vehicle point ellipse start y(ES y)–end y of vehicle point)

The values of "c" and "d" may depend on the accident type. For example, c and d for accident type 2 may be given by:

c=ES x d=end y

In addition, c and d for accident types 3, 4, 5, and 17 may be given by:

c=end x d=ES y

Figure 86A:
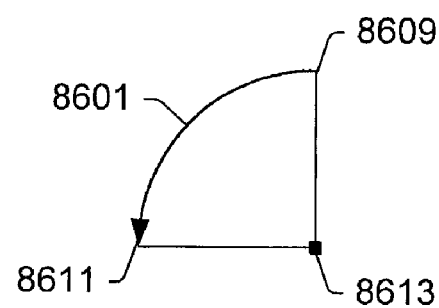
FIGS. 86$a$-$c$ depict portions of ellipses that represent trajectories for various accident types.
Figure 86B:
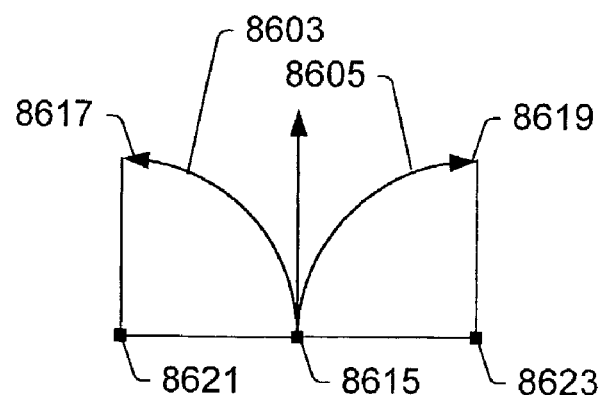
Figure 86C:
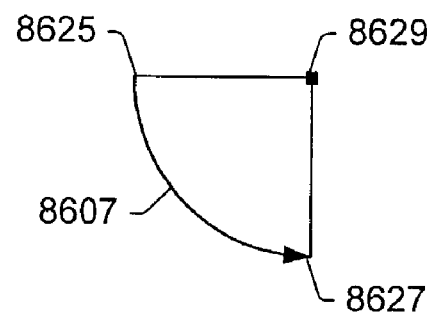

FIGS. 86a-c depict portions of ellipses that represent trajectories for various accident types. FIG. 86a depicts portion 8601 for accident type 2. Point 8609 is the start of the portion of the ellipse, point 8611 is the end of the portion of the ellipse, and point 8613 is the center of the ellipse. FIG. 86b depicts portion 8603 for accident type 3 and portion 8605 for accident type 5. For portion 8603, point 8615 is the start of the portion of the ellipse, point 8617 is the end of the portion of the ellipse, and point 8621 is the center of the ellipse. For portion 8605, point 8615 is the start of the portion of an ellipse, point 8619 is the end of the portion of the ellipse, and point 8623 is the center of the ellipse. FIG. 86c depicts portion 8607 for accident type 4. Point 8625 is the start of a portion of an ellipse, point 8627 is the end of a portion of an ellipse, and point 8629 is the center of the ellipse.

An embodiment of a method of using the speed, time, and distance of vehicles for assessing liability illustrated by the flow chart in FIG. 72 may also include estimating 7205 coordinates of the collision area. In an embodiment, a collision area may be defined using a collision lane and a trajectory of at least one point on the turning vehicle. The collision area, as shown in FIG. 74, may be rectangular in shape. In other embodiments, the collision area may be other shapes, such as square or elliptical.

"Collision area points" refer to points on or inside the collision area that are intersected by vehicle points. "AreaFP" may refer to the point at which the first vehicle point of a vehicle (vehicleFP) enters the collision area. For example, collision area point 7429 in FIG. 74 may be an areaFP. In one embodiment, areaFP may be determined from the first intersection of the trajectory of vehicleFP and the collision lane. For example, the intersection of trajectory 7415 with edge 7435 of collision lane 7427 may determine areaFP. In an embodiment, the trajectory of vehicleFP, such as trajectory 7415, may be a mathematical relationship, such as an ellipse, derived using the method depicted in FIG. 84.

In an embodiment, the equation for the edge of the collision lane may depend on the accident type. The x and y coordinates of areaFP may be given as:
- AT 2, 4: areaFPy=vehicle12y of vehicle A+½ [collision lane width]
- AT 3, 5: areaFPy=vehicle12y of vehicle A–½ [collision lane width]
- areaFPx=ellipseIntercept(curve=FP, x value=N/A, y value=areaFPy)
- AT 17: areaFPx=B start x–½ [vehicle B lane width]
  areaFPy=vehicle12–½ [vehicle A lane width]

Vehicle12y of vehicle A is the y coordinate of vehicle12. EllipseIntercept may refer to a function that determines the x-value of a point on an ellipse at a known y-value. For accident type 3, an x-value may be determined from:

$x=c+a(1-(y-d)^2/b^2)^{1/2}$ where a, b, c, and d are ellipse parameters shown in FIG. 85. The x-value for accident types 2, 4, and 5 may be determined from:

$x=c-a(1-(y-d)^2/b^2)^{1/2}$

Similarly, a y-value may be determined from a known x-value. For accident types 2, 3, and 5, a y-value may be determined from:

$y=d+b(1-(x-c)^2/a^2)^{1/2}$

For accident type 4, a y-value may be determined from:

$y=d-b(1-(x-c)^2/a^2)^{1/2}$

"AreaLP" may refer to the point at which the last vehicle point of a vehicle (vehicleLP) exits the collision area. For example, collision area point 7431 in FIG. 74 may be an areaLP. In one embodiment, areaLP may be determined from the second intersection of the trajectory of vehicleLP with the collision lane. For example, the intersection of trajectory 7419 with edge 7437 of collision lane 7427 may determine areaLP. In an embodiment, the trajectory of vehicleLP may be a mathematical relationship, such as an ellipse, derived using the method depicted in FIG. 84. The coordinates of areaLP may be given as:
If AT 17
  areaLPx=vehicle B start x+½ [B Lane Width]
  areaLPy=vehicle A vehicle12+½ [A lane width]
If AT2, 3, 4, 5
  areaLPx=ellipseIntercept(LP, N/A, areaLPy)
If AT 2, 4: areaLPy=A vehicle12–½ [A lane width]
If AT 3, 5: areaLPy=A vehicle12+½ [A lane width]

"AreaCP" may refer to the point inside the collision area at which the trajectory of impact points (vehicleCP) of vehicle A and vehicle B intersect. For example, areaCP in FIG. 74, point 7441, may be determined from the intersection of trajectory 7443 of vehicle point 7439 with trajectory 7423 of vehicle point 7421. The trajectory of vehicleCP of vehicle B, such as trajectory 7423, may be a mathematical relationship, such as an ellipse, derived using the method depicted in FIG. 84. Trajectory 7423 corresponds to the trajectory of the impact point of vehicle B (B vehicleCP). The coordinates of areaCP may be given by:
  areaCPy=([A Collision Lane]–0.5)*[A Lane Width]+ widthDifference
  widthDifference=
    If impact point 1, 2, 3, 4, 5, widthDifference=–3
    If impact point 6, 12, widthDifference=0
    If impact point 7, 8, 9, 10, 11, widthDifference=3
  areaCPx=ellipseIntercept(CP, N/A, areaCPy)

An embodiment of a method of using speed, time, and distance of vehicles for assessing liability illustrated by the flow chart in FIG. 72 may also include estimating 7207 the time, a perception time, for a collision point on the reference vehicle to travel from a perception point to the collision area. The perception point may be determined using a visibility start point. The "visibility start point" is a position on the reference vehicle's travel path at which a reacting vehicle may be expected to first notice the reference vehicle. The time at the visibility start point may be no earlier than the time at the start point of the reference vehicle.

Figure 87A:
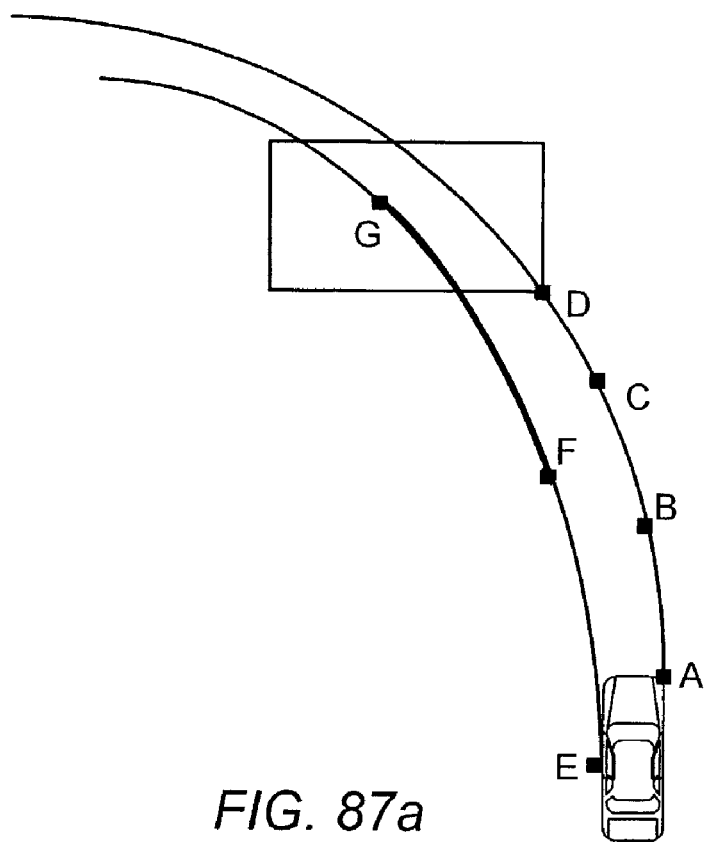
FIGS. 87$a$-$b$ depict the trajectories of vehicle points.
Figure 87B:
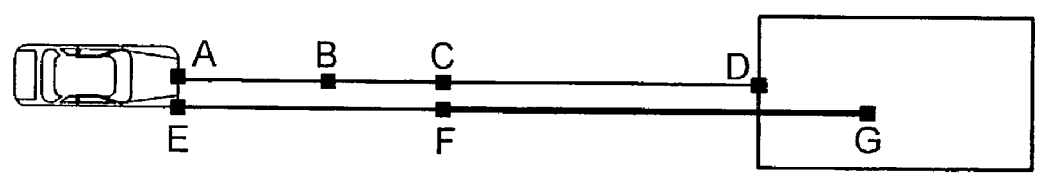

FIG. 87a and FIG. 87b depict the trajectories of vehicle points for vehicles A and B, respectively. Point A is vehicleFP at the start point of vehicle A (FIG. 87b) or vehicle B (FIG. 87a), point B is vehicleFP at the visibility start, point C is vehicleFP at the perception point, and point D is vehicleFP at areaFP. Point E is vehicleCP at the start point, point F is vehicleCP when vehicleFP is at the perception point, and point G is vehicleCP at areaCP. As shown in FIG. 87a and 87b, the points may refer to either vehicle A or vehicle B.

Figure 88:
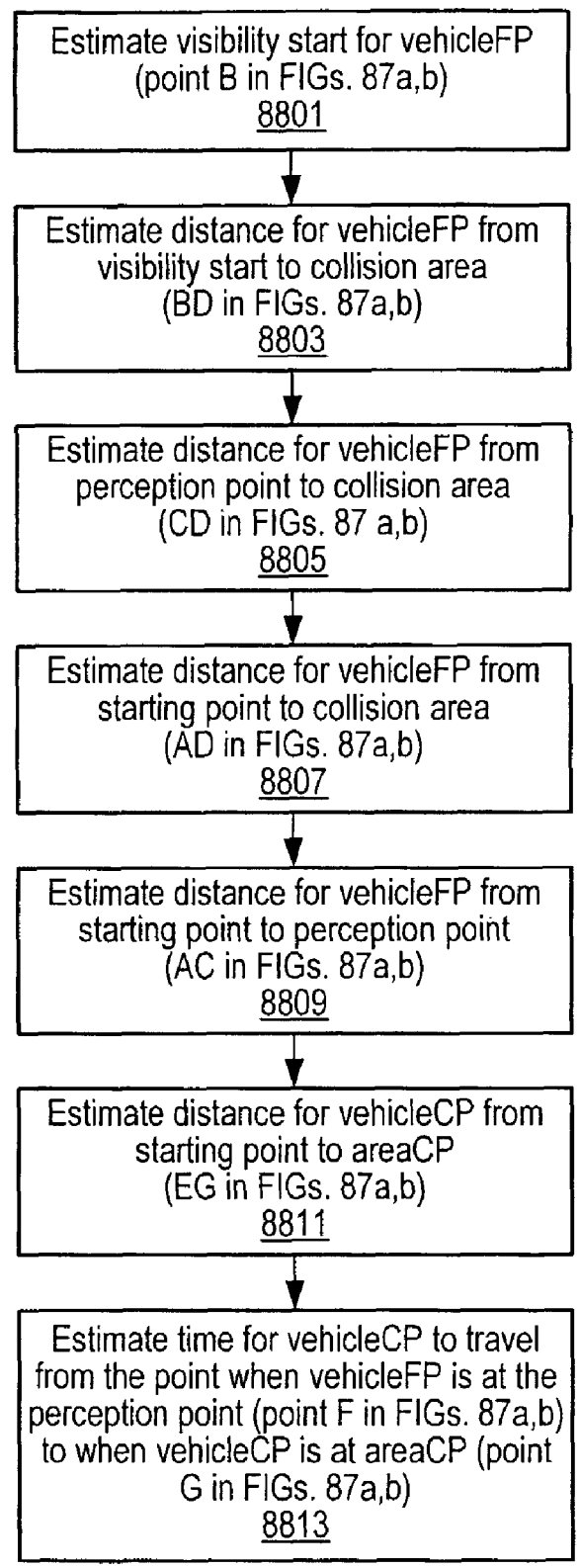
FIG. 88 depicts a flow chart of an embodiment of a method of estimating the time and distance traveled by a vehicle point.

FIG. 88 depicts a flow chart of an embodiment of a method of estimating the time and distance traveled by vehicleCP from the perception point to the collision point. Referring to FIG. 87a or FIG. 87b, the method estimates the time and distance between point F and point G (FG). The method includes estimating 8801 the visibility start point for vehicleFP, which is point B in FIGS. 87a and b. In one embodiment, the visibility start point may be the start point for the reference vehicle estimated with the method depicted in FIG. 84. For example, the visibility start point may be at the start point of vehicleFP.

Alternatively, the visibility start point may differ from the start point if a view of the roadway was obstructed, for example, by parked cars. In one embodiment, if the start point of the vehicle is at the edge or inside the intersection box shown in FIG. 73, then the visibility start point may be at the start point of vehicleFP. If the start point is behind the edge of the intersection box, the visibility start point may be at the edge of the intersection box. In one embodiment, a method of estimating the visibility start point (Vis start) may include the following:

If viewObstructed
   If vehicle's start point at edge of or inside intersection box
      Vis start x=start vehicleFP x
      Vis start y=start vehicleFP y
   If start point behind edge of intersection box
      Visibility start point is edge of intersection box
      B reference vehicle
         Start orientation=1
            If AT 17: Vis start x=B start vehicleFP x
            Other ATs: Vis start x=ellipseIntersect(FP ellipse, x=N/A, y=0)
            Vis start y=0
         Start orientation=4
            Vis start x=right intersection edge=[intersecting road lane width]*[intersecting road total lanes]+[intersecting road median width]+2*[intersecting road inside shoulder width]
            Vis start y=ellipseIntercept(FP ellipse, x=vis start x, y=N/A)
         Start orientation=3
            Vis start x=ellipseIntercept(FP ellipse, x=N/A, y=vis start y)
            Vis start y=top intersection edge=[A lane width]*[A total lanes]+[A median width]+2*[A inside shoulder width]
      A reference vehicle
         Start orientation=2
            Vis start x=0
            Vis start y=start vehicleFP y
If view not obstructed
   Vis start x=vehicleFP x
   Vis start y=vehicleFP y In an embodiment, the method in FIG. 88 may further include estimating 8803 a distance from vehicleFP at visibility start (point B) to the collision area (point D or areaFP), which is BD in FIGS. 87a and b. For example, if vehicle B is the reference vehicle and its view is obstructed, BD may be found from the arc length of an FP curve from the start point to the collision area. An "FP curve" is a mathematical relationship representing the trajectory of vehicleFP. In an embodiment, the curve may be a portion of an ellipse. In one embodiment, the estimation of the arc length of an ellipse may be expressed as follows:

$$BD = \text{arclength}(FP,B \text{ vis start } x, \text{area}FPx)$$

If the view is not obstructed, BD is the arc length above in addition to the distance from the start point to the ellipse start:

$$BD = \text{arclength}(FP,B \text{ vis start } x, \text{area}FPx) + D_{SP \text{ to } ES}$$

Arclength(curve, x1, x2) is a function which calculates the arc length of ellipse "curve" between "x1" and "x2." The pseudo-code for the arc length function may be given as:

```
Float f(x,a,b)
// beware of having to cast expression or sub-expressions to float
Return(sqrt(a^2*cos(x)^2+b^2*sin(x)^2))
// for AT 17, call this method but use the two y values of the
    points instead of the x values
Float arclength(curve, x1, x2)
// beware of need to cast to float
get a,b,c,d for the appropriate ellipse, FP, CP, LP
// check for cases where ellipse is a line
if (a==0)
    if AT 17 return abs(x2-x1) // note inputs are really y values
        in this case else error
If (b==0)
    return abs(x2-x1) // this should never happen
// center ellipse on origin
x1=x1-c
x2=x2-c
// ensure arc is to the right of y axis (positive x values)
x1=abs(x1)
x2=abs(x2)
if (x1>x2) {
    float temp
    temp=x1
    x1=x2
    x2=temp
}
// ensure x not beyond A axis of ellipse
if (x2>a)
    x2=a
    if (x1<0)
        x1=0
// express integral limits in terms of x, instead of in radians
float lowerLimit, upperLimit
lowerLimit=arcsin(x1/a)
upperLimit=arcsin(x2/a)
/* evaluate integral as described in white paper */
// set number of iterations <<to be determined experimen-
    tally>> MUST BE EVEN
int iterations=8
stepSize=(upperLimit-lowerLimit)/iterations
// evaluate first and last terms
float sum=0
sum=f(lowerLimit,a,b)+f(upperLimit,a,b)
// evaluate remaining n-2 terms
int coefficient=2
for(int k=1; k<iterations; ++k) {
    coefficient=6-coefficient
    sum+=coefficient*f(lowerLimit+k*stepSize,a,b)
}
sum *=stepSize/3
return(sum)
```

If vehicle A is the reference vehicle, BD may be found from:

$$BD = \min(\text{area}FPx \text{ and area}LPx) - \text{vis start } x$$

In one embodiment, the method in FIG. 88 may also include estimating 8805 a distance for vehicleFP at the perception point (point C) to the collision area (point D or areaFP), which is CD in FIGS. 87a and b. First, it may be determined whether vehicle A or vehicle B is on the near side or the far side. The terms "near side" and "far side" refer to the distance between vehicles as they enter an intersection. A relatively large distance between vehicles may correspond to a reacting vehicle approaching from the far side of an intersection with respect to a reference vehicle. Alternatively, a relatively small distance between vehicles may correspond to a reacting vehicle approaching from the near side of an intersection with respect to a reference vehicle. In one embodiment, near side or far side may be determined by the following:

AT 3, 5, 17
    If reference vehicle is vehicle A and [B Median Width] is greater than "none", or Roadway=H and [Primary Road]="No", or [B Center Turn Lane]="Yes", Far Side
    Otherwise, Near Side
AT 4
    If reference vehicle is vehicle B and [A Median Width] is greater than "none" or Roadway=H and [Primary Road]="Yes" or [A Center Turn Lane]="Yes", Far Side
    Otherwise, Near Side
AT 2
    If [Originating Median Width] is greater than "none" or Roadway=H and [Primary Road]="Yes" or [Originating Center Turn Lane}="Yes", Far Side
    Otherwise, Near Side In one embodiment, the reference vehicle may travel a specified distance from visibility start (point B in FIGS. 87a and b) to the collision area (point D on FIGS. 87a and b) before the reacting vehicle perceives danger. If the vehicle is on the far side, then the reference vehicle may travel specified fraction of the distance from point B to point D before the reacting vehicle perceives danger. In one embodiment, the specified fraction may be two thirds, which makes CD approximately ⅓*BD. In other embodiments, specified fraction may be slightly more or less than two thirds. If the vehicle is on the near side, then the reference vehicle may travel a another specified fraction of the distance from point B to point D before the reacting vehicle perceives danger. In an embodiment, the specified fraction may be one third, which makes CD approximately ⅔*BD. In some embodiments, the another specified fraction may be slightly more or less than one third.

An embodiment of the method in FIG. 88 may include estimating 8807 a distance for vehicleFP from the starting point (point A) to the collision area (point D or areaFP), which is AD in FIGS. 87a and b. If vehicle B is the reference vehicle, AD in FIG. 87a, may be given by the arc length of an FP curve (from the curve start to the collision area) and the distance from the start point to the curve start. For example, AD may be given by:

$$AD = \text{arclength}(FP, \text{vehicleFPx ES, areaFPx}) + D_{SP\ to\ ES}$$

where vehicleFPxES is the x-coordinate of vehicleFP at the start of the ellipse.

If vehicle A is the reference vehicle, AD may be found from $$AD = \min(\text{areaFPx and areaLPx}) - A\ \text{start vehicleFPx}$$

The distance for vehicleFP may then be estimated 8809 from the starting point of a vehicle to the perception point, which is AC in FIGS. 87a and b from:

$$AC = AD - CD$$

where CD has been determined at step 8805. The method in FIG. 88 may also include estimating 8811 the distance for vehicleCP from the starting point of a vehicle (point E) to the collision area (point G or vehicleCP at areaCP), which is EG in FIGS. 87a and b. If vehicle B is the reference vehicle, EG in FIG. 88a may be estimated from the arc length of a CP curve from the curve start to point G and the distance from the start point to the curve start. A "CP curve" is mathematical relationship, such as a portion of an ellipse, representing the trajectory of vehicleCP. For example, EG may be given by:

$$EG = \text{arclength}(CP, B\ \text{vehicleCPx ES, areaCPx}) + D_{SP\ to\ ES}$$

If vehicle A is the reference vehicle, EG may be found from $$EG = \text{areaCPx} - A\ \text{start vehicleCPx}$$

An embodiment of the method in FIG. 88 may include estimating 8813 the time for vehicleCP to travel from the point when vehicleFP is at the perception point (point F) to when vehicleCP is at areaCP (point G). $t_{FG}$ may be determined by:

$$t_{FG} = t_{EG} - t_{EF}$$

$t_{EG}$, the time to travel distance EG, may be estimated from the initial velocity of a vehicle ($v_0$), the acceleration ($a_A$), and the maximum curve velocity ($v_{MC}$).

In general, the time to travel a distance with no acceleration may be determined by the distance divided by the velocity. Furthermore, the time to travel a distance with acceleration may be determined from:

$$t = (v_0 \pm (v_0^2 + 2ad)^{1/2})/2$$

where a is the acceleration, d is the distance, and $v_0$ is the initial velocity. However, if a vehicle is accelerating on a curve, the speed is limited to the maximum curve velocity. The time for a vehicle to travel a distance d on a curve that reaches the maximum curve velocity may include two portions, $t_1$ and $t_2$. $t_1$ is the time to reach the maximum curve velocity:

$$t_1 = (v_{Mc} - v_0)/d$$

The time traveled at the maximum curve velocity is given by:

$$t_2 = (d - d_1)/v_{MC}$$

where $$d_1 = v_0 t_1 + \tfrac{1}{2} a t_1^2$$

In one embodiment, a function, timeToTravel(d, accelerating, $v_0$, a, maxv, endv), may be used to determine the time to travel a given distance, where "endv" is the velocity at the endpoint of a trajectory. "Accelerating" refers to whether the vehicle is accelerating or not. The timeToTravel function may also determine the velocity at the endpoint.

For example, $t_{EG}$ may be estimated by:

$$t_{EG} = \text{timeToTravel}(EG, \text{accelerating}, v_0, a_A, v_{MC}, v_G)$$

$a_A$ is a positive acceleration. In one embodiment, pseudo-code for the function timeToTravel may be given by:
timeToTravel(d, accelerating, v, a, maxv, &endv)
if d<0
    d=0
if accelerating or a < >0
    if maxv given // on a curve
        v=min(v, maxv)
    // get time to reach maxv

```
t1=(vmax-v)/a
// how far travelled in that time
d1=v*t1+0.5*a*t1*t1
if d1<=d // reached maxv before distance travelled
    endv=maxv
    // remaining distance d-d1 covered at constant speed
    // total time is time accelerating+time at constant
    t=t1+(d-d1)/maxv
else // never reached maxv
    if not solveQuadratic(0.5*a, v, -1*d, t) error!! //else t
        is the time
else // unconstrained acceleration
    if v=0
        t=sqrt(2*d/a)
    else
        if not solveQuadratic(0.5*a, v, -1*d, t) error!! //else t
            is the time
    endv=v+at
else // constant speed
    if maxv given
        v=min(v, maxv)
    t=d/v
    endv=v
```

As used herein, the maximum curve velocity ($v_{MC}$) may be the speed of a turning vehicle at which the driver of the vehicle experiences a specified gravitational force in a direction outward from the curve. The maximum curve velocity may be applicable to vehicle B when it is turning and accelerating. In one embodiment, the specified gravitational force may be the maximum force that a driver may comfortably tolerate.

The maximum curve velocity may depend on whether the curve radius is increasing or decreasing. For example, for accident type 2 b<a: decreasing curve radius b≥a: increasing curve radius where a and b are radii of an ellipse shown in FIG. 85. Similarly, for accident types 3, 4, and 5 b<a: increasing curve radius b≥a: decreasing curve radius

In one embodiment, the maximum curve speed for an ellipse may be approximated by the maximum the speed for an equivalent circle. The radius of an equivalent circle may be determined from:

decreasing radius, $r=\min(a,b)$ increasing radius, $r=(a+b)/2$

In an embodiment, the maximum curve speed may be estimated from a percentage of a critical curve speed (CCS). The critical curve speed is defined as the speed beyond which a vehicle slides out of a turn. Alternatively, the maximum curve speed may be estimated using a gravitational force that a driver tolerates during a turn. The speed at which a driver would experience the tolerated gravitational force may be given as $CCS$(in miles per hour)$=3.86((\text{radius in feet}*C_f)^{1/2}$ where $C_f$ is the coefficient of friction between a vehicle and a roadway. In some embodiments, $C_f$ may be between about 0.3 and about 0.5. In other embodiments, $C_f$ may be between about 0.2 and 0.3. In certain embodiments, $C_f$ may be between about 0.5 and 0.6.

In one embodiment, $t_{EF}$ may be determined from $t_{AC}$. $t_{EF}$ is the same as $t_{AC}$ since all of the points on a vehicle travel together, and, therefore, take the same amount of time to travel. $t_{AC}$ may be determined from distance AC, the initial velocity of a vehicle, the acceleration, and the maximum curve velocity. For example, $t_{AC}$ may be estimated by:

$t_{AC}$=timeToTravel($AC$,accelerating,$v_0,a_A,v_{MC},v_C$)

An embodiment of a method of using the speed, time, and distance of vehicles for assessing liability illustrated by the flow chart in FIG. 72 may also include estimating 7209 a location of a reacting vehicle. In one embodiment, $t_{FG}$ for the reference vehicle may be used to estimate a location of the reacting vehicle. In certain embodiments, the position of the reacting vehicle at time, $t_{FG}$, before the collision may be used to assess an opportunity of the reacting vehicle to avoid the accident. At $t_{FG}$ before the collision, both the reference vehicle and the reacting vehicle may have at least some opportunity to notice one another. Therefore, $t_{FG}$ before the collision may be the earliest point at which the vehicles may have started to perceive, react, and brake.

FIG. 87a and FIG. 87b will be referred to in embodiments of methods of locating the reacting vehicle. The location of the reacting vehicle $t_{FC}$ before the collision may be at point F in FIG. 87a and FIG. 87b. Therefore, the reacting vehicle may be pushed back a distance $FG_{RV}$ from the location of the collision. $t_{FG}$ may be referred to as $t_{PB}$. In an embodiment, estimating the location of the reacting vehicle may depend on its actions prior to the accident. The actions may include continuing from a constant rate of speed, traveling at a constant speed and then braking, and accelerating from a stop.

In some embodiments, if the action of the reacting vehicle is continuing from a constant rate of speed then:

$EF_{RV}=v_0 t_{AC}$ where $t_{AC}$ is determined at step 8813 in FIG. 88. In addition, $FG_{RV}$ may be determined from:

$FG_{RV}=v_0 t_{PB}$ where $v_0$ is the initial velocity of the reacting vehicle and $t_{PB}$ is determined at step 8813 in FIG. 88.

Figure 89:
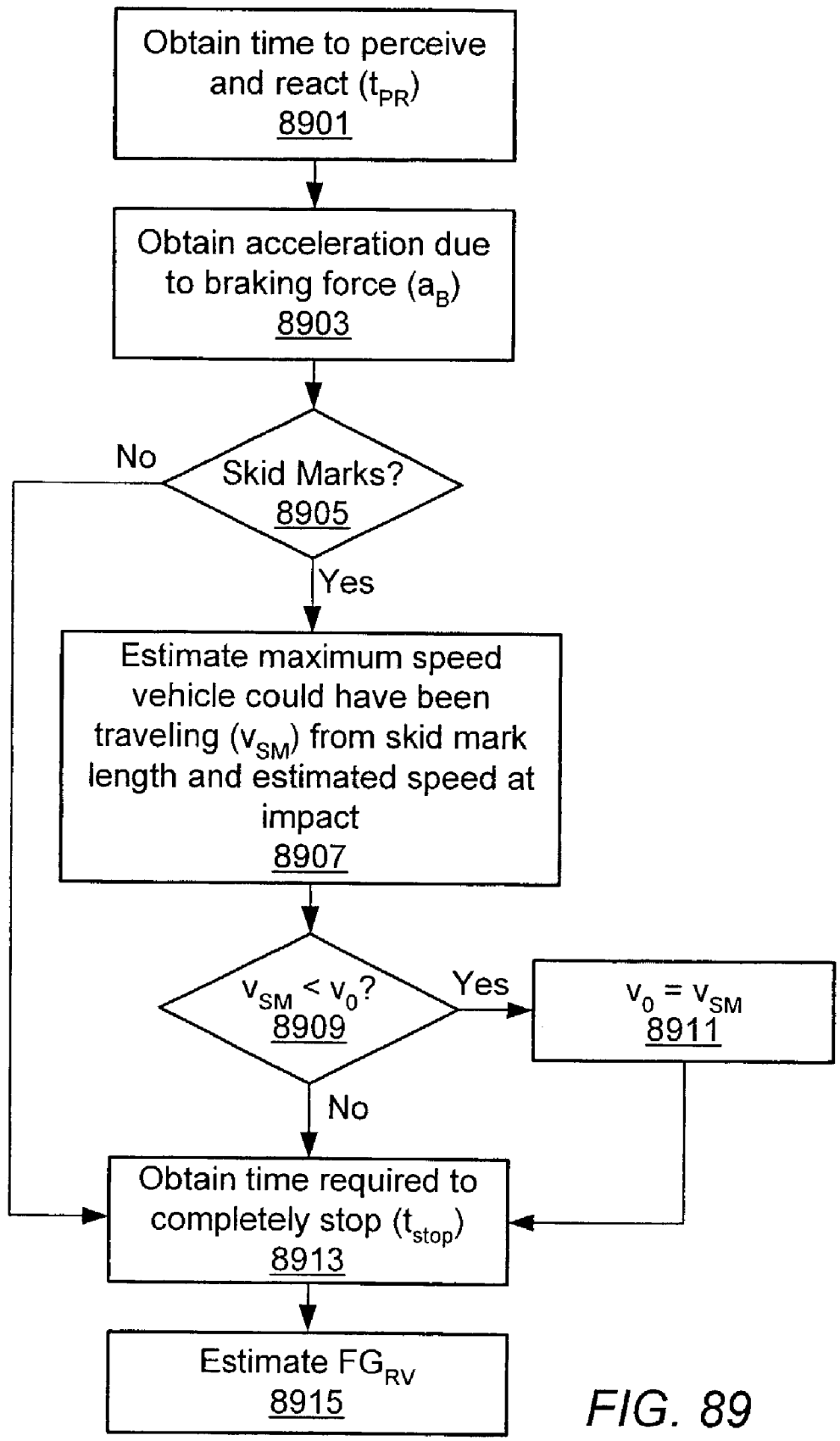
FIG. 89 depicts a flow chart of an embodiment of a method of locating a reacting vehicle.

FIG. 89 depicts a flow chart of an embodiment of a method of locating the reacting vehicle if the vehicle was traveling at a constant speed and then braked. The method may include obtaining 8901 a time to perceive and react or perception-reaction time ($t_{PR}$). $t_{PR}$ refers to the time required for a driver to perceive and react to danger. $t_{PR}$ may depend on the weather, lighting, and type of roadway. Table 6 lists perception-reaction times for various roadways and weather and lighting conditions.

TABLE 6

PERCEPTION-REACTION (PR) TIMES FOR VARIOUS ROADWAYS AND WEATHER AND LIGHTING CONDITIONS

| PR Time (sec) | Weather | Lighting | Roadway |
| --- | --- | --- | --- |
| 1.5 | Clear | Daylight | — |
| 1.5 | Cloudy | Daylight | — |
| 1.5 | Misting Rain | Daylight | — |
| 2.5 | — | Daylight | Curved |
| 2.5 | — | Daylight | Hillcrest |
| 2.5 | Light-Moderate Rain | Daylight | — |
| 2.5 | Light-Moderate Snow | Daylight | — |
| 2.5 | Clear | Dawn | — |
| 2.5 | Cloudy | Dawn | — |

TABLE 6-continued

PERCEPTION-REACTION (PR) TIMES FOR VARIOUS
ROADWAYS AND WEATHER AND LIGHTING
CONDITIONS

| PR Time (sec) | Weather | Lighting | Roadway |
|---|---|---|---|
| 2.5 | Clear | Dusk | — |
| 2.5 | Cloudy | Dusk | — |
| 2.5 | Misting Rain | Dawn | — |
| 2.5 | Misting Rain | Dusk | — |
| 2.5 | Clear | Night w/Streetlights | — |
| 2.5 | Cloudy | Night w/Streetlights | — |
| 2.5 | Misting Rain | Night w/Streetlights | — |
| 3.5 | — | Night w/Streetlights | Curved |
| 3.5 | — | Night w/Streetlights | Hillcrest |
| 3.5 | Light-Moderate Rain | Night w/Streetlights | — |
| 3.5 | Light-Moderate Snow | Night w/Streetlights | — |
| 3.5 | Clear | Night w/o Streetlights | — |
| 3.5 | Cloudy | Night w/o Streetlights | — |
| 3.5 | Misting Rain | Night w/o Streetlights | — |
| 3.5 | Heavy Rain | Daylight | — |
| 3.5 | Heavy Snow | Daylight | — |
| 3.5 | Sleet/Hail/Freezing Rain | Daylight | — |
| 4.0 | — | Night w/o Streetlights | Curved |
| 4.0 | — | Night w/o Streetlights | Hillcrest |
| 4.0 | Light-Moderate Rain | Night w/o Streetlights | — |
| 4.0 | Light-Moderate Snow | Night w/o Streetlights | — |
| 4.0 | Heavy Rain | Dawn | — |
| 4.0 | Heavy Snow | Dawn | — |
| 4.0 | Sleet/Hail/Freezing Rain | Dawn | — |
| 4.0 | Heavy Rain | Dusk | — |
| 4.0 | Heavy Snow | Dusk | — |
| 4.0 | Sleet/Hail/Freezing Rain | Dusk | — |
| 4.0 | Heavy Rain | Night w/Streetlights | — |
| 4.0 | Heavy Snow | Night w/Streetlights | — |
| 4.0 | Sleet/Hail/Freezing Rain | Night w/Streetlights | — |
| 4.0 | Heavy Rain | Night w/o Streetlights | — |
| 4.0 | Heavy Snow | Night w/o Streetlights | — |
| 4.0 | Sleet/Hail/Freezing Rain | Night w/o Streetlights | — |
| 4.0 | Fog/Smoke/Smog/Dust | Daylight | — |
| 4.0 | Fog w/Rain | Daylight | — |

The acceleration due to braking force ($a_B$), which is negative, may then be obtained 8903. It is determined at decision point 8905 whether there were skid marks at the accident scene. If there were skid marks, the maximum speed a vehicle could have been traveling ($v_{SM}$) may be estimated 8907 from skid mark length ($d_{SM}$) and estimated speed at impact $$v_{SM} = (2 a d_{SM} + ([\text{Speed at Impact}])^2)^{1/2}$$

At decision point 8909, it is determined whether $v_{SM} < v_0$. If the answer is yes, then $v_0 = v_{SM}$. The method then proceeds to step 8913. If the decision point 8909 is negative, then the method proceeds to step 8913. If the answer to decision point 8905 is negative, then method also proceeds to step 8913. The time required to completely stop may then be estimated 8913. In one embodiment, the time required to completely stop ($t_{stop}$) may be determined by:

$$t_{Stop} = t_{PR} + v_0 / a_B$$

The method then may include determining $FG_{RV}$ at step 8915. If $t_{PB} > t_{stop}$, then it is possible for the reacting vehicle to stop at some time between the time at the perception point and the time at the collision point. The trajectory may include a portion at a constant speed and a portion during which the vehicle is braking. In this case, distance $FG_{RV}$ may be estimated by:

$$FG_{RV} = v_0^2 / 2a_B + (t_{PB} - t_{braking}) v_0$$

If $t_{PB} \leq t_{PR}$, it is not possible for a reacting vehicle to start braking before the collision. The reacting vehicle would be traveling at constant speed between the time at the perception point and the time at the collision point. Therefore, $FG_{RV}$ is given by:

$$FG_{RV} = v_0 t_{PB}$$

If $t_{PR} < t_{PB} < t_{stop}$, then a portion of the time between the perception point and the collision point is perceiving and reacting and a portion is braking. $FG_{RV}$ may be given by:

$$FG_{RV} = t_{PR} v_0 + (t_{brake} v_0 - \tfrac{1}{2} a_B t_{brake}^2)$$

Figure 90:
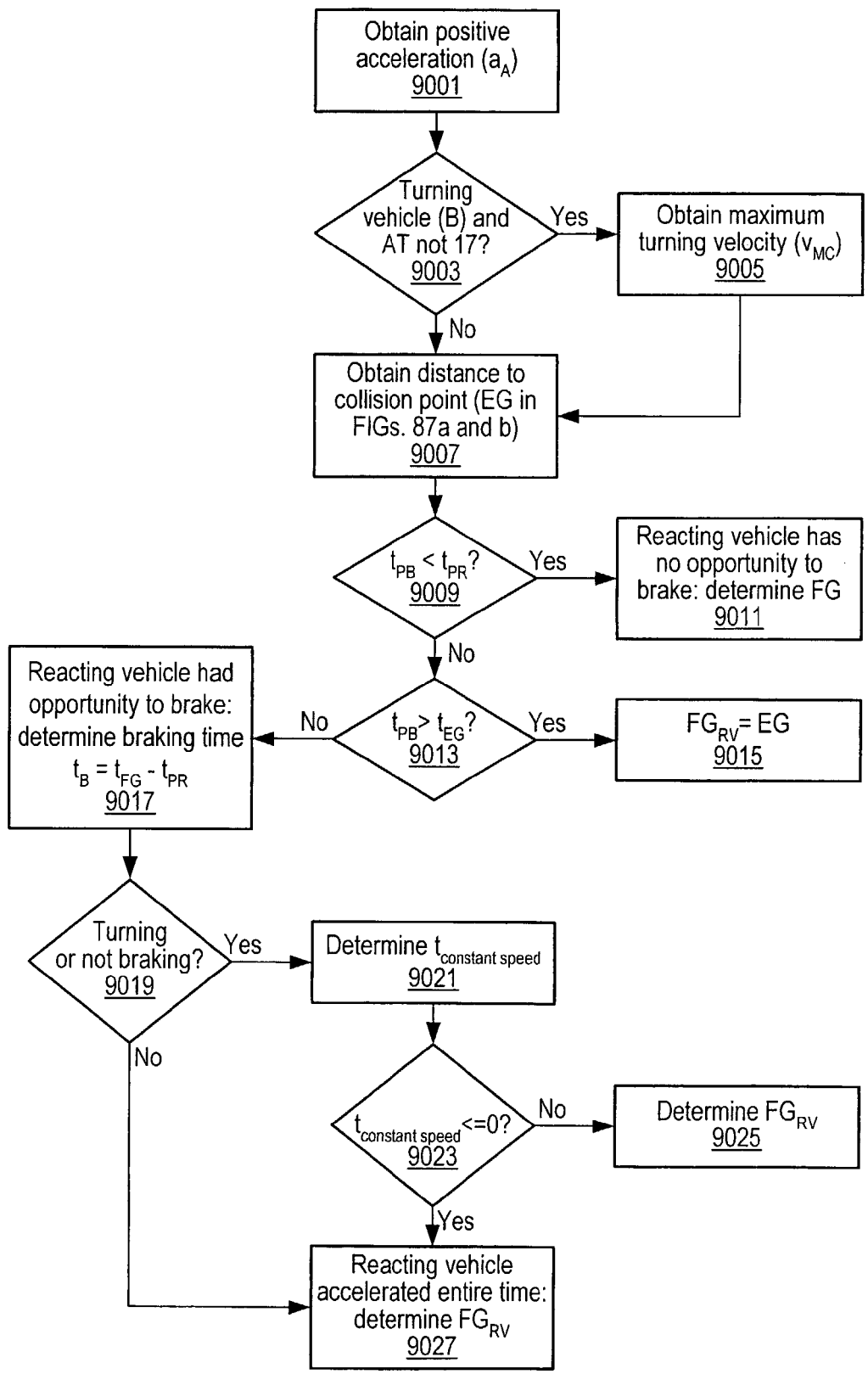
FIG. 90 depicts a flow chart of an embodiment of a method of estimating a portion of a trajectory of a reacting vehicle.

FIG. 90 illustrates an embodiment of a method of estimating $FG_{RV}$ if the reacting vehicle accelerated from a stop prior to the accident. The method may include obtaining 9001 the positive acceleration ($a_A$). At decision point 9003, it is determined whether the reacting vehicle is turning vehicle B and if the accident type is not 17. If the answer is positive, then the maximum turning velocity ($v_{MC}$) may be obtained 9005. The method may proceed to step 9007. If decision point 9003 is negative, then the distance to the collision point, EG in FIGS. 87a and b, may be obtained 9007. For vehicle B with accident type 17 or vehicle A, then Vehicle A: $EG_{RV}$ = vehicleCPx–A start vehicleCPx Vehicle B: $EG_{RV}$ = vehicleCPy–B start vehicleCPy where A vehicleCPx is the x-coordinate of the collision point at the start point of vehicle A and B vehicleCPy is the y-coordinate of the collision point at the start point of vehicle B. For vehicle B when the accident type is not 17, EG may be given by the arc length of the CP curve between the curve start point and the collision area and the distance between the start point and the curve start. For example, if the curve is a portion of an ellipse:

$$EG_{RV} = \text{arclength}(CP, \text{vehicleCPxES}, \text{areaCPx}) + D_{SP \, to \, ES}$$

At decision point 9009, it is determined whether $t_{PB}$ is less than the $t_{PR}$, the perception-reaction time. If yes, then the reacting vehicle has no opportunity to brake. If the reacting vehicle is not turning (vehicle B with accident type 17 or vehicle A) then $$FG_{RV} = a_A (t_{EG} - t_{PB}) t_{PB} + \tfrac{1}{2} a_A t_{PB}^2$$

If the reacting vehicle was turning, then $EF_{RV}$ may first be estimated. If the time to reach the maximum turning velocity ($v_{MC}$) is less than $t_{EG}$, then the turning vehicle is accelerating on a portion of $EF_{RV}$ and traveling at constant $v_{MC}$ along a portion of $EF_{RV}$:

$$EF_{RV} = \tfrac{1}{2} a_A t^2 + (t_{EF} - t) v_{MC}$$

where t is the time to reach $v_{MC}$. If the time to reach maximum turning velocity is greater than or equal to $t_{EG}$, then $$EF_{RV} = \tfrac{1}{2} a_A t_{EF}^2$$

$FG_{RV}$ may then be determined from $$FG_{RV} = EG_{RV} - EF_{RV}$$

If the answer to decision point 9009 is negative, it is determined whether $t_{PB}$ is greater than $t_{EG}$ at decision point 9013. If the answer is positive, then reacting vehicle had no opportunity to brake, therefore, $FG_{RV}$ may be set to $EG_{RV}$ at 9015. If decision point 9013 is negative, then the reacting vehicle has the opportunity to brake and the braking time may be estimated 9017 from $$t_B = t_{FG} - t_{PR}$$

At decision point 9019, it is determined whether the reacting vehicle is turning or is not braking. If the answer to decision point 9019 is yes, the time the vehicle traveled at constant speed is estimated 9021. At decision point 9023, it is determined if the time the vehicle traveled at constant speed is less then or equal to zero. If the answer is no, then $FG_{RV}$ may be estimated 9025. First, it is determined whether the time the vehicle traveled at constant speed is less than the perception-reaction time. In this case $FG_{RV}=EG_{RV}-EF_{RV}$. If the time the vehicle traveled at constant speed is greater than or equal to the perception-reaction time, then $$FG_{RV}=v_{MC}t_{PR}+v_{MC}t_B-\tfrac{1}{2}a_Bt_B^2$$

If decision point 9023 is positive, the method proceeds to step 9027.

If decision point 9019 is negative, then the reacting vehicle accelerated the entire time 9027. $FG_{RV}$ may be estimated by $$FG_{RV}=EG_{RV}-\tfrac{1}{2}(t_A-t_{PR})^2$$

where $t_A$ is the total time spent accelerating.

An embodiment of a method of using the speed, time, and distance of vehicles for assessing liability illustrated by the flow chart in FIG. 72 may also include estimating 7211 a time for a reference vehicle to clear the collision area shown in FIG. 74. At the time of the collision, vehicleCP of vehicle A and vehicle B substantially coincide at areaCP in the collision area, as shown by point 7441 in FIG. 74. The time to clear the collision area may be the time for a vehicle to travel from areaCP to a point at which the entire vehicle has exited the collision area. The time to clear may be equivalent to the time for vehicleLP (e.g., point 7417 in FIG. 74) to reach areaLP (e.g., point 7431 in FIG. 74) starting at the time of the collision.

In an embodiment, the time to clear may include two portions. A first portion may be the time for the collision point, vehicleCP, (e.g., point 7421 in FIG. 74) to exit the collision area starting from the time of the collision. A second portion may be the time for vehicleLP to exit the collision area starting from the time that vehicleCP exits the collision area. The time for the vehicle to clear the collision area may be the sum of the two portions.

In accident type 4 or 5, as shown in FIG. 4, the collision lane for the turning car, vehicle B, is the same as the lane that it is targeting. Consequently, neither vehicle A nor vehicle B may clear the collision area. The time to clear may then be set to a relatively high value, for example, 1000 seconds.

Figure 91:
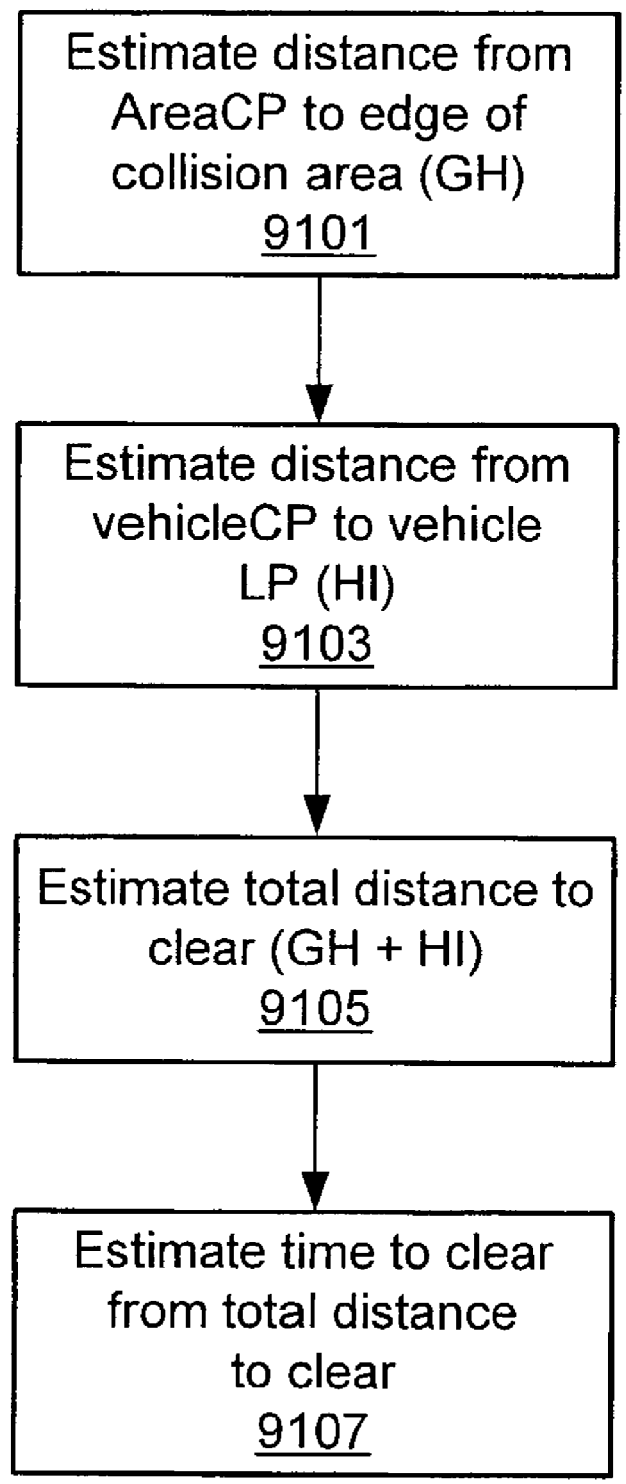
FIG. 91 depicts a flow chart of an embodiment of a method for estimating the time for a vehicle to clear a collision area.

A method for estimating the time for vehicle A to clear the collision area is depicted in the flow chart in FIG. 91. A diagram depicting vehicle A clearing the collision area is given in FIGS. 92a and 92b. The method may include estimating 9101 a distance from areaCP to the edge of collision area, which is GH in FIGS. 92a and 92b. The distance from vehicleCP to vehicleLP, which is HI in FIGS. 92a and 92b, may then be estimated 9103. The total distance to clear the collision area may be estimated 9105 by:

$$d_{clear}=GH+HI$$

GH may be estimated from:

$$GH=\max(\text{area}LPx,\text{area}FPx)-A\ \text{area}CPx$$

HI is the distance from vehicleCP to vehicleLP and may be determined using Table 4.

The method may include estimating 9107 the time to clear, $t_{Aclear}$, from total distance to clear. If the action of vehicle A prior to the accident was constant speed or slowing, then the time to clear may be $$t_{Aclear}=d_{clear}/v_0$$

Figure 92A:
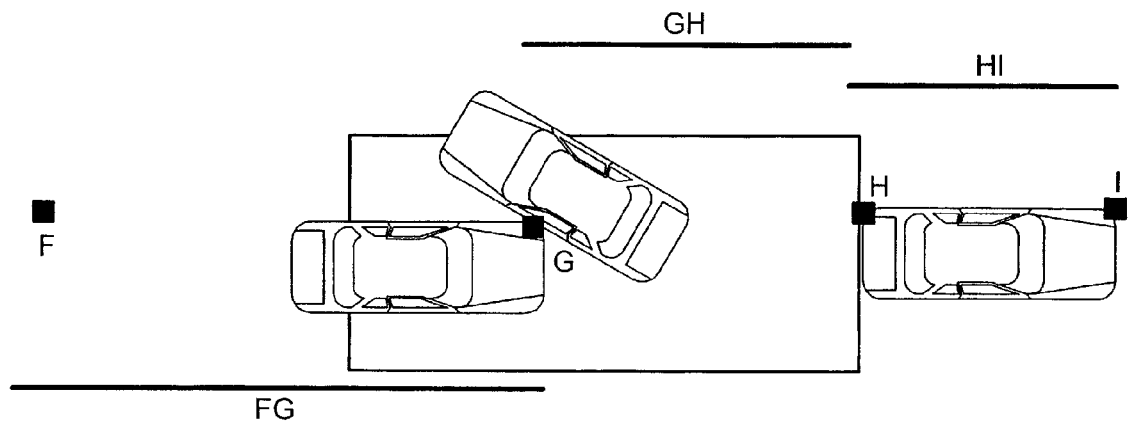
FIGS. 92$a$-$b$ depict illustrations of an accident.
Figure 92B:
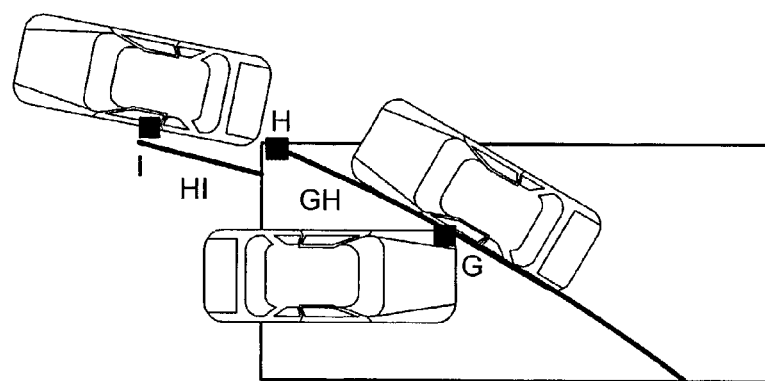

If the action of vehicle A prior to the accident was accelerating from a stop then, the time to clear may be estimated from $d_{clear}$, the initial speed at point G in FIG. 92a and 92b ($v_G$), and $a_A$. For example, the timeToTravel function may be used. $v_G$ may be estimated from distance EG, $v_0$, $a_A$, and $v_{MC}$. The timeToTravel function may also be used to estimate $v_G$. Distance EG may be estimated by the method depicted in FIG. 88 at step 8811.

Figure 93:
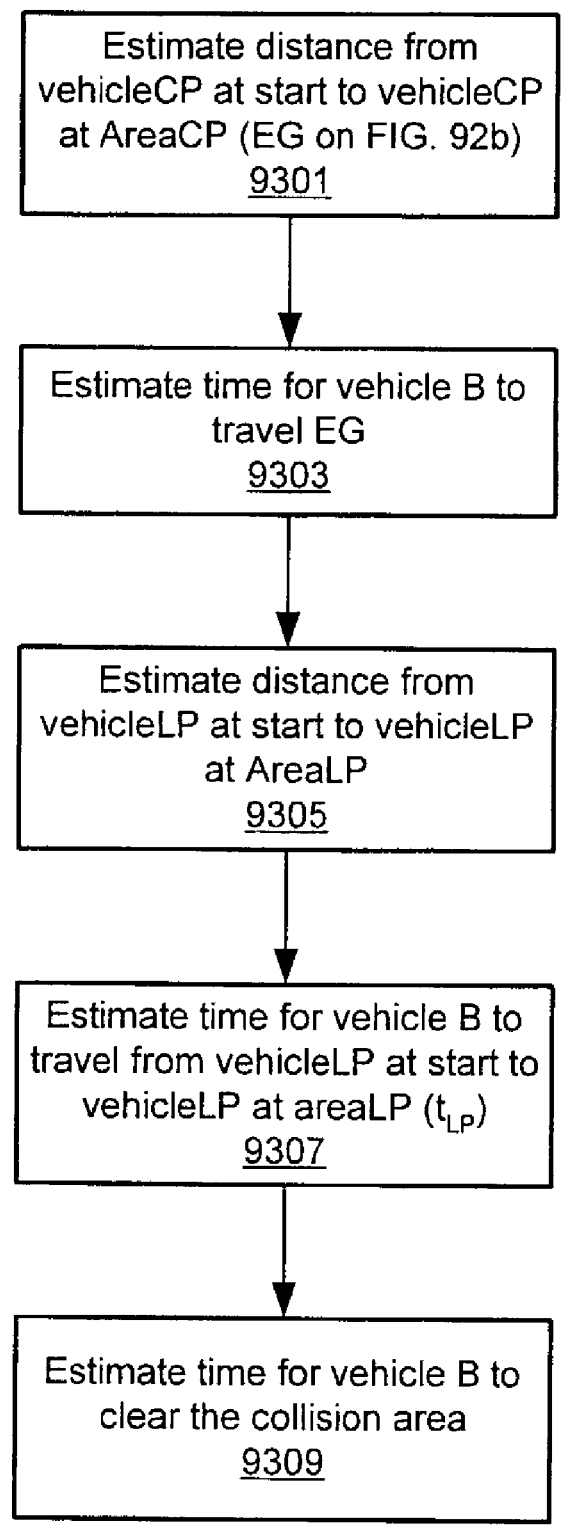
FIG. 93 depicts a flow chart of an embodiment of a method for estimating the time for a vehicle to clear a collision area.

A method for determining the time for vehicle B to clear the collision area is depicted in FIG. 93. The method may apply if vehicle B is the reference vehicle and the reaction of vehicle B prior to the accident is braking from accelerating or continuing from accelerating. The method may include estimating 9301 a distance from vehicleCP at start to vehicleCP at areaCP (EG on FIG. 87a). If vehicle B is the reference vehicle, EG is estimated at step 8811 in FIG. 88. If vehicle B is the reacting vehicle, then $$EG=EF_{RV}+FG_{RV}$$

Distances $EF_{RV}$ and $FG_{RV}$ may be determined using the method depicted in FIG. 90.

The time for vehicle B to travel EG may then be estimated 9303. If vehicle B is the reference vehicle, $t_{EG}$ is estimated at step 8813 in FIG. 88. If vehicle B is the reacting vehicle, then $t_{EG}$ may be calculated from the initial velocity, acceleration, maximum curvature velocity, and the final velocity of vehicle B, for example:

$$t_{EG}=\text{timeToTravel}(EG,v_0,B\text{'s }a_A,v_{MC},v_G)$$

The method may further include estimating 9305 a distance from vehicleLP at the start point to vehicleLP at areaLP along the LP trajectory. For example, the distance may be estimated as the arc length along the LP curve from the start of the curve to areaLP and the distance from the start point to the start of the curve. For example, if the curve is a portion of an ellipse:

$$d_{LP}=\text{arclength}(LP,B\text{'s vehicle}LP\times ES,\text{area}LPx)+D_{SP\ to\ ES}$$

The time for vehicle B to travel the distance from vehicleLP at start to vehicleLP at areaLP ($t_{LP}$) may then be estimated 9307 from the initial velocity, acceleration, and maximum curvature velocity. For example, $$t_{LP}=\text{timeToTravel}(d_{LP},v_0,B\text{'s }a_A,v_{MC},v_{areaLP})$$

The time for vehicle B to clear the collision area may be estimated 9309 from $$t_{Bclear}=t_{LP}-t_{EG}$$

Alternatively, if vehicle B is the reacting vehicle and the reaction of vehicle B prior to the accident is braking from a constant speed, then the distance to clear may be estimated from the arc length along the LP curve from areaCPx to areaLPx plus the distance from vehicleCP to vehicleLP $$d_{clear}=\text{arclength}(LP,\text{area}CPx,\text{area}LPx)+abs(\text{vehicle}CP-\text{vehicle}LP)$$

The time to clear may be calculated from $D_{clear}$, the initial velocity, acceleration, and maximum curve velocity, for example, $$t_{Bclear}=\text{timeToTravel}(d_{clear},v_0,B\text{'s }a_A,v_{MC},v_{areaLP})$$

Figure 94:
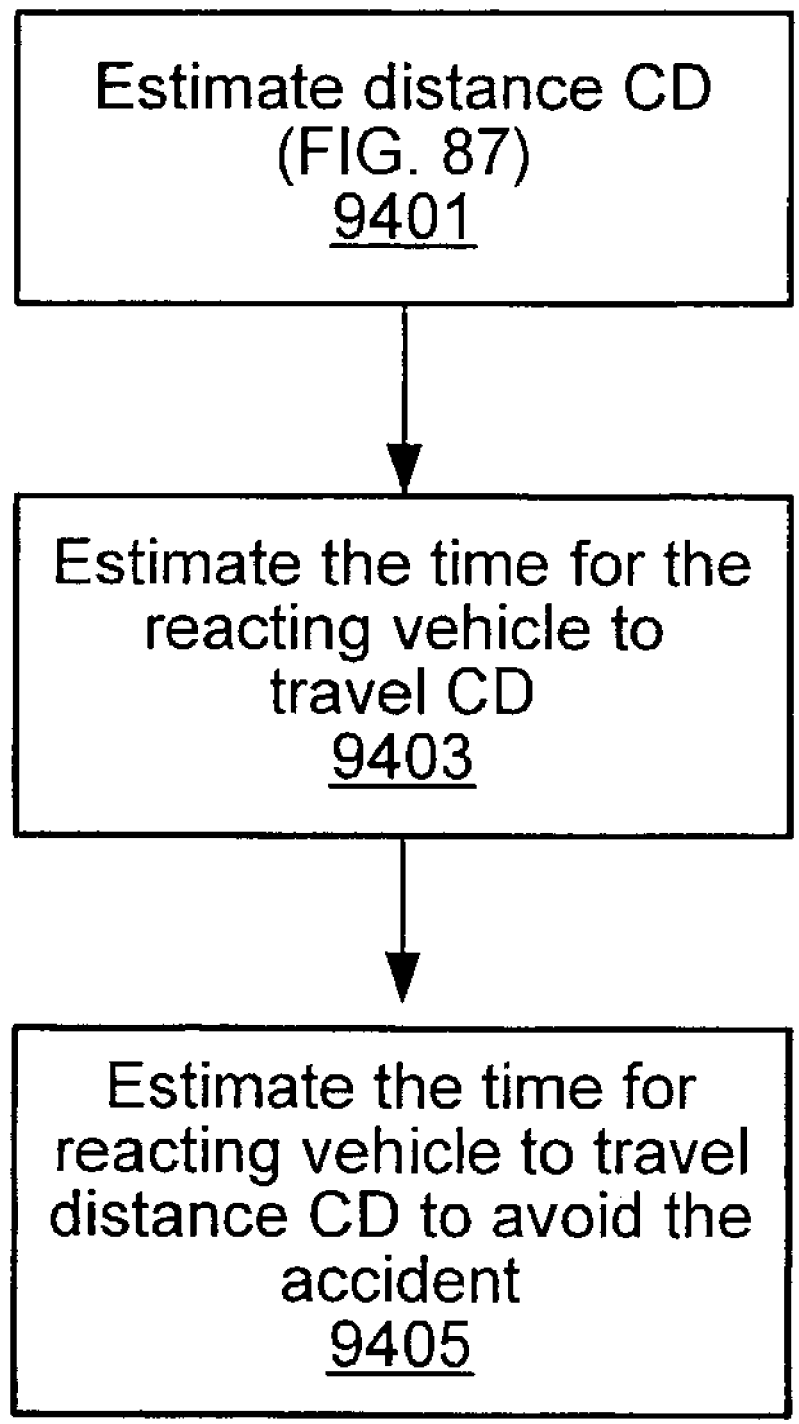
FIG. 94 depicts a flow chart of an embodiment of a method for estimating a time for a reacting vehicle to avoid an accident.

An embodiment of a method of using the speed, time, and distance of vehicles for assessing liability illustrated by the flow chart in FIG. 72 may also include estimating 7213 a time for a reacting vehicle to travel to the collision area such that the vehicle avoids an accident with a reference vehicle. The time may be estimated using the time for the reference vehicle to clear the collision area. FIG. 94 depicts a flow chart of an embodiment of a method for estimating a time for a reacting vehicle to avoid the accident. The method may include estimating 9401 the distance from the perception point, point C in FIG. 87, to the collision area, to point D in FIG. 87. Distance CD may be estimated from distance AC and distance AD:

$$CD_{RV} = AD_{RV} - AC_{RV}$$

Distance $AC_{RV}$ may be estimated using the time for the reacting vehicle to travel $EF_{RV}$. If the reacting vehicle accelerated from a stop, then the time to travel $EF_{RV}$ may be $$\text{timeToTravel} = (EF_{RV}, \text{accel=yes}, v_0, v_{MC}, v_F)$$

If vehicle B's action prior to the accident was constant speed or slowing then the time to travel $EF_{RV}$ may be $$\text{timeToTravel} = (EF_{RV}, \text{accel=no}, v_0, v_{MC}, v_F)$$

Since the reacting vehicle's $t_{EF}$ is the same as the reacting vehicle's $t_{AC}$, then $$AC_{RV} = t_{AC} v_0 + \tfrac{1}{2} a_A t_{AC}^2$$

$AD_{RV}$ for vehicle A when vehicle A accelerates from a stop may be given by $$\min(\text{areaFPx}, \text{areaLPx}) - \text{Start vehicle12 x}$$

For vehicle B, $AD_{RV}$ may be given by:

$$AD_{RV} = \text{arclength}(FP, \text{vehicleFPxES}, \text{areaFPx}) + D_{SP\,to\,ES}$$

Distance CD may then be estimated. For vehicle A that has constant speed or is slowing before the accident $$CD_{RV} = FG_{RV} - (\text{areaCP x} - \min(\text{areaFPx}, \text{areaLP x})) - \text{distance from vehicle12 to impact point})$$

For a vehicle A that is not at constant speed or is slowing before the accident and vehicle B $$CD_{RV} = AD_{RV} - AC_{RV}$$

The method may also include estimating 9403 the time ($t_1$) for the reacting vehicle to travel $CD_{RV}$. $t_1$ may correspond to the actual time for the reacting vehicle to travel from the perception point to the collision area. $t_1$ may be based on the reactions of the reacting vehicle prior to the accident. For example, if the reaction is braking from a constant speed, then $t_1$ is the solution to the quadratic equation:

$$V_0 t_{PR} + V_0 t_1 - \tfrac{1}{2} a_B t_1^2 = CD$$

If the reacting vehicle was braking from accelerating, it may be desirable to estimate the distance the vehicle travels during the perception-reaction time to the braking point ($d_1$) and the distance traveled during braking to point D, $d_2$. $d_1$ may be given by:

$$d_1 = v_c t_{PR} + \tfrac{1}{2} a_A t_{PR}^2$$

It may be advantageous to estimate the speed of the vehicle when it arrives at the braking point $$v_2 = (t_{AC} + t_{PR}) a_A$$

$d_2$, may also be estimated from CD and $d_1$ $$d_2 = CD - d_1$$

If $d_2$ is less then the nominal stopping distance, then $t_1$ is equal to the perception reaction-time and the time to travel $d_2$:

$$t_1 = t_{PR} + \text{timeToTravel}(d_2, \text{acceleration}, V_2, -a_B, v_D)$$

where the nominal stopping distance is $V_2^2/(2 \ast C_f \ast g)$.

If $d_2$ is greater than or equal to the nominal stopping distance it may be likely that the vehicle may have come to a complete stop prior to the accident if the vehicle had braked as hard as possible when the average driver would have recognized danger. It may be likely that the reported speed of the vehicle was incorrect, the vehicle did not use full braking force, and/or the vehicle did not notice the other vehicle in a reasonable amount of time.

If the vehicle reaction is continuing from a constant speed, then $$t_1 = \text{timeToTravel}(CD, \text{acceleration}, v_0, v_{MC}, v_D)$$

If the vehicle reaction is continuing from accelerating, then $$t_1 = \text{timeToTravel}(CD, \text{acceleration}, v_C, a_A, v_{MC}, v_D)$$

The method may further include estimating 9405 the time ($t_x$) for the reacting vehicle to travel distance CD to avoid the accident. $t_x$ may be the time for the reacting vehicle to reach a collision area after the reference vehicle clears the collision area. In one embodiment, $t_x$ may be the sum of the actual time for the reacting vehicle to travel distance CD and the amount of time for the reference vehicle to clear the collision area:

Vehicle A, $t_x = t_1 + t_{Bclear}$, where $t_1$ is for vehicle A

Vehicle B, $t_x = t_1 + t_{Aclear}$, where $t_1$ is for vehicle B $t_{Aclear}$ may be estimated in the method depicted in FIG. 91 at step 9107. $t_{Bclear}$ may be estimated in the method depicted in FIG. 93 at step 9309. $t_x$ may be used to assess whether the reacting vehicle may have avoided the accident.

An embodiment of a method of using the speed, time, and distance of vehicles for assessing liability illustrated by the flow chart in FIG. 72 may also include assessing 7215 an opportunity of the reacting vehicle to avoid the accident. A method may include selecting a specified speed of a vehicle involved in an accident. A specified speed may be, for example, the actual speed of a vehicle, the speed limit for the vehicle, or the safe speed for the vehicle. The method may also include assessing whether the vehicle had an opportunity to avoid the accident at the specified speed. In one embodiment, the vehicle may have the opportunity to avoid the accident by stopping before the accident. In another embodiment, the vehicle may have the opportunity to avoid the accident by delaying at the specified speed of the vehicle. In other embodiments, the vehicle may have the opportunity to avoid the accident by maintaining the specified speed of the vehicle. In addition, the vehicle may attempt to avoid the accident by braking.

In an embodiment, the method may include assessing an effect on liability based on the opportunity to avoid the accident. The effect on liability may include a factor including a contribution to liability based on the specified speed of the vehicle. In addition, the effect on liability may include a factor including a contribution based an outcome. The outcome may include whether the vehicle had the opportunity to stop, delay, or maintain the specified speed to avoid the accident. The effect on liability may also include a contribution including a factor based on whether the vehicle reacted by braking to avoid the accident. For example, Table 7 lists factor shifts in liability according to one embodiment corresponding to the specified speed, reaction, and outcome. Experienced claims adjusters may estimate the factor shift values. The total factor shift from the opportunity to avoid may be the sum of the specified speed factor shift, the reaction factor shift, and the outcome factor shift.

TABLE 7

CONTRIBUTION TO LIABILITY FROM OPPORTUNITY TO AVOID

| Specified Speed | Factor Shift (%) | Reaction | Factor Shift (%) | Outcome | Factor Shift (%) |
|---|---|---|---|---|---|
| Actual | 5 | No Braking | 5 | Stop | 5 |
| Speed Limit | 3 | Braking | 0 | Maintain | 3 |
| Safe | 0 | — | — | Delay | 1 |

Figure 95:
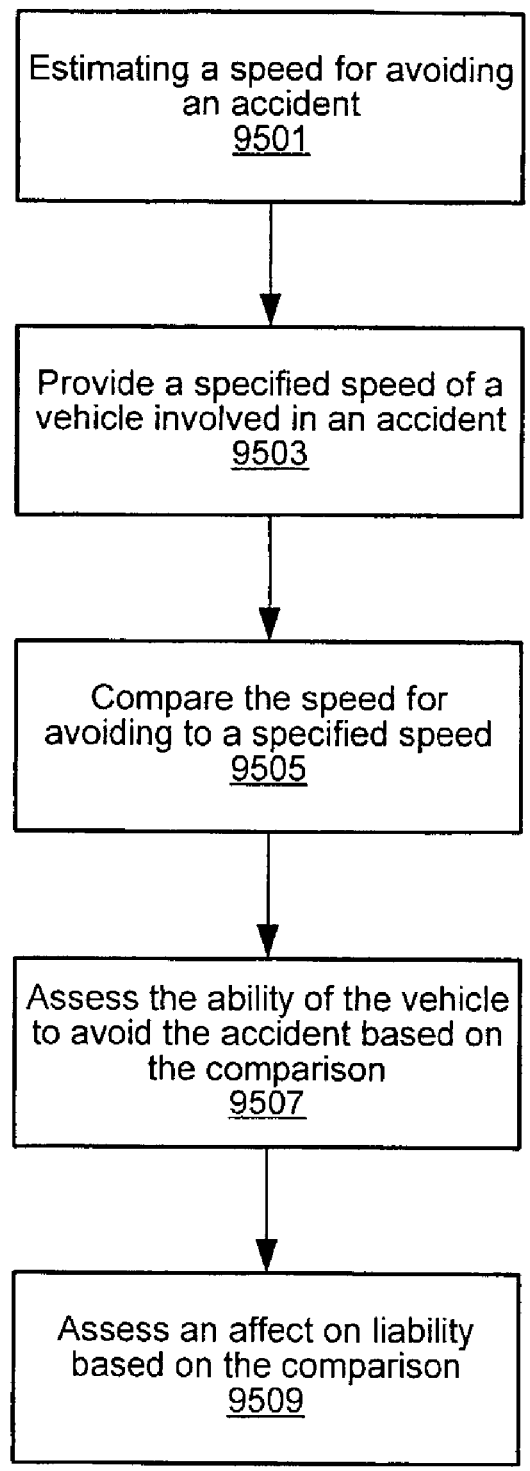
FIG. 95 depicts a flow chart of an embodiment of a method for assessing the opportunity of a reacting vehicle to avoid an accident.

FIG. 95 depicts a flow chart of an embodiment of a method for assessing the opportunity of a reacting vehicle to avoid an accident. The method may include estimating 9501 a speed for avoiding an accident. A "speed for avoiding" may be an approximate speed that allows a reacting vehicle an opportunity to avoid the accident. A vehicle may have an opportunity to avoid an accident between the perception point and the collision area (distance CD in FIG. 87). In one embodiment, a speed for avoiding may be an approximate maximum speed of a vehicle such that the vehicle avoids the accident by stopping before the accident ($Speed_{ToStop}$). In such a situation, a vehicle may be traveling at the $Speed_{ToStop}$ and then brakes to stop before the accident. A speed for avoiding may also include an approximate maximum speed to avoid an accident by maintaining a constant rate of speed ($Speed_{MaintainToDelay}$). In addition, speed for avoiding may be an approximate maximum speed to avoid an accident by braking without stopping ($Speed_{BrakeToDelay}$).

Furthermore, the method may also include providing 9503 a specified speed of a vehicle involved in an accident. The speed for avoiding may be compared 9505 to the specified speed.

In certain embodiments, the method may further include assessing 9507 the ability of the vehicle to avoid the accident based on the comparison. An affect on liability may be assessed 9509 based on the ability of the vehicle to avoid the accident.

In one embodiment, the $Speed_{ToStop}$ for a reacting vehicle may be obtained from the total time to stop. The total time to stop may be the sum of the perception-reaction time and the time to brake $$t_{Stop} = t_{PR} + t_{Brake}$$

If the perception-reaction time is greater than $t_x$, the time for a reference vehicle to clear the collision area, the reacting vehicle would not have the opportunity to brake. In this case, the $Speed_{ToStop}$ may not be determined. If the perception-reaction time is less than $t_x$, then the $Speed_{ToStop}$ may be given by $$Speed_{ToStop} = (t_x - t_{PR}) * a_B$$

where $a_B$ is the acceleration due to braking.

In an embodiment, $Speed_{MaintainToDelay}$ may be obtained from $$Speed_{MaintainToDelay} = \text{Distance Traveled/Time spent at Constant Rate of Speed}$$

It follows that $Speed_{MaintainToDelay}$ may be given by $$Speed_{MaintainToDelay} = CD/t_x$$

where distance CD is from FIG. 87. In some embodiments, the $Speed_{BrakeToDelay}$ may be obtained using a formula for the total stopping distance $$D_{Total} = d_{PR} + d_{NominalStop}$$

where $d_{PR}$ (=$Speed_{BrakeToDelay} * t_{PR}$) is the distance traveled during the perception-reaction time and $$d_{NominalStop} = Speed_{BrakeToDelay} * (t_x - t_{PR}) - \tfrac{1}{2} a_B (t_x - t_{PR})^2)$$

If the perception-reaction time is greater than $t_x$, a vehicle would not have the opportunity to brake, and the $Speed_{BrakeToDelay}$ may not be determined. The $Speed_{BrakeToDelay}$ may be given by $$Speed_{BrakeToDelay} = CD/t_x + a_B (t_x - t_{PR})^2 / 2 t_x$$

Table 8 lists assessments of the opportunity to avoid an accident based on comparisons of a specified speed of a reacting vehicle to speed for avoiding. Each case in Table 8 includes a comparison of a specified speed to a speed for avoiding, whether the vehicle attempted to avoid the accident by braking, and outcome of avoiding the accident. Each case may be associated with a contribution to liability. The contribution to liability may be based on the specified speed, braking, and/or the manner of avoiding the accident.

In an embodiment, an assessment may include whether a vehicle may have been able to stop before the accident at actual speed. Cases 1 and 2 are situations in which the actual speed is less than the $Speed_{ToStop}$. For case 1, it may be likely that the vehicle may have come to a complete stop prior to the accident if the vehicle had braked as hard as possible when the average driver would have recognized danger. The accident may have occurred because the reported speed of the vehicle may be incorrect, the vehicle may not have used full braking force, and/or the vehicle may not have noticed the other vehicle in a reasonable amount of time. In case 2, it may also be likely that the vehicle may have come to a complete stop if the vehicle had braked as hard as possible when the average driver would have recognized danger.

In other embodiments, an assessment may include whether a vehicle may have been able to delay enough to avoid the accident by braking at the actual speed. Cases 3 and 4 are situations in which the actual speed is less than or equal to SpeedBrakeToDelay. In case 3, it may be likely that the vehicle may have delayed enough to avoid the accident if the vehicle had braked as hard as possible when the average driver would have recognized danger. The accident may have occurred because the reported speed of the vehicle may be incorrect, the vehicle may not have used full braking force, and/or the vehicle may not have recognized the other vehicle in a reasonable amount of time. In case 4, it may be likely that the vehicle may have delayed enough to avoid the accident if the vehicle had braked as hard as possible when the average driver would have recognized danger.

In one embodiment, an assessment of whether a vehicle may have avoided an accident may be based on whether the vehicle was accelerating from a stop prior to the accident. If the vehicle was accelerating from a stop, it may be determined if $t_x > t_{PR}$. If $t_x > t_{PR}$ it may be likely the vehicle may not have avoided the accident even if the vehicle had recognized the accident when the average driver would have and had used full braking force. If the reaction of the vehicle was braking, then the total shift in liability to the vehicle may be substantially zero. If the reaction of the vehicle was not braking, there may be a shift in liability to the vehicle, for example, about 10%.

Alternatively, if $t_x$ is less than or equal to $t_{PR}$, then it may be likely the vehicle may not have avoided the accident even if the vehicle had recognized the accident when the average driver would have and had used full breaking force. The shift in liability may be substantially zero.

In some embodiments, an assessment may include whether a vehicle may have been able to stop before the accident at the speed limit. Cases 5 and 6 are situations in which the speed limit is less than or equal to $Speed_{ToStop}$. In case 5, if the vehicle had been traveling at the speed limit, it may be likely that the vehicle may have come to a complete stop if full braking force were applied when the average driver would have recognized and reacted to the other vehicle. In case 6, it may be likely that the vehicle may have come to a complete stop had the vehicle used full braking force when the average driver would have recognized and reacted to the other vehicle.

In another embodiment, an assessment may include whether a vehicle may have delayed enough to avoid the accident by maintaining the speed limit. Cases 7 and 8 are situations in which the speed limit is less than or equal to $Speed_{MaintainToDelay}$. In case 7, if the vehicle had been traveling at the speed limit, it may be likely that the accident may have been avoided, even without braking. In case 8, if the vehicle had been traveling at the speed limit, it may be likely that the accident would have been avoided.

In certain embodiments, an assessment may include whether a vehicle may have been able to delay enough to avoid the accident by braking at the speed limit. Cases 9 and 10 are situations in which the speed limit is less than or equal to $Speed_{BakeToDelay}$. In cases 9 and 10, if the vehicle had been traveling at the speed limit, it may be likely that the accident may have been avoided if the vehicle had used full braking force when the average driver would have recognized and reacted to the other vehicle.

In one embodiment, an assessment may include whether a vehicle may have been able to stop before the accident at the safe speed. Cases 11 and 12 are situations in which the safe speed is less than or equal to $Speed_{SpeedToStop}$. In cases 11 and 12, the vehicle may not have avoided the accident at the speed limit. If the vehicle had been traveling at the safe speed, it may be likely that the vehicle may have come to a complete stop had the vehicle used full braking force when the average driver would have recognized and reacted to the other vehicle.

In an embodiment, an assessment may include whether a vehicle may have been able to delay enough to avoid the accident by maintaining the safe speed. Cases 13 and 14 are situations in which the safe speed is less than or equal to $Speed_{MaintainToDelay}$. In case 13, the vehicle may not have avoided the accident at the speed limit. If the vehicle had been traveling at the safe speed, it may be likely that the accident may have been avoided, even without braking. In case 14, the vehicle may not have avoided the accident at the speed limit. If the vehicle had been traveling at the safe speed, it may be likely that the accident may have been avoided.

In some embodiments, an assessment may include whether a vehicle may have been able to delay enough to avoid by braking at the safe speed. Cases 15 and 16 are situations in which the safe speed is less than or equal to $Speed_{BrakeToDelay}$. In cases 15 and 16, the vehicle may not have avoided the accident at the speed limit. If the vehicle had been traveling at the safe speed, it may be likely that the accident may have been avoided if the vehicle had used full braking force, when the average driver would have recognized and reacted to the other vehicle.

Cases 17, 18, and 19 are situations in which the safe speed is greater than the $Speed_{BrakeToDelay}$. Cases 17 and 18 correspond to situations in which $t_x > t_{PR}$. For both cases 17 and 18, it may be unlikely that the vehicle could have avoided the accident at its actual speed, speed limit, or even the safe speed for conditions. Case 19 corresponds to a situation in which $t_x$ is greater than or equal to $t_{PR}$. For case 19, it may be unlikely that the vehicle may have avoided the accident at its actual speed, speed limit, or even the safe speed for conditions.

TABLE 8

ASSESSMENT OF REACTING VEHICLE

| Case | Speed Comparison | Braking | Outcome | Factor Shift (%) |
|---|---|---|---|---|
| 1 | Actual Speed ≦ $Speed_{ToStop}$ | Yes | Stop | 10 |
| 2 | Actual Speed ≦ $Speed_{ToStop}$ | No | Stop | 15 |
| 3 | Actual Speed ≦ $Speed_{BrakeToDelay}$ | Yes | Delay | 6 |
| 4 | Actual Speed ≦ $Speed_{BrakeToDelay}$ | No | Delay | 11 |
| 5 | Speed Limit ≦ $Speed_{ToStop}$ | Yes | Stop | 5 |
| 6 | Speed Limit ≦ $Speed_{ToStop}$ | No | Stop | 13 |
| 7 | Speed Limit ≦ $Speed_{MaintainToDelay}$ | Yes | Maintain | 6 |
| 8 | Speed Limit ≦ $Speed_{MaintainToDelay}$ | No | Maintain | 11 |
| 9 | Speed Limit ≦ $Speed_{BrakeToDelay}$ | Yes | Delay | 4 |
| 10 | Speed Limit ≦ $Speed_{BrakeToDelay}$ | No | Delay | 9 |
| 11 | Safe Speed ≦ $Speed_{SpeedToStop}$ | Yes | Stop | 5 |
| 12 | Safe Speed ≦ $Speed_{SpeedToStop}$ | No | Stop | 10 |
| 13 | Safe Speed ≦ $Speed_{MaintainToDelay}$ | Yes | Maintain | 3 |
| 14 | Safe Speed ≦ $Speed_{MaintainToDelay}$ | No | Maintain | 8 |
| 15 | Safe Speed ≦ $Speed_{BrakeToDelay}$ | Yes | Delay | 1 |
| 16 | Safe Speed ≦ $Speed_{BrakeToDelay}$ | No | Delay | 6 |
| 17 | Safe Speed > $Speed_{BrakeToDelay}$ and $t_x > t_{PR}$ | Yes | Delay | — |
| 18 | Safe Speed > $Speed_{BrakeToDelay}$ and $t_x > t_{PR}$ | No | Delay | — |
| 19 | Safe Speed > $Speed_{BrakeToDelay}$ and $t_x ≦ t_{PR}$ | — | Delay | — |

Figure 96:
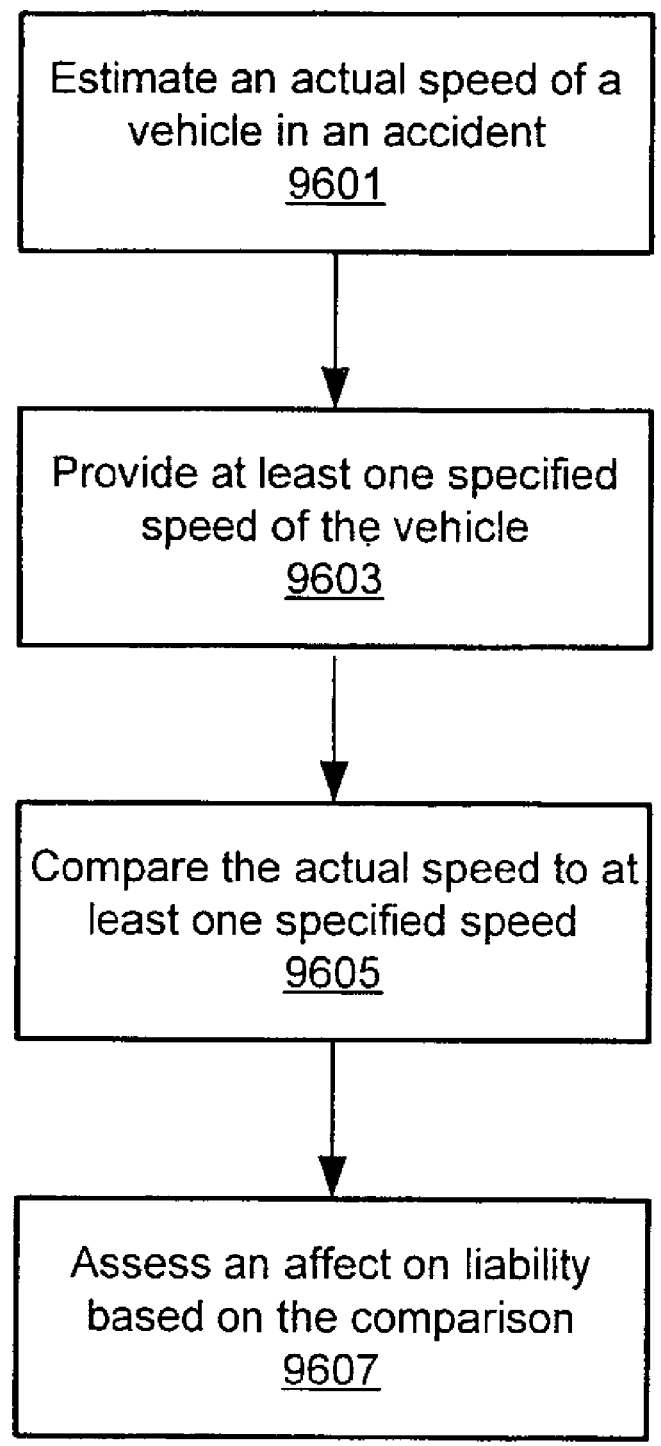
FIG. 96 depicts a flow chart of an embodiment of a method of using a computer system for assessing liability in an accident.

In one embodiment, liability in an accident may be assessed from an estimated actual speed of a vehicle. FIG. 96 depicts a flow chart of an embodiment of a method of using a computer system for assessing liability in an accident using the estimated actual speed of a vehicle. The method may include estimating 9601 an actual speed of a vehicle in an accident. At least one specified speed of the vehicle may be provided 9603 to the computer system. A specified speed may include a safe speed for a vehicle for the conditions at the scene of the accident or a speed limit for the vehicle. The method may further include comparing 9605 the actual speed to at least one specified speed. An effect on liability may then be assessed 9607 based on the comparison. The actual speed may, in some embodiments, be used to assess the liability of a straight vehicle (vehicle A) or a turning vehicle (vehicle B).

In one embodiment, a comparison may include determining an excess of the actual speed over a specified speed. For example, the relative amount that the actual speed of a vehicle exceeds the speed limit (percent excess) for the vehicle may be given by $S_{LimitExcess}$=(Actual Speed−Speed Limit)/Speed Limit*100%

Similarly, the relative amount that the actual speed of a vehicle exceeds the safe speed for the vehicle may be given by $S_{SafeExcess}$=(Actual Speed−Safe Speed)/Safe speed*100%

In an embodiment, the safe speed may depend on the conditions of the road at the scene of an accident. For example, if the road conditions are dry, then the safe speed may be the same as the speed limit. Alternatively, if the conditions are not dry, the safe speed may be calculated from the nominal dry stopping distance of a vehicle. The nominal dry stopping distance may be given by Nominal dry stopping distance=(Speed Limit)$^2$/(2×dry $C_f$×g)

where dry $C_f$ is the coefficient of friction between a vehicle and a dry road and g is the gravitational acceleration (32.2 ft/s$^2$). The safe speed may then be calculated from Safe speed=[2*actual $C_f$*g*nominal dry stopping distance]$^{1/2}$ where actual $C_f$ is the coefficient of friction between the vehicle and the road at the scene of the accident.

In certain embodiments, the coefficient of friction may depend on the road condition and road surface. Table 9 lists values of the coefficient of friction for various road conditions and road surfaces. In other embodiments, the coefficient of friction may also be a function of speed. Table 10 lists values of the coefficient of friction for various road surfaces, road conditions, and speeds.

TABLE 9

COEFFICIENT OF FRICTION FOR VARIOUS ROAD SURFACES AND ROAD CONDITIONS

| Road Condition | Road Surface | Coefficient of Friction |
|---|---|---|
| Dry | Concrete | 0.70 |
| Dry | Asphalt | 0.68 |
| Dry | Gravel | 0.70 |
| Dry | Dirt | 0.50 |
| Wet | Concrete | 0.58 |
| Accumulated Water During Heavy Rain | Concrete | 0.58 |
| Muddy | Concrete | 0.58 |
| Wet | Asphalt | 0.58 |
| Accumulated Water During Heavy Rain | Asphalt | 0.58 |
| Muddy | Asphalt | 0.58 |
| Wet | Gravel | 0.60 |
| Accumulated Water During Heavy Rain | Gravel | 0.60 |
| Muddy | Gravel | 0.60 |
| Wet | Dirt | 0.40 |
| Accumulated Water During Heavy Rain | Dirt | 0.40 |
| Muddy | Dirt | 0.40 |
| Accumulated Snow - Dry | Not Considered | 0.18 |
| Accumulated Snow - Wet | Not Considered | 0.45 |
| Hardpacked Snow - Dry | Not Considered | 0.43 |
| Hardpacked Snow - Wet | Not Considered | 0.45 |
| Ice Patches | Not Considered | 0.16 |
| Ice | Not Considered | 0.16 |
| Black Ice | Not Considered | 0.08 |

TABLE 10

COEFFICIENT OF FRICTION FOR VARIOUS ROAD SURFACES AND ROAD CONDITIONS

| | DRY | | WET | |
|---|---|---|---|---|
| Description of Road Surface | Less than 30 MPH From-To | More than 30 MPH From-To | Less than 30 MPH From-To | More than 30 MPH From-To |
| CONCRETE | | | | |
| New, sharp | .80-1.20 | .70-1.0 | .50-.80 | .40-.75 |
| Traveled | .60-.80 | .60-.75 | .45-.70 | .45-.65 |
| Polished | .55-.75 | .50-.65 | .45-.65 | .45-.60 |
| ASPHALT | | | | |
| New, Sharp | .80-1.20 | .65-1.0 | .50-.80 | .45-.75 |
| Travelled | .60-.80 | .55-.70 | .45-.70 | .40-.65 |
| Polished | .55-.75 | .45-.65 | .45-.65 | .40-.60 |
| Excess Tar | .50-.60 | .35-.60 | .30-.60 | .25-.55 |
| GRAVEL | | | | |
| Packed, Oiled | .55-.85 | .50-.80 | .40-.80 | .40-.60 |
| Loose | .40-.70 | .40-.70 | .45-.75 | .45-.75 |
| CINDERS | | | | |
| Packed | .50-.70 | .50-.70 | .65-.75 | .65-.75 |
| ROCK | | | | |
| Crushed | .55-.75 | .55-.75 | .55-.75 | .55-.75 |
| ICE | | | | |
| Smooth | .10-.25 | .07-.20 | .05-.10 | .05-.10 |
| SNOW | | | | |
| Packed | .30-.55 | .35-.55 | .30-.60 | .30-.60 |
| Loose | .10-.25 | .10-.20 | .30-.60 | .30-.60 |

In certain embodiments, liability assessment may be based on the percent excess of the actual speed over the speed limit or safe speed, $S_{LimitExcess}$ or $S_{SafeExcess}$, respectively. For example, a contribution to liability may be associated with at least one range of percent excess of the actual speed over the speed limit or safe speed. The contribution to liability may be referred to as a "raw speed factor." The raw speed factor may shift the liability for a vehicle based on the percent excess of the actual speed. In one embodiment, a maximum shift value may be associated with a range of percent excess.

In one embodiment, the raw speed factor may be estimated by multiplying a raw speed multiplier by a maximum shift value. The "raw speed multiplier" may be provided by an experienced claims adjuster. The "maximum shift value" may be a maximum shift in liability due to the speed of a vehicle that would be contemplated by an experienced claims adjuster. Table 11 lists ranges of percent excess of the actual speed over the speed limit or safe speed for a vehicle. Table 11 also lists a maximum liability shift for each of the ranges of percent excess according to one embodiment.

TABLE 11

RANGES OF PERCENT EXCESS OF ACTUAL SPEED OVER THE SPEED LIMIT OR SAFE SPEED AND MAXIMUM LIABILITY SHIFTS

| $S_{LimitExcess}$ or $S_{SafeExcess}$ (%) | Maximum Shift (%) |
|---|---|
| 0-10 | 0 |
| 11-20 | 0 |
| 21-30 | 5 |
| 31-40 | 10 |
| 41-50 | 20 |
| 51-60 | 30 |
| 61-75 | 30 |
| 76-100 | 40 |
| 101+ | 50 |

In an embodiment, liability assessment may be based on a comparison of actual speed and the speed limit for the vehicle. For example, if the actual speed is greater than the speed limit, then $S_{limitExcess}$ may be calculated. A shift in liability may then be assessed based on $S_{limitExcess}$.

In other embodiments, liability assessment may be based on a comparison of the actual speed with the safe speed for the vehicle. For example, if the actual speed is greater than the safe speed, then $S_{SafeExcess}$, may be calculated. A shift in liability may then be assessed based on $S_{SafeExcess}$.

In one embodiment, $S_{SafeExcess}$ may be calculated if the actual speed is greater than or equal to the safe speed and the actual speed is less than or equal to the speed limit. A shift in liability may then be assessed based on $S_{limitExcess}$.

In an embodiment, if the actual speed is less than the safe speed and the speed limit, then no shift in liability may be assessed to a vehicle.

Figure 97:
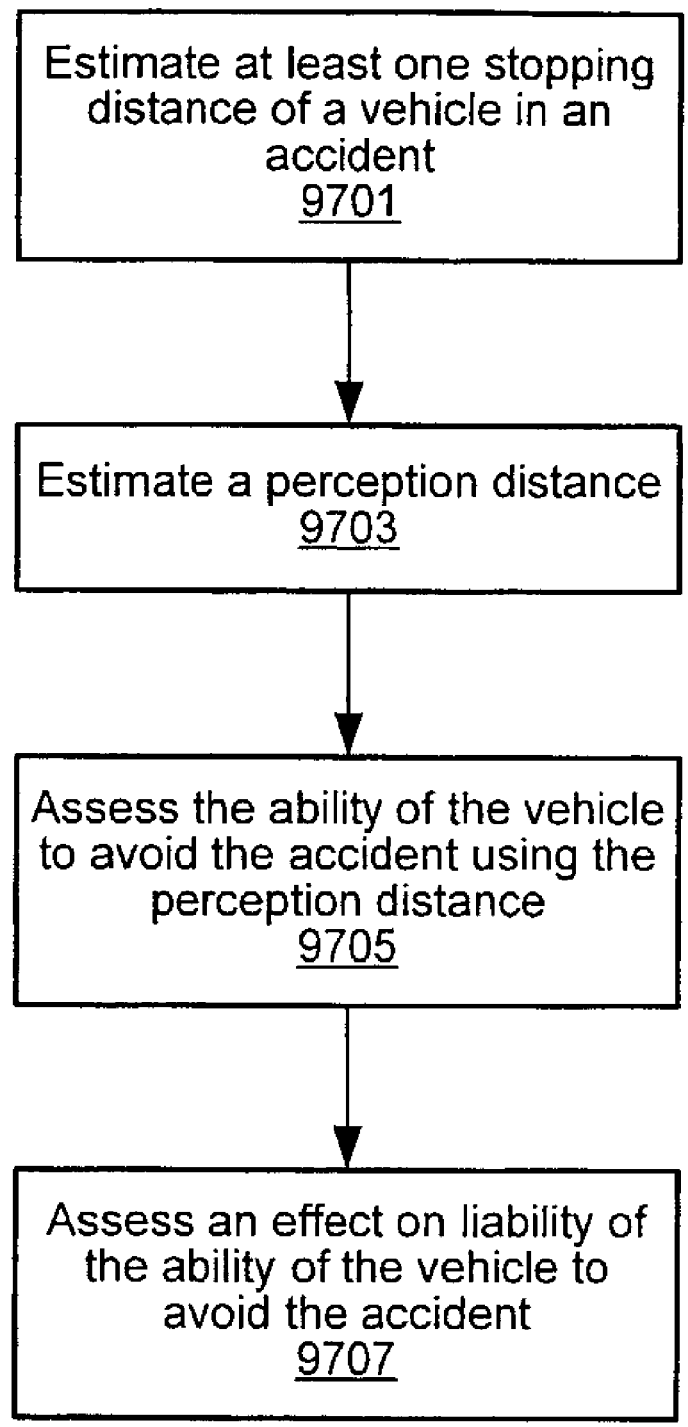
FIG. 97 depicts a flow chart of an embodiment of a method for assessing the opportunity of a reacting vehicle to avoid an accident.

FIG. 97 depicts a flow chart of an embodiment of a method for assessing the opportunity of a reacting vehicle to avoid an accident. The method may apply if the reaction of vehicle A and vehicle B before an accident was braking from a constant rate of speed or braking from accelerating. The method may include estimating 9701 at least one stopping distance of a vehicle. A stopping distance may refer to an approximate distance for a reacting vehicle to stop to avoid the accident. For example, the stopping distance may be an approximate distance to stop for a vehicle traveling at a specified speed. The specified speed may include an actual speed of the vehicle, a speed limit for the vehicle, or the safe speed for the vehicle.

In an embodiment, the method may also include estimating 9703 a perception distance. A perception distance may refer to an approximate distance from the accident at which the driver of a reacting vehicle substantially sensed danger of an accident. In an embodiment, the perception distance may be provided in units of vehicle length. The ability of the vehicle to avoid the accident may then be assessed 9705 using the perception distance. The method may further include assessing 9707 an effect on liability of the ability of the vehicle to avoid the accident.

In one embodiment, the stopping distance for a vehicle traveling at an actual speed may be obtained from a nominal stopping distance and the perception distance ($D_{PR}$)

$$D_{StopActual} = \text{Nominal Stopping Distance} + t_{PR} * \text{Actual Speed}$$

where $$\text{Nominal Stopping Distance} = [\text{Actual Speed}]^2 / (2 * \text{actual } C_f * g)$$

The stopping distance at actual speed ($D_{StopActual}$) may then be given by:

$$D_{StopActual} = ([\text{Actual Speed}]^2 / (2 * \text{actual } C_f * g)) + \text{Actual Speed} * t_{PR}$$

where $C_f$ is the coefficient of friction between the vehicle and the road. Similarly, the stopping distance at a speed limit ($D_{StopLimit}$) may be given by:

$$D_{StopLimit} = ([\text{Speed Limit}]^2 / (2 * \text{actual } C_f * g)) + \text{Speed Limit} * t_{PR}$$

The stopping distance at a safe speed ($D_{StopSafe}$) may be given by $$D_{StopSafe} = ([\text{Safe Speed}]^2 / (2 * \text{actual } C_f * g)) + \text{Safe Speed} * t_{PR}$$

In certain embodiments, an assessment may include whether a vehicle may have stopped before the accident at actual speed. Table 12 includes comparisons of stopping distances to perception distances. Case 20 in Table 12 refers to a situation in which the stopping distance at the actual speed is less than the perception distance. In this case, it may be likely that the vehicle may have come to a complete stop if the vehicle had braked with full force when the other vehicle was first noticed.

In another embodiment, an assessment may include whether a vehicle may have stopped before the accident at the speed limit. Case 21 refers to a situation in which the stopping distance at the speed limit is less than the perception distance. In this case, it may be likely that the vehicle may have come to a complete stop and avoided the accident.

In one embodiment, an assessment may include whether a vehicle may have stopped before the accident at the safe speed. Case 22 refers to a situation in which the stopping distance at the safe speed is less than the perception distance. In this case, it may be likely that the vehicle may have come to a complete stop and avoided the accident. Case 23 refers to a situation in which the stopping distance at the safe speed is greater than or equal to the perception distance. In this case, it may be likely that the vehicle's speed did not play a significant role in the accident.

TABLE 12

ASSESSMENT OF REACTING VEHICLE

| Case | Comparison | Speed | Factor Shift (%) |
|---|---|---|---|
| 20 | Is $[D_{StopActual}]$ < [Perception Distance] | Actual | 10 |
| 21 | Is $[D_{StopLimit}]$ < [Perception Distance] | Limit | 8 |
| 22 | Is $[D_{StopSafe}]$ < [Perception Distance] | Safe | 5 |
| 23 | Is $[D_{StopSafe}]$ ≧ [Perception Distance] | Safe | — |

As shown in FIGS. 75e and 75g, vehicle B, the turning vehicle may not clear a collision area in some embodiments of accident types 4 and 5. Therefore, the time ($t_x$) for the reacting vehicle to travel distance CD in FIG. 87 may not be useful for assessing whether a reacting vehicle may avoid an accident. FIGS. 75e and 75g correspond to embodiments of accident types 4 and 5, respectively, in which the collision lane is the same as the target lane for vehicle B.

Figure 98:
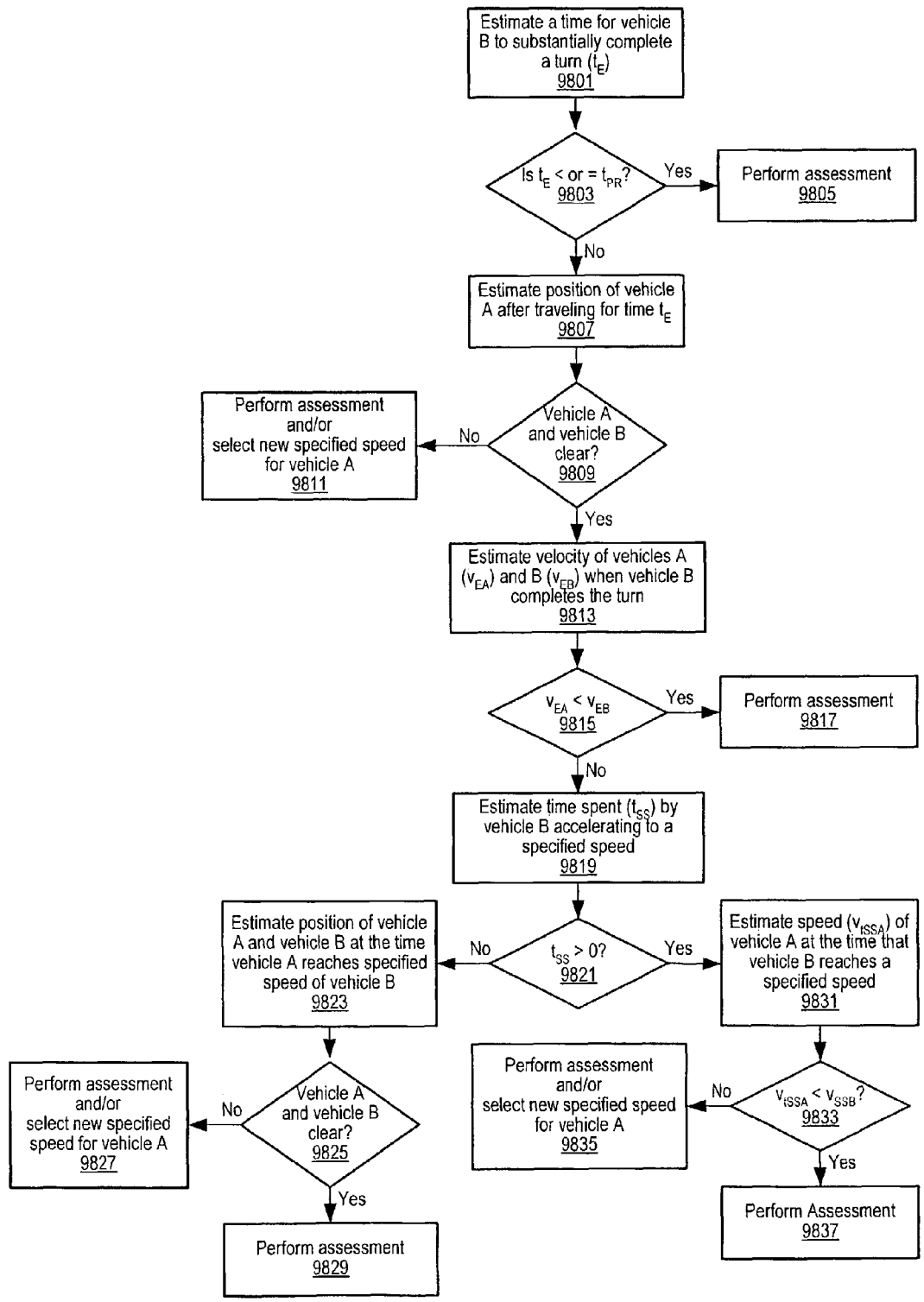
FIG. 98 depicts a flow chart of an embodiment of a method for assessing whether a straight vehicle may avoid an accident.

FIG. 98 depicts a flow chart of an embodiment of a method for assessing whether a straight vehicle (vehicle A) may avoid an accident for accident types illustrated in FIGS. 75e and 75g. Assessments made in FIG. 98 are summarized in TABLE 13. The method may include estimating 9801 the time for vehicle B to substantially complete a turn ($t_E$). Vehicle B is depicted at the completion of a turn by diagram 7533 in FIG. 75e or diagram 7539 in FIG. 75g. The distance traveled by vehicle B during time $t_E$ may be from the perception point (point C in FIG. 87) to the intended end position of vehicle B estimated by the method shown in FIG. 77. The intended end position may represent the position of vehicle B at the completion of a turn. $t_E$ may be compared 9803 to the perception-reaction time ($t_{PR}$) of vehicle A. If $t_E$ is less than or equal to $t_{PR}$, then there is no time for vehicle A to brake to avoid colliding with vehicle B. Assessments 9805 may be made of the opportunity of vehicle A to avoid the accident. Cases 24 and 25 in Table 13 may correspond to assessments 9805. For cases 24 and 25, it may be likely that the vehicle's speed did not play a significant role in the accident.

TABLE 13

ASSESSMENT OF REACTING VEHICLE A FOR CASES IN WHICH
VEHICLE B DOES NOT CLEAR THE COLLISION AREA

| Case | Speed | Reaction | Factor Shift (%) |
|---|---|---|---|
| 24 | Not applicable | Braking | 0 |
| 25 | Not applicable | No Braking | 5 |
| 24b | Safe Speed | Braking | 0 |
| 25b | Safe Speed | No Braking | 5 |
| 26 | Speed Limit | Braking | 3 |
| 27 | Speed Limit | Not Braking | 8 |
| 28 | Safe Speed | Braking | 0 |
| 29 | Safe Speed | No Braking | 5 |

TABLE 14

ASSESSMENT OF REACTING VEHICLE B FOR CASES IN WHICH
VEHICLE B DOES NOT CLEAR THE COLLISION AREA

| Case | Speed | Reaction | Factor Shift (%) |
|---|---|---|---|
| 30 | Actual Speed | Braking | 5 |
| 31 | Actual Speed | Not Braking | 10 |
| 32 | Safe Speed | Braking | 0 |
| 33 | Safe Speed | Not Braking | 5 |
| 34 | Safe Speed | — | 0 |

Alternatively, if $t_E$ greater than $t_{PR}$, then the opportunity for vehicle A to avoid the accident may be assessed for at least one specified speed of vehicle A. A specified speed may include, but is not limited to, the speed limit for vehicle A or the safe speed for vehicle A. In one embodiment, an assessment may be carried out using the speed limit of vehicle A if the speed limit of vehicle A is less than the actual speed of vehicle A. In addition, an assessment may be carried out using the safe speed of vehicle A if the safe speed of vehicle A is less than the speed limit and actual speed of vehicle A.

In certain embodiments, assessing the opportunity of vehicle A to avoid the accident may include estimating 9807 the position of vehicle A after traveling for time $t_E$ at a specified speed. The position of vehicle B after time $t_E$ may be the intended end position estimated in FIG. 77. The positions of vehicle A and vehicle B may be compared 9809 to determine whether the vehicles may be clear of one another. The position of the front of vehicle A may be compared to the position of the rear of vehicle B. For example, the position of the front of vehicle A may be the x coordinate of vehicleFP of vehicle A. Similarly, the position of the rear of vehicle B may be the x coordinate of vehicleLP of vehicle B. In some embodiments, vehicle A and vehicle B may be considered to be clear and not to have collided if the x coordinate of the position of the front of vehicle A is less than the x coordinate of the position of the rear of vehicle B. In other embodiments, a buffer may be used to define when a collision may have occurred. For example, vehicle A and vehicle B may be considered to be clear and not to have collided if the x coordinate of the position of the front of vehicle A minus a buffer value is less than the x coordinate of the position of the rear of vehicle B. The buffer value may be, for example, a half a vehicle length.

In one embodiment, if vehicle A and vehicle B are not clear and have collided 9809, assessments may be performed 9811 regarding the opportunity for vehicle A to avoid the accident. For example, if the specified speed is the safe speed of vehicle A, an assessment may be made. If vehicle A was braking from accelerating or braking from a constant rate then case 24b may apply. If vehicle A was not braking from accelerating or braking from a constant rate then case 25b may apply. It may be likely that vehicle A's speed did not play a significant role in the accident. Alternatively, another specified speed, lower than the previous specified speed, may be selected 9811 for assessment. The new assessment may begin at step 9807.

Furthermore, if it is determined that vehicle A and vehicle B are clear and have not collided, the velocity ($V_{EB}$) of vehicle B when it completes the turn may be estimated 9813. The velocity of vehicle A ($V_{EA}$) when vehicle B completes the turn may also be estimated 9813. $v_{EA}$ and $v_{EB}$ may then be compared 9815. If $V_{EA}$ is less than $V_{EB}$, then assessments may be performed 9817. Cases 26 and 27 in Table 13 may apply if the specified speed is the speed limit. Cases 28 and 29 in Table 13 may apply if the specified speed is the safe speed. It may be likely that vehicle A may avoid the accident if vehicle A was traveling at the specified speed.

If $v_{EA}$ is greater than $v_{EB}$, vehicle A may become closer and collide with vehicle B. The time spent ($t_{SS}$) by vehicle B accelerating to a specified speed starting at the end of the turn may then be estimated 9819. The specified speed may be, for example, the speed limit of vehicle B or the safe speed of vehicle B. At decision point 9821, it is determined whether $t_{SS}$ is greater than 0. If $t_{SS}$ is approximately zero, then vehicle B is already traveling approximately at its specified speed at the end of the turn. In this case, the position of vehicle A and the position of vehicle B at the time vehicle A reaches the specified speed of vehicle B may be estimated 9823. The positions of vehicle A and vehicle B may then be compared 9825 to determine whether the vehicles may be clear. The comparison may be performed in a manner similar to that at step 9809.

In one embodiment, if it is determined at decision point 9825 that vehicle A and vehicle B are clear, assessments may be performed 9829 regarding the opportunity for vehicle A to avoid the accident. Cases 26 and 27 in Table 13 may apply if the specified speed is the speed limit. Cases 28 and 29 in Table 13 may apply if the specified speed is the safe speed. In general, for these cases, it may be likely that vehicle A may avoid the accident if vehicle A was traveling at the specified speed.

Furthermore, if vehicle A and vehicle B are not clear, assessments may be performed 9827 and/or another specified speed may be selected. For example, if the specified speed is the safe speed of vehicle A, an assessment may be made. If vehicle A was braking from accelerating or braking from a constant rate then case 24 may apply. If vehicle A was not braking from accelerating or braking from a constant rate of speed then case 25 may apply. Alternatively, another specified speed for vehicle A, lower than the previous specified speed, may be selected 9827 for assessment. The new assessment may begin at step 9807.

In one embodiment, if $t_{SS}$ is greater than zero at decision point 9821, the speed ($V_{tSSA}$) of vehicle A at the time that vehicle B reaches a specified speed may be estimated 9831. $V_{tSSA}$ may then be compared 9833 to the specified speed of vehicle B ($V_{SSB}$) to determine whether vehicle A and vehicle B may collide. If $v_{tSSA}$ is greater than the specified speed for vehicle B, then it may be possible for vehicle A to become closer and collide with vehicle B. An assessment may be performed 9835 and/or another specified speed for vehicle A may be selected. Cases 25 and 26 may apply. It may be likely that vehicle A's speed did not play a significant role in the accident. Alternatively, another specified speed, lower than the previous specified speed, may be selected 9835 for an assessment. The new assessment may begin at step 9807.

If $V_{tSSA}$ is less than the specified speed for vehicle B at decision point 9833, then an assessment may be performed 9837. It may be unlikely that vehicle A would collide with vehicle B. Cases 26 and 27 in Table 13 may apply if the specified speed is the speed limit. Cases 28 and 29 in Table 13 may apply if the specified speed is the safe speed. It may be likely that vehicle A may avoid the accident if vehicle A was traveling at the specified speed.

Figure 99:
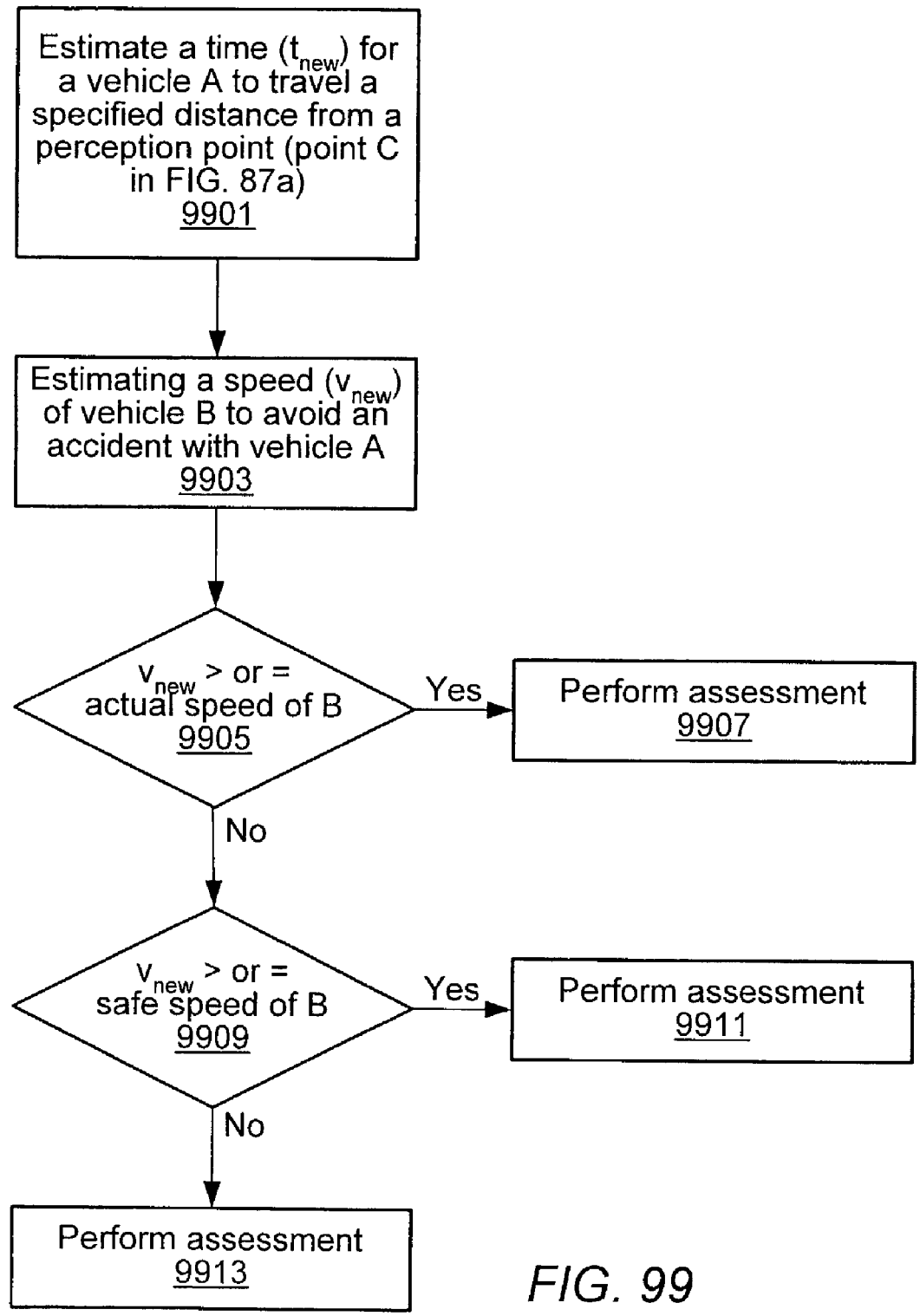
FIG. 99 depicts a flow chart of an embodiment of a method for assessing whether a turning vehicle may avoid an accident.

FIG. 99 depicts a flow chart of an embodiment of a method for assessing whether a turning vehicle (vehicle B) may avoid an accident for accident types illustrated in FIGS. 75e and 75g. The method may include estimating 9901 a time ($t_{new}$) for a vehicle A to travel a specified distance from the perception point (point C in FIG. 87a). The specified distance may be selected such that vehicle A is beyond the position of vehicle B at the end of the turn. The specified distance may be, for example, three vehicle lengths past the perception point. If vehicle A is accelerating from a stop before the accident, then $t_{new}$=specified distance/$v_C$ where $v_C$ is the velocity of vehicle A at point C in FIG. 87a. If vehicle A is at a constant speed or slowing before the accident, then $t_{new}$=specified distance/$v_0$ where $v_0$ is the initial or constant speed of vehicle A. The method may then include estimating 9903 a speed ($v_{new}$) of vehicle B to avoid an accident with vehicle A. Such a speed may result in vehicle B at or near the end of its turn after vehicle A has passed. The speed may be given by:

$v_{new}$=CD(from FIG. 87a)/$t_{new}$

The method may further include comparing 9905 $v_{new}$ with the actual speed of vehicle B. If $v_{new}$ is greater than or equal to the actual speed of B, then an assessment of whether vehicle B may have avoided the accident may be performed 9907. Cases 30 and 31 in Table 14 may apply. It may be likely that vehicle B should have been able to avoid the accident at the speed it was traveling.

If $v_{new}$ is less than the actual speed of B, then $v_{new}$ may be compared 9909 to the safe speed of B. If $v_{new}$ is greater than or equal to the safe speed of B, then an assessment may be performed 9911. Cases 32 and 33 in Table 14 may apply. It may be likely that vehicle B should have been able to avoid the accident at the safe speed. If $v_{new}$ is less than the safe speed of B, then case 34 in Table 14 may apply 9913. It may be likely that vehicle B's speed did not play a significant role in the accident.

In one embodiment, a total contribution to liability due to the speed of a vehicle may include a combination of the raw speed factor shift and the opportunity to avoid factor shift. The opportunity to avoid (OTA) shift may be obtained from the method depicted in FIG. 95 and Table 8, the method depicted in FIG. 97 and Table 12, or the method depicted in FIG. 98 and Tables 13 and 14. The raw speed shift may be obtained from the method depicted in FIG. 96 and Table 11. In some embodiments, the total speed factor shift may be given by:

Total Speed factor shift=OTA Shift+Raw speed shift

In other embodiments, the total speed factor shift may be limited by the maximum shift shown in Table 11. For example, the total speed factor shift may be given by the formula:

Total Speed factor shift=OTA Shift*[(Start %+(100− Start %)*% Excess]/100+Raw Speed Shift % Excess may refer to $S_{SafeExcess}$ or $S_{LimitExcess}$. In one embodiment, Start % may be about 20%.

In certain embodiments, a method may include providing a computer system configured to access a memory. The memory may include a theoretical path of at least one vehicle in an accident. The memory may also include a collision area. The theoretical path may be displayed as a graphical image in a graphical user interface. The method may further include displaying a collision area as a graphical image in a graphical user interface. At least one vehicle may also be displayed as a graphical image in the graphical user interface.

Figure 100:
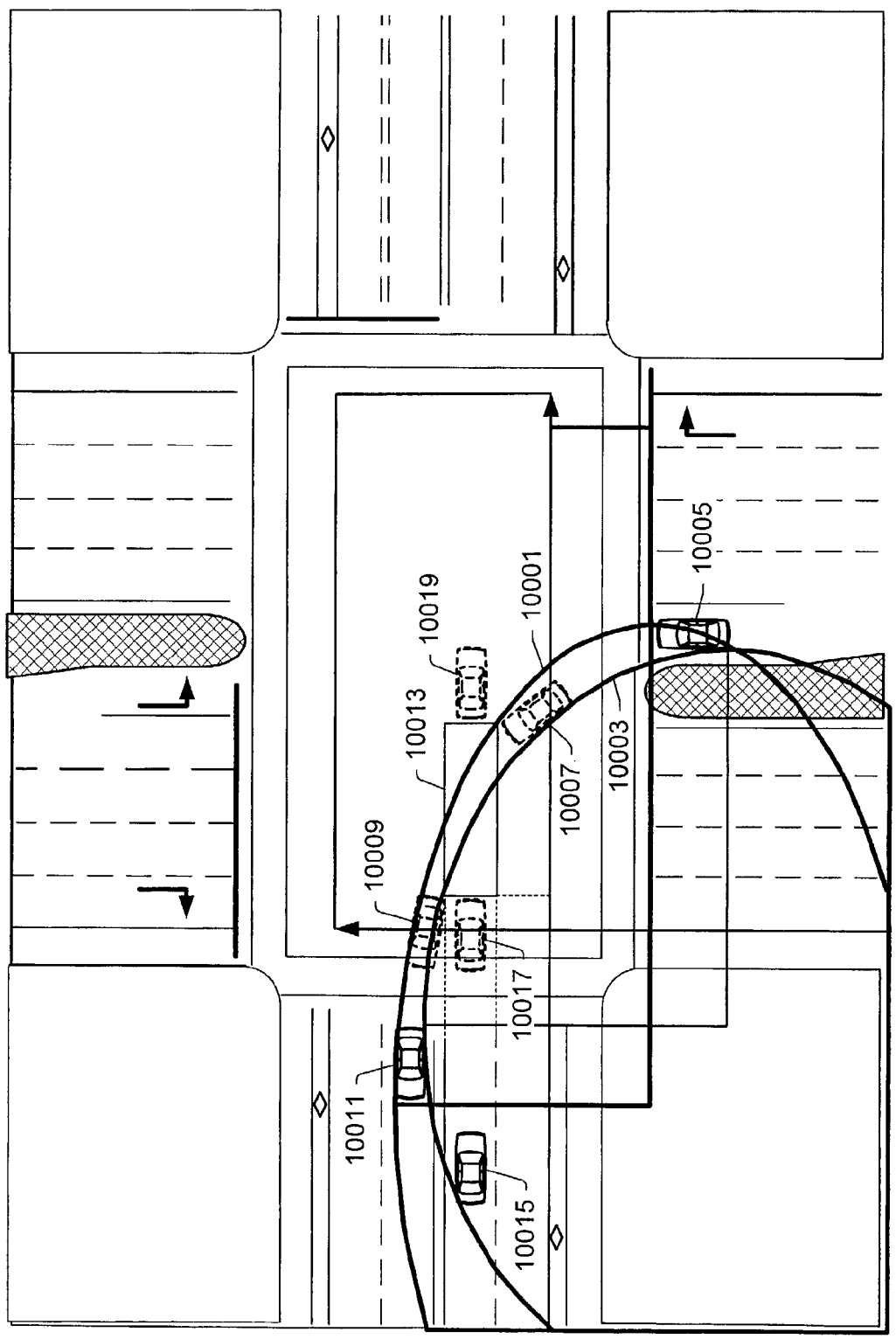
FIG. 100 depicts images of an accident scene on a graphical user interface.

FIG. 100 depicts images of an accident scene corresponding to accident type 3 on a graphical user interface. The figure illustrates trajectory 10001 of the first vehicle point and trajectory 10003 of the last vehicle point of a turning vehicle. A graphical image of the turning vehicle is shown at the start 10005 of the turn, just prior 10007 to entering collision area 10013, just after exiting 10009 collision area 10013, and at the completion 10011 of the turn. A graphical image of the straight vehicle is also shown prior to entering 10015 the intersection, just prior 10017 to entering collision area 10013, and just after 10019 exiting collision area 10013.

As described herein, a user may provide claim data for one or more claims to a computer system regarding a vehicle accident in a graphical user interface, for example, see FIGS. 42-45 and FIGS. 47-64. The claim data that is provided may be stored in a database associated with a method and system for estimating liability in an accident such as @Fault developed by Computer Sciences Corporation of El Segundo, Calif. A database associated with claim reporting software may also include at least some of the claim data for the one or more claims.

It may be advantageous in an embodiment to copy claim data from a database associated with the claim reporting software to a database associated with a method and system for estimating liability in an accident. In one embodiment, a method may include accessing claim data for one or more claims relating to a vehicle accident from a first database on a computer system. The first database may be associated with claim reporting software. In some embodiments, claim data for the one or more claims may be accessed periodically following a user-defined time period. For example, the user-defined time period may be daily, weekly, monthly, and yearly. The accessed claim data may be stored on a second database on the computer system. In some embodiments, the second database may be associated with a method and system for estimating liability in a vehicle accident. In an embodiment, a communications software program may access the claim data from the first database and store the claim data on the second database.

In some embodiments, the method may further include accessing claim data for one or more of the claims on the second database for use by the method and system for estimating liability in a vehicle accident. For example, a user of the method and system for estimating liability may prompt the computer system to access claim data for one or more of the claims in the second database.

Figure 101:
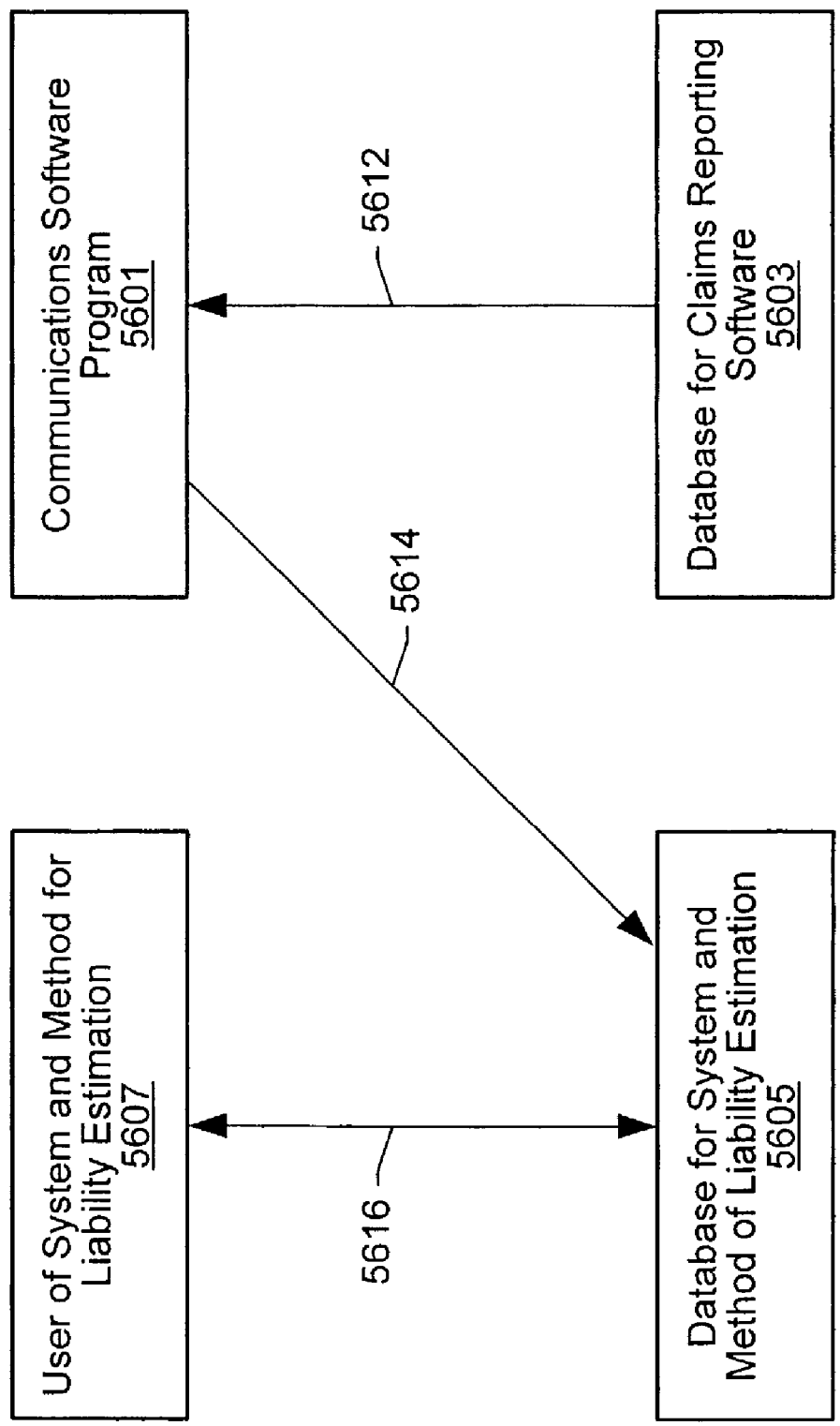
FIG. 101 is an illustration of a system and method for copying claim data.

FIG. 101 is an illustration of a system for copying claim data from one database to another. Diagrams 5601, 5603, 5605, and 5607 represent components of the system and method that interact with one another. Arrows 5612, 5614, and 5616 represent the flow of data between components. Communications Software Program 5601 may access claim data for one or more claims from Database for Claims Reporting Software 5603 as shown by arrow 5612. The Communications Software Program may be configured to access the claims data on a periodic basis, for example, nightly. The number of claims accessed may be at least one, however, hundreds, thousands, or more may be accessed. The claim data of the one or more claims may be transferred, as shown by arrow 5612, from Database 5603 by the Communications Software Program. In some embodiments, Communications Software Program 5601 may be configured to convert claim data stored in the format of Database 5603 to the format of Database 5605. The claim data may then stored, as shown by arrow 5614, on Database for System and Method of Liability Estimation 5605. User 5607 may then have access to the claim data for use by the system and method for estimating liability in an accident, as shown by arrow 5616.

In other embodiments, claim data for a claim relating to a vehicle accident may be requested. For example, a user of the method and system for estimating liability may prompt the computer system to access claim data of the claim. The claim data for the claim may be accessed from a first database if the claim data for the claim is not stored on a second database. In an embodiment, the first database may be associated with claim reporting software and the second database may be associated with a method and system for estimating liability in a vehicle accident. The claim data for the claim accessed from the first database may be stored on the second database on the computer system. The method may further include accessing the claim data for the claim on the second database for use by the method and system for estimating liability in a vehicle accident.

Figure 102:
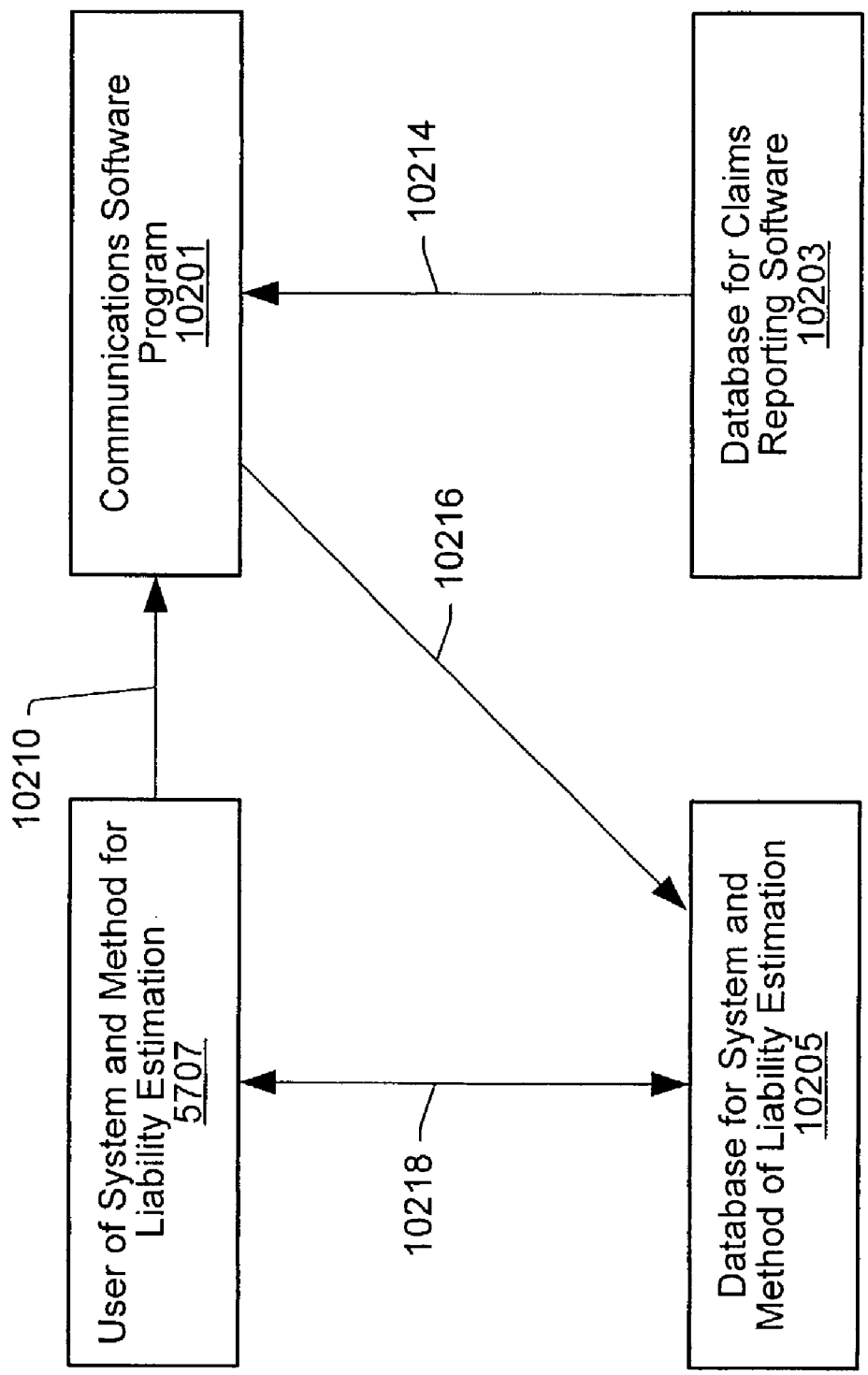
FIG. 102 is an illustration of a system and method for copying claim data.

FIG. 102 is another illustration of a system and method for copying claim data from one database to another. Diagrams 10201, 10203, 10205, and 10207 represent components of the system and method that interact with one another. Arrows 10210, 10214, 10216, and 10218 represent the flow of information and data between components. User 10207 may issue a request for claim data for a claim, as shown by arrow 10210, to Communications Software Program 10201. Communications Software Program 10201 may access claims data for the claim from Database for Claims Reporting Software 10203 as shown by arrow 10214. The claim data for the claim may be transferred, as shown by arrow 10214, from Database 10203 by the Communications Software Program. The claim data may then stored, as shown by arrow 10216, on Database 10205 for System and Method of Liability Estimation 10205. User 10207 may then have access to the claim, as shown by arrow 10218.

It may be useful or necessary to communicate claim information relating to liability determination performed by claims adjusters to other parties in a claims organization. For example, claim information may be sent for management review on a periodic basis. Alternatively, communication of claim information from a claims adjuster may be contingent upon specific conditions being met or satisfied. Generally, reporting such information periodically and identifying such conditions manually by a claims adjuster can be time consuming. In addition, such manual reporting may be inconsistent and unreliable. An alternative to manual reporting of claim information may include a method of automatically preparing and sending pre-configured reports to management personnel in a claims organization.

Figure 103:
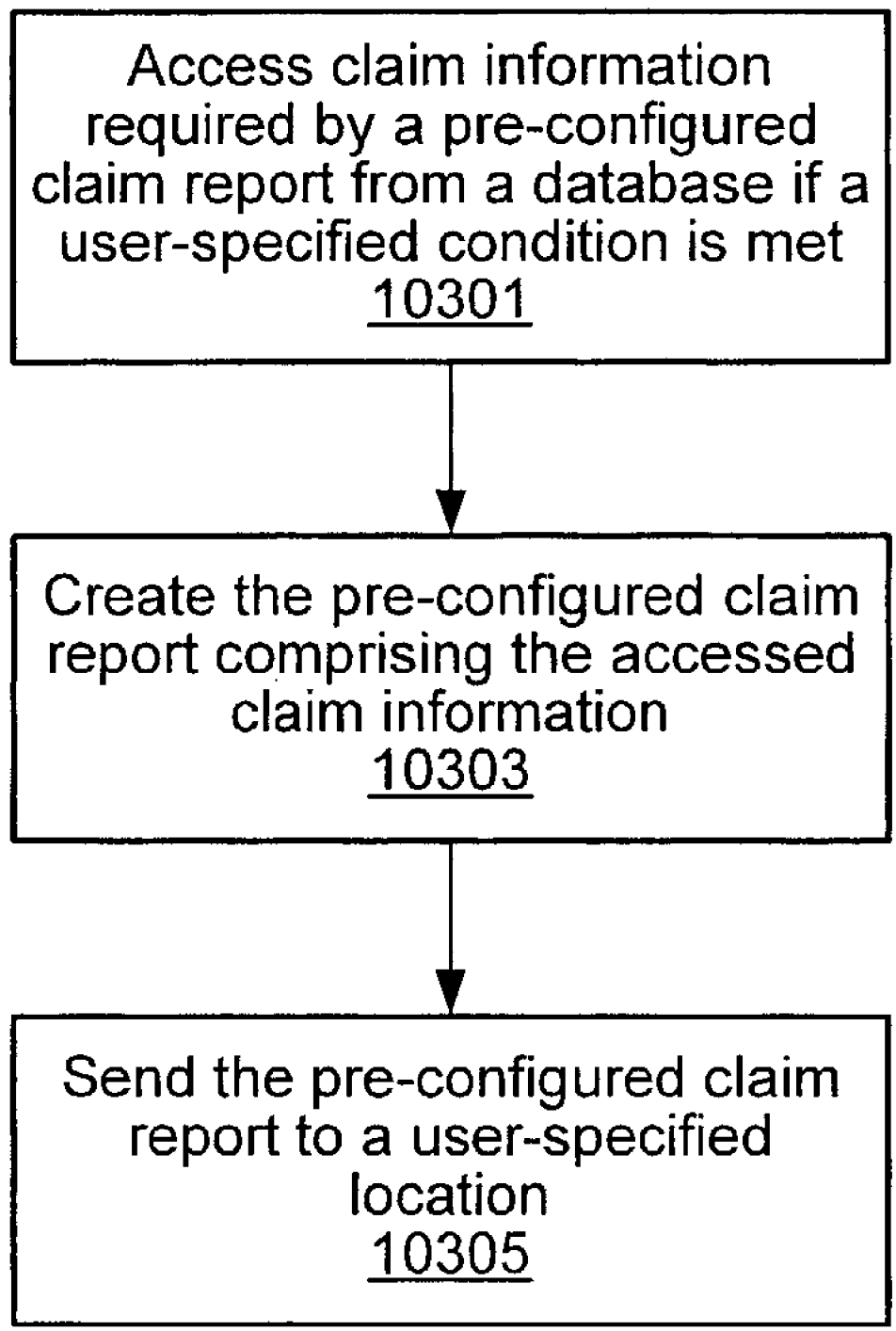

In one embodiment of a method of estimating liability, claim information required by a pre-configured claim report may be accessed from a database if a user-specified condition is met. FIG. 103 depicts a flow chart illustrating accessing of claim information at step 10301. During a liability estimation process, claim information relating to an accident may be entered and assessments may be made based on the claim information. Management personnel may desire to review the claim information and assessments if they meet certain conditions. For example, such conditions may include settlement liability within a particular range, settlement liability less than a particular value, settlement liability greater than a particular value, settlement liability with a particular magnitude of discrepancy with an assigned liability, assignment of an absolute liability value, assignment of a particular accident type, assignment of a particular roadway configuration, assignment of a particular liability, assignment of a particular range of liability, and assignment of a particular liability for a particular factor. An assigned liability may be obtained from a method for estimating liability in a vehicle accident, as described herein.

In some embodiments, the database may be associated with a method for estimating liability in a vehicle accident such as @Fault developed by Computer Sciences Corporation of El Segundo, Calif. Claim information required by the pre-configured claim report may include one or more of the following: names of parties, adjuster identification, claim number, jurisdiction, accident details, liability assigned to parties, liability range assigned to parties, and discrepancy between assigned liability and settlement liability. A pre-configured claim report may then be created that includes the required claim information as shown at step 10303 in FIG. 103. In an embodiment, the claim report may be sent to a user-specified location as indicated at step 10305. For example, the user-specified location may include an electronic mailbox or a printer. The electronic mailbox or printer may be associated with management personnel.

In some embodiments, accessing the required claim information may be performed by a business intelligence tool. In addition, a business intelligence tool may also create the pre-configured claim report. A "business intelligence tool" is a software program that coordinates the actions of gathering, processing and distributing decision-making information. In one embodiment, the software program "BusinessObjects" developed by Business Objects of San Jose, Calif. may be used. In general, BusinessObjects is a tool that allows users to access, analyze, and share information stored in multiple data sources. Users may create reports and analyze data with BusinessObjects. Data access software programs in BusinessObjects may be configured to access specific types of claim information from a database. In an embodiment, the data access programs may be represented by icons on the BusinessObjects desktop interface on the display screen of a personal computer. A pre-configured report may include one or more of the data access programs.

Figure 104:
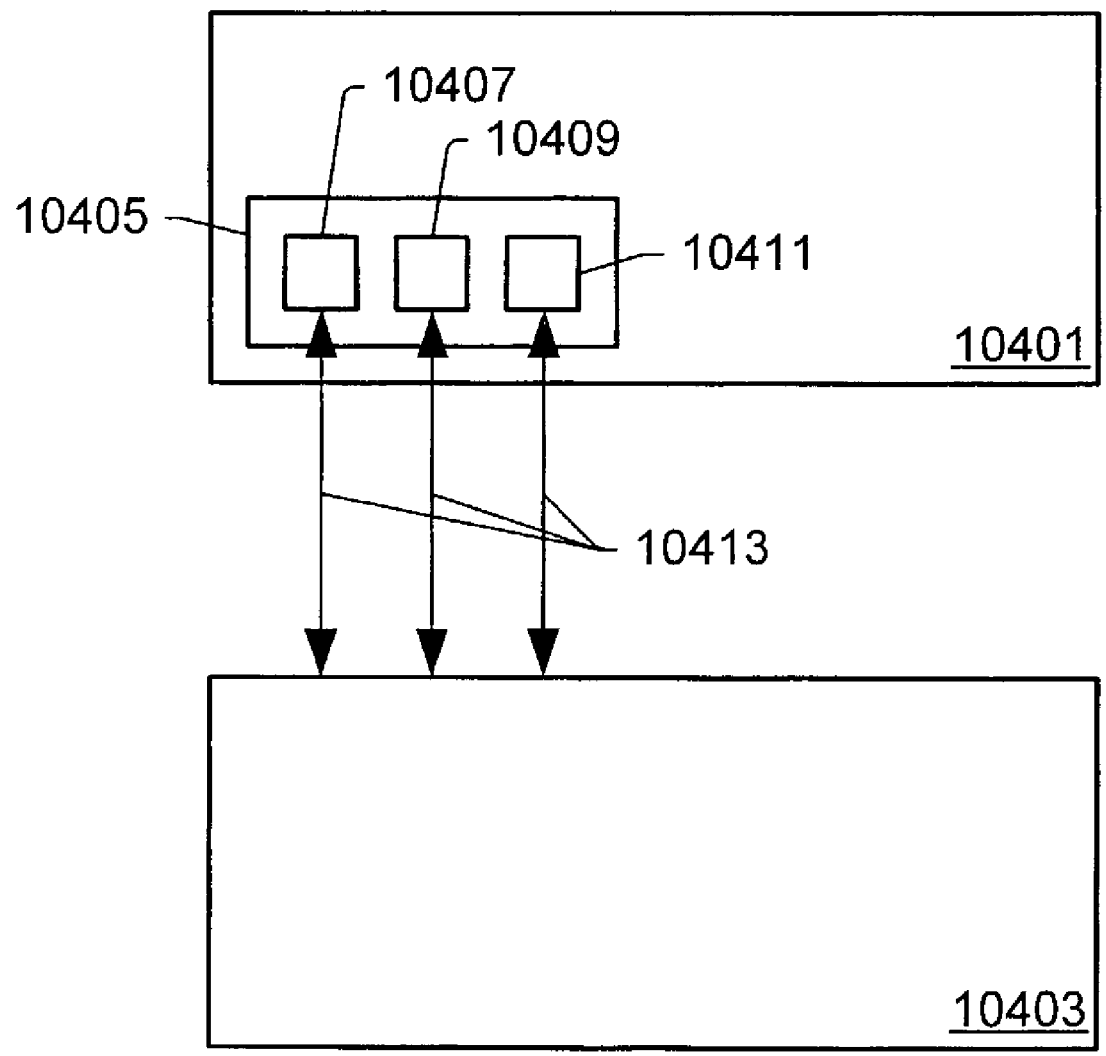

FIG. 104 represents a schematic illustration of a system for creating a pre-configured claim report. Diagram 10401 may represent a Business Intelligence tool such as BusinessObjects for creating a pre-configured claim report. Diagram 10403 may represent a database associated with a system for estimating liability in a vehicle accident. A pre-configured accident report may be created by template 10405. Template 10405 may include data access programs 10407, 10409, and 10411, which are programmed to access specific types of claim information from the database. Arrows 10413 represent the access of the specific types of claim information from the database by the data access programs.

FIG. 105 is an illustration of a claim report generated due to a user-specified condition being met. The user-specified condition is a discrepancy between an assigned liability and a settlement liability greater than 20 percent. The title of Report 10501 is "Discrepancy between Assigned Liability and Settlement Liability Greater than 20%." Row 10503 identifies claim information included in the claim report. Row 10505 includes the claim information for the claim that had the discrepancy.

In another embodiment, claim information on a computer system required by a pre-configured claim report for an accident may be accessed from a database periodically following a user-specified time period. The user-specified time period may be daily, weekly, monthly, and yearly. The claim report may include claims with one or more characteristics. Management personnel may desire to view reports relating to claims, for instance, that have been settled, settled within the user-specified time period, claims within a particular range of settlement value, claims with a particular assignment of liability, or claims with the assignment of a particular range of liability. A claim report may then be created and sent to a user-defined location. In an alternative embodiment, a pre-configured claim report may be requested by a user.

FIG. 106 is a schematic illustration of a portion of a claim report generated on a daily basis. Report 10601 with the title "Claims Settled on Jan. 28, 2002" is a periodic report generated on a daily basis. The report includes claim information on claims settled on Jan. 28, 2002. Row 10603 identifies claim information included in the claim report. Rows 10605 include the claim information for the claims that were settled.

In one embodiment, a method of estimating liability in an accident may include recording vehicle data of a vehicle relating to the accident in memory on a computer system. The computer system may be located in the vehicle. For example, an airbag module may be configured to record the vehicle data. Vehicle data of a vehicle may include the pre-impact speed, braking before the accident, engine speed before the accident, and throttle position before the accident. Engine speed may be measured in revolutions per minute (RPM). "RPM" is the revolutions per minute at which the engine crankshaft of a vehicle turns whether a vehicle is stationary or in motion. In addition, vehicle data may include post-accident change in velocity of the vehicle. The effect of the vehicle data on the liability of a party in the accident may then be estimated.

In one embodiment, the recorded vehicle data may be stored in a data file on a computer system. Vehicle data may be stored if an event such as an accident or sudden change in speed is detected by a sensor on the vehicle. In an embodiment, the stored vehicle data may be in a format that is not recognizable to general purpose computer software programs. Therefore, the recorded vehicle data may be decoded to a recognizable format.

An embodiment may also include determining one or more properties from the vehicle data. The one or more properties may include, for example, distance traveled before the accident, distance traveled after braking, acceleration, point of impact, and angle of impact. The effect of the one or more properties on the liability of a party in the accident may also be estimated.

In an embodiment, the vehicle data and the one or more properties may be used to assess the influence of factors on liability. For example, the vehicle data and such properties may be relevant to factors related to a driver's actions: following too closely, driving at an unsafe speed, a sudden stop or swerve, driving with taillights or brake lights off, unsafe backing, failure to take evasive action, and an improper lane change.

In another embodiment, the method may include evaluating accuracy of information relating to the accident provided by one or more sources. The data may be compared to corresponding properties provided in information from the one or more sources.

One embodiment for estimating liability from vehicle data and properties may include a first computer system and a second computer system. Vehicle data may be recorded in memory and stored in a data file on a first computer system. The vehicle data may then be retrieved from the first computer system with a second computer system.

The first computer system may be, for example, a vehicle's airbag sensing and diagnostic module. A second computer system may retrieve the vehicle data from the first computer system. After retrieval, the second computer system may decode the data such that the decoded data may be accessible to general purpose software programs. The method may further include estimating an effect of the data on the liability of a party. In some embodiments, the data may be retrieved by a third computer system, such as a laptop or desktop computer. The effect of the data on the liability of a party may be estimated on the third computer system.

Figure 107:
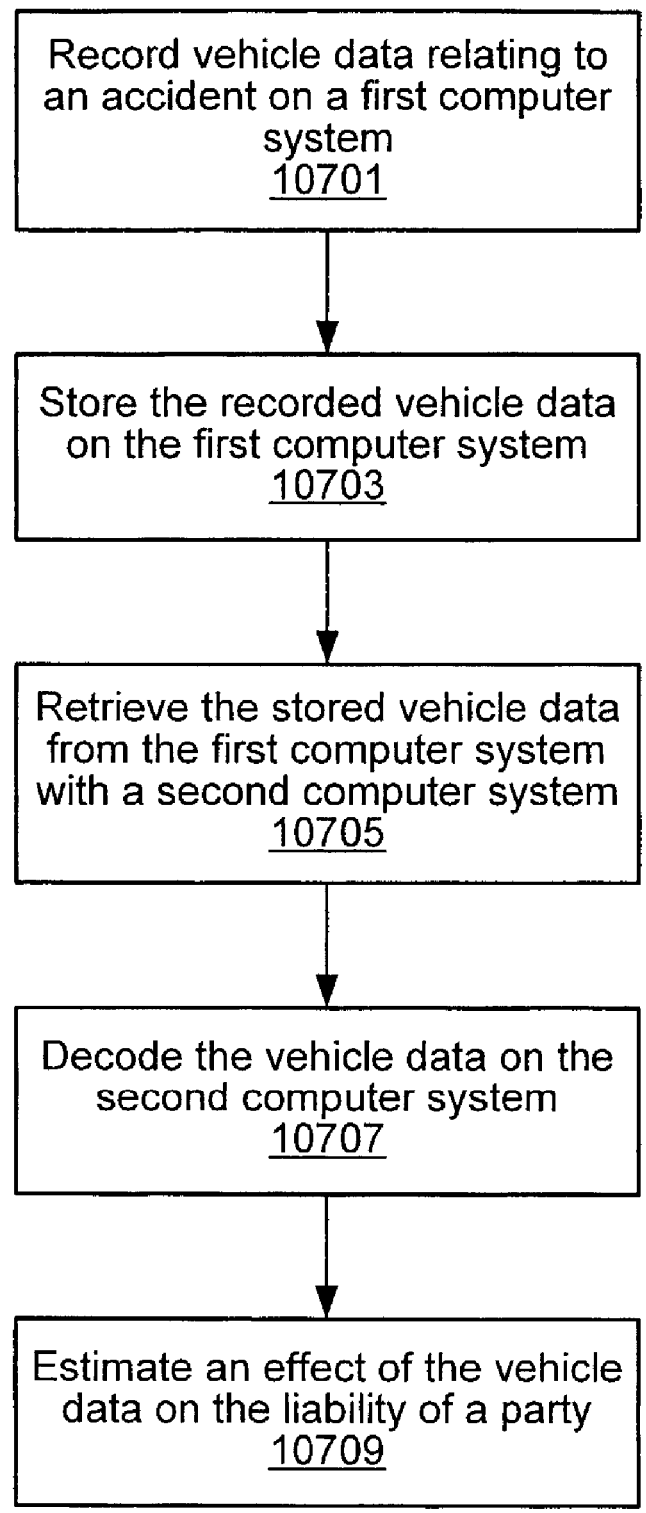

FIG. 107 is a flow chart illustrating a method of estimating liability that uses vehicle data recorded on a computer system in a vehicle. In step 10701, vehicle data may be recorded on a first computer system. Vehicle data may be stored on the first computer system as shown in step 10703. The stored vehicle data may be retrieved in step 10705 with a second computer system. At step 10707, vehicle data may be decoded on the second computer system. In step 10709, an effect of the data on the liability of a party may be determined. Liability may be estimated on a third computer system.

Figure 108:
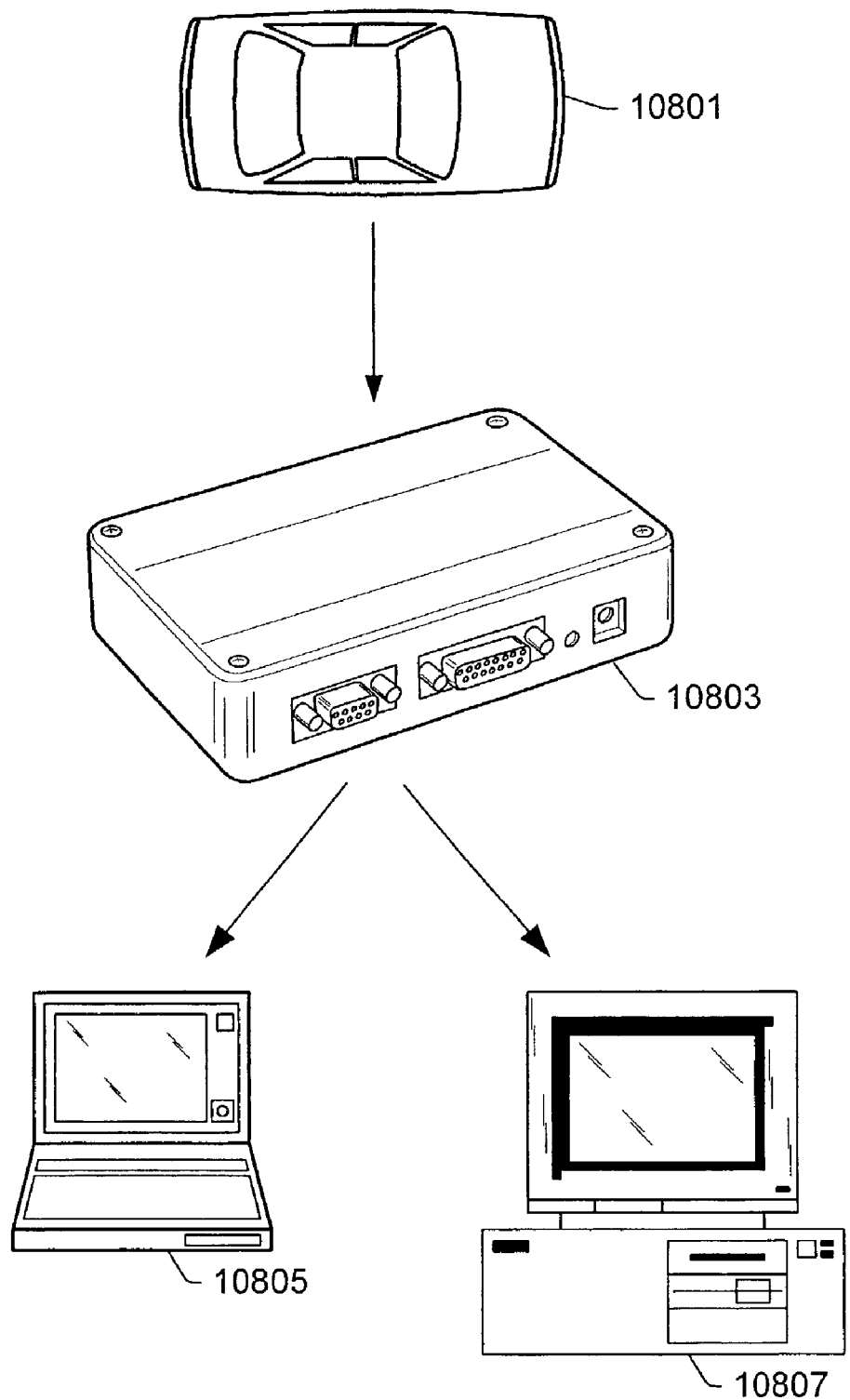

FIG. 108 illustrates a system for obtaining vehicle data for estimating the liability of a party in an accident. Arrows represent transfer of data between components of the system. Diagram 10801 illustrates a vehicle that has an airbag module installed that is configured to record vehicle data. An "airbag module" refers to a computer that controls airbag deployment. Since 1990, airbag modules configured to record vehicle data were installed in selected General Motors vehicles. An airbag module configured to record vehicle data may be referred to as a "Sensing and Diagnostic Module" (SDM). The SDM corresponds to the first computer system referred to in step 10701 in FIG. 107. The following data may be recorded by the SDM: brake status (5 seconds before impact), change in velocity vs. time for frontal airbag deployment event, engine speed (5 seconds before impact), maximum change in velocity for near-deployment event, throttle position (5 seconds before impact), time between near-deploy and deploy event (if within 5 seconds), time from vehicle impact to airbag deployment, time from vehicle impact to time of maximum change in velocity, and vehicle speed (5 seconds before impact).

The SDM may record two types of crash events. The first crash event may be referred to as a "near deployment event." A "near deployment event" is an event severe enough to initiate a sensing algorithm that initiates storage of vehicle data, but not severe enough to deploy the airbag(s). Both pre-crash and crash data may be recorded during a near deployment event. The SDM may store up to one near deployment event. The data from a near deployment event may be overwritten by an event with a greater SDM recorded velocity change.

The second type of SDM recorded crash event may be referred to as a "deployment event." A "deployment event" may be an event severe enough to initiate a sensing algorithm and to deploy the airbag(s). The SDM may also record both pre-crash and crash data during a deployment event. The SDM may store up to two different deployment events if the events occur within five seconds of one another. The first deployment event, which is the event that deploys the airbag, may be stored in a deployment file. The second deployment event may be stored in a near deployment file. Deployment events may not be overwritten or cleared from the SDM. Once the SDM has deployed the airbag, the SDM may be replaced.

Diagram 10803 in FIG. 108 illustrates an example of a module that may retrieve vehicle data recorded and stored by the SDM. Diagram 10803 is an illustration of a Crash Data Retrieval (CDR) system manufactured by Vetronix Corporation in Santa Barbara, Calif. The CDR includes hardware and software that retrieves pre- and post-crash data from the airbag module of a vehicle. The CDR may correspond to the second computer system referred to in step 10705 in FIG. 107. The CDR decodes portions of the data recorded by the SDM using proprietary algorithms. The Windows® based CDR software may depict the decoded data in graphs and tables. The pre-crash vehicle data that the CDR may provide includes brake status (on/off) 5 seconds before impact, vehicle speed 5 seconds before impact, engine speed 5 seconds before impact, and throttle position 5 seconds before impact. The post-crash data that the CDR provides includes change in velocity vs. time for a frontal airbag deployment event. The decoded vehicle data may be retrieved by laptop 10805 or desktop computer 10807 for further analysis. Laptop computer 10805 and Desktop computer 10807 in FIG. 108 may include software for analyzing data obtained from the CDR.

Figures 109, 110:
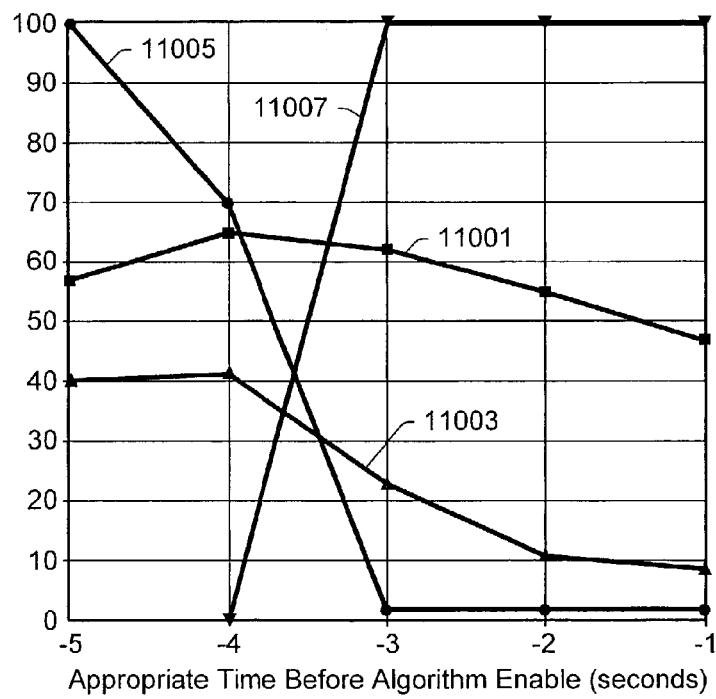

FIG. 109 illustrates vehicle data from the CDR. Column 10901 labeled "Seconds Before AE" is the time in seconds before the crash algorithm was enabled to store vehicle data. "AE" refers to "algorithm enabled." Since the algorithm is enabled by a collision, column 10901 represents the number of seconds before a crash. Column 10903 labeled "Vehicle Speed (MPH)" includes the vehicle speed in miles per hour. Column 10905 labeled "Engine Speed (RPM)" includes the speed of the engine in revolutions per minute. Column 10907 labeled "Throttle Position (percent)" includes the throttle open percent. "100" corresponds to a completely open throttle. Column 10909 labeled "Brake Switch Circuit Status" indicates whether or not the brakes are applied in the vehicle. The Brake Switch Circuit status is "OFF" when the brakes are not applied and "ON" when the brakes are applied.

FIG. 110 is graphical output of the CDR corresponding to the data depicted in FIG. 109. The abscissa labeled "Approximate Time Before Algorithm Enable (seconds)" corresponds to column 10901 in FIG. 109. Curve 11001 represents the pre-impact vehicle speed in miles per hour and corresponds to column 10903 in FIG. 109. Curve 11003 represents the engine speed in RPM/100 and corresponds to column 10905 in FIG. 109. Curve 11005 represents the throttle position and corresponds to column 10907 in FIG. 109. Curve 11007 represents the brake switch circuit status and corresponds to column 10909 in FIG. 109.

Figure 111:
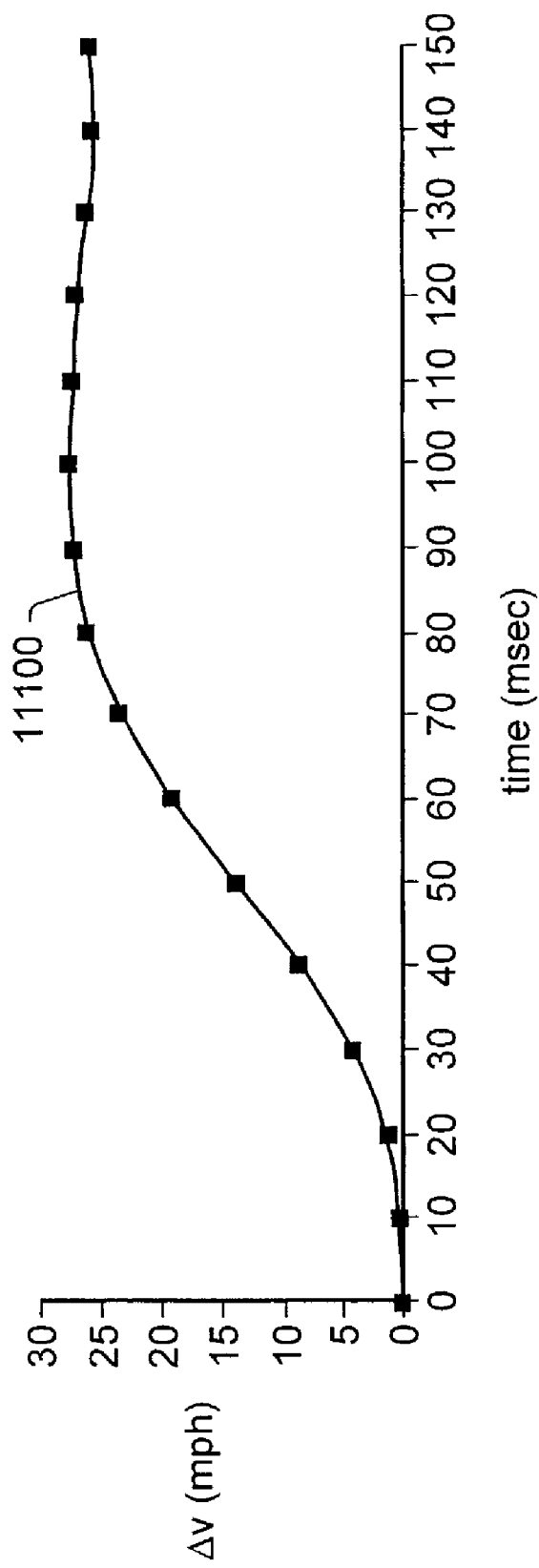

FIG. 111 is graphical output from the CDR for the post-accident decrease in velocity versus time. Curve 11100 shows that the velocity of the vehicle decreases by almost 30 miles per hour in the first 150 milliseconds after the crash.

Assessment of vehicle accident claims may include determining damages due to injuries to vehicle occupants. In one embodiment, a method of assessing a claim in a vehicle accident on a computer system may include estimating injuries to one or more vehicle occupants in a vehicle accident. The injuries to the one or more vehicle occupants may be estimated from one or more variables. The variables used to estimate the injuries may include one or more of the following: impact forces on vehicles in the accident, weight of the vehicles, positions of occupants in the vehicles, and pre-impact speed of the vehicles in the accident. The impact forces may be estimated from the pre-impact speed and the weight of the vehicles in the accident. In one embodiment, estimating the injuries may include determining the type and severity of injuries. Injuries may include damage to soft tissue and bones.

In an embodiment, the pre-impact speed of the vehicles in the accident may be estimated from crush damage to the vehicles. Alternatively, the pre-impact speed of one or more of the vehicles in the accident is obtained from data recorded on the one or more vehicles. The data may be recorded, for example, with an airbag diagnostic module.

In one embodiment, WrExpert software developed by Injury Sciences LLC of San Antonio, Tex. may be used to estimate injuries in a vehicle accident. For example, WrExpert may determine the types of injuries in a vehicle accident from impact forces on the vehicles, weight of the vehicles, positions of occupants in the vehicles, and pre-impact speed of the vehicles in the accident. The pre-impact speed may be determined by WrExpert from crush damage of the vehicles.

The method for assessing a claim may further include estimating damages due to injuries to one or more injured vehicle occupants. The damages due to injuries may depend upon the type and severity of an injury. The damages due to injuries may include compensation for medical treatment, lost wages, and pain and suffering. Damages due to injuries may be estimated with a software program called COLOSSUS developed by Computer Sciences Corporation of El Segundo, Calif. COLOSSUS is a comprehensive knowledge-based system software product used by the insurance industry. COLOSSUS assists the human decision-making process in assessing bodily injury claims. Its design includes insurance and medical expertise. An adjuster is guided through injury evaluation consultations with a series of detailed questions relating to a claim. COLOSSUS bases conclusions upon the severity of actual injuries and provides claims professionals with a valuation range for each claim. It may evaluate more than 600 injuries, for example, a broken arm, pinched nerve, strained back, bruised ribs, and torn muscles.

The method for assessing a claim may further include estimating the liability of the parties in the accident, as described herein. The relative fault of the parties in the accident may be determined. Adjusted damages due to injuries may be determined from the estimated damages due to injuries and the liability of the parties. For example, the adjusted damages due to injuries of a vehicle occupant that was in a given party's vehicle may be determined by reducing the estimated damages due to injuries of the vehicle occupant by the party's liability.

In one embodiment, a method of estimating liability for an accident may include estimating pre-impact speeds of one or more vehicles in an accident from the crush damage of the one or more vehicles. WrExpert software may be used to estimate the impact speed from crush damage of a vehicle. The effect of the pre-impact speeds of the vehicles on the liability of parties in the accident may then be estimated.

Figure 112:
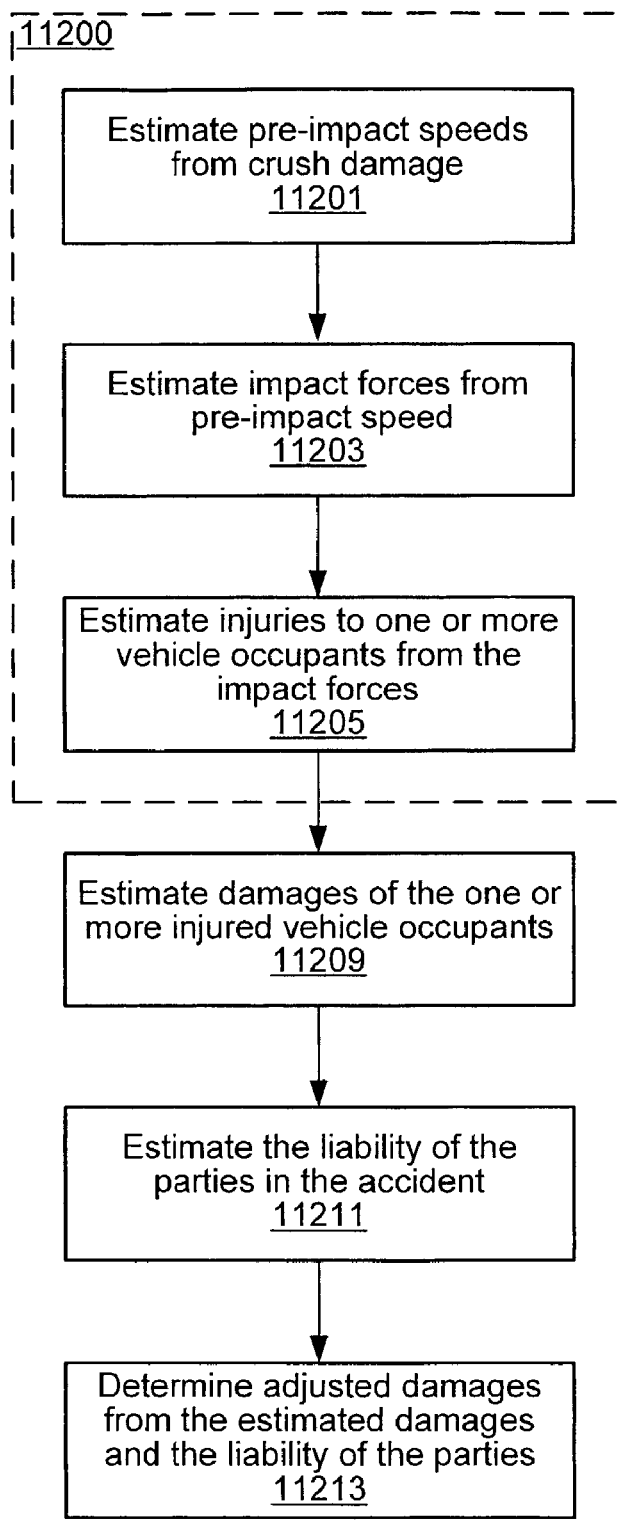

FIG. 112 is an illustration of one embodiment of assessing a claim. Diagram 11200 represents a software application such as WrExpert, as described above. The steps enclosed by diagram 11200 may be performed by WrExpert. At step 11201 the pre-impact speeds of vehicles in the accident may be estimated. The impact forces may then be estimated at step 11203. At step 11205, the injuries to one or more vehicle occupants may be estimated from the impact forces. The method continues to step 11209 where damages due to injuries of the one or more vehicle occupants may be estimated. Step 11209 may be performed by a software program such as COLOSSUS. The liability of the parties in the accident may be estimated at step 11211. Finally, the adjusted damages due to injuries may be determined from the estimated damages due to injuries and the liability of the parties at step 11213.

In a variation of the method illustrated in FIG. 112, the pre-impact speed of one or more of the vehicles in the accident may be determined from recorded crash data from an SDM on one or more of the vehicles. The impact forces may then be estimated at step 11203 from the recorded pre-impact speeds of one or more of the vehicles. The method may continue as described above. The results of the variation may be compared to the results from the method described above that used pre-impact speed estimated from crush damage.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method, comprising:
   providing a computer system configured to access a memory,
   wherein the memory comprises at least one numerical factor shift associated with each of at least two of a plurality of cases, wherein each of at least two of the plurality of cases includes:
      a value of a speed factor, wherein the value of the speed factor is based on a comparison between a specified speed of a reacting vehicle in an accident and at least one other speed, wherein the specified speed is an actual speed, a speed limit, or a safe speed; and
      a value of a braking factor, wherein the value of the braking factor is based on whether or not a reacting vehicle in a vehicle accident attempted to avoid the accident by braking;
   wherein the memory further comprises a theoretical path of at least one vehicle in a vehicle accident under consideration, wherein the memory comprises a probable collision area for the vehicle accident under consideration, wherein the probable collision area for the vehicle accident under consideration includes positions that a reference vehicle and a reacting vehicle in the accident under consideration are likely to occupy at impact, wherein the probable collision area is defined by a plurality of coordinates, and wherein the plurality of coordinates is estimated using the theoretical path of at least one point on at least one vehicle in the vehicle accident under consideration;
   in a graphical user interface, displaying the probable collision area for the vehicle accident under consideration as a graphical image having a particular shape and at least one boundary, wherein the particular shape and the at least one boundary are based on the plurality of coordinates estimated using the theoretical path of the at least one point on the at least one vehicle;
   displaying at least one vehicle as a graphical image in the graphical user interface;
   displaying the theoretical path as a graphical image in the graphical user interface;
   assessing, using the displayed graphical images, an opportunity for the reacting vehicle in the vehicle accident under consideration to have avoided the vehicle accident, wherein assessing the opportunity of the reacting vehicle in the vehicle accident under consideration to have avoided the accident comprises:
      the computer system comparing a specified speed of the reacting vehicle in the accident under consideration with at least one other speed, wherein the specified speed for the reacting vehicle under consideration is an actual speed, a speed limit, or a safe speed of the reacting vehicle;
      determining, for the vehicle accident under consideration, a value of a speed factor, wherein the value of the speed factor is based on the comparison of the specified speed of the reacting vehicle in the vehicle accident under consideration with the at least one other speed;
      determining, for the vehicle accident under consideration, a value of a braking factor, wherein the value of the braking factor is based on whether or not the reacting vehicle attempted to avoid the accident by braking;
   estimating, using the displayed graphical images, a contribution to liability of at least one party to the vehicle accident based on the opportunity of the reacting vehicle to avoid the accident, wherein estimating the contribution to liability comprises the computer system applying to a base liability, from among the numerical factor shifts associated with the plurality of cases in the memory, at least one numerical factor shift associated with a case, from among the plurality of cases, having:
      a value of a speed factor that matches the value of the speed factor for the accident under consideration; and
      a value of a braking factor that matches the value of the braking factor for the accident under consideration.

2. The method of claim 1, wherein the theoretical path comprises an ellipse.

3. The method of claim 1, wherein at least one vehicle comprises a turning vehicle.

4. The method of claim 1, wherein at least one vehicle comprises a straight traveling vehicle.

5. A system configured to estimate liability, comprising:
   a CPU;
   a data memory coupled to the CPU; and
   a system memory coupled to the CPU, wherein the system memory is configured to store one or more computer programs executable by the CPU, and wherein the computer programs are executable to implement a method comprising:
      providing a computer system configured to access a memory,
      wherein the memory comprises at least one numerical factor shift associated with each of at least two of a plurality of cases, wherein each of at least two of the plurality of cases includes:
         a value of a speed factor, wherein the value of the speed factor is based on a comparison between a specified speed of a reacting vehicle in an accident and at least one other speed, wherein the specified speed is an actual speed, a speed limit, or a safe speed; and a value of a braking factor, wherein the value of the braking factor is based on whether or not a reacting vehicle in a vehicle accident attempted to avoid the accident by braking;

wherein the memory further comprises a theoretical path of at least one vehicle in a vehicle accident under consideration, wherein the memory comprises a probable collision area for the vehicle accident under consideration, wherein the probable collision area for the vehicle accident under consideration includes positions that a reference vehicle and a reacting vehicle in the vehicle accident under consideration are likely to occupy at impact, wherein the probable collision area is a defined by a plurality of coordinates, and wherein the plurality of coordinates is estimated using the theoretical path of at least one point on at least one vehicle in the vehicle accident under consideration;

in a graphical user interface, displaying the probable collision area for the vehicle accident under consideration as a graphical image having a particular shape and at least one boundary, wherein the particular shape and the at least one boundary are based on the plurality of coordinates estimated using the theoretical path of the at least one point on the at least one vehicle;

displaying at least one vehicle as a graphical image in the graphical user interface;

displaying the theoretical path as a graphical image in the graphical user interface;

assessing, using the displayed graphical images, an opportunity for the reacting vehicle in the vehicle accident under consideration to have avoided the vehicle accident, wherein assessing the opportunity of the reacting vehicle in the vehicle accident under consideration to have avoided the accident comprises:

the computer system comparing a specified speed of the reacting vehicle in the accident under consideration with at least one other speed, wherein the specified speed for the reacting vehicle under consideration is an actual speed, a speed limit, or a safe speed of the reacting vehicle;

determining, for the vehicle accident under consideration, a value of a speed factor, wherein the value of the speed factor is based on the comparison of the specified speed of the reacting vehicle in the vehicle accident under consideration with the at least one other speed;

determining, for the vehicle accident under consideration, a value of a braking factor, wherein the value of the braking factor is based on whether or not the reacting vehicle attempted to avoid the accident by braking;

estimating, using the displayed graphical images, a contribution to liability of at least one party to the vehicle accident based on the opportunity of the reacting vehicle to avoid the accident, wherein estimating the contribution to liability comprises applying to a base liability, from among the numerical factor shifts associated with the plurality of cases in the memory, at least one numerical factor shift associated with a case, from among the plurality of cases, having:

a value of a speed factor that matches the value of the speed factor for the accident under consideration; and a value of a braking factor that matches the value of the braking factor for the accident under consideration.

6. A computer readable storage medium comprising program instructions stored thereon, wherein the program instructions are computer-executable to implement a method comprising providing a computer system configured to access a memory, wherein the memory comprises at least one numerical factor shift associated with each of at least two of a plurality of cases, wherein each of at least two of the plurality of cases includes:

a value of a speed factor, wherein the value of the speed factor is based on a comparison between a specified speed of a reacting vehicle in an accident and at least one other speed, wherein the specified speed is an actual speed, a speed limit, or a safe speed; and a value of a braking factor, wherein the value of the braking factor is based on whether or not a reacting vehicle in a vehicle accident attempted to avoid the accident by braking;

wherein the memory further comprises a theoretical path of at least one vehicle in a vehicle accident under consideration, wherein the memory comprises a probable collision area for the vehicle accident under consideration, wherein the probable collision area for the vehicle accident under consideration includes positions that a reference vehicle and a reacting vehicle are likely to occupy at impact, wherein the probable collision area is defined by a plurality of coordinates, and wherein the plurality of coordinates is estimated using the theoretical path of at least one point on at least one vehicle in the vehicle accident under consideration;

in a graphical user interface, displaying the probable collision area for the vehicle accident under consideration as a graphical image having a particular shape and at least one boundary, wherein the particular shape and the at least one boundary are based on the plurality of coordinates estimated using the theoretical path of the at least one point on the at least one vehicle;

displaying at least one vehicle as a graphical image in the graphical user interface;

displaying the theoretical path as a graphical image in the graphical user interface;

assessing, using the displayed graphical images, an opportunity for the reacting vehicle in the vehicle accident under consideration to have avoided the vehicle accident, wherein assessing the opportunity of the reacting vehicle in the vehicle accident under consideration to have avoided the accident comprises:

comparing a specified speed of the reacting vehicle in the accident under consideration with at least one other speed, wherein the specified speed for the reacting vehicle under consideration is an actual speed, a speed limit, or a safe speed of the reacting vehicle;

determining, for the vehicle accident under consideration, a value of a speed factor, wherein the value of the speed factor is based on the comparison of the specified speed of the reacting vehicle in the vehicle accident under consideration with the at least one other speed;

determining, for the vehicle accident under consideration, a value of a braking factor, wherein the value of the braking factor is based on whether or not the reacting vehicle attempted to avoid the accident by braking;

estimating, using the displayed graphical images, a contribution to liability of at least one party to the vehicle accident based on the opportunity of the reacting vehicle to avoid the accident, wherein estimating the contribution to liability comprises applying to a base liability, from among the numerical factor shifts associated with the plurality of cases in the memory, at least one numerical factor shift associated with a case, from among the plurality of cases, having:
- a value of a speed factor that matches the value of the speed factor for the accident under consideration; and
- a value of a braking factor that matches the value of the braking factor for the accident under consideration.

7. A method of assessing liability for a vehicle accident using a computer system, comprising:

providing a computer system configured to access a memory, wherein the memory comprises at least one numerical factor shift associated with each of at least two of a plurality of cases, wherein each of at least two of the plurality of cases includes:
- a value of a speed factor, wherein the value of the speed factor is based on a comparison between a specified speed of a reacting vehicle in an accident and at least one other speed, wherein the specified speed is an actual speed, a speed limit, or a safe speed; and
- a value of a braking factor, wherein the value of the braking factor is based on whether or not a reacting vehicle in a vehicle accident attempted to avoid the accident by braking;

estimating coordinates of a probable collision area for the vehicle accident under consideration comprising a collision point, wherein the probable collision area for the vehicle accident under consideration is a defined area having coordinates, wherein the defined area includes positions that a reference vehicle and a reacting vehicle in the vehicle accident under consideration are likely to occupy at impact;

estimating a time for the reference vehicle to clear the probable collision area for the vehicle accident under consideration, wherein the reference vehicle has cleared the probable collision area for the vehicle accident when all parts of the vehicle have exited from the defined area;

estimating a time for the reacting vehicle to reach the probable collision area for the vehicle accident under consideration, wherein the reacting vehicle has reached the probable collision area when a part of the vehicle enters the defined area;

assessing an opportunity of the driver of the reacting vehicle to avoid the vehicle accident under consideration based on the estimated time for the reacting vehicle to reach the probable collision area, wherein assessing the opportunity of driver of the reacting vehicle to have avoided the accident comprises:
- the computer system comparing a specified speed of the reacting vehicle in the accident under consideration with at least one other speed, wherein the specified speed for the reacting vehicle under consideration is an actual speed, a speed limit, or a safe speed of the reacting vehicle;
- determining, for the vehicle accident under consideration, a value of a speed factor, wherein the value of the speed factor is based on the comparison of the specified speed of the reacting vehicle in the vehicle accident under consideration with the at least one other speed;
- determining, for the vehicle accident under consideration, a value of a braking factor, wherein the value of the braking factor is based on whether or not the reacting vehicle attempted to avoid the accident by braking; and estimating a contribution to liability to the reacting vehicle based on the opportunity of the reacting vehicle to avoid the vehicle accident, wherein estimating the contribution to liability comprises the computer system applying to a base liability, from among the numerical factor shifts associated with the plurality of cases in the memory, at least one numerical factor shift associated with a case, from among the plurality of cases, having
- a value of a speed factor that matches the value of the speed factor for the accident under consideration; and
- a value of a braking factor that matches the value of the braking factor for the accident under consideration.

8. The system of claim 5, wherein the method further comprises using the graphical images to assess the opportunity of at least one vehicle to avoid the accident.

9. The method of claim 7, wherein estimating the contribution to liability to the reacting vehicle further comprises using the graphical images.

10. The method of claim 1, wherein the shape of the probable collision area is a polygon.

11. The method of claim 1, wherein the coordinates of the probable collision area are estimated using the theoretical paths of at least two vehicles in the accident.

12. The method of claim 1, wherein the coordinates of the probable collision area are estimated using a collision lane and a trajectory of at least one point on a turning vehicle.

13. The method of claim 1, further comprising selecting at least one vehicle point and using the at least one selected vehicle point to estimate the probable collision area.

14. The method of claim 1, further comprising:
- selecting a first vehicle point, a last vehicle point, and a collision point, wherein the first vehicle point is the first point on a vehicle to occupy a probable collision area, wherein the last vehicle point is the last point to occupy a probable collision area, and
- using the first vehicle point, the last vehicle point, and the collision point to estimate the probable collision area.

15. The method of claim 7, wherein the defined shape is polygonal.

16. The method of claim 1, wherein displaying the theoretical path comprises displaying an intended end position of the at least one vehicle.

17. The method of claim 1, further comprising:
- wherein at least one of the plurality of cases in the memory further comprises:
  - a value of an outcome factor, wherein the value of the outcome factor is based on a manner by which a vehicle accident may have been avoided, wherein the manner of avoiding the vehicle accident is one of: stopping, delaying at a specified speed, or maintaining a specified speed;
- wherein assessing an opportunity of the reacting vehicle to avoid the vehicle accident under consideration further comprises:
  - determining, for the vehicle accident under consideration, a value of an outcome factor;
- wherein estimating the liability for the at least one party in the vehicle accident under consideration comprises applying, to a base liability, a numerical factor shift in the memory that is associated with a case, from among the plurality of cases, that matches the value of the speed factor for the vehicle accident under consideration, matches the value of the braking factor for the vehicle accident under consideration, and matches the value of the outcome factor for the vehicle accident under consideration.

18. The method of claim 1, wherein comparing the specified speed for the reacting vehicle in the accident under consideration to the at least one other speed comprises comparing the specified speed for the reacting vehicle in the accident with a speed for avoiding, wherein the speed for avoiding is an approximate speed that allows the reacting vehicle to avoid an accident.

19. The method of claim 18, wherein the speed for avoiding to which the specified speed is compared is a maintain-to-delay speed, wherein the maintain-to-delay speed is an approximate maximum speed to avoid the vehicle accident by maintaining a constant rate of speed.

20. The method of claim 18, wherein the speed for avoiding to which the specified speed is compared is a brake-to-delay speed, wherein the brake-to-delay speed is an approximate maximum speed to avoid the vehicle accident by braking without stopping.

* * * * *